(12) United States Patent
Furukawa et al.

(10) Patent No.: US 8,072,979 B2
(45) Date of Patent: Dec. 6, 2011

(54) TERMINAL-TO-TERMINAL COMMUNICATION CONTROL SYSTEM FOR IP FULL SERVICE

(75) Inventors: Hisao Furukawa, Saitama (JP); Shoji Miyaguchi, Chiba (JP)

(73) Assignees: The Distribution Systems Research Institute, Tokyo (JP); Miyaguchi Research Co., Ltd., Chiba (JP)

( * ) Notice: Subject to any disclaimer, the term of this patent is extended or adjusted under 35 U.S.C. 154(b) by 1187 days.

(21) Appl. No.: 11/818,120

(22) Filed: Jun. 12, 2007

(65) Prior Publication Data

US 2007/0297393 A1 Dec. 27, 2007

(51) Int. Cl.
*H04L 12/56* (2006.01)
*G06F 15/16* (2006.01)

(52) U.S. Cl. ........................ 370/392; 709/249
(58) Field of Classification Search .......... None
See application file for complete search history.

(56) References Cited

U.S. PATENT DOCUMENTS

| | | | |
|---|---|---|---|
| 4,933,937 A | 6/1990 | Konishi | 370/85.13 |
| 5,732,078 A | 3/1998 | Arango | 370/355 |
| 5,751,971 A | 5/1998 | Dobbins et al. | 395/200.68 |
| 5,793,763 A | 8/1998 | Mayes et al. | 370/389 |
| 5,825,772 A | 10/1998 | Dobbins et al. | 370/396 |
| 5,898,830 A | 4/1999 | Wesinger, Jr. et al. | 395/187.01 |
| 5,999,612 A | 12/1999 | Dunn et al. | 379/212 |
| 6,006,258 A | 12/1999 | Kalajan | 709/245 |
| 6,006,272 A | 12/1999 | Aravamudan et al. | 709/245 |
| 6,069,890 A | 5/2000 | White et al. | 370/352 |
| 6,075,783 A | 6/2000 | Voit | 370/352 |
| 6,094,431 A | 7/2000 | Yamato et al. | 370/395 |
| 6,104,711 A | 8/2000 | Voit | 370/352 |
| 6,145,011 A | 11/2000 | Furukawa et al. | 709/245 |
| 6,233,234 B1 | 5/2001 | Curry et al. | 370/356 |
| 6,243,379 B1 | 6/2001 | Veerina et al. | 370/389 |
| 6,249,820 B1 | 6/2001 | Dobbins et al. | 709/238 |
| 6,252,952 B1 | 6/2001 | Kung et al. | 379/114.1 |
| 6,308,148 B1 | 10/2001 | Bruins et al. | 703/27 |
| 6,321,337 B1 | 11/2001 | Reshef et al. | 726/14 |
| 6,324,280 B2 | 11/2001 | Dunn et al. | 379/230 |
| 6,339,594 B1 | 1/2002 | Civanlar et al. | 370/352 |
| 6,353,614 B1 | 3/2002 | Borella et al. | 370/389 |
| 6,396,840 B1 | 5/2002 | Rose et al. | 370/401 |

(Continued)

FOREIGN PATENT DOCUMENTS

EP 0 698 975 A2 2/1996

(Continued)

OTHER PUBLICATIONS

U.S. Appl. No. 10/620,785, filed May 9, 2000, Furukawa et al.

(Continued)

*Primary Examiner* — Ricky Ngo
*Assistant Examiner* — Clemence Han
(74) *Attorney, Agent, or Firm* — Sughrue Mion, PLLC

(57) ABSTRACT

The present invention relates to a terminal-to-terminal communication connection control method using an IP network characterized in that: in order for a mobile telephone set to have a telephone communication with a fixed telephone set by way of a mobile communication network and an IP network, the mobile communication network carries out a line connection control based on the common channel signaling system; the IP network establishing a communication path by carrying out a line connection control applying a common channel signaling system to the IP network thereby effecting a telephone communication.

29 Claims, 105 Drawing Sheets

U.S. PATENT DOCUMENTS

| | | | |
|---|---|---|---|
| 6,457,061 | B1 | 9/2002 | Bal et al. ................... 709/245 |
| 6,523,069 | B1 | 2/2003 | Luczycki et al. ........... 709/249 |
| 6,654,456 | B1 | 11/2003 | Mandalia et al. ....... 379/220.01 |
| 6,724,747 | B1 | 4/2004 | Arango et al. ............... 370/352 |
| 6,934,278 | B1 | 8/2005 | Champa et al. ............. 370/352 |
| 7,006,433 | B1 | 2/2006 | Dantu et al. ................. 370/218 |
| 7,047,561 | B1 | 5/2006 | Lee .............................. 726/12 |
| 2001/0034794 | A1* | 10/2001 | Nie ............................ 709/242 |
| 2002/0009073 | A1 | 1/2002 | Furukawa et al. ........... 370/352 |
| 2002/0118676 | A1 | 8/2002 | Tonnby et al. ............... 370/352 |
| 2002/0124084 | A1 | 9/2002 | Furukawa et al. ........... 709/225 |
| 2002/0152311 | A1 | 10/2002 | Veltman et al. ............. 709/227 |
| 2002/0154635 | A1* | 10/2002 | Liu ............................. 370/392 |
| 2003/0172160 | A9* | 9/2003 | Widegren et al. ........... 709/226 |
| 2005/0059390 | A1* | 3/2005 | Sayers et al. ................ 455/425 |
| 2005/0086379 | A1 | 4/2005 | Asami ......................... 709/245 |
| 2005/0281285 | A1* | 12/2005 | Inoue et al. ................. 370/465 |
| 2006/0077978 | A1* | 4/2006 | Sprague et al. ............. 370/392 |
| 2007/0038698 | A1* | 2/2007 | Peterson ..................... 709/203 |
| 2007/0258457 | A1* | 11/2007 | Sakamoto et al. ........... 370/392 |
| 2009/0323694 | A1* | 12/2009 | Miki et al. .................. 370/392 |
| 2010/0226371 | A1* | 9/2010 | Shimonishi ................. 370/392 |

FOREIGN PATENT DOCUMENTS

| | | |
|---|---|---|
| EP | 0 825 748 A2 | 2/1998 |
| EP | 0 851 635 A2 | 7/1998 |
| EP | 0 851 653 A2 | 7/1998 |
| EP | 0 928 095 A2 | 7/1999 |
| EP | 0 973 343 A1 | 1/2000 |
| EP | 1 054 568 A2 | 11/2000 |
| GB | 2 313 981 A | 12/1997 |
| GB | 2 320 167 | 6/1998 |
| GB | 2 332 818 A | 6/1999 |
| GB | 2 352 111 | 1/2001 |
| JP | 11-088438 | 3/1999 |
| JP | 128956/1999 | 5/1999 |
| JP | 128956/1999 A1 | 5/1999 |
| JP | 128956/1999 A3 | 5/1999 |
| JP | 128956/1999 A4 | 5/1999 |
| JP | 11-239178 | 8/1999 |
| JP | 3084681 | 9/2000 |
| JP | 3084681 A2 | 9/2000 |
| JP | 3084681 A4 | 9/2000 |
| JP | 3084681 B1 | 9/2000 |
| JP | 3084681 B2 | 9/2000 |
| WO | 97/23078 | 6/1997 |
| WO | 97/28628 | 8/1997 |
| WO | 97/31492 | 8/1997 |
| WO | 97/48051 | 12/1997 |
| WO | 98/06201 | 2/1998 |
| WO | 98/20724 | 5/1998 |
| WO | 98/30008 | 7/1998 |
| WO | 98/59523 | 12/1998 |
| WO | 99/14931 | 3/1999 |
| WO | 99/28827 | 6/1999 |
| WO | 99/37061 | 7/1999 |
| WO | 00/16206 | 3/2000 |
| WO | 00/51331 | 8/2000 |
| WO | 01/24499 | 4/2001 |
| WO | 01/37529 A1 | 5/2001 |

OTHER PUBLICATIONS

U.S. Appl. No. 09/165,212, filed, Oct. 2, 1998, Furukawa et al.

U.S. Appl. No. 09/568,515, filed May 9, 2000, Furukawa et al.

Nagami, K., et al.,, "VCID Notification for Label Switching," IEICE Transactions on Information and Comm. Eng. Tokyo, JP, vol. E82-D, No. 4, pp. 863-869, (Apr. 1999).

Giacometti, S., et al., "Tunnelling Effectiveness in the Access Environment," 38th European Telecommunications Congress, pp. 101-105 (Aug. 24, 1999).

Anquetil, L.-P., et al., "Media Gateway Control Protocol and Voice Over IP Gateways," IEEE Communications Magazine, pp. 110-116 (Jul. 1999).

Gbaguidi, C., et al., "A Programmable Architecture for the Provision of Hybrid Services," IEEE Communications Magazine, pp. 110-116 (Jul. 1999).

Hui, S.C., et al., "Towards a Standards-Based Internet Telephony System," Computer Standards & Interfaces, vol. 19, pp. 89-103 (1998).

Hunt, R., "Internet/Intranet Firewall Security-Policy, Architecture, and Transaction Services," Computer Communications, vol. 21, pp. 1107-1123 (1998).

Malkin, G.S., "Dial-In Virtual Private Networks Using Layer 3 Tunneling," IEEE, pp. 555-561 (1997).

European Search Report (14 pages), which was mailed on Oct. 20, 2003, for European Patent Application No. 01200880.1.

Hamdi, M., et al., "Voice Service Interworking for PSTN and IP Networks," IEEE Communications Magazine, vol. 37, No. 5, pp. 104-111 (May 1999).

"Packet-based multimedia communications systems," ITU-T Recommendation H.323—Annex D, (Sep. 1998), 10 pages.

Australian Written Opinion for Singapore Patent Application No. SG 200102034-6 (Date: Jun. 24, 2002; No. Of pages : 6) , which corresponds to the above-identified U.S. Appl. No. 10/165,326.

U.K. Search Report for U.K. Patent Application No. GB 0011091.6 (Date: Nov. 29, 2000; No. Of pages: 1), which corresponds to the above-identified U.S. Appl. No. 10/165,326.

European Search Report for EPO Patent Application No. EP01200880 (Date: Nov. 28, 2002; No. Of pages; 4), which is related to the above- identified U.S. Appl. No. 10/165,326.

* cited by examiner

PRIOR ART

| SIP / H322-sig, H245 etc. |
| --- |
| CC (Connection Control) (IAM,ACM,CPG,ANM,REL,RLC,etc.) |
| IP (protocol type="CC") |
| Data Link |
| Physical layer |

59-2

| SIP / H322-sig, H245 etc. |
| --- |
| CC (Connection Control) (IAM,ACM,CPG,ANM,REL,RLC,etc.) |
| UDP |
| IP (protocol type="UDP") |
| Data Link |
| Physical layer |

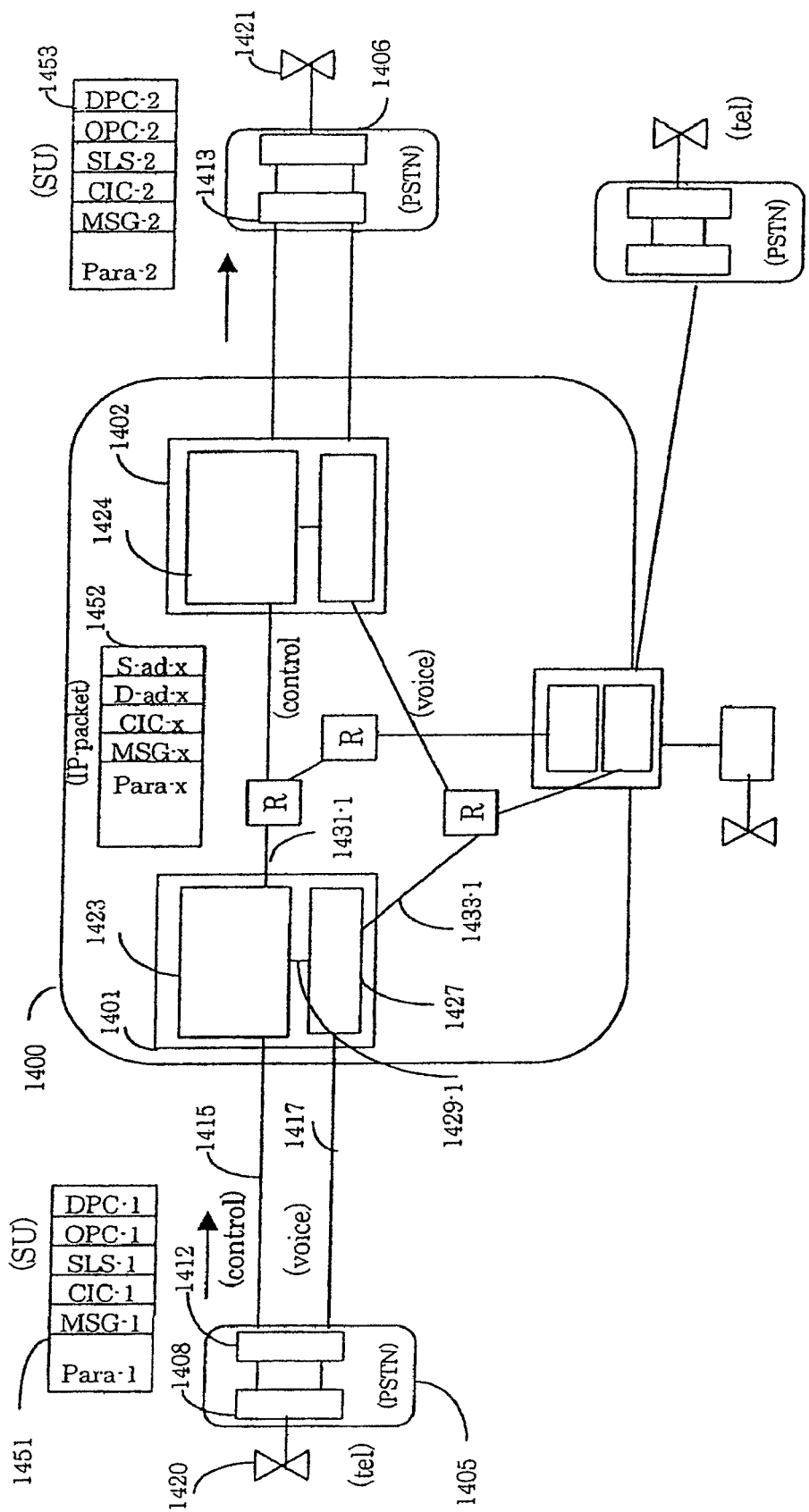

Fig.9 PRIOR ART
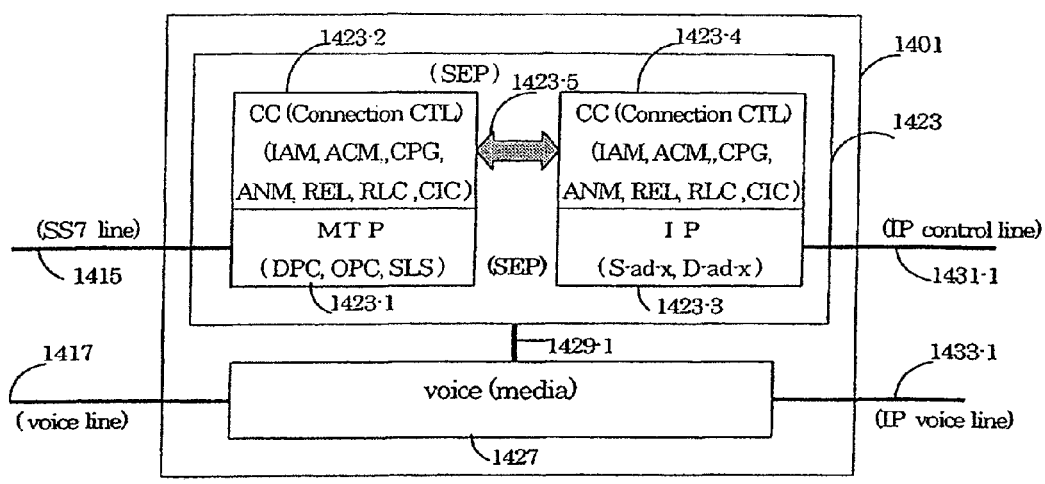
Fig.10 PRIOR ART
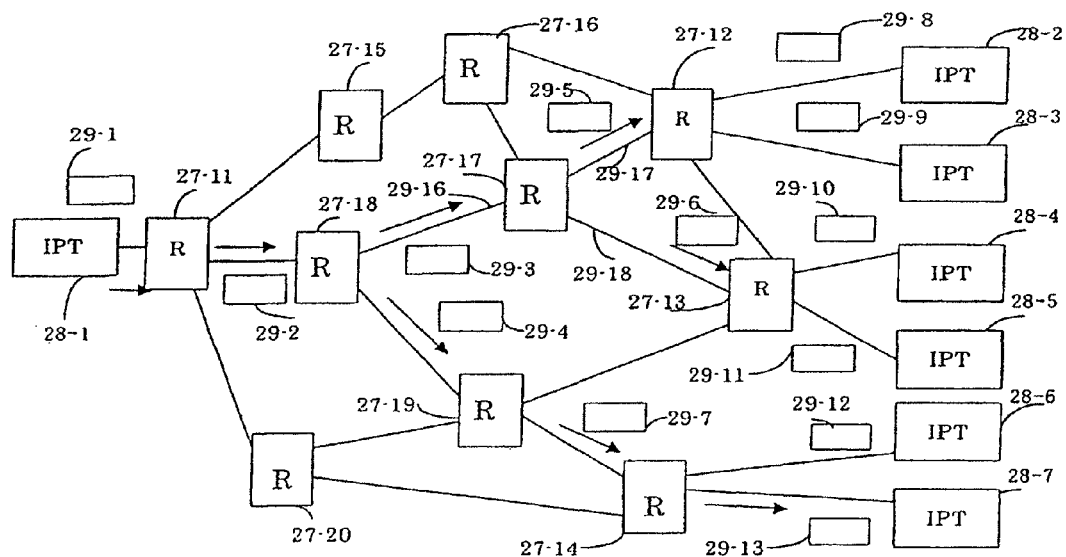

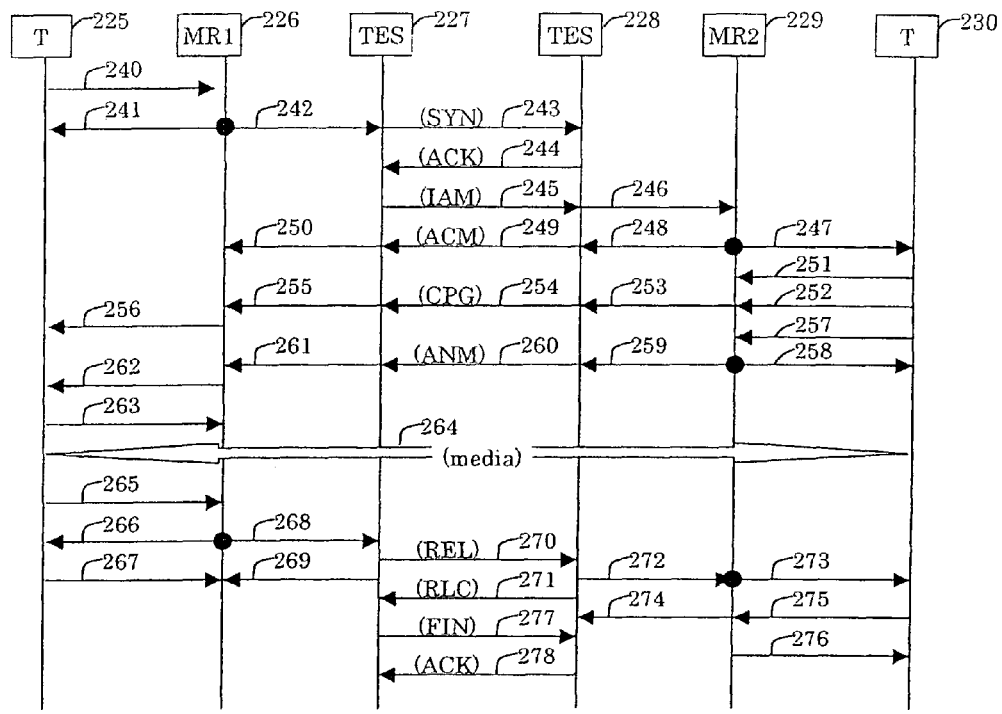
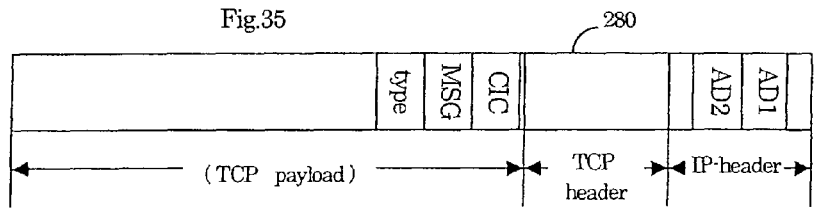

Fig. 63

```
typedef struct {
    unsigned int    ISA;    /* Internal Sending IP address */
    unsigned int    IRA;    /* Internal Receiving IP address */
    unsigned int    NSA;    /* Network Source address */
    unsigned int    NDA;    /* Network Destination address */
    unsigned int    MSA;    /* Mask for Source IP address */
    unsigned int    MDA;    /* Mask for Destination IP address */
    unsigned char   IFI;    /* Interface internal */
    unsigned char   IFE;    /* Interface external */
    unsigned short  ID;     /* Record ID */
    unsigned int    CTL;    /* control information */
        /* bit 00: if record effective, 1=yes, 0=no */
        /* bit 01: protocol filter 1, 1=yes, 0=no */
        /* bit 02: protocol filter 2, 1=yes, 0=no */
        /* bit 03: protocol filter 3, 1=yes, 0=no */
        /* bit 04: protocol filter 4, 1=yes, 0=no */
        /* bit 05: port filter 1, 1=yes, 0=no */
        /* bit 06: port filter 2, 1=yes, 0=no */
        /* bit 07: port filter 3, 1=yes, 0=no */
        /* bit 08: port filter 4, 1=yes, 0=no */
        /* bit 09: priority control, 1=yes, 0=no */
        /* bit 10: multicast control 1, 1=yes, 0=no */
        /* bit 11: multicast control 2, 1=yes, 0=no */
        /* bit 12: signature when sending, 1=yes, 0=no */
        /* bit 13: signature when receiving, 1=yes, 0=no */
        /* bit -: reserved */
        /* bit 31: memory protection, 1=yes, 0=no */
    unsigned int  * PTR;    /* pointer to pointer_table */
} CapsuleRecord ;
```

| IA7 | IA8 | NSA7 | NDA8 | MSA7 | MDA8 | IFI7 | IFE7 | ID7 | CTL7 | PTR7 |
|-----|-----|------|------|------|------|------|------|-----|------|------|
| IA1 | IA2 | NSA1 | NDA2 | MSA1 | MDA2 | IF714 | IF713 | ID1 | CTL1 | PTR1 |
| IA5 | IA6 | NSA5 | NDA6 | MSA5 | MDA6 | IFI5 | IFE5 | ID5 | CTL5 | PTR5 |
| .. | .. | .. | .. | .. | .. | .. | .. | .. | .. | .. |

Fig. 70
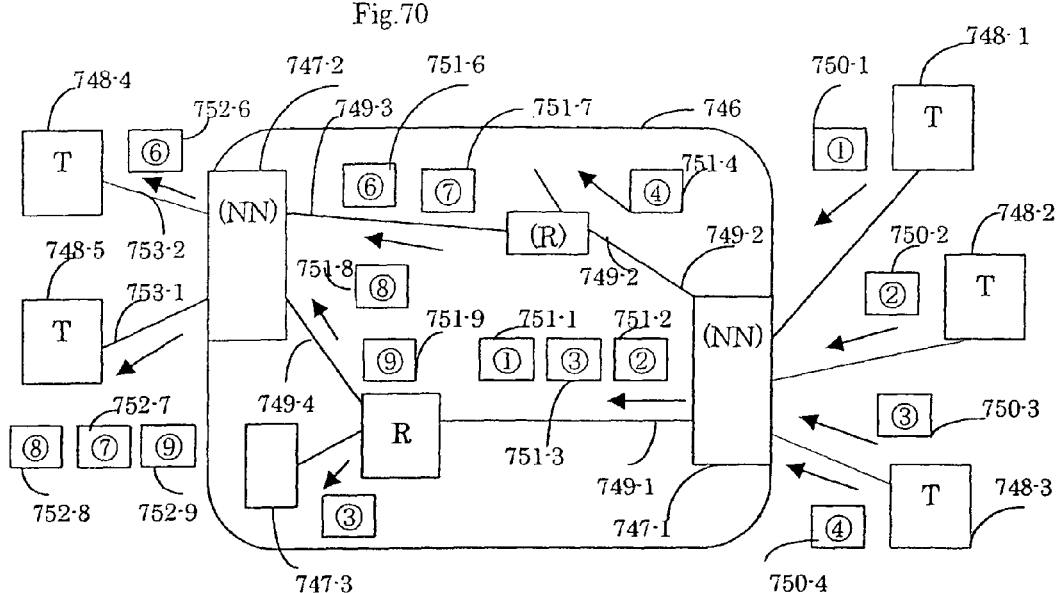
Fig. 71
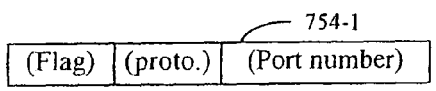
Fig. 72
```
                                              754-2
typedef struct
{
        char Flag;
            /* bit 0: continue, 1=yes, 0=no */
            /* bit 1: 1=type-1, 0=type-0 */
            /* bit 2-4: b-priority (0-7)*/
            /* bit 5-7: c-priority (0-7) */
        char Prototype;
        short int PortNumber;
} PriorityRecord;
```
Fig. 73
| (flag) | (prototype) | (port number) | 755 |
|---|---|---|---|
| 10001010 | 00000110 | 00010000 00000000 | (type-0, priority=1,2,TCP, Port=4096) |
| 11001100 | 00000110 | 00000100 00000000 | (type-1, priority=1,4,TCP, Port=1024) |
| 00001011 | 00010001 | 0 | (type-0, priority=1,3,UDP, no-port) |

Fig 81

| | | | | | | 766-30 | | | | |
|---|---|---|---|---|---|---|---|---|---|---|
| IM-IP | ISA1 | NSA30 | NDA30 | MSA01 | MDA01 | 0 | 0 | ID· | CTL· | PTR·· |
| IS7 | IS73 | NSA7 | NDA7 | MSA7 | MDA7 | IFI·· | IFE·· | ID· | CTL· | PTR·· |
| IS6 | IS73 | NSA6 | NDA6 | MSA6 | MDA6 | IFI·· | IFE·· | ID· | CTL· | PTR·· |
| IS5 | IS73 | NSA5 | NDA5 | MSA5 | MDA5 | IFI·· | IFE·· | ID· | CTL· | PTR·· |
| IS73 | IS7 | NDA7 | NSA7 | MDA7 | MSA7 | IFI·· | IFE13 | ID· | CTL· | PTR·· |
| IS73 | IS6 | NDA6 | NSA6 | MDA6 | MSA6 | IFI·· | IFE13 | ID· | CTL· | PTR·· |
| IS73 | IS5 | NDA5 | NSA5 | MDA5 | MSA5 | IFI·· | IFE13 | ID· | CTL· | PTR·· |
| IS73 | IS64 | NS64 | NDA64 | MSA64 | MDA64 | IFI·· | IFE·· | ID· | CTL· | PTR·· |
| IS73 | IS67 | NS67 | NDA67 | MSA67 | MDA67 | IFI·· | IFE·· | ID· | CTL· | PTR·· |
| ·· | ·· | ·· | ·· | ·· | ·· | ·· | ·· | · | ·· | ·· |

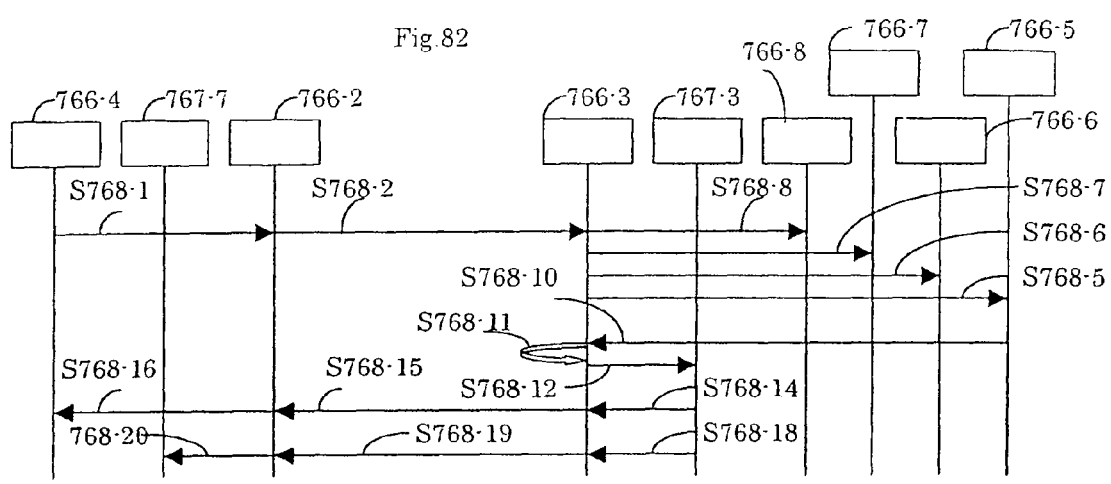

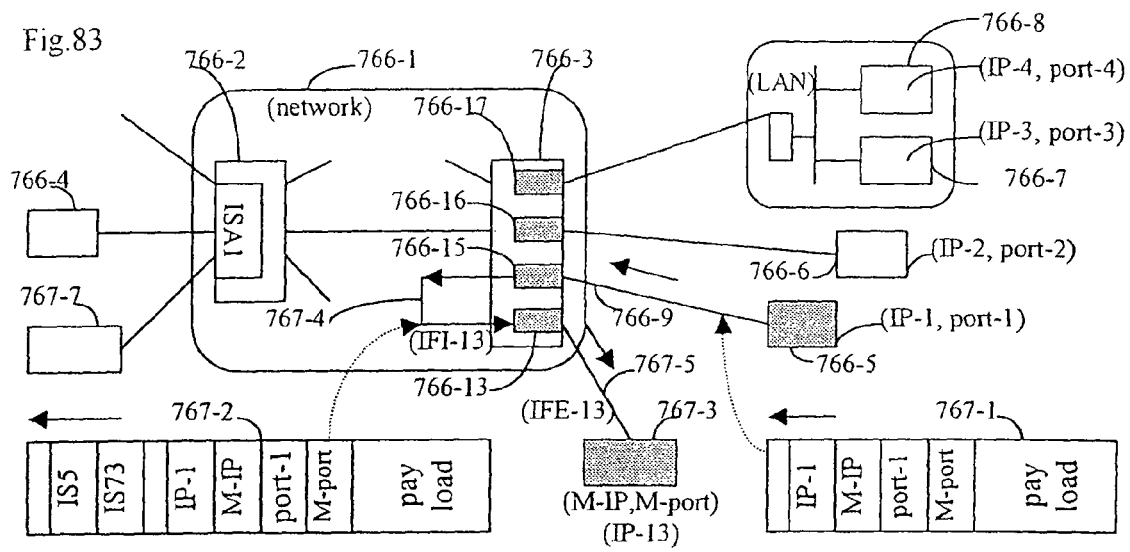

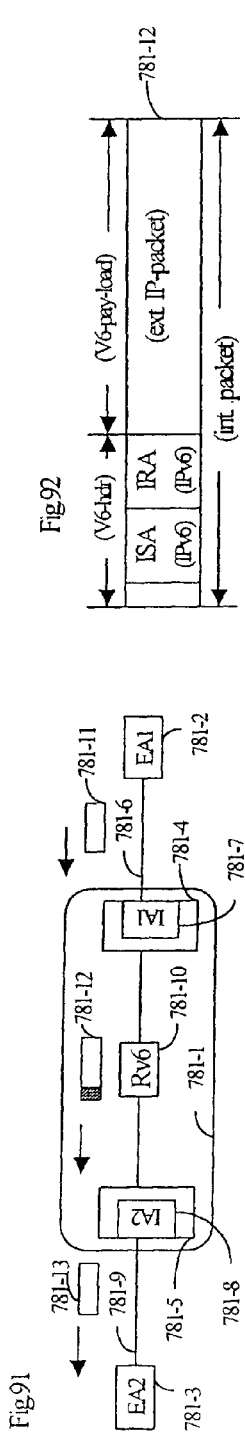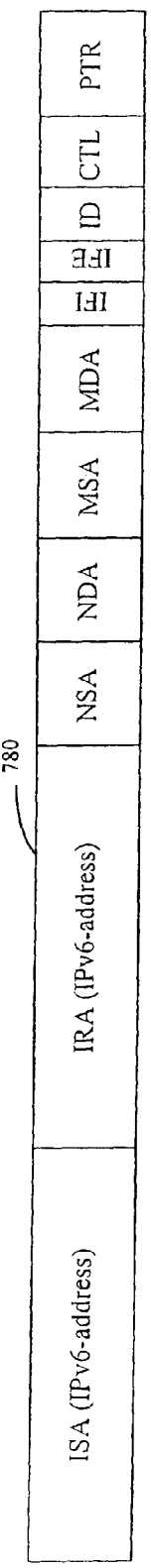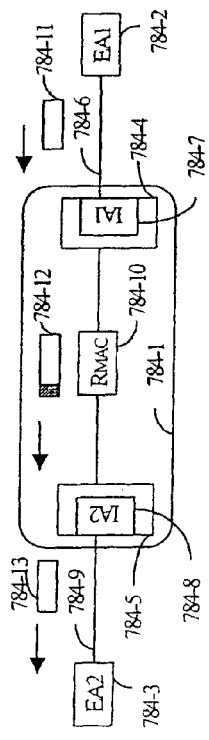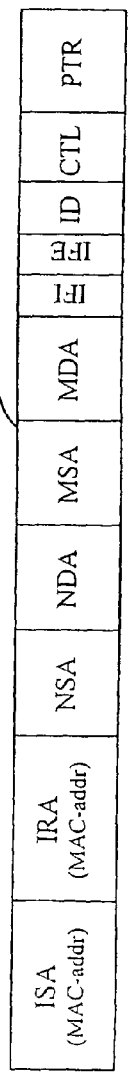

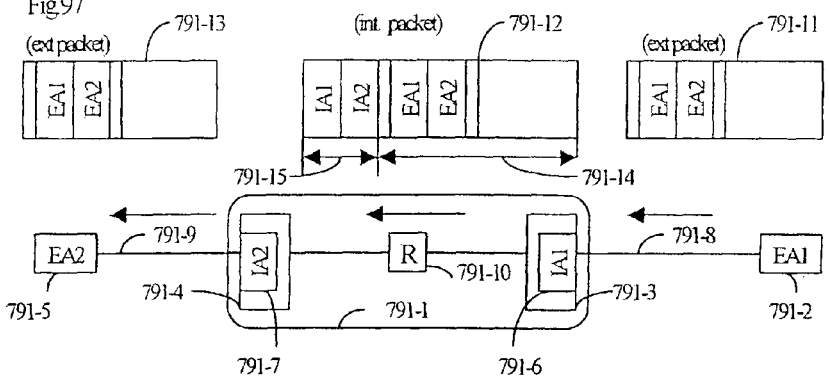
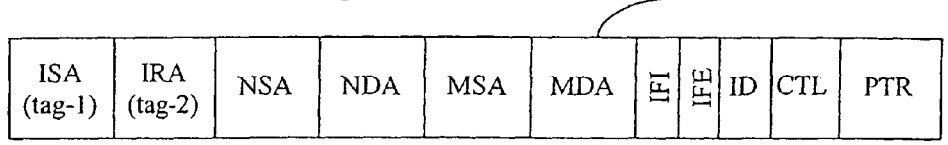
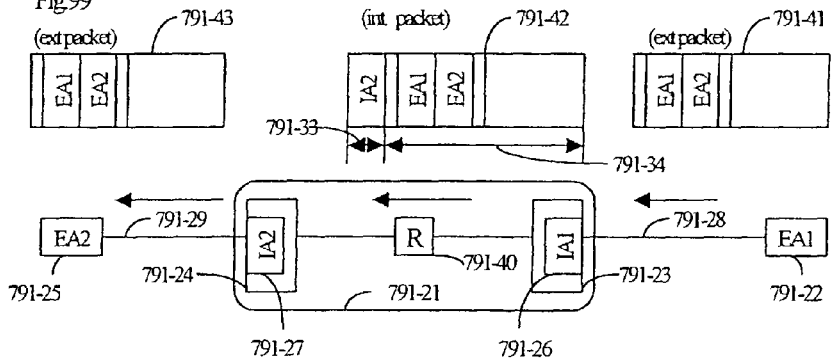
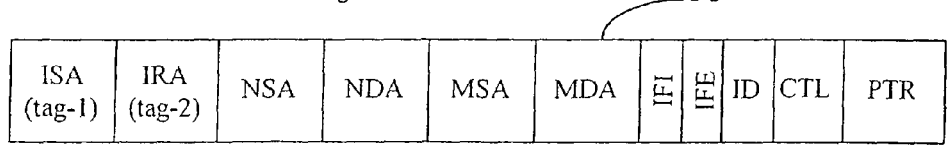

Fig.110
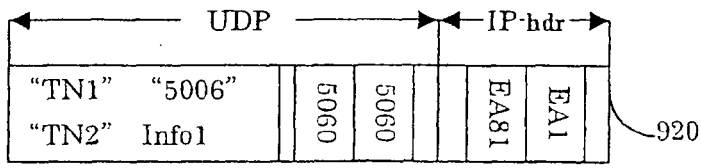
Fig.111
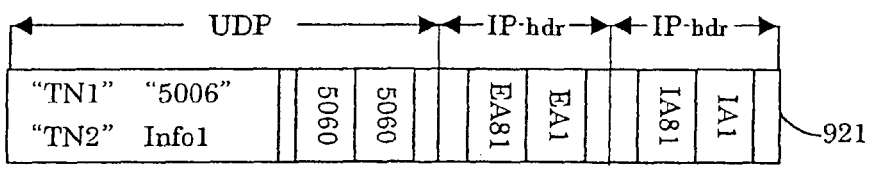
Fig.112
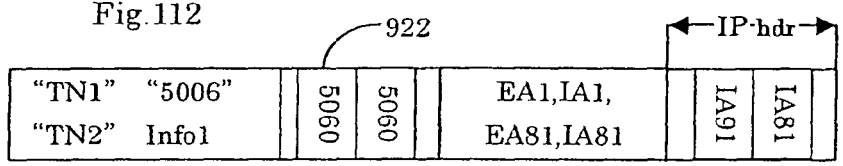
Fig.113
| CIC | UNI | Src-ID | Dest-ID | IP address | Proc-ID | Start time | End time |
|---|---|---|---|---|---|---|---|
| CIC-1 | UNI1 | "1004" | "x・x" | ×,×,×× ・・ | ANM | St-1 | |
| CIC-2 | | "TN1" | "TN2" | EA1,IA1,EA81, IA81,IA91 | IAM | St-2 | |
| ... | | .. | .. | .. | .. | .. | .. |
923

Fig.114
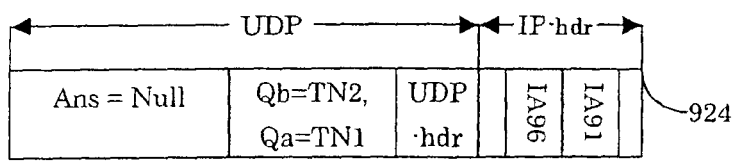
Fig.115
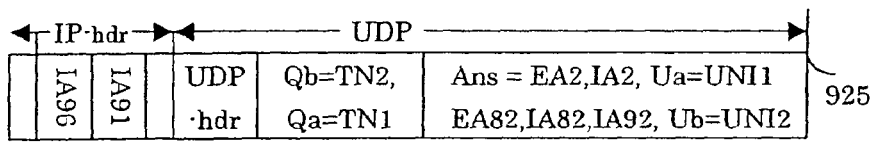
Fig.116
| CIC | UNI | Src.-ID | Dest.-ID | IP address & UNI | Proc-ID | Start time | End time |
|---|---|---|---|---|---|---|---|
| CIC-1 | UNI1 | "1004" | "××" | ×,×,×× ·· | ANM | St-1 | |
| CIC-2 | UNI1 | "TN1" | "TN2" | EA1,IA1,EA81,IA81,IA91,EA2,IA2,EA82,IA82,IA92,UNI2 | IAM | St-2 | |
| ·· | | ·· | ·· | ·· | ·· | ·· | ·· |
926-1

| IP-addr.,Port-No | UNI |
|---|---|
| IA81, port-81 | UNI1 |
| ×××× | ××× |

925-2

| CIC | UNI | Src.-ID | Dest.-ID | IP address & UNI | Proc ID | Start time | End time |
|---|---|---|---|---|---|---|---|
| CIC-2 | UNI2 | "TN1" | "TN2" | EA1,IA1,EA81,IA81, IA91,EA2,IA2,EA82, IA82,IA92 | IAM | St-3 | |
| .. | | .. | .. | .. | .. | .. | .. |

| | | | | | | | 910-1 | | | |
|---|---|---|---|---|---|---|---|---|---|---|
| IA1 | IA81 | NA1 | NA81 | MA1 | MA81 | IFI·· | IFE· | ID· | CTL· | PTR· |
| IA1 | IA2 | EA1 | EA2 | MK1 | MK2 | IFI·· | IFE· | ID· | CTL· | PTR· |
| IA11 | IA81 | NA11 | NA81 | MA11 | MA81 | IFI·· | IFE· | ID· | CTL· | PTR· |
| IA11 | IA12 | NA11 | NA12 | MA11 | MA12 | IFI·· | IFE· | ID· | CTL· | PTR· |
| IA7 | IA8 | EA7 | EA8 | MK25 | MK26 | IFI·· | IFE· | ID· | CTL· | PTR· |
| ·· | ·· | ·· | ·· | ·· | ·· | ·· | ·· | · | ·· | ·· |

Fig.137

| | | | | | | | 910-2 | | | |
|---|---|---|---|---|---|---|---|---|---|---|
| IA12 | IC81 | NA12 | NC81 | MA12 | MC81 | IFI·· | IFE· | ID· | CTL· | PTR· |
| IA12 | IA11 | NA12 | NA11 | MA12 | MA11 | IFI·· | IFE· | ID· | CTL· | PTR· |
| IA8 | IA7 | EA8 | EA7 | MK26 | MK25 | IFI·· | IFE· | ID· | CTL· | PTR· |
| ·· | ·· | ·· | ·· | ·· | ·· | ·· | ·· | · | ·· | ·· |

Fig.138

| | | | | | | | 10-3 | | | |
|---|---|---|---|---|---|---|---|---|---|---|
| IB1 | IB81 | NB1 | NB81 | MB1 | MB81 | IFI·· | IFE· | ID· | CTL· | PTR· |
| ·· | ·· | ·· | ·· | ·· | ·· | IFI·· | IFE· | ID· | CTL· | PTR· |
| IB1 | IB2 | EB1 | EB2 | MK6 | MK5 | IFI·· | IFE· | ID· | CTL· | PTR· |
| IB1 | IB81 | K-zero | EB81 | M-zero | M-one | ·· | ·· | · | ·· | ·· |
| ·· | ·· | ·· | ·· | ·· | ·· | ·· | ·· | · | ·· | ·· |

Fig.139

| | | | | | | | 910-4 | | | |
|---|---|---|---|---|---|---|---|---|---|---|
| IA2 | IA82 | NA2 | NA82 | MA2 | MA82 | IFI·· | IFE· | ID· | CTL· | PTR· |
| IB81 | IB1 | NB81 | NB1 | MB81 | MB1 | IFI·· | IFE· | ID· | CTL· | PTR· |
| IA2 | IA1 | EA2 | EA1 | MK2 | MK1 | IFI·· | IFE· | ID· | CTL· | PTR· |
| IB2 | IB1 | EB2 | EB1 | MK5 | MK6 | IFI·· | IFE· | ID· | CTL· | PTR· |
| IB2 | IB84 | K-zero | EB81 | M-zero | M-one | ·· | ·· | · | ·· | ·· |

| IP address | No. in use | Upper limit |
|---|---|---|
| EA1 | 2 | 5 |
| EA6 | 3 | 4 |
| .. | .. | .. |

918-1

| IP address | No. in use | Upper limit |
|---|---|---|
| EA7 | 0 | 3 |
| EA2 | 2 | 7 |
| EB2 | 3 | 5 |
| .. | .. | .. |

918-2

Fig.145
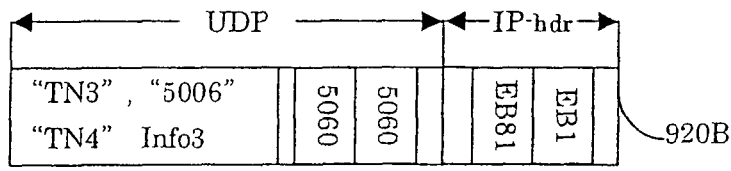
Fig.146
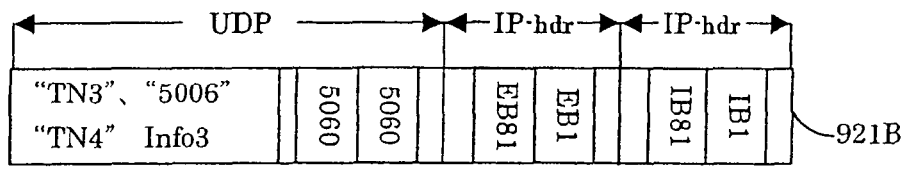
Fig.147
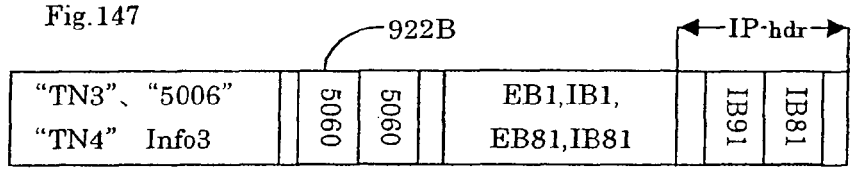
Fig.148
| CIC | UNI | Src.-ID | Dest.-ID | IP address & UNI | Proc-ID | Start time | End time |
|---|---|---|---|---|---|---|---|
| CIC-3 | | "TN3" | "TN4" | EB1,IB1,EB81, IB81,IB91 | IAM | St-5 | |
| .. | | .. | .. | .. | .. | .. | .. |
923B
Fig.149
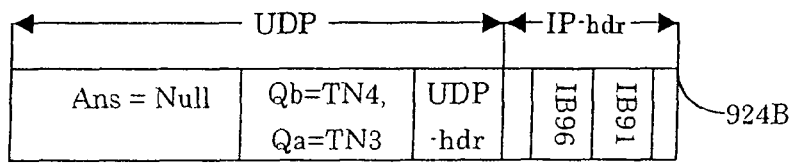

Fig.150
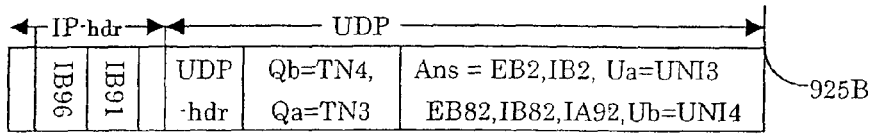
Fig.151
| CIC | UNI | Src.-ID | Dest.-ID | IP address & UNI | Proc -ID | Start time | End time |
|---|---|---|---|---|---|---|---|
| CIC-3 | UNI3 | "TN3" | "TN4" | EB1,IB1,EB81,IB81, IB91,EB2,IB2, EB82,IB82,IA92,UNI4 | IAM | St-3 | |
| . . | | . . | . . | . . | | . . | . . |
926-1B
Fig.152
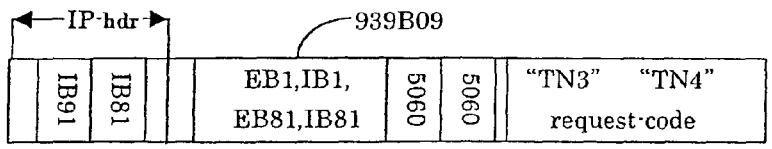
Fig.153
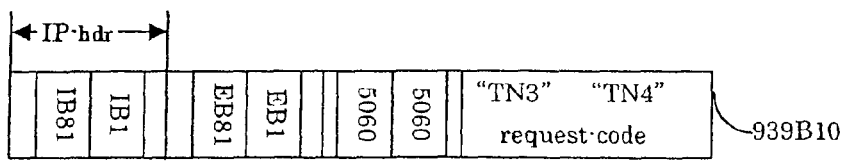
Fig.154
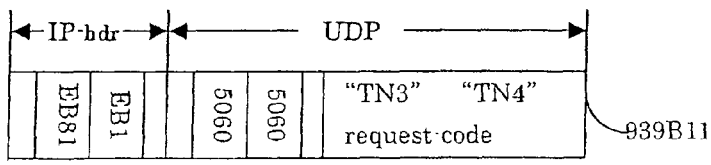

Fig.155
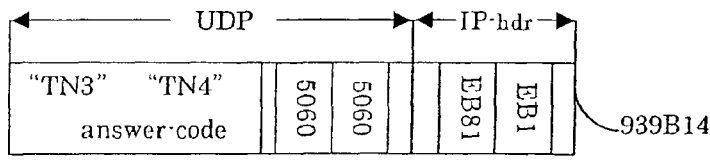
Fig.156
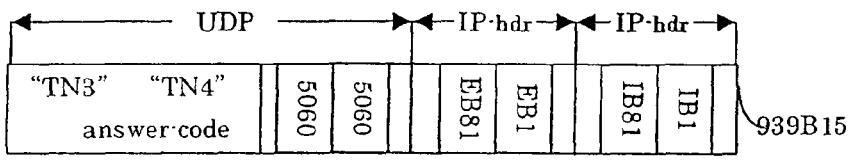
Fig.157
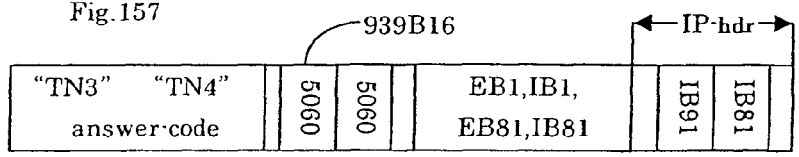
Fig.158
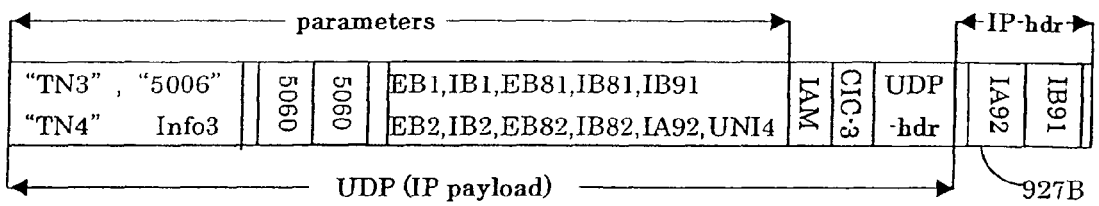
Fig.159
| CIC | UNI | Src.-ID | Dest.-ID | IP address & UNI | Proc-ID | Start time | End time |
|---|---|---|---|---|---|---|---|
| CIC-3 | UNI4 | "TN3" | "TN4" | EB1,IB1,EB81,IB81, IB91,EB2,IB2, EB82,IB82,IA92 | IAM | St-4 | |
| .. | .. | .. | .. | .. | .. | .. | .. |
926-2B Fig.199
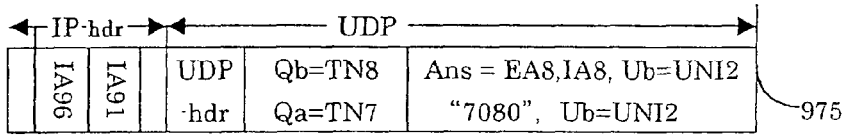
Fig.200
| CIC | UNI | Src.-ID | Dest.-ID | IP address & UNI | Proc-ID | Start time | End time |
|---|---|---|---|---|---|---|---|
| CIC-8 | UNI1 | "TN7" | "TN8" | EA7,IA7, EA8,IA8,UNI2 | IAM | St-7 | Time7 |
| . . | | . . | . . | . . | . . | . . | . . |
976-1
Fig.201
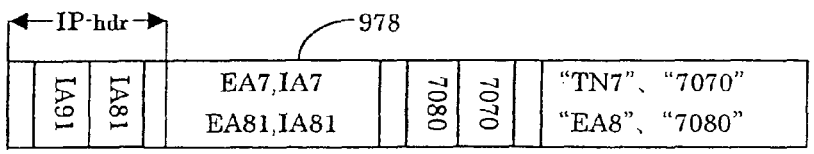
Fig.202
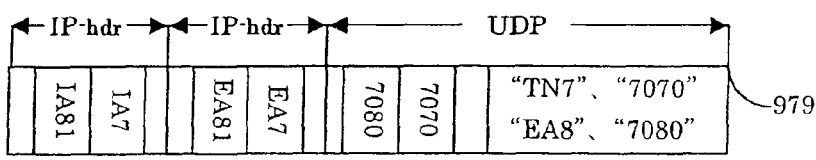
Fig.203
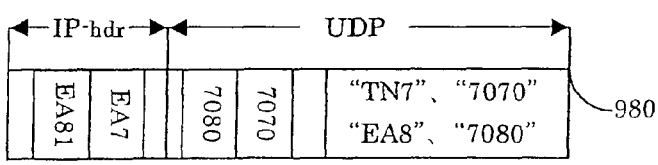

Fig.204
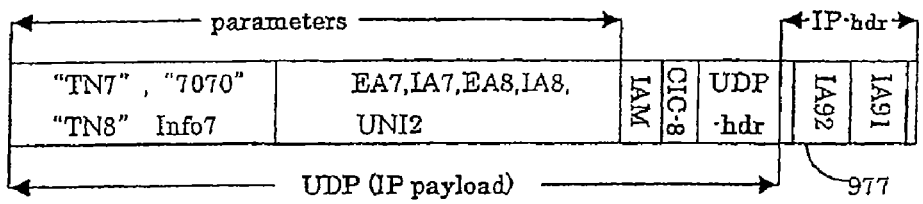
Fig.205
| CIC | UNI | Src.-ID | Dest.-ID | IP address & UNI | Proc-ID | Start time | End time |
|---|---|---|---|---|---|---|---|
| CIC-8 | UNI2 | "TN7" | "TN8" | EA7,IA7,EA8, IA8 | IAM | St-8 | Time7 |
| .. | .. | .. | .. | .. | .. | .. | .. |
976-2
Fig.206
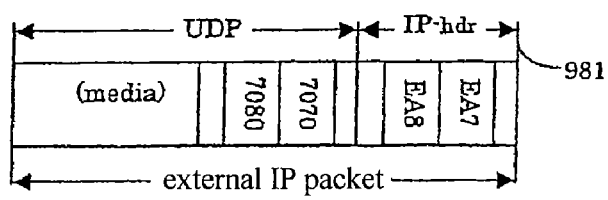
Fig207
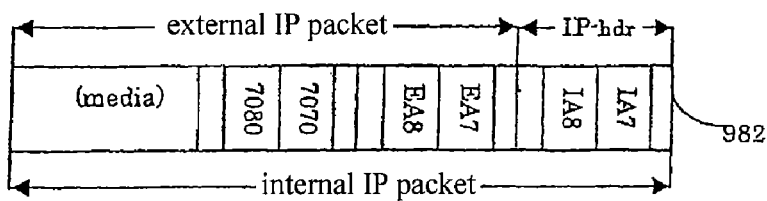

| Here | There | | | Int-PK Output I/F | Ext-PK Output I/F | |
|------|-------|---|---|-------------------|-------------------|---|
| I01  | E01   | M1 | IM1 | G02,G03,G00 | 0 | 331-1 |
| IM1  | M1    | E01 | I01 | G00 | F02 | |

| IM1 | M1 | E01 | I01 | G04 | F04 | 332-1 |

| IM1 | M1 | E01 | I01 | G31 | F10,F11 | 333-1 |

| IM1 | M1 | E01 | I01 | G34 | F15 | 334-1 |

| IM1 | M1 | E01 | I01 | G38 | F17,F18 | 335-1 |

| | Output I/F | 337-1 |
|---|------------|-------|
| IM1 | G11,G12 | |

| | Output I/F | 338-1 |
|---|------------|-------|
| IM1 | G27,G28 | |

| | Output I/F | 339-1 |
|---|------------|-------|
| IM1 | G22 | |

Fig.238
| ISA | IRA | NSA | NDA | MSA | MDA | IFI | IFE | · | 332-1x |
|-----|-----|-----|-----|-----|-----|-----|-----|---|---|
| IM1 | I01 | M1 | E01 | one | one | G04 | F04 | · | · |
(one=255.255.255.255)
Fig.239
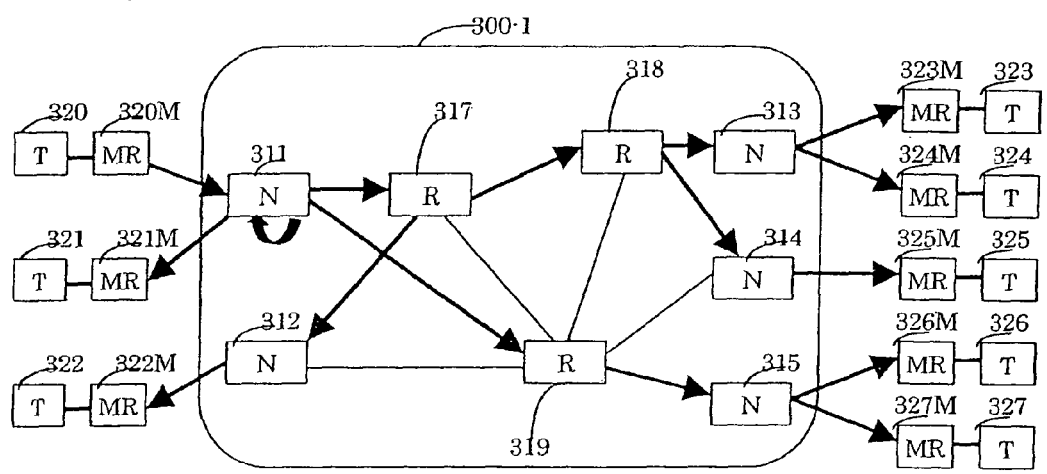
Fig.240
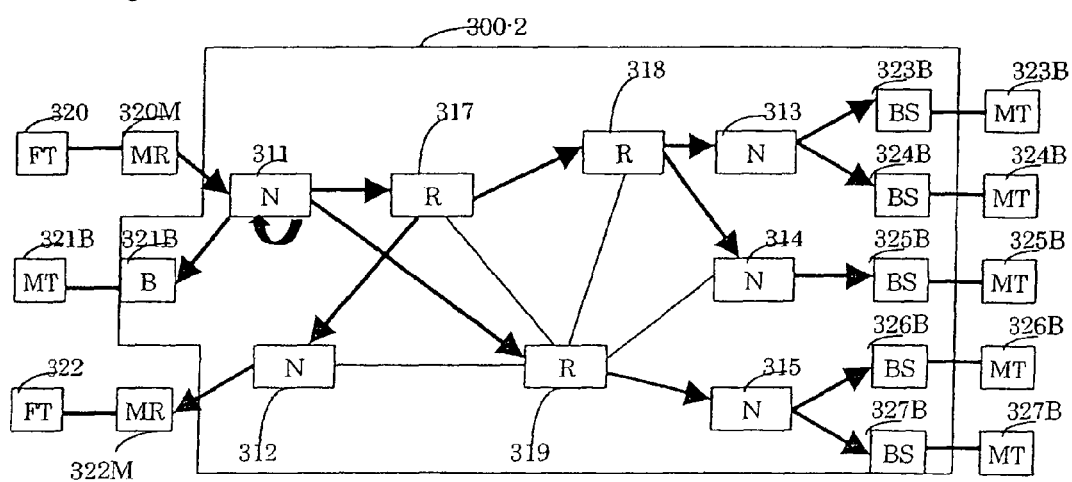

TERMINAL-TO-TERMINAL COMMUNICATION CONTROL SYSTEM FOR IP FULL SERVICE

BACKGROUND OF THE INVENTION

1. Field of the Invention

The present invention relates to a terminal-to-terminal communication connection control system for IP (Internet Protocol) service including IP-service terminal-to-terminal communication connection control system of any or a combination of a terminal-to-terminal communication connection control method for cooperating an IP network (called also an IP transfer network) with another communication network, a terminal-to-terminal connection control method for an IP network applied with the No. 7 common channel signaling system, a terminal-to-terminal connection control method based on an IP-network multicast technique, an apparatus for realizing terminal-to-terminal communication connection control and multicast service or TV conference service. The other communication network includes a public switched telephone network (PSTN) and a mobile communication network used for mobile phones, besides the IP network.

2. Description of the Related Art

The prior arts related to the present invention includes Japanese Patent No. 3084681 C1 (hereinafter, "prior patent") by the present applicants and Japanese Patent Application No. 078270/2001 (hereinafter, "prior patent application") by the present applicants.

The prior patent realizes, in an integrated information communication system as an IP packet transfer network adopting an IP encapsulation technique, an IP encapsulation technique, a technique of dynamically setting an address management table by IP-terminal request, and a method of acquiring an IP address by presenting a telephone number to a domain server to register the acquired address in a address management table. Meanwhile, the prior patent application discloses, in a terminal-to-terminal communication connection method using an IP packet transfer network, a simplified encapsulation technique, a method of applying the common channel signaling system onto an IP network, a method of carrying out multicast by registering a user's terminal-unit address into the network node unit, and so on.

Note that the prior patent or patent application uses the terms not the same as the terms used in the present invention. Accordingly, the terms used in the prior patent or patent application will be shown with parentheses in order to avoid confusion. For example, in the case of describing a network node unit (access control apparatus), the access control apparatus is a term used in the prior patent or patent application.

<<IP Encapsulation Technique>>

The IP encapsulation technique disclosed in the prior patent will be outlined with reference to FIG. 1. In this example, an external IP packet 13-1 is transferred from an IP terminal unit 12-1 having an external IP address "EA01" to an IP terminal unit 12-2 having an external IP address "EA02" via an IP network 11-1. A logic communication line 12-3 has an end (logic terminal) to be identified by a logic terminal identifier "Pin1" while a logic communication line 12-4 has an end to be identified by a logic terminal identifier "Pin2". The logic terminal "Pin1" is given with an internal IP address "IA01", and the logic terminal "Pin2" is given with an internal IP address "IA02". The network node unit 11-2, receiving an external IP packet 13-1, confirms that an internal IP address given to the logic terminal "Pin1" inputted by the IP packet 13-1 is "IA01" and a destination IP address of the IP packet 13-1 is "EA02", to search through the interior of an address management table 11-8. Searched are records including, first, a source internal IP address of "IA01" and, next, a destination external IP address of "EA02". Furthermore, inspection is made whether the detected record includes a source external IP address "EA01" of within the IP packet 13-1. In the present example, this is a record including "Pin1, IA01, IA02, EA01, EA02" on a second line from above. Using the IP addresses "IA01" and "IA02" of the record, an IP packet 13-2 is formed (IP packet encapsulation).

The internal IP packet 13-2 passes through routers 11-4, 11-5, 11-6 to reach a network node unit 11-3. The network node unit 11-2 removes the received internal IP packet 13-2 of an IP header (IP packet decapsulation) and forwards an obtained external IP packet 13-3 onto a communication line 12-4. An IP terminal unit 12-3 receives the external IP packet 13-3. The first-lined record "Pin1, IA01, IA81, EA01, EA81" of an address management table 11-8 is used to encapsulate an external IP packet directed toward a server 11-7 having an external IP address "EA81" and an internal IP address "IA81". By changing a destination external IP address of an external IP packet inputted at the same logic terminal (terminal end of a logic communication line 12-3) to "EA01", "EA81" or so, the destination where the external IP packet is to reach can be changed. Note that the mask technique in IP encapsulation is known, e.g. explained in FIG. 362 of the prior patent application.

<<Simplified Encapsulation Technique>>

With reference to FIG. 2, outlined is a simplified encapsulation technique disclosed in the prior patent application. The internal packet formed by simplified encapsulation is different from the foregoing IP encapsulation in that containing a destination internal address but not containing a source internal address. A logic communication line 22-3 at its end (logic terminal) is determined by a logic terminal identifier "Pin1" while a logic communication line 22-4 at its end (logic terminal) is determined by a logic terminal identifier "Pin2". An internal IP address "IA01" is provided to the logic terminal "Pin1", and an internal IP address "IA02" is provided to the logic terminal "Pin2". In the present example, an external IP packet 23-1 is transferred from an IP terminal unit 22-1 having an external IP address "EA01" to an IP terminal unit 22-2 having an external IP address "EA02". The network node unit 21-2, upon receiving an external IP packet 23-1, confirms that an internal IP address given to the logic terminal "Pin1" inputted by the IP packet 23-1 is "IA01" and a destination external IP address of the IP packet 23-1 is "EA02", to search an address management table 21-8. Searched are records including, first, a source internal IP address of "IA01" and, next, a destination external IP address of "EA02". Furthermore, inspection is made whether the detected record includes a source external IP address "EA01" of within the IP packet 23-1. In the present example, fallen under is a record including "Pin1, IA01, IA02, EA01, EA02" on a second line from above. The IP addresses "IA01" and "IA02" in the record are used to form an IP packet 13-2 having a simplified header whose destination IP address is "IA02" (simplified encapsulation). The internal IP packet 23-2 reaches a network node unit 21-3 by way of routers 21-4, 21-5, 21-6. The network node unit 21-2 removes the received internal IP packet 23-2 of its simplified header (simplified decapsulation) and forwards an obtained external IP packet 23-3 onto a communication line 22-4. The internal packet is to be realized by an optical frame having communication two layers including, for example, only a destination address. Such an optical frame includes a MAPOS being known, for example.

Incidentally, the IP encapsulation and the simplified IP encapsulation, in any, can use as a logic terminal identifier a logical terminal identification number at an end of a communication two-layered address (physical address, MAC address or the like), for example. Meanwhile, similarly to the IP encapsulation technique, a destination where an external packet is to reach can be changed by changing a destination external IP address of within the external IP packet inputted at the same logic terminal.

<<Technique for Dynamically Setting Address Management Table upon Request of IP Terminal Unit>>

The prior patent discloses, in Embodiment 35, a method to change a setting content of an address management table (conversion table) of within a network node unit (access control apparatus) from a user's IP terminal. This will be explained with reference to FIG. 3.

An IP terminal unit 23-1 sends an external IP packet (ICS user frame) containing a domain name "c5. b2. a1" to a conversion table server 23-2 (Step 23-4). The conversion table server 23-2 makes an inquiry to the domain name server 23-3 (Step 23-5). The domain name server 23-3 searches for and acquires an internal address (ICS network address) and external IP address (ICS user address) corresponding to the domain name "c5. b2. a1" (Step 23-6). Then, this is sent back to the conversion table server 23-2 (Step 23-7). The conversion table server 23-2 writes it into a conversion table (Step 23-8), for report to the IP terminal 23-1 (Step 23-9).

<<Method for Acquiring IP Address by Telephone Number as Domain Name>>

Next, Embodiment 36 of the prior patent discloses that IP packets (ICS user frames) can be communicated with the other end of communication by using a telephone number as a domain name wherein the IP packet stores therein a digitalized voice thereby enabling public communication by the telephone. An address management server (conversion table server) converts an input domain name into an external IP address (ICS user address) to send it back, and registers an internal address (ICS network address) in an address management table (conversion table) of the network node unit (access control apparatus).

A telephone number "1234-5678" inputted to a telephone set is delivered to a conversion table server via a telephone number input section of the telephone set. The conversion table server 24-4 (FIG. 4) makes an inquiry to a plurality of domain name servers 24-1, 24-2, 24-3 one after another (24-6 to 24-11 in FIG. 4) on the basis of the received telephone number "1234-5678", and acquires an internal address and external IP address of a telephone set at the other end of communication upon considering the telephone number "1234-5678" as a domain name. Next, the conversion table server 24-4 prepares a new item to be added to the address management table (conversion table) of within the network node unit by using acquired two addresses, and sends it to a requesting telephone set. Also, the network node unit uses the new item of the address management table as a new element of the address management table in the network node unit.

<<Method for Applying the No. 7 Common Channel Signaling System to IP Network>>

This is a technique disclosed in the prior patent application. As shown in FIG. 5, connection servers 25-5 to 25-6 and a relay connection server 25-7 are provided in an IP network 25, to connect terminal units 25-1 and 25-2 to the connection server via a media router 25-3 or 25-4. Note that the connection server and the relay connection server are referred also to as telephone management servers. The connection servers 25-5 and 25-6 are provided with a function similar to the line-connection control of a line switch (LS) in a public switched telephone network (PSTN) while the relay connection server 25-7 is with a function similar to the line-connection control of a tall switch (TS). Terminal units, such as telephone sets, IP terminal units or video terminal units, send and receive an initial address message (IAM) capable of making equally corresponding to the line-connection control message of the common channel signing system, an address complete message (ACM), a call progress message (CPG), an answer message (ANM), a release message (REL) and a release completion message (RLC) by way of an interior of the IP network, thereby realizing a terminal-to-terminal communication connection control method using an IP network. Note that a terminal-to-terminal communication connection control method is feasible between the two connection servers 25-5 and 25-6 wherein a relay connection server 25-7 does not exist.

The utilizer inputs a destination telephone number on the terminal unit 25-1 (Step Z1). The media router 25-3 sends back a call set acceptance (Step Z2). The media router 25-3 sends an IP packet including a destination telephone number and source telephone number to set a call (Step Y1). An IAM packet forwarded from the connection server 25-5 passes the connection server 25-6 (Steps Y2, Y3) to reach the media router 25-4 (Step Y4). The media router 25-4 requests the terminal unit 25-2 to set a call (Step Z4). The connection server 25-6 sends back an ACM packet (Steps Y5, Y6). The terminal unit 25-2 reports of an incoming call tone (Step Z7). The media router 25-4 sends an incoming call to the connection server 25-6 (Step Y7). The connection server 25-6 sends a CPG packet (Steps Y8, Y9) to notify a ring-back tone to the terminal unit 25-1 via the media router 25-3 (Step Y10, Step Z10). The terminal unit 25-2, responding to the call set request, makes a notification to the connection server 25-6 (Step Z11, Step Y11). The connection server 25-6 forms and sends an ANM packet. The terminal unit 25-1 enters into a voice communication phase (Steps Y12 to Y14, Step Z14).

When the utilizer ends the voice communication on the terminal unit 25-1, a disconnect request on the terminal unit 25-1 is notified (Step Z16). A REL packet signifying a series of release requests and a RLC packet meaning a completion of release request are communicated, thereby closing the call connection (Steps Y16 to Y23, Steps Z22 and Z23). The step of between the connection server 25-2 and the connection server 25-6 (Y2, Y3, etc.) is referred to as an NNI, while the step of between the connection server and the media router (Y1, Y3, etc.) is referred to as a UNI.

<<Detailed Example of Between IP Network Applied with Common Channel Signaling System and Public Switched Telephone Network>>

The Embodiments 13 to 16 of the prior patent application, adopting a concept of the common channel signaling system, have a feature of separating the interior of an IP network with a control communication line and a voice communication line. This discloses a method of controlling the communication connection between telephone sets through the IP network and public switched telephone network. In FIG. 6, numeral 40-1 is an IP network, numeral 40-2 is a public switched telephone network, numeral 40-3 is a gateway having an encapsulation function, numeral 40-4 is a relay gateway, numeral 40-5 is an IP communication line, numeral 40-6 is a control communication line on the common channel signaling system, and numeral 40-7 is a voice communication line. Numeral 40-8 is a control IP communication line and numeral 40-9 is a voice IP communication line. Numerals 41-1 and 41-2 are telephone sets, numeral 41-3 is a media router, numeral 42-1 is a tall switch, numeral 42-2 is a subscriber exchange, numeral 42-3 is a relay control section (STP), numeral 42-4 is a voice control section having an encapsulation function, and numeral 42-5 is a terminal-unit control section (SEP). Numeral 43-1 is a proxy telephone server, numeral 43-2 is a telephone management server, numeral 43-3 is a telephone number server, numerals 43-4 and 43-5 are table management servers, numerals 44-1 and 44-2 are network node units having encapsulation and decapsulation functions, numerals 44-3, 44-4, 44-5, 44-6 are respectively routers. The relay control section 42-3 is given with an IP address. The relay control section 42-3 is a signal transfer point (STP) on the common channel signaling system as viewed from the public switched telephone network 40-2, and given with a signaling point address.

The terminal-unit control section 42-5 of FIG. 6 corresponds to the connection server 25-5 of FIG. 5, and the relay control section 42-3 of FIG. 6 corresponds to the relay connection server 25-7 of FIG. 5. Herein, "correspondence" means that the terminal unit control section 42-5 and the relay control section 42-3 have a function to effect line-connection control based on the common channel signaling system.

In case the telephone set 41-1 requests a call set to the telephone set 41-2, an initial address message (IAM), an address completion message (ACM), a call progress message (CPG), an answer message (ANM), a release message (REL), a release completion message (RLC) and the like are communicated by way of the media router 41-3, network node unit 44-1, terminal-unit control section 42-5, routers 44-4 to 44-5, relay control section 42-3, control communication line 40-6, exchange 42-1 and exchange 42-2, thereby effecting a terminal-to-terminal communication connection control using the IP network. Herein, the voice forwarded from the telephone set 41-1 reaches the telephone set 41-2 by way of the media router 41-3, network node unit 44-1, router 44-6, network node unit 44-2, voice IP communication line having a function of voice control section encapsulation 40-9, exchange 42-1 and exchange 42-2.

The relay control section 42-3 defines the various parameters to be defined by the common signaling system, e.g. circuit identification code (CIC) and signaling link selection (SLS), according to a rule previously arranged with the public switched telephone network 40-2. The relay control section 42-3 writes a signaling point address, signaling link selection and circuit identification code of the relay control section 42-3, together with a media path identifier, to an address connection table 45-1. There lay control section 42-3, managing a gateway address management table 45-2, can search through the gateway address management table 45-2 to acquire an IP address of a gateway managing a destination telephone number, i.e. an IP of a gateway for connection to a telephone set having a destination telephone number. The relay control section 42-3, managing a signaling point address management table 45-3, can search through the signaling point address management table to acquire a signaling point address of an exchange of within the public switched telephone network 40-2. The relay control section 42-3 makes a notification to the encapsulation-functioned voice control section 42-4 via an information line 45-4. The encapsulation-functioned voice control section 42-4 writes the notified information as a record of the media path connection table 45-4 and makes notification of a write completion. The media path identifier is used to identify a voice communication path used for a telephone call (connection/voice communication/release) of between telephone sets. Incidentally, the encapsulation-functioned voice control section 42-4 is configured to define a logic communication line for transmit a voice from the encapsulation-functioned voice control section 42-4 onto the voice communication line 40-7 and write the logic communication line identifier as a record of the media path connection table 45-4.

The encapsulation-functioned voice control section 42-4 converts a voice stored in an IP packet forwarded from the voice IP communication line 40-9 into a form for transfer within the public switched telephone network 40-2, and sends it onto the voice communication line 40-7. Also, the encapsulation-functioned voice control section 42-4 converts a voice frame forwarded from the voice communication line 40-7 of the public switched telephone network 40-2 into an IP packet form, and sends it onto the voice IP communication line 40-9. The voice control section has therein an IP address to send and receive a voice IP packet, thus serving for a setting of the media path connection table 45-4.

The prior patent application discloses a technique for transferring a message (IAM, ACM, . . . , REL, etc.) for telephone line-connection control by storing it in an IP packet (FIG. 142, etc. of tenth embodiment). The line control conforming to the common line signaling system is applied to a level above the three layers of a communication layer (network layer).

The line-connection control messages (IAM, ACM, CPG, ANM, REL, RLC) conforming to the common channel signaling system are to be set in a payload section of an internal IP packet. Explanation will be made using a protocol stack 59-1, 59-2 (FIG. 7). In designating a protocol type as an item in a header of an internal IP packet, there is a method of defining "CC" (connection control) representative of line-connection control as a new prototype to store the line-connection control messages in a payload section of the internal IP packet. As another method, there is a method of designating the protocol type as "ICMP" to store the line-connection control messages in an ICMP message area in the internal IP packet.

As a still another method, there is a method of designating the protocol type as "UDP" to store the line-connection control messages in a payload section in a UDP segment of an internal IP packet. The method with a protocol stack 59-1 is a method of providing a data link layer on a physical layer as the lowermost layer, an IP layer thereon (network layer), and a new line-connection control layer (CC layer) in a level that. The method with a protocol stack 59-2 is a method of providing a UDP layer or ICMP layer in a level above an IP layer, and a line-connection control layer (CC layer) thereon.

The fourteenth embodiment of the prior patent application explains, as shown in FIG. 8 (part of FIG. 232 of the prior patent application), a terminal-to-terminal communication connection control method to carry out a telephone communication from a telephone set 1420 to a telephone set 1421 by way of a public switched telephone network 1405, an IP network 1400 and a public switched telephone network 1406. Outlining will be made on a scope concerned with the invention.

When taking a receiver of the telephone set 1420, a signal unit 1451 based on the common channel signaling system is transferred to the relay control section 1423 of within a relay gateway 1401 via a control communication line 1415. The signal unit 1451 has a destination point code of "DPC-1", a source point code of "OPC-1", a signaling link selection of "SLS-1", a circuit identification code of "CIC-1", a message of "IAM" and a parameter of "Para-1". The parameter "Para-1" has a content including a telephone number "TN-1" of the telephone set 1420 and a telephone number "TN-2" of the telephone set 1421. The relay control section 1423 receives the signal unit 1451 and forms an IP packet 1451. The IP packet 1452 has a destination IP address of "D-ad-x", a source IP address of "S-ad-x" and a circuit identification code of "CIC-x", and includes a telephone number "TN-1" of the telephone set 1420 and a telephone number "TN-2" of the telephone set 1421. The relay control section 1423 sends the IP packet 1452 formed in the above into the IP network 1400. The IP packet 1452 reaches the relay control section 1424 of within the relay gateway 1402, which, in the relay control section 1424, is converted into a signal unit 1453 to reach the telephone set 1421 via the public switched telephone network 1406. The relay control section 1423 and the voice control section 1427 exchange information, such as port numbers, through the information line 1429-1.

FIG. 9 shows a function of the relay control section 1423 within the relay gateway 1401 by separating the communication function layer. The signal unit 1451 forwarded from the control communication line 1415 is connected to an MTP as a communication function layer on the common channel signaling system. The communication function layer 1423-1 deals with the communication processing concerning a destination point code DPC-1, source point code OPC-1 and signaling link selection SLS-1 of in the signal unit 1451. The communication function layer 1423-2 deals with the communication processing concerning a message IAM, circuit identification code CIC-1 and parameter Para-1 of in the signal unit 1451. On the other hand, the communication function layer 1423-3 deals with the communication processing concerning a destination IP address D-adx and source IP address S-adx contained in the IP packet 1452. The communication function layer 1423-4 deals with the communication processing concerning a message IAM and circuit identification code CIC-x of in the IP packet 1452.

As in the above, the gist lies in that the communication function layers 1423-2 and 1423-4 carry out a mutual conversion of between the packet 1451 on the common channel signaling system and a packet 1452 conforming to a rule in the prior patent application.

<<Outline of Multicast>>

Next, explanation is made on a multicast-type IP network 27-1 for a transfer of from one source of delivery to a plurality of destinations, with reference to FIG. 10.

Routers 27-11 to 27-20 respectively hold multicast tables. An IP packet 29-1 having a multicast address "MA1" is sent from an IP terminal unit 28-1 to reach the router 27-18 via the router 27-11. By making reference to a router-dependent multicast table held in the router 27-18, an IP packet 29-3 and IP packet 29-4 are transferred onto a communication line. The IP packet 29-3 is copied in the router 27-17 and turned into IP packets 29-5 and 29-6, while the IP packet 29-5 is copied in the router 27-12 and turned into IP packets 29-8 and 29-9, respective of which reach an IP terminal unit 28-2 and an IP terminal unit 28-3. The IP packet 29-6 is copied in the router 27-13 and turned into an IP packet 29-10 and 29-11, respective of which reach IP terminal units 28-4 and 28-5. The IP packet 29-4 passes the routers 27-19, 27-14, and copied IP packets 29-12 and 29-13 respectively reach IP terminal units 28-6 and 28-7.

Incidentally, known is the method of transferring multicast data by storing it in a UPD segment of in an IP packet, which is applicable to the foregoing multicast. The routers 27-11 to 27-14 shown in FIG. 10 are network node units. In the technique disclosed in Embodiment 18 of the prior patent application, an address of a terminal unit is previously registered in an address management table of a network node unit so that, by the means for examining an address included in communicated multicast data, realized is a multicast IP-packet communication capable of preventing against not-allowed transmission of multicast data thereby enhancing information security and imposing multicast data fee onto the recipient.

<<Example of Multicast Communication>>

This is an example disclosed as Embodiment 20 in the prior patent application. Explanation will be made with reference to FIG. 11. Within an IP network 31-1, there are provided a range 31-2 under the management of communication company X and a range 31-3 under the management of communication company Y, network node units 32-1 to 32-12, routers 34-1 to 34-11, and a router 34-12. The network node units and the routers are connected directly by IP communication lines or indirectly through the network node units and routers. The terminal units 33-1 to 33-17 having an IP packet transmitting/receiving function are connected to the network node units via IP communication lines. Numerals 33-24 to 33-27 are multicast P service proxy servers, numerals 33-28 to 33-31 are multicast Q service proxy servers, and numerals 33-32 to 33-35 are overflow communication line servers. The communication companies X and Y jointly manage the routers 34-12. A multicast system with IP encapsulation is disclosed in the Embodiment 17 in the proceeding patent.

<<Transmission Terminal Units and Transmission Management Servers of Communication Company>>

The electronic newspaper distribution service by a newspaper company A is classified as multicast P service and the news distribution service by a broadcasting station B is as multicast Q service. The terminal unit 33-1 is a multicast data transmitting terminal unit under the management of the communication company X, the terminal unit 33-2 is a transmission management server under the management of the communication company X, a terminal unit 33-4 is a multicast data transmitting terminal unit under the management of the communication company Y, a terminal unit 33-6 is a transmission management server under the management of the communication company Y, and a terminal unit 33-7 is a terminal unit under the management of the newspaper company A which is a terminal unit for multicast P service to transmit an electronic newspaper prepared by the newspaper company A to the transmission management server 33-2 of the communication company X and to the transmission management server 33-6 of the communication company Y thus effecting the administrative correspondence communication concerning electronic newspaper distribution. A terminal unit 33-3 is a terminal unit under the management of the broadcasting station B, which is a terminal unit for multicast Q service to transmit the (voice-moving image) TV news distribution service offered by the broadcasting station B to the transmission management server 33-2 of the communication company X and to the transmission management server 33-6 of the communication company Y thus effecting the administrative correspondence communication concerning electronic newspaper distribution. The transmission management server 33-2 carries out an administration procedure concerning multicast data transmission, such as distributing an electronic newspaper prepared by the newspaper company A on behalf of the communication company X, TV news distribution service by the broadcasting station B and electronic stock-price guide service by a stock company C. Similarly, the transmission management server 33-6 carries out an administration procedure concerning multicast data transmission on behalf of the communication company Y.

<<Data Distribution via Multicast Service Proxy Server>>

Furthermore, the prior patent discloses a multicast technique having an intervening multicast service proxy server, which will be explained in the below (see FIG. 325 of the prior patent). Disclosed is a technique that the multicast data forwarded from the transmission terminal and transferred into the IP transfer network, reaches a multicast service proxy server set up on a reception side, the multicast service proxy server receiving the multicast data, the multicast service proxy server then transmitting the multicast data toward a plurality of terminal units connected to a network node unit by the use of a multicast data distribution function of within the network node unit, the terminal units in plurality receiving the multicast data.

<<Mobile Terminal Unit>>

The prior patent application discloses a technique of communication from a mobile terminal unit through a radio communication path. This will be outlined with reference to FIG. 12. Text data is forwarded from an IP terminal unit 128-1 to reach a radio transmitting/receiving section 123 of within an IP transfer network 120 by way of a radio interface converting section 129-1, a radio transmitting/receiving section 127 and a radio communication path 125, and to reach a network node unit 121 via a gateway 122, being transferred within the IP transfer network 120 to reach another terminal unit via another network node unit. The digital voice forwarded from an IP telephone set 128-2, similarly, reaches another telephone set via the IP transfer network. An IP voice image unit 128-3 also is similar to the above, and voice and image data reach another IP voice image unit via the IP transfer network.

<<Telephone Communication via Media Router>>

The prior patent application discloses a technique of telephone communication via a media router, which will be explained with reference to FIGS. 13 and 14. In this example, a media router 1021 has an IP address "EA1" and a media router 1022 has an IP address "EA2". Digital voice is stored in an IP packet given with a local IP address and forwarded from a telephone set 1011 to reach the media router 1021. Next, the media router 1021 turns into an external IP packet having a source address "EA1" and destination address "EA2". The external IP packet reaches a network node unit 1031 via a communication line 1040. This turns into an internal packet by the use of a first-lined record of an address management table 1034. The internal packet is transferred within the IP network to reach a network node unit 1032. The internal packet is decapsulated and the external IP packet is restored. This passes a communication line 1041 to reach a media router 1022 where it is stored in an IP packet given with a local IP address, thus reaching a telephone set 1012.

Next, with reference to FIG. 15, shown is another disclosure example of another media router 1021-1. This is an example that a connection control section 1080-1 has an external address "EA1". The voice, forwarded from a telephone set 1011-1 having a telephone number "Tel-No-1", passes a pin number "T1" at an end of a communication line to reach a telephone control section 1081-1. The connection control section 1080-1 makes reference to a first-lined record "Tel-No-1, T1, 5004" of a telephone number/pin number/ UDP port number correspondence table 1083 in an inside thereof to adopt a port number "5004", and forms an external packet storing a voice having a source address "EA1" and a port number "5004" of a UDP or TCP packet within an IP packet. Namely, the media router 1021-1 is characterized by a technique that an external address "EA1" and port number "5004" is assigned to a telephone set having a telephone number "Tel-No-1".

Next, with reference to FIG. 16, shown is another disclosure example of another media router 1021-2. The media router 1021-2 includes a telephone control section 1081-2, a PBX control section 1085-1, a connection control section 1080-2, routers 1086, 1087. An IP packet, forwarded from a terminal unit 1090 of within a LAN 1093, reaches a network node unit of within the IP network by way of a router 1087, a communication line 1089, a router 1086 and a communication line 1040-2. Similarly, an IP packet containing the same image data, forwarded from a moving-image transceiver 1092, reaches a network node unit of within the IP transfer network by way of a router 1087, a communication line 1089, a router 1086 and a communication line 1040-2. It is possible to transfer an IP packet in a reverse direction.

In order for implementing IP full service using an IP network, there is no terminal-to-terminal communication connection control method for a common carrier to provide IP full service, i.e., (1) terminal-to-terminal communication connection control method using a mobile communication network and IP network, (2) method for implementing line-connection control in a level above a TCP layer, using telephone numbers, (3) method for implementing TV conference communication using IP-network multicast function, (4) method of configuring a relay gateway unit for connecting an IP network and a PSTN, (5) method of setting an entire or part of an external address in an internal-packet address area, (6) method of setting an entire or part of an external address in an internal frame, (7) method of implementing various functions of network node units within an IP network, (8) method of carrying out fixed telephone, mobile phone and multimedia communications on the same IP network, (9) method of implementing security ASP, (10) method of transmitting and receiving multicast data without distinction between mobile and fixed terminal units, (11) method of switching a radio base point during voice communication, and so on.

SUMMARY OF THE INVENTION

It is an object of the present invention to resolve the problems of and stemmed from the foregoing methods. Namely, (1) an object is to solve the terminal-to-terminal communication connection control method for telephone and voice image communications in order for a mobile phone or voice image unit to communicate with another telephone set or voice image unit via an IP network and a mobile communication network, (2) an object is to solve the terminal-to-terminal communication connection control method by establishing a TCP communication path between a source-sided telephone management server and a destination-sided telephone management server, and then establishing a communication path for terminal-to-terminal communication, to thereafter carry out a voice image communication via an IP network between two voice image units, (3) an object is to solve or the method of implementing TV conference with IP multicast by setting a multicast communication record in an address management table of in a network node unit and setting a multicast route table in a router, to transmit voice moving images by the use of multicast addresses, (4) an object is to solve the gateway configuring method for connecting the common channel signaling system based IP network and a PSTN by installing relay gateways within an IP network in order to effect telephone communication of telephone—IP network—PSTN—telephone, (5) an object is to solve the method of structuring an IP network by, in IP packet encapsulation, setting an entire or part of an external address to an address area of in the internal packet due to a method of setting within an external IP packet, (6) an object is to solve the method of structuring an IP network by a method of setting an entire or part of an external address to an address area of in the internal frame, (7) an object is to solve the method of structuring a security IP network by implementing a method to separate an IP network into a plurality of internal IP networks by the use of packet filters, priority control function, multicast recipient address conversion function and port numbers, a method to separate an IP network into a plurality of internal IP networks, (8) an object is to solve the method of implementing fixed telephone and mobile phone communications on the same IP network by the use of a CIC management table including an administration function of a terminal-unit-sided UNI, (9) an object is to provide an IP network for implementing security ASP due to selecting an IP address, port number and protocol kind of an IP packet to be communicated between an ASP operation server and a user program by the network node unit thereby excluding non-designated IP packets, (10) an object is to solve the multicast data method of providing IP packet exchange service (Intranet, Extranet) and fixed telephone and mobile phone services, without distinction between mobile and fixed terminal units, on IP networks based on the same principle, and (11) an object is to solve the method for registering and changing a whereabouts position of a telephone set by registering a mobile phone over an IP-network-formed mobile communication network in order for implementing mobile phone communication.

The present invention concerns a terminal-to-terminal communication connection control method using an IP network. The foregoing object of the invention is achieved by: in order for a mobile telephone set to have a telephone communication with a telephone set by way of a mobile communication network and an IP network, the mobile communication network carries out a line connection control based on the common channel signaling system; the IP network establishing a communication path by transmitting and receiving a line connection control message applying the common channel signaling system to the IP network thereby effecting a telephone communication.

Meanwhile, the foregoing object of the present is achieved by: in order for a voice image unit 1 to have a voice image communication with a voice image unit 2 by way of a mobile communication network and an IP network, the mobile communication network carries out a line connection control based on the common channel signaling system; the IP network establishing a communication path by a line connection control message applying the common channel signaling system to the IP network, and thereafter carrying out a control procedure for opening a voice image communication path between the voice image units 1 and 2 to effect a voice image communication between the voice image units 1 and 2; when the voice image communication ends, the voice image units 1 and 2 carrying out a control procedure for closing the voice image communication path; whereby the voice image units 1 and 2 release the communication path according to a line-connection control message, or otherwise, by: establishing previously a TCP communication path establishing between a source-sided telephone management server and a destination-sided telephone management server; transmitting and receiving circuit connection control messages IAM, ACM, CPG, ANM to establish a communication path for terminal-to-terminal communication, and thereafter communicating voice and data between two terminal units; communicating line connection control messages REL, RLC between the source-sided telephone management server and the destination-sided telephone management server to release the communication path thereby releasing the TCP communication path.

Furthermore, achievement is by: establishing a TCP communication path between a source-sided telephone management server and a destination-sided telephone management server; thereafter transmitting and receiving circuit connection control messages IAM, ACM, CPG, ANM to establish a communication path for terminal-to-terminal communication, and thereafter releasing the TCP communication path; communicating voice and data between two terminal units; when one of the terminal units ends data communication, establishing the TCP communication path between the source-sided telephone management server and the destination-sided telephone management server; thereafter communicating line connection control messages REL, RLC to release the communication path for terminal-to-terminal communication and release the TCP communication path.

The present invention concerns a TV conference communication method using an IP network. The foregoing object of the present invention is achieved by: setting an address management table in a network node unit, and setting a route table for multicast IP packet transfer in a router of within an IP network; a sender 1 sending a voice and moving image by using a multicast address M1, one or more receivers receiving the voice and moving image by using the multicast address M1; a sender 2 sending a voice and moving image by using a multicast address M2, one or more receivers receiving the voice and moving image by using the multicast address M2; an IP packet being encapsulated by the address management table and transferred within the IP network to use the multicast transmission/reception function.

Meanwhile, the present invention concerns a gateway configuration within an IP network. The foregoing object of the present invention is achieved by: configuring a relay gateway by a relay control section and a voice control section in order to carry out a communication between telephone sets by way of a telephone set 1—IP network—PSTN—telephone set 2; an NNI interface section based on the common channel signaling system for connection to a PSTN or mobile communication network being provided within the relay control section while a UNI interface section based on the common channel signaling system for connection to a PSTN or mobile communication network being within the voice control section.

Meanwhile, the present invention concerns an IP network. The foregoing object of the present invention is achieved by: an external IP packet being converted into an internal packet in an input-sided network node unit and transferred within an IP network; the external IP packet being to be restored from the internal packet in an output-sided network node unit; under the control of a record of an address management table of within the input-sided network node unit, an entire or part of an external address set in the external IP packet to be set to an address area of the internal packet.

Meanwhile, the present invention concerns an IP network. The foregoing object of the present invention is achieved by: under the control of a record of an address management table of within the input-sided network node unit of the external IP packet, an external address set in the external IP packet in an entirety or a part being to be set to an address area of the internal frame.

Meanwhile, the present invention concerns a method for carrying out various functions of the network node unit of within the IP network. The foregoing object of the present invention is achieved by: configuring the network node unit to include at least one of a protocol filter function and a port filter function; the protocol filter function controlling, as a function upon transmission, whether to convert the external IP packet into an internal packet or not according to a protocol of within the external IP packet to be inputted. Also, the port filter function receives the internal IP packet from the inside of the IP network as a function at the destination, restores an external IP packet from the internal IP packet and controls whether to forward it onto an external communication line according to a port number of an external IP packet included in a payload section in the internal IP packet to be inputted.

The packet filter function of the network node unit includes a protocol filter using a protocol kind of within an IP packet, and a port filter function using a port number of within a TCP or UDP segment in an IP packet. The port filter, also, allows a packet to pass or prevents the packet according to a port passage condition of the external IP packet entering the network node unit. The network node unit has furthermore a function to convert a destination multicast IP address into another IP address (multicast NAT function) by the use of a multicast control table. By using the port filter applicable for a communication record of a unit control table of within the network node unit, the IP network can be separated into a plurality of internal networks. The network node unit includes a unit control table. The control table includes a filtering control table, a packet priority control table, a multicast control table and a signature control table. The unit control table is achieved by including an address management table function due to the foregoing other technique.

Meanwhile, the present invention concerns an IP network. The foregoing object of the present invention is achieved by resolving the respective of six communication cases, i.e., a communication between a fixed telephone set and a fixed telephone set as Communication Case 1, a communication between a mobile phone and a mobile phone as Communication Case 2, a communication between a mobile phone and a fixed telephone set as Communication Case 3, a communication between a fixed telephone set and a mobile phone as Communication Case 4, a multimedia terminal-to-terminal communication based on the common channel signaling system as Communication Case 5, and a multimedia terminal-to-terminal communication set a communication record as Communication Case 6.

The communication procedure of between the media router and the telephone management server and the communication procedure of between the media router and the telephone management server are UNIs. The communication procedure of between the telephone management server and the telephone management server is an NNI based on the common channel signaling system. The IP network includes two or more network node units. An external packet forwarded from a media router 1 or radio base point 1 turns into an internal packet in a source-sided network node unit. The internal packet is transferred within the communication network. The internal packet is restored into an external packet in a destination-sided network node unit and forwarded to a media router 2 or radio base point 2.

In Communication Case 1 to Communication Case 4, a communication is made connecting, from a communication line, a terminal unit 1, a media router 1 or radio base point 1, a telephone management server 1, a telephone management server 2, a media router 2 or radio base point 2 and a terminal unit 2. Accordingly, the communication procedure of between the media router or radio base point and the telephone management server is an UNI for the media router or radio base point while the communication procedure of between the telephone management server and the telephone management server is an NNI based on the common channel signaling system. By the above noted method, the terminal-to-terminal communication connection control method is carried out. The radio base point includes an IP communication line interface section, radio interface section and a radio transmitting/receiving section, making possible telephone communication with any of an analog mobile phone, a digital mobile phone and IP movement. Also, the foregoing object is achieved by using a channel-IP address correspondence table to enable the management of the IP addresses to be used by the mobile phone.

In Communication Case 5, a communication is made connecting, from a communication line, a multimedia terminal unit 1, a media router 1 or radio base point 1, a telephone management server 1, a telephone management server 2, a media router 2 or the radio base point 2 and a multimedia terminal unit 2. Accordingly, the communication procedure of between the telephone management server and the telephone management server carries out an NNI based on the common channel signaling system, thereby achieving the forgoing object. In Communication Case 6, a communication is made connecting, from a communication line, an IP terminal unit 1 having an IP packet transmission/reception function, a media router 1 or radio base point 1, a telephone management server 1, a telephone management server 2, a media router 2 or the radio base point 2 and an IP terminal unit 2. Similarly to the above, the communication procedure of between the telephone management server and the telephone management server does not employ the common channel signaling system. Furthermore, a communication record is set within a unit control table in order for use in a communication between the IP terminal 1 and the IP terminal 2 on the basis of a request by the IP terminal 1. The communication record is deleted after closing the communication, thereby achieving the foregoing object.

Meanwhile, the present invention concerns an IP network. In the foregoing object of the present invention, a mobile phone for carrying out a mobile telephone communication is registered to a mobile network comprising an IP network; while the mobile phone 1 is continuing a telephone communication by way of a communication line of the mobile phone 1—a radio base point 1—telephone management server 1—a telephone management server 2—radio base point 2—mobile phone 2, the mobile phone 1 can move in geographical position to communicate with another radio base point 3, i.e. can continue the telephone communication by way of a communication line of the mobile phone 1—radio base point 3—telephone management server 1—telephone management server 2—radio base point 2—mobile phone 2. Furthermore, achievement is made by solving a method that, while the mobile phone 1 is continuing a telephone communication by way of a communication line of the mobile phone 1—radio base point 1—telephone management server 1—telephone management server 2—radio base point 2—mobile phone 2, the mobile phone 1 can move to another radio base point 4 under the administration of a telephone management server 4, i.e. continues the telephone communication by way of a communication line of the mobile phone 1—radio base point 4—telephone management server 4—telephone management server 2—radio base point 2—mobile phone 2.

Meanwhile, the present invention concerns an ASP service realized through an IP network. The foregoing object of the present invention is achieved by: the network node unit selects an IP address, port number or protocol kind of an IP packet communicated between an ASP server and a user program to exclude the other IP packet than that designated whereby an IP packet containing a permitted IP address, port number or protocol kind passes the network node unit while the IP packet not allowed is excluded in the network node unit thereby making possible to carry out an IP network capable of providing security ASP service.

Meanwhile, the present invention concerns an IP network. The foregoing object of the present invention is achieved by: in order to transmit multicast data to nearly all the network node units of within the IP network and receive the multicast data by a plurality of mobile terminal units, a mobile terminal unit carries out a terminal-unit authentication communication procedure to a radio base point so that the mobile terminal unit allowed receives the multicast data.

BRIEF DESCRIPTION OF THE DRAWINGS

In the accompanying drawings:

FIG. 7 is a figure explaining a conventional concept applying a common channel signaling system to an IP network;

FIG. 8 is a figure explaining a conventional connection control of a telephone set applied with a common channel signaling system;

FIG. 9 is a figure for explaining a gateway logic structure of a prior patent application centering on line connection control;

FIG. 10 is a view explaining the conventional packet transfer by multicast;

FIG. 34 is a figure explaining a circuit connection control in a TCP session, in the second embodiment of the present invention;

FIG. 35 is a figure explaining a TCP header form, in the second embodiment of the present invention;

FIG. 63 is a figure of a communication record represented in a program language C, in the seventh embodiment of the present invention;

FIG. 64 is an example of a unit conversion table comprising a plurality of communication record, in the seventh embodiment of the present invention;

FIG. 70 is a figure explaining the overall flow of packet priority control, in the seventh embodiment of the present invention;

FIG. 71 is a figure representing a priority control record form, in the seventh embodiment of the present invention;

FIG. 72 is a figure of a priority control record represented in a program language C, in the seventh embodiment of the present invention;

FIG. 73 is a figure showing an example of a plurality of priority control records, in the seventh embodiment of the present invention;

FIG. 81 is an example of a unit control table comprising a plurality of communication record used for carrying out the multicast control function—2, in the seventh embodiment of the present invention;

FIG. 82 is a figure explaining a procedure of transmitting and receiving multicast data in the multicast control function—2, in the seventh embodiment of the present invention;

FIG. 83 is a figure explaining on how to report a reception in the multicast control function—2, in the seventh embodiment of the present invention;

FIG. 91 is a figure showing an example that an external packet is converted into an IPv6-formed internal packet and transferred, in the seventh embodiment of the present invention;

FIG. 92 is an example of an IPv6-formed internal packet, in the seventh embodiment of the present invention;

FIG. 93 is a figure showing a form of a communication record as an IPv6-formed internal packet, in the seventh embodiment of the present invention;

FIG. 94 is a figure showing an example that an external IP packet is converted into a MAC-formed internal frame and transferred, in the seventh embodiment of the present invention;

FIG. 95 is an example of a MAC-formed internal frame, in the seventh embodiment of the present invention;

FIG. 96 is a figure showing a form of a communication record as an example of a MAC-formed internal frame, in the seventh embodiment of the present invention;

FIG. 97 is a figure showing an example that an internal packet formed by providing a tag to an external packet is transferred, in the seventh embodiment of the present invention;

FIG. 98 is a figure showing an example of a communication record for the internal packet formed by providing a tag to an external packet, in the seventh embodiment of the present invention;

FIG. 99 is a figure showing an example of conversion to and transfer of another formed internal packet formed by providing a tag to an external packet, in the seventh embodiment of the present invention;

FIG. 100 is a figure showing an example of a communication record for the other formed internal packet formed by providing a tag to an external packet, in the seventh embodiment of the present invention;

FIG. 110 is a figure showing an IP packet to be transferred from a calling-sided media router to a network node unit, in Communication Case 1 of the eighth embodiment of the present invention;

FIG. 111 is a figure showing an IP packet to be transferred from a network node unit to a proxy telephone server, in Communication Case 1 of the eighth embodiment of the present invention;

FIG. 112 is a figure showing an IP packet to be transferred from a proxy telephone server to a telephone management server, in Communication Case 1 of the eighth embodiment of the present invention;

FIG. 113 is a figure showing a calling-sided CIC management table, in Communication Case 1 of the eighth embodiment of the present invention;

FIG. 114 is a figure showing an IP packet to be sent from a telephone management server to a telephone number server, in Communication Case 1 of the eighth embodiment of the present invention;

FIG. 115 is a figure showing an IP packet to be sent from a telephone number server back to a telephone management server, in Communication Case 1 of the eighth embodiment of the present invention;

FIG. 116 is another figure showing another example of a calling-sided CIC management table, in Communication Case 1 of the eighth embodiment of the present invention;

FIG. 119 is a figure showing a reception-sided CIC management table, in Communication Case 1 of the eighth embodiment of the present invention;

FIG. 120 is a figure showing an IP packet to be transferred from a telephone management server to a proxy telephone server, in Communication Case 1 of the eighth embodiment of the present invention;

FIG. 121 is a figure showing an IP packet to be transferred from a proxy telephone server to a network node unit, in Communication Case 1 of the eighth embodiment of the present invention;

FIG. 122 is a figure showing an IP packet to be transferred from a network node unit to a media router, in Communication Case 1 of the eighth embodiment of the present invention;

FIG. 123 is a figure showing an ACM message to be sent from a called-sided telephone management server to a calling-sided telephone management server, in Communication Case 1 of the eighth embodiment of the present invention;

FIG. 124 is a figure showing an IP packet to be transferred from a called-sided media router to a network node unit, in Communication Case 1 of the eighth embodiment of the present invention;

FIG. 125 is a figure showing an IP packet to be transferred from a network node unit to a proxy telephone server, in Communication Case 1 of the eighth embodiment of the present invention;

FIG. 126 is a figure showing an IP packet to be transferred from a proxy telephone server to a telephone management server, in Communication Case 1 of the eighth embodiment of the present invention;

FIG. 127 is a figure showing a CPG message to be sent from a called-sided telephone management server to a calling-sided telephone management server, in Communication Case 1 of the eighth embodiment of the present invention;

FIG. 128 is a figure showing an IP packet to be transferred from a calling-sided telephone management server to a proxy telephone server, in Communication Case 1 of the eighth embodiment of the present invention;

FIG. 129 is a figure showing an IP packet to be transferred from a proxy telephone server to a network node unit, in Communication Case 1 of the eighth embodiment of the present invention;

FIG. 130 is a figure showing an IP packet to be transferred from a network node unit to a media router, in Communication Case 1 of the eighth embodiment of the present invention;

Figure 131:
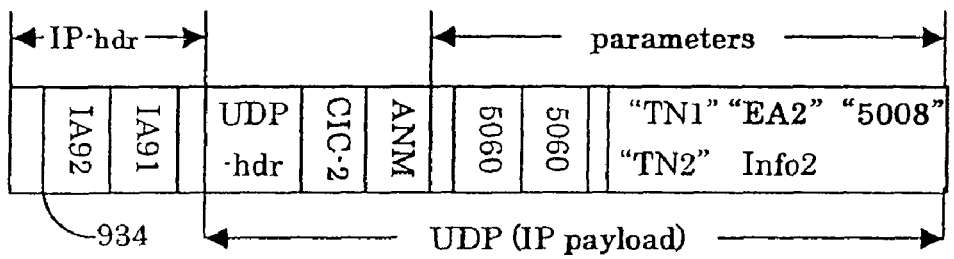
Figure 132:
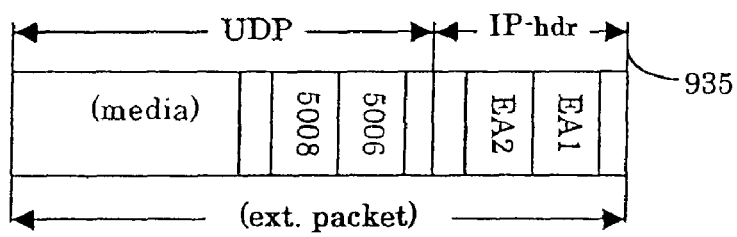
Figure 133:
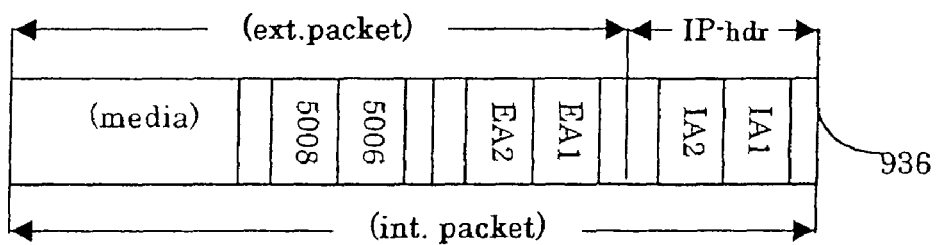
Figure 134:
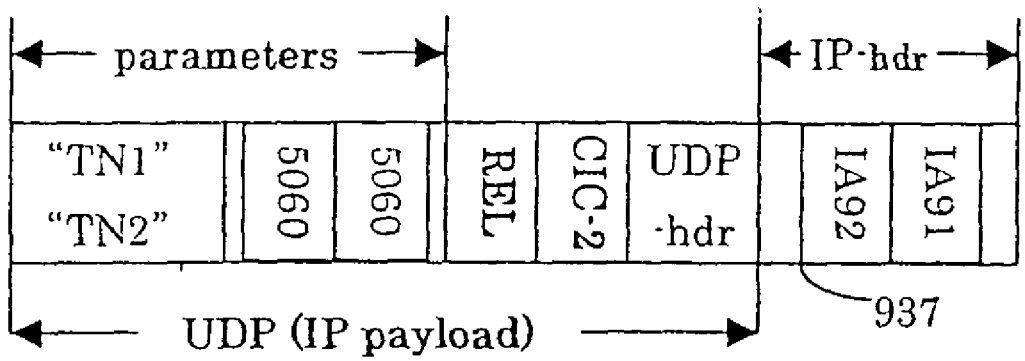
Figure 135:
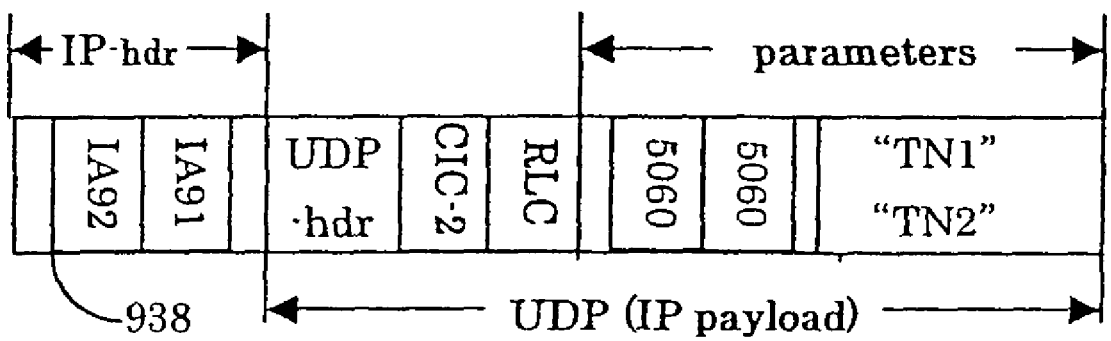
Figures 140, 141, 142:
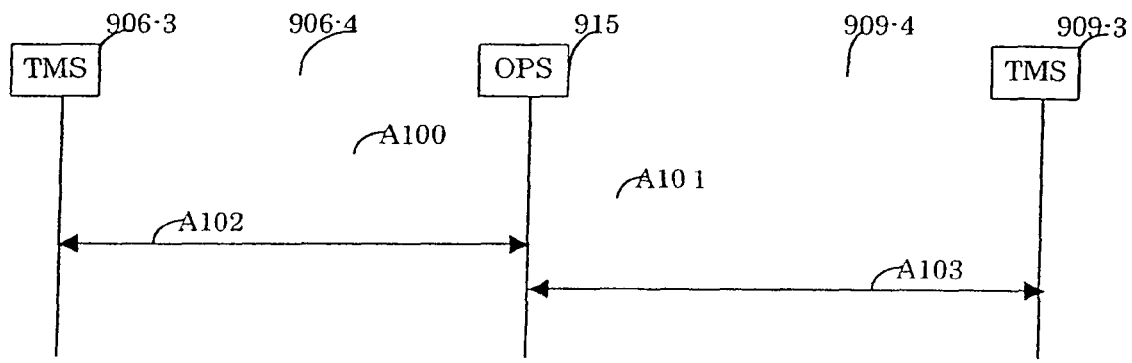
Figure 143:
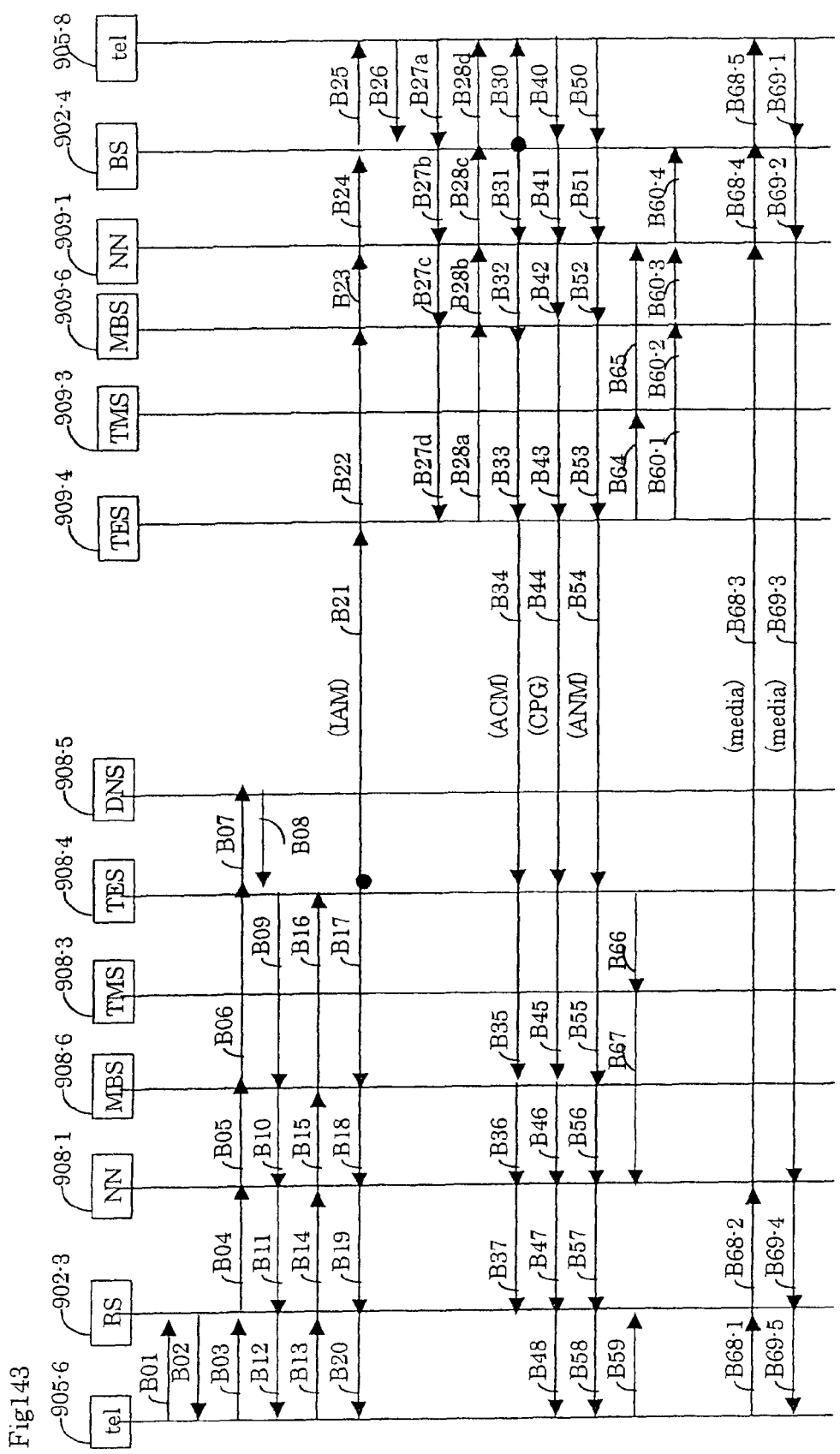
Figure 144:
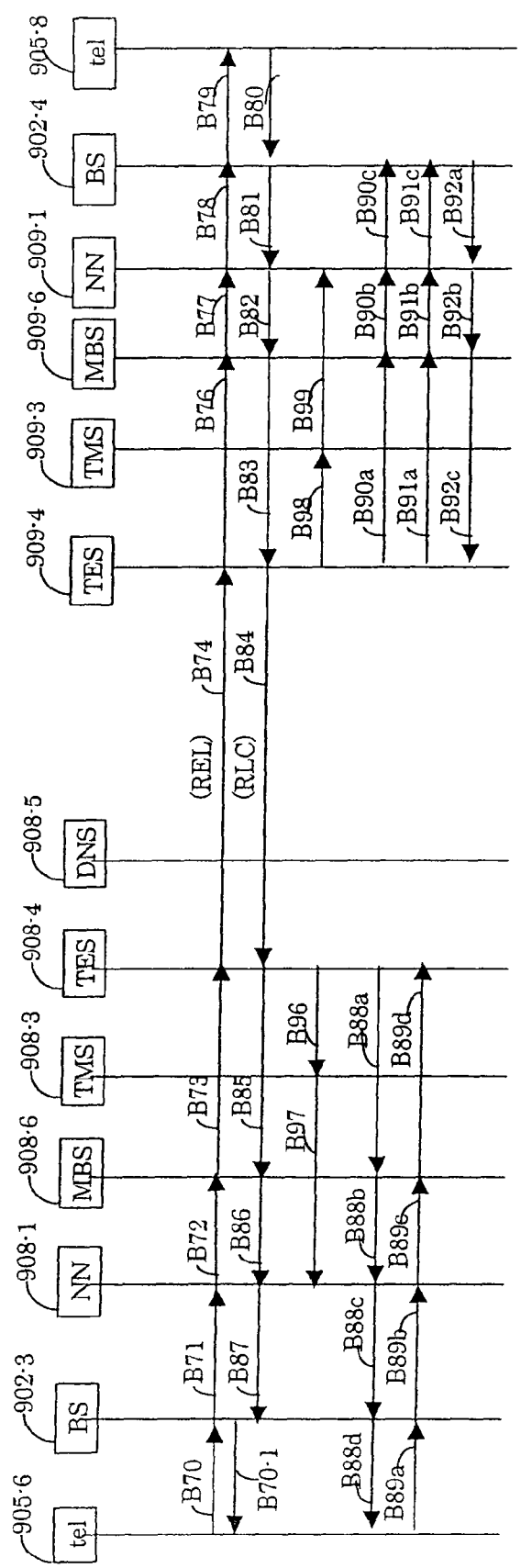
Figure 160:
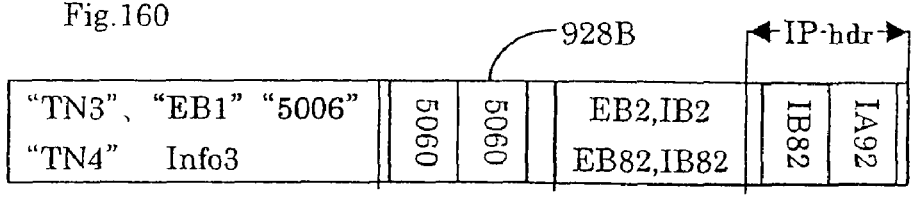
Figure 161:
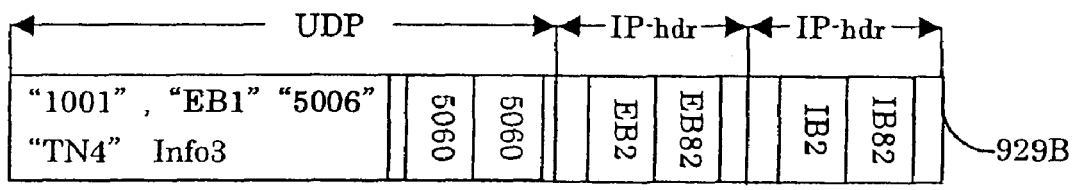
Figure 162:
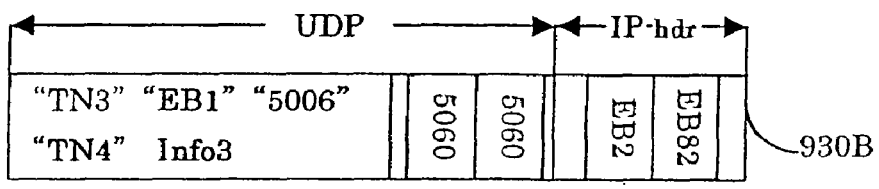
Figure 163:
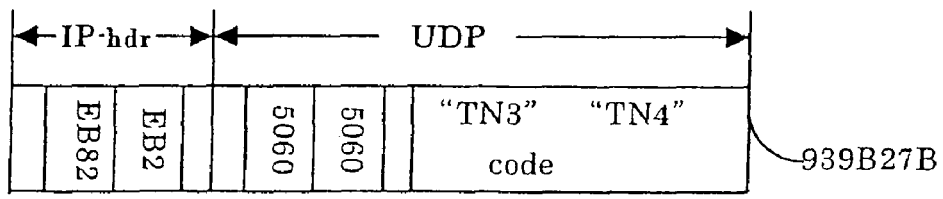
Figure 164:
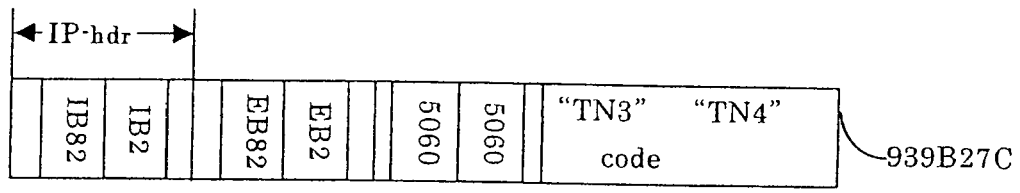
Figure 165:
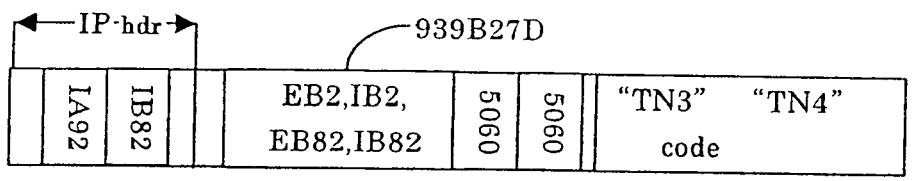
Figure 166:
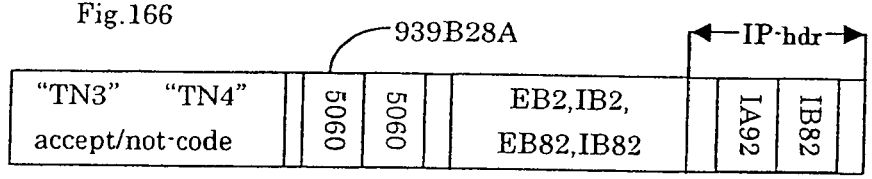
Figure 167:
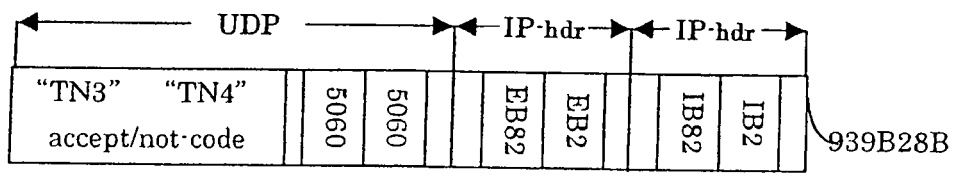
Figure 168:
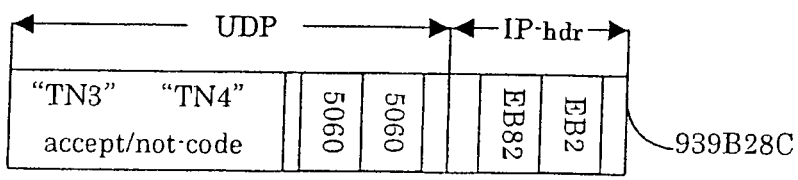
Figure 169:
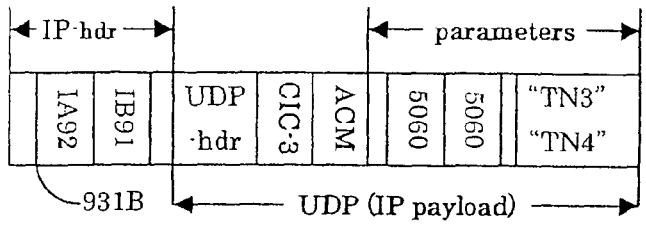
Figure 170:
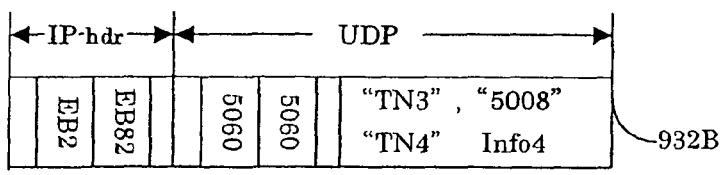
Figure 171:
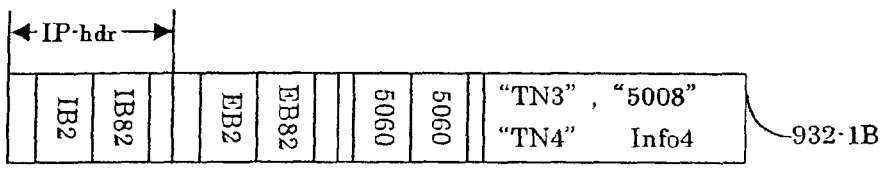
Figure 172:
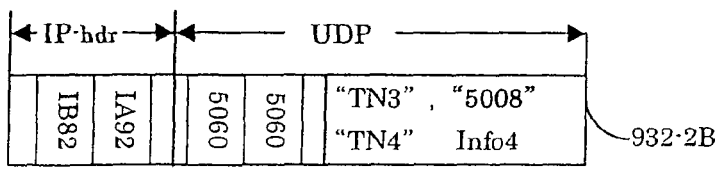
Figure 173:
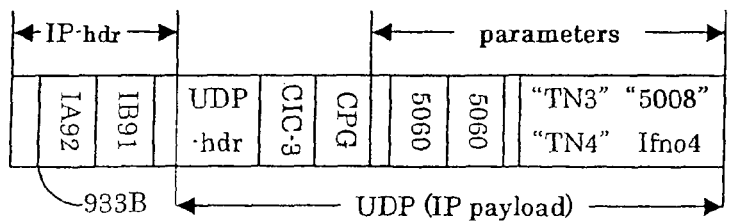
Figure 174:
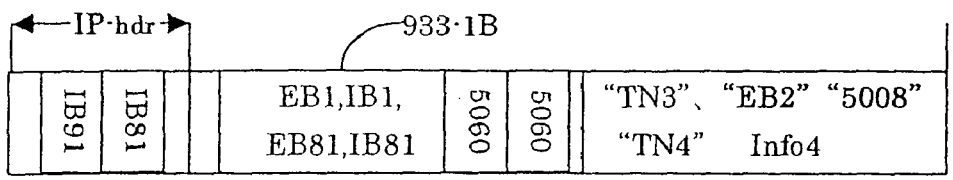
Figure 175:
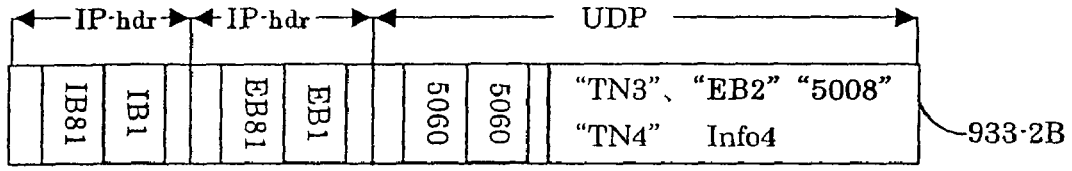
Figure 176:
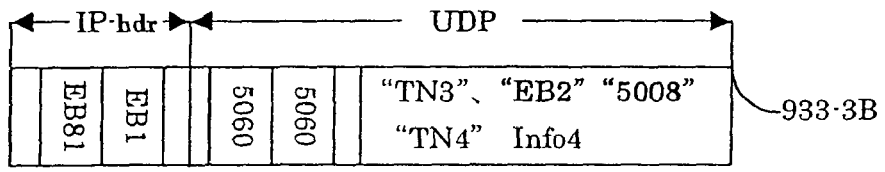
Figure 177:
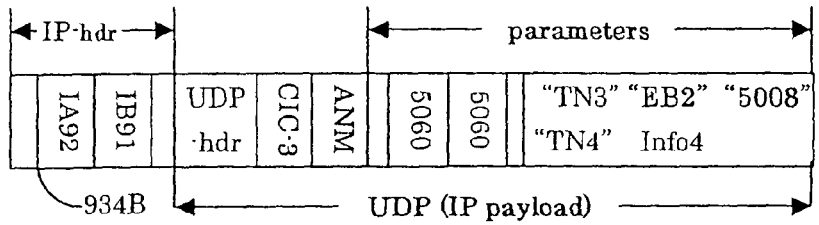
Figure 178:
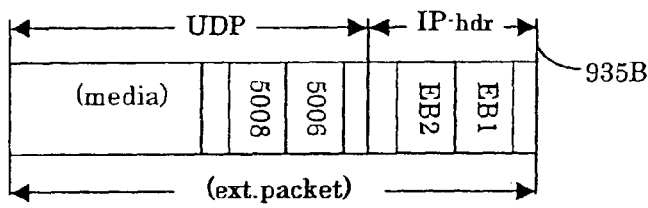
Figure 179:
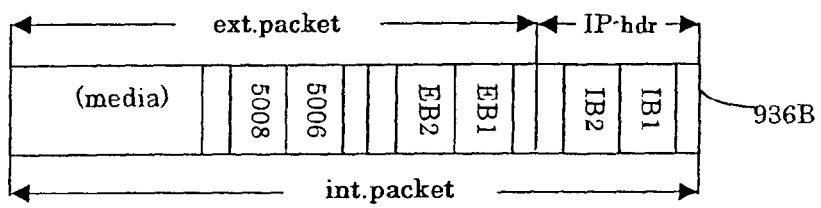
Figure 180:
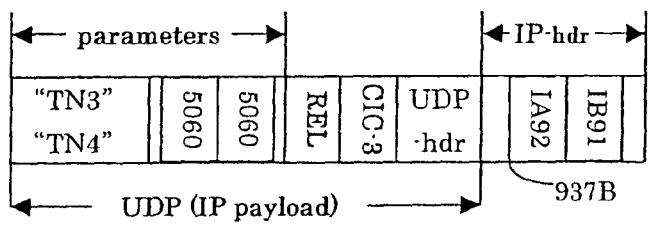
Figure 181:
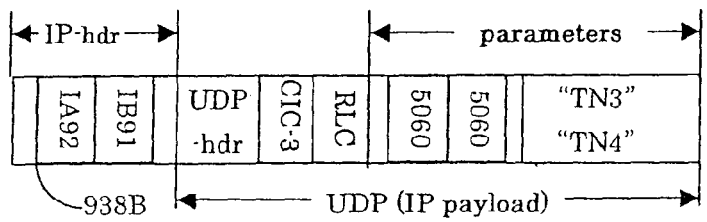
Figure 182:
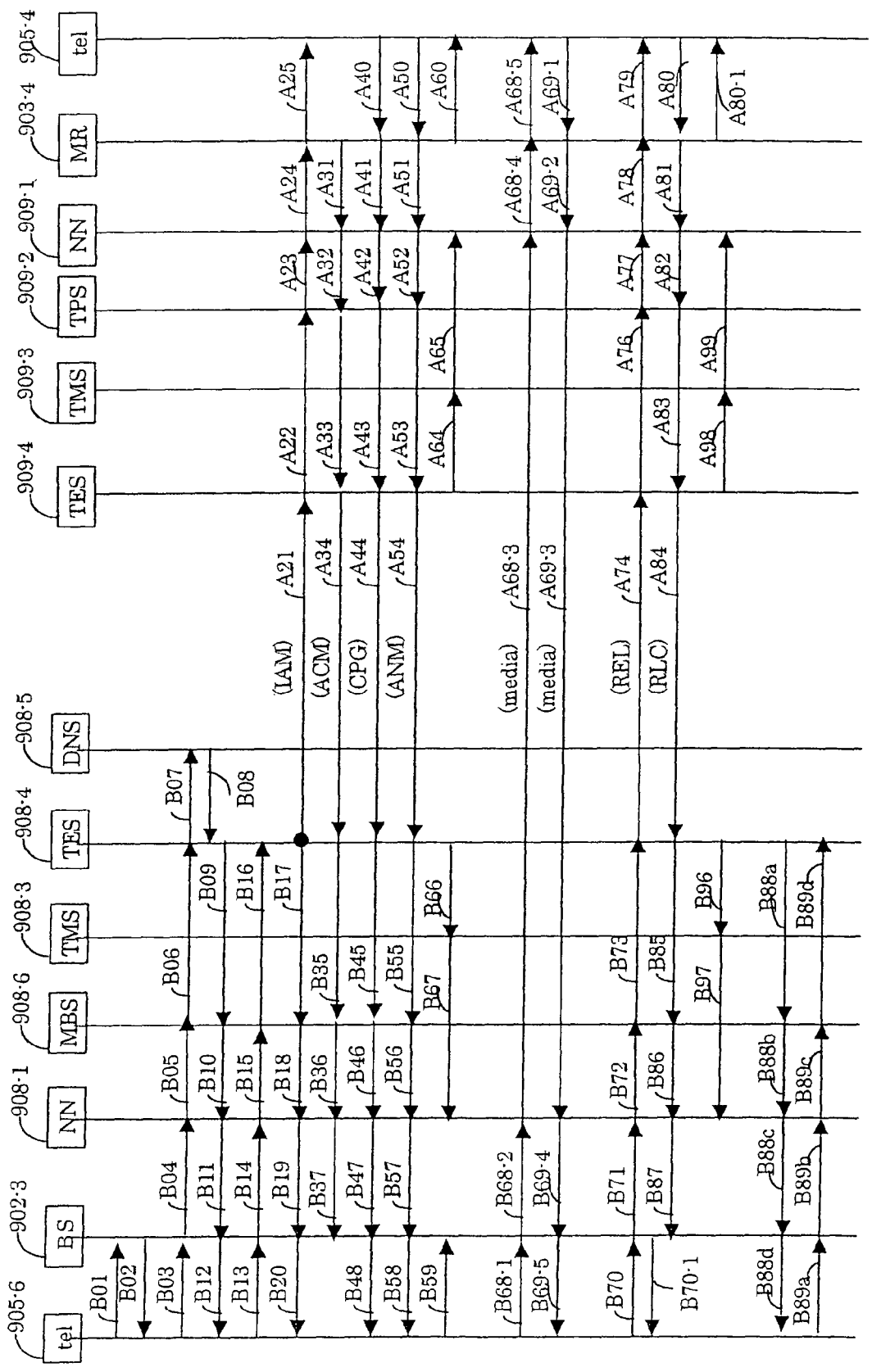
Figure 183:
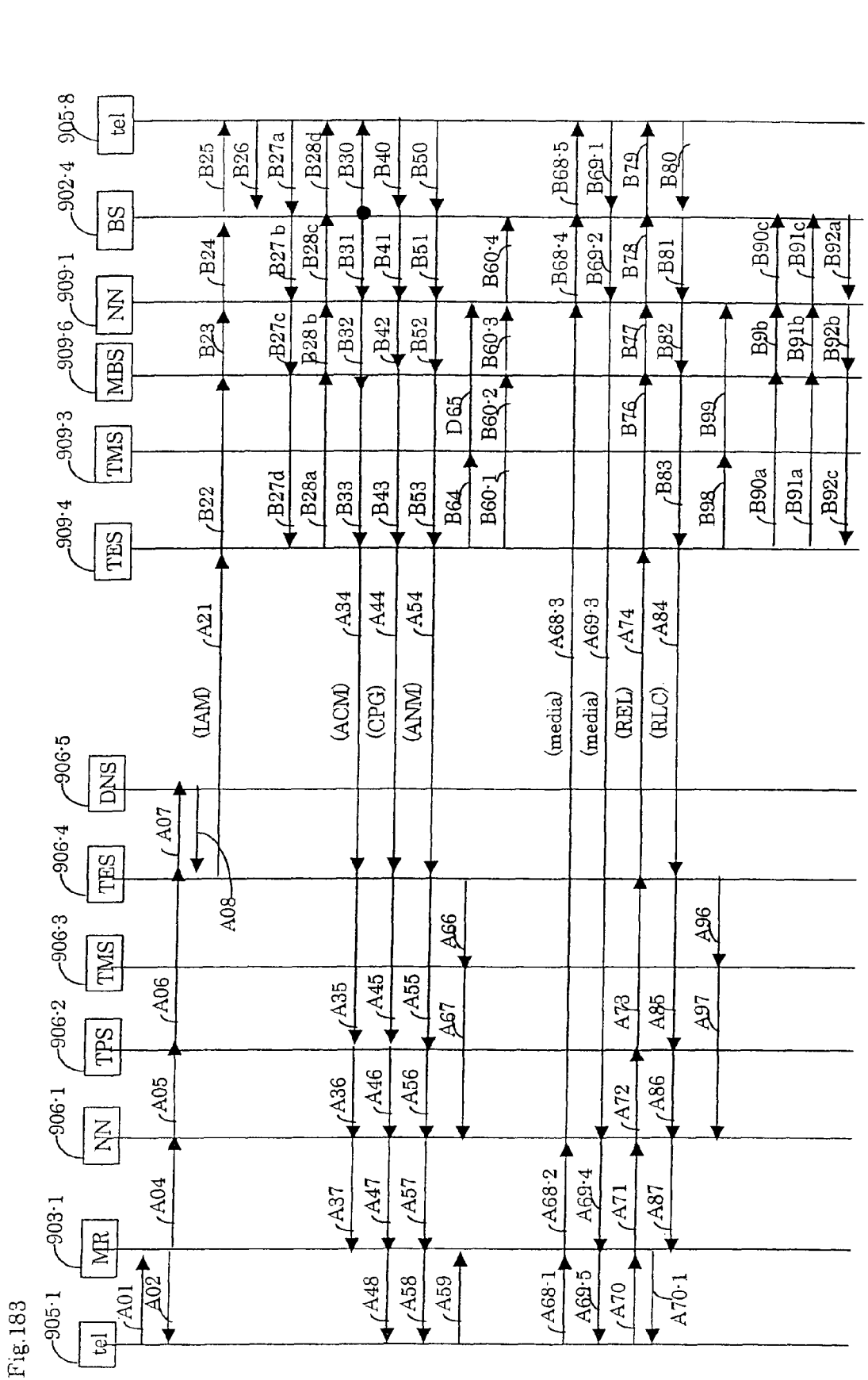
Figures 184, 185:
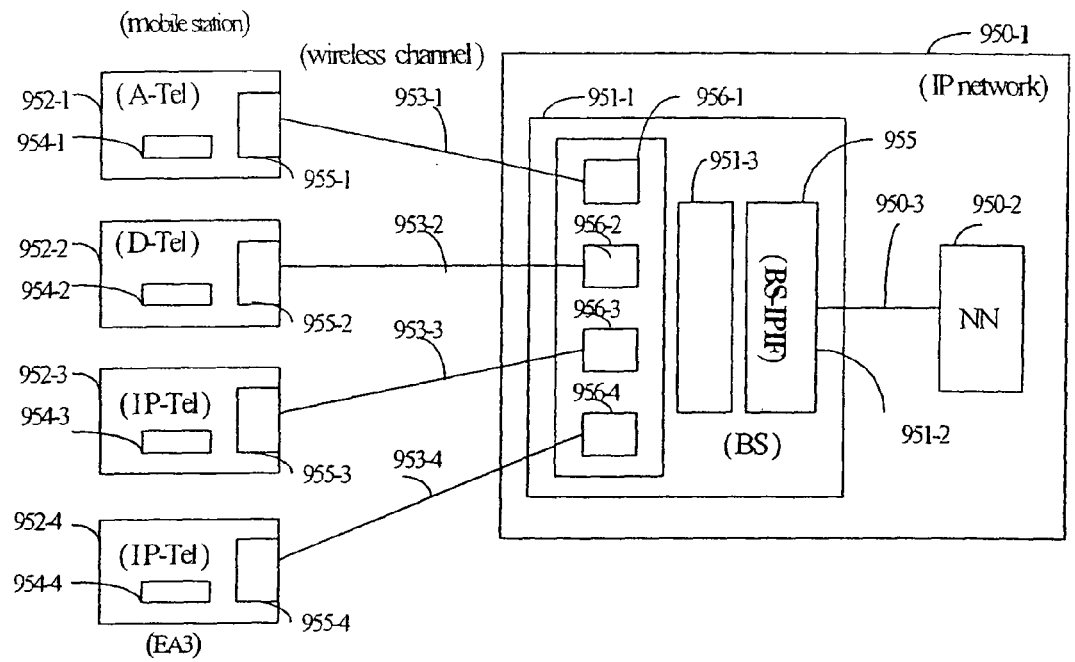
Figure 186:
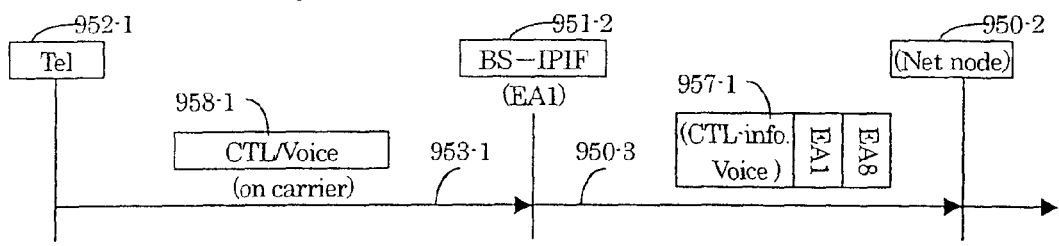
Figure 187:
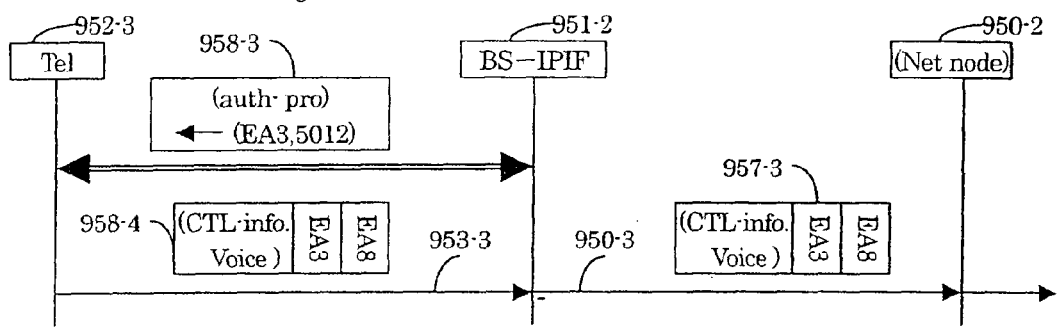
Figure 188:
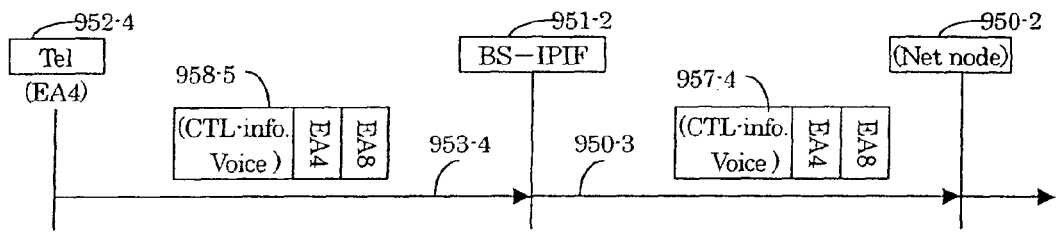
Figure 189:
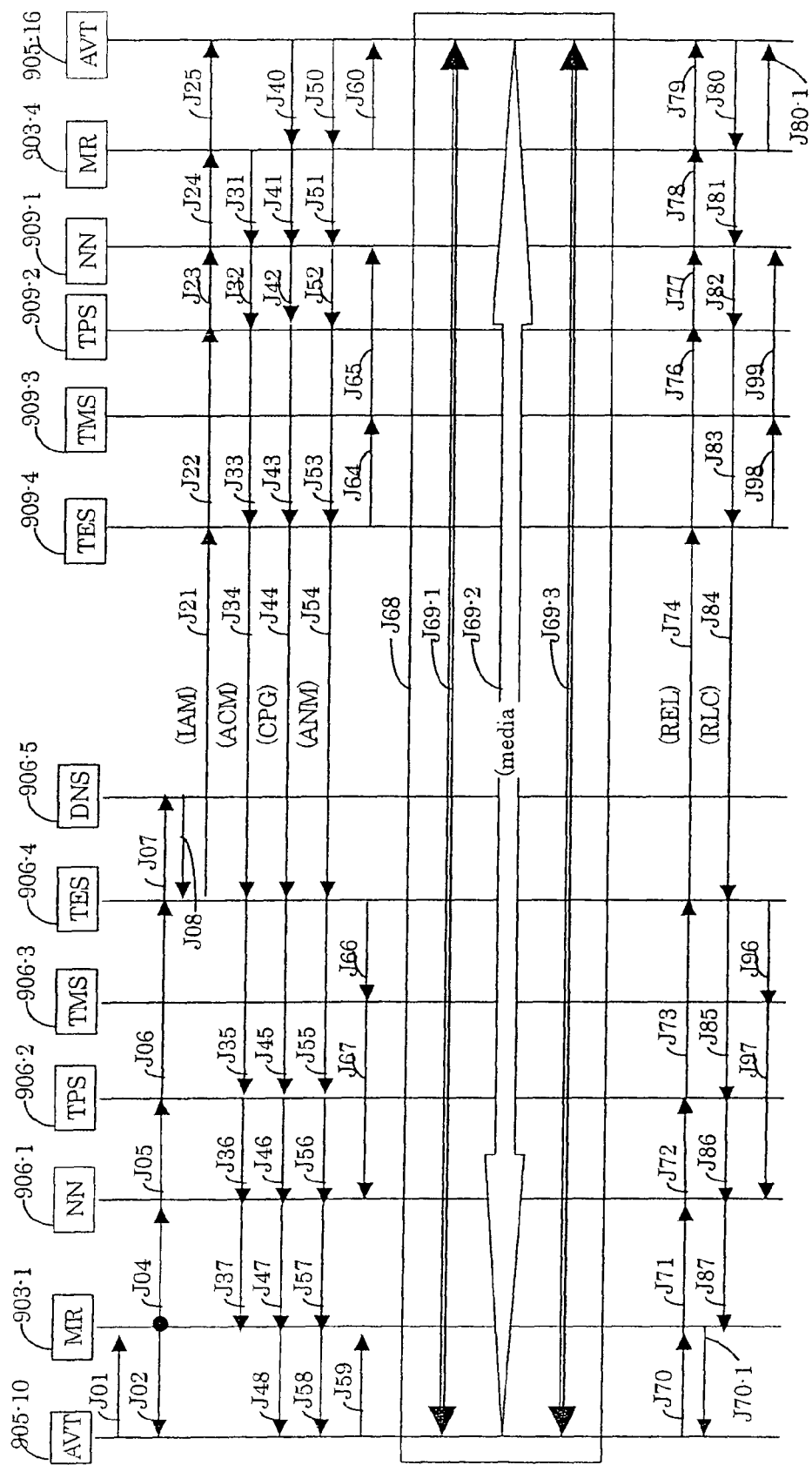
Figure 190:
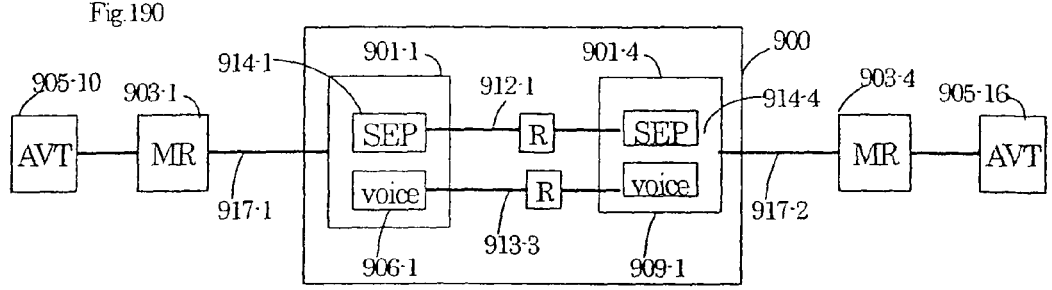
Figure 191:
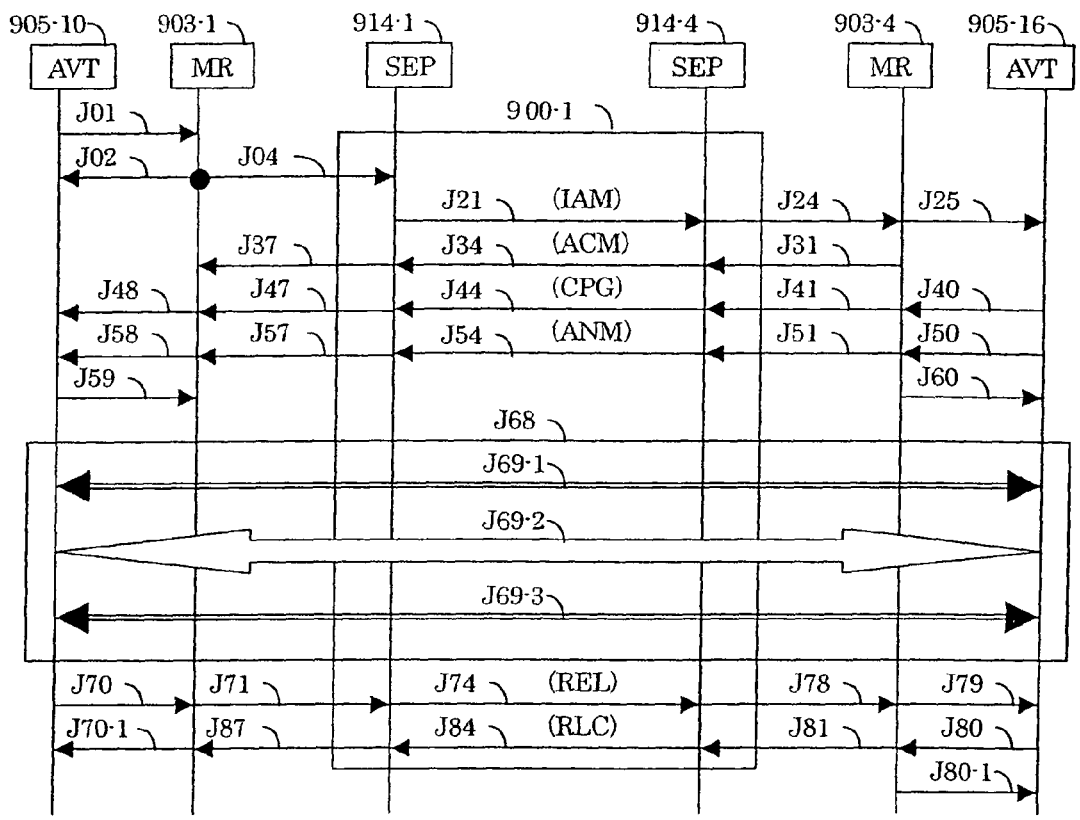
Figure 192:
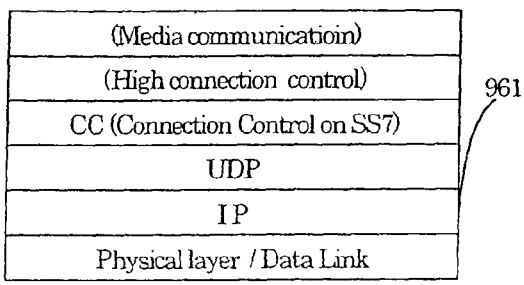
Figure 193:
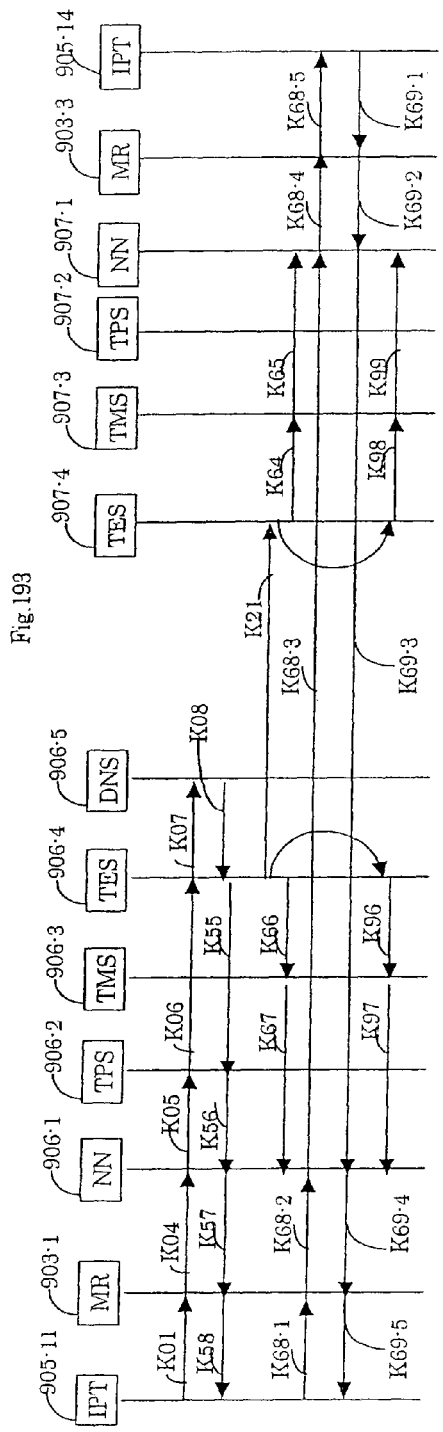
Figure 194:
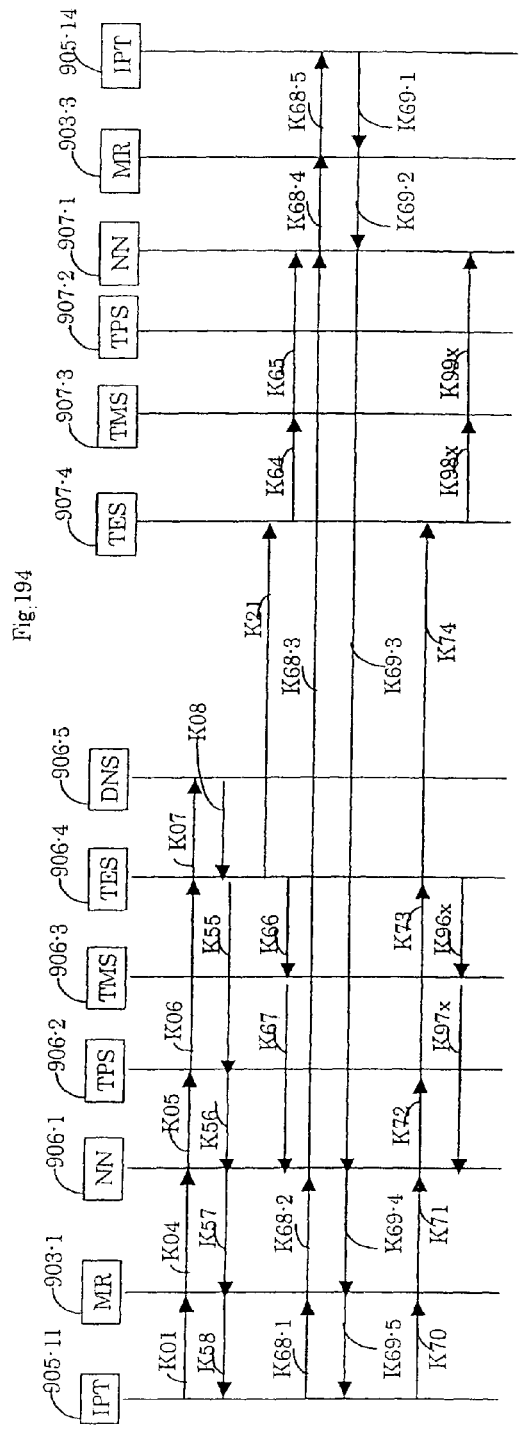
Figure 195:
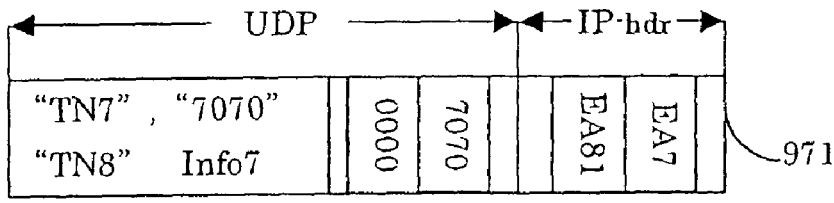
Figure 196:
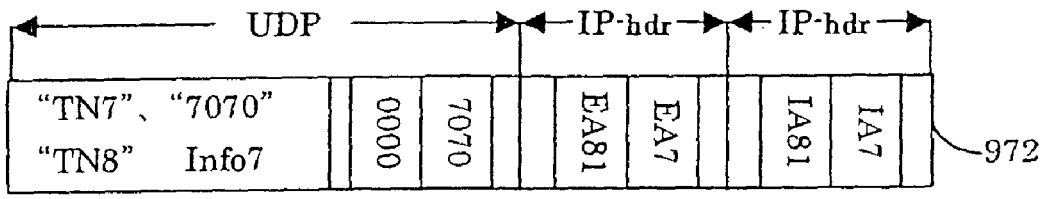
Figure 197:
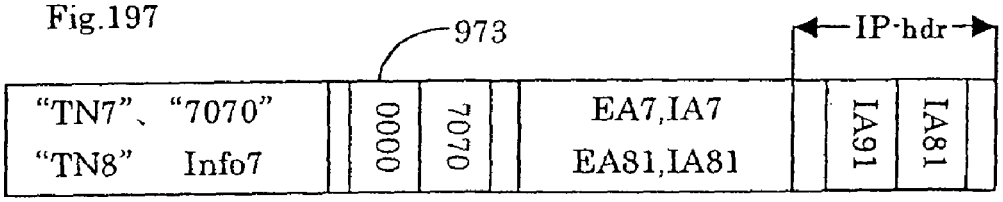
Figure 198:
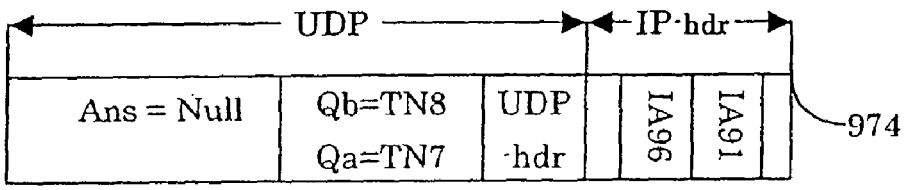
Figure 208:
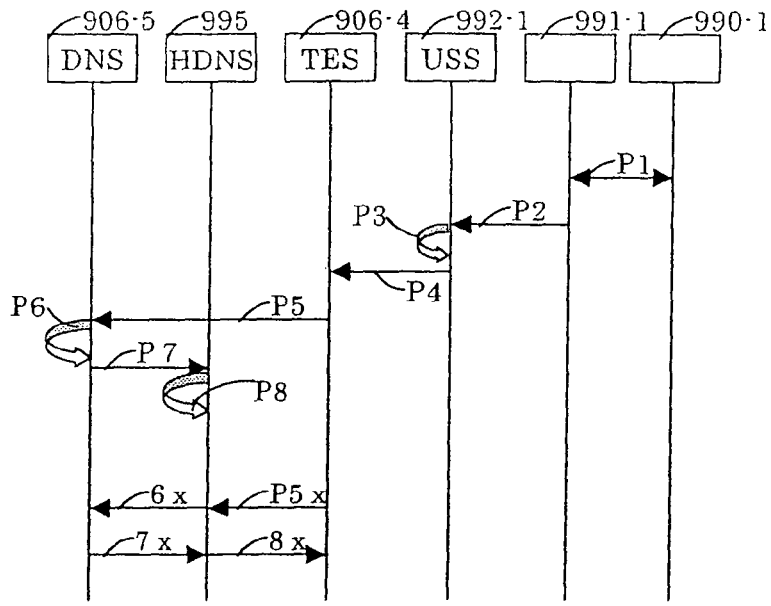
Figure 209:
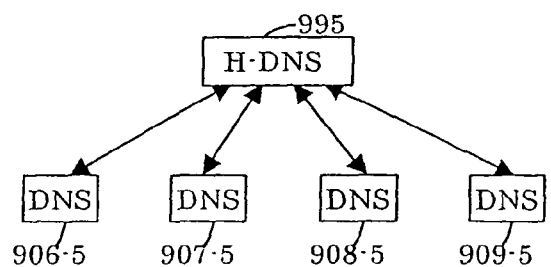
Figure 210:
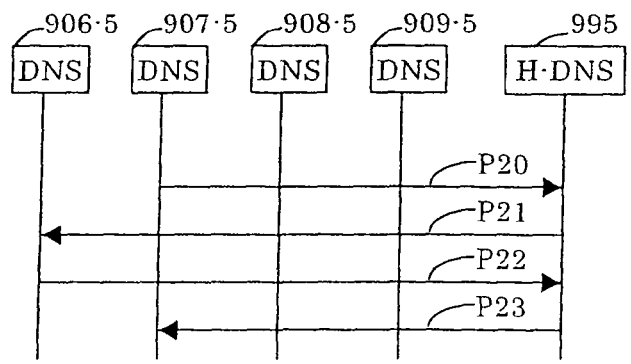
Figure 211:
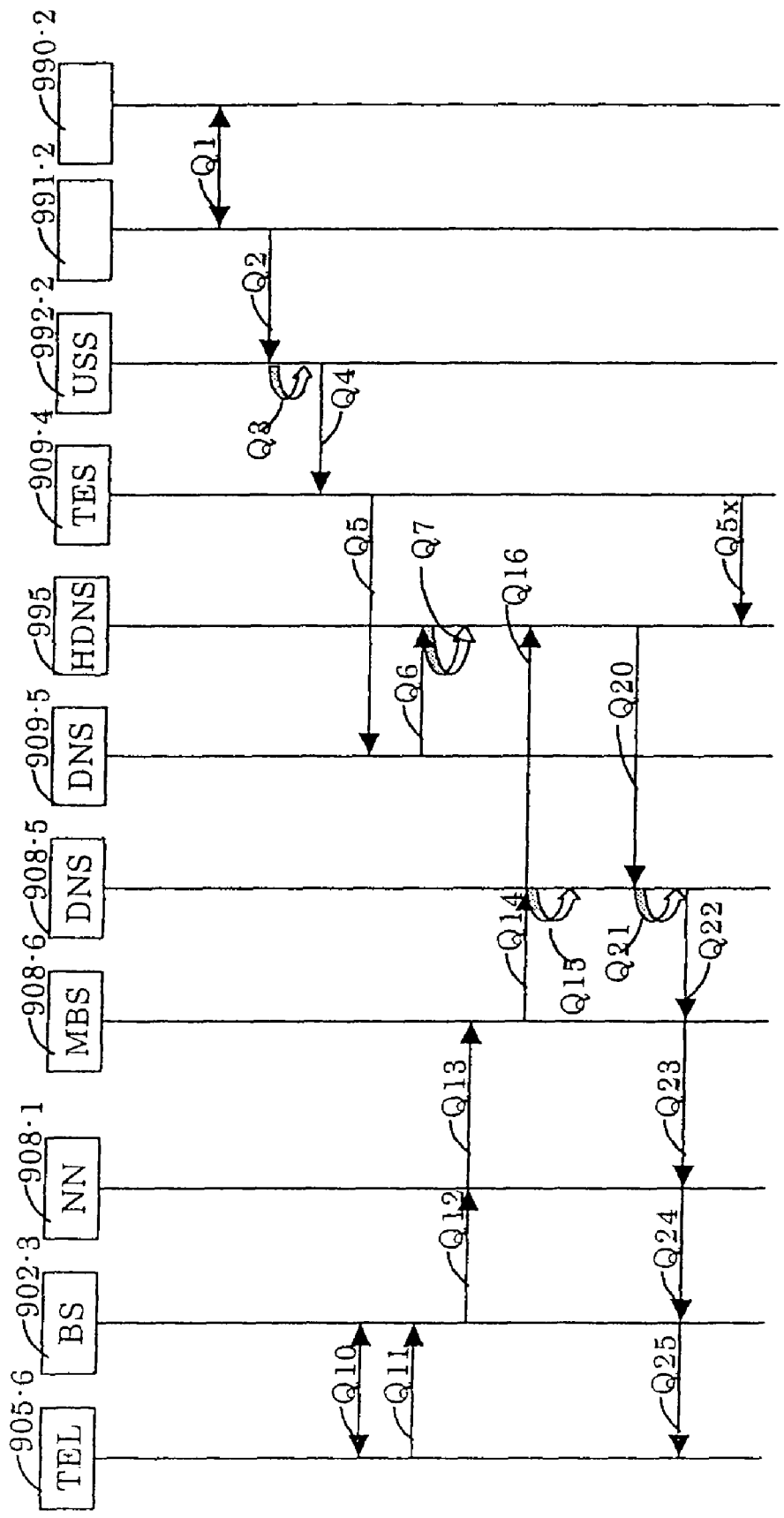
Figure 212:
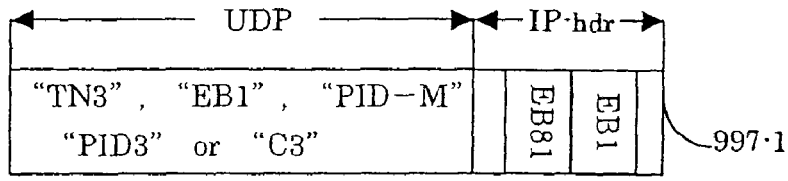
Figure 213:
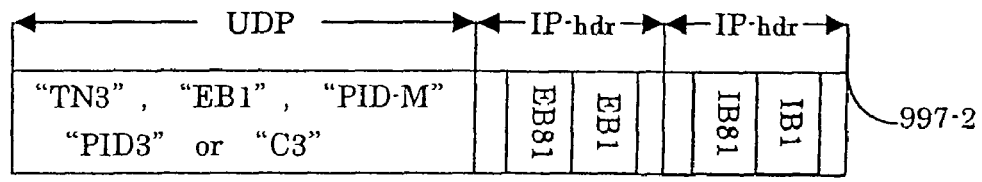
Figure 214:
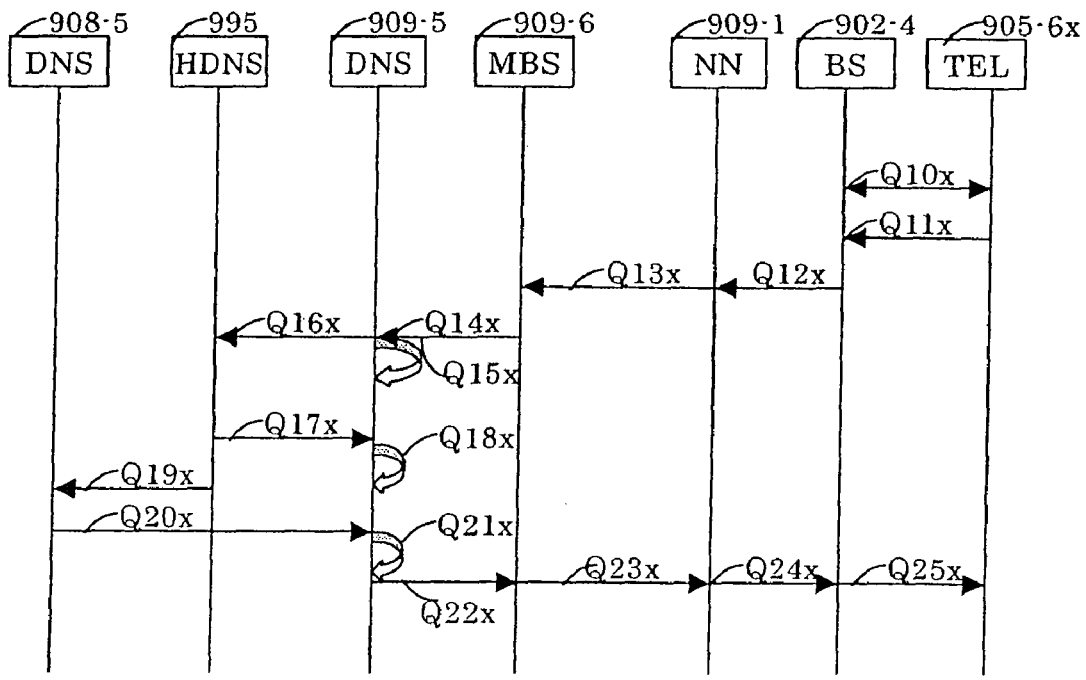
Figure 215:
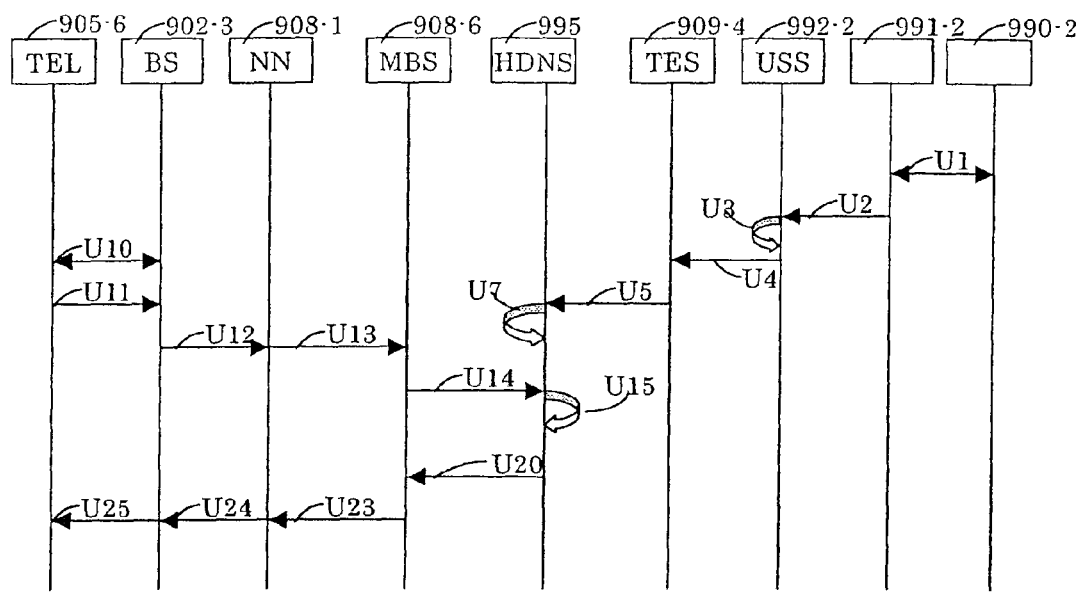
Figure 216:
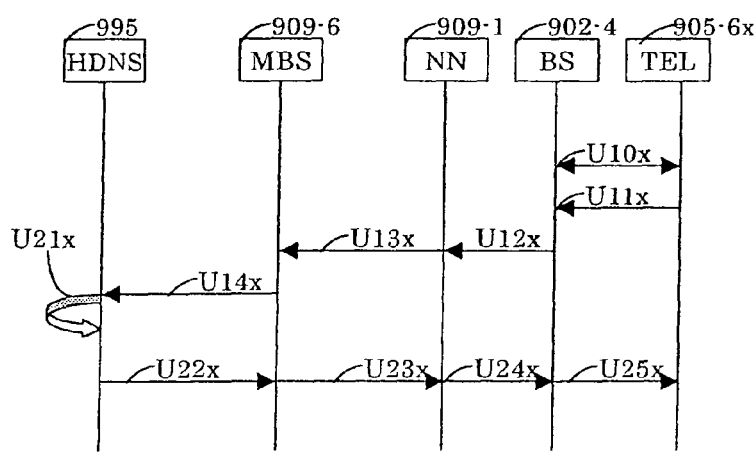
Figure 217:
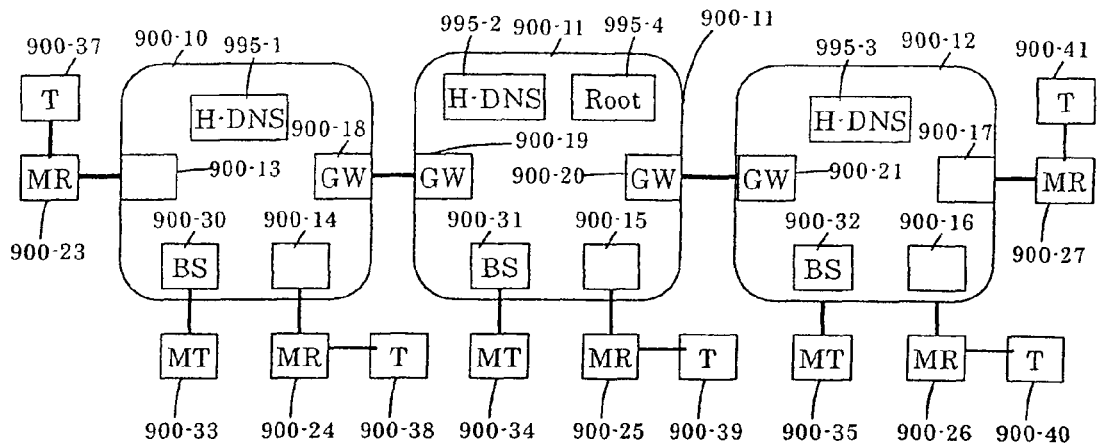
Figure 218:
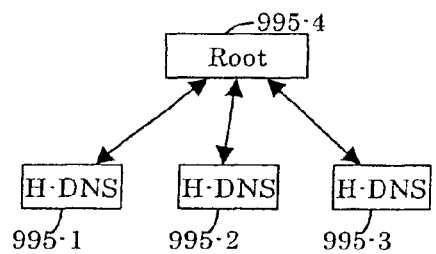
Figure 219:
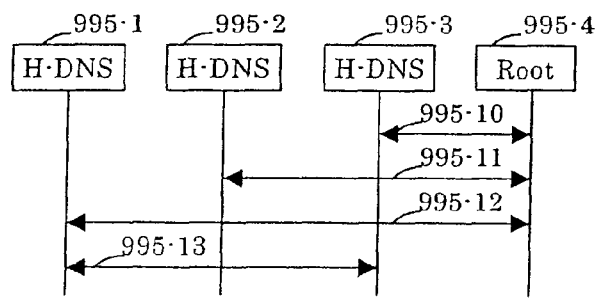
Figure 220:
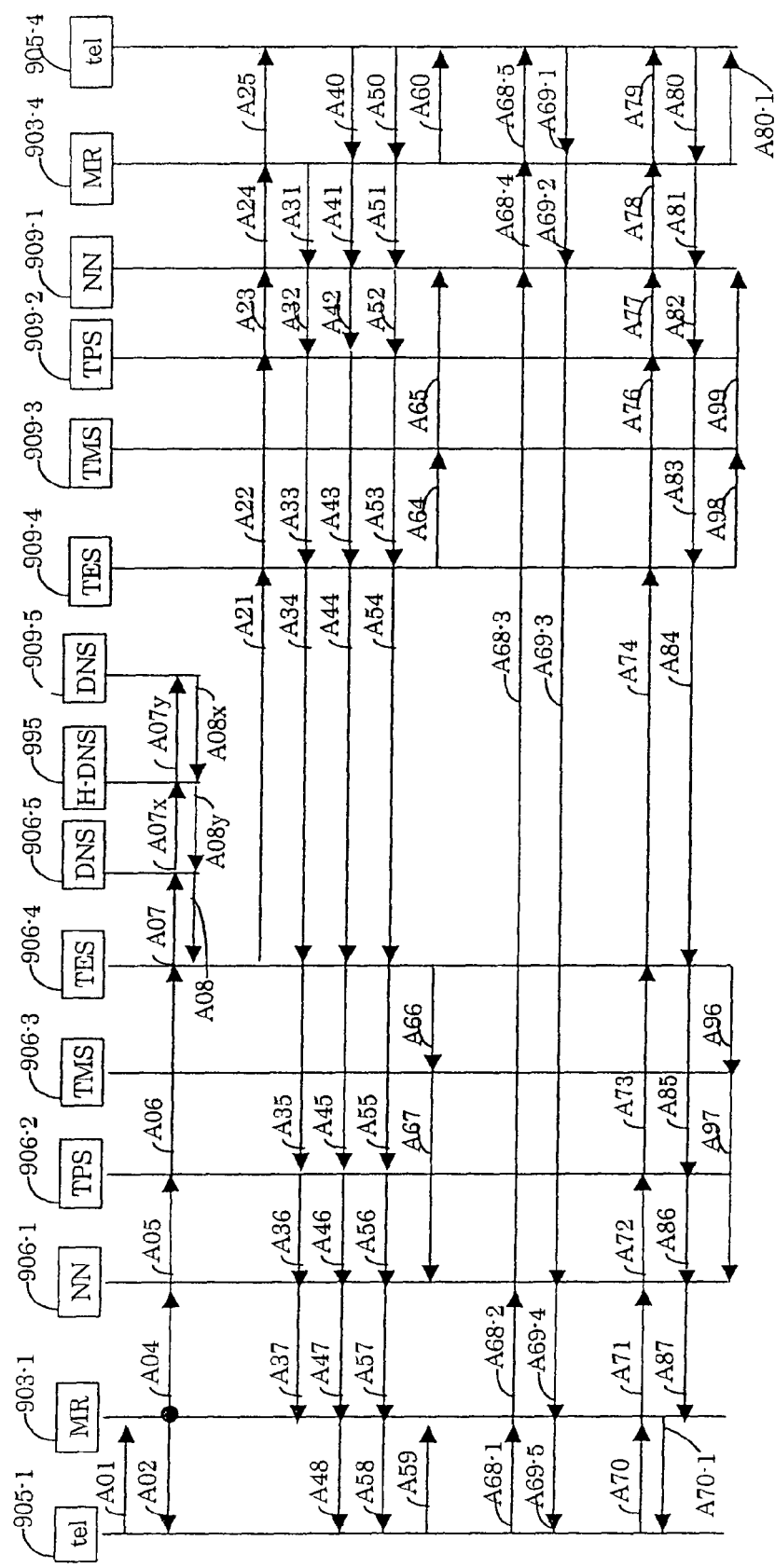
Figure 221:
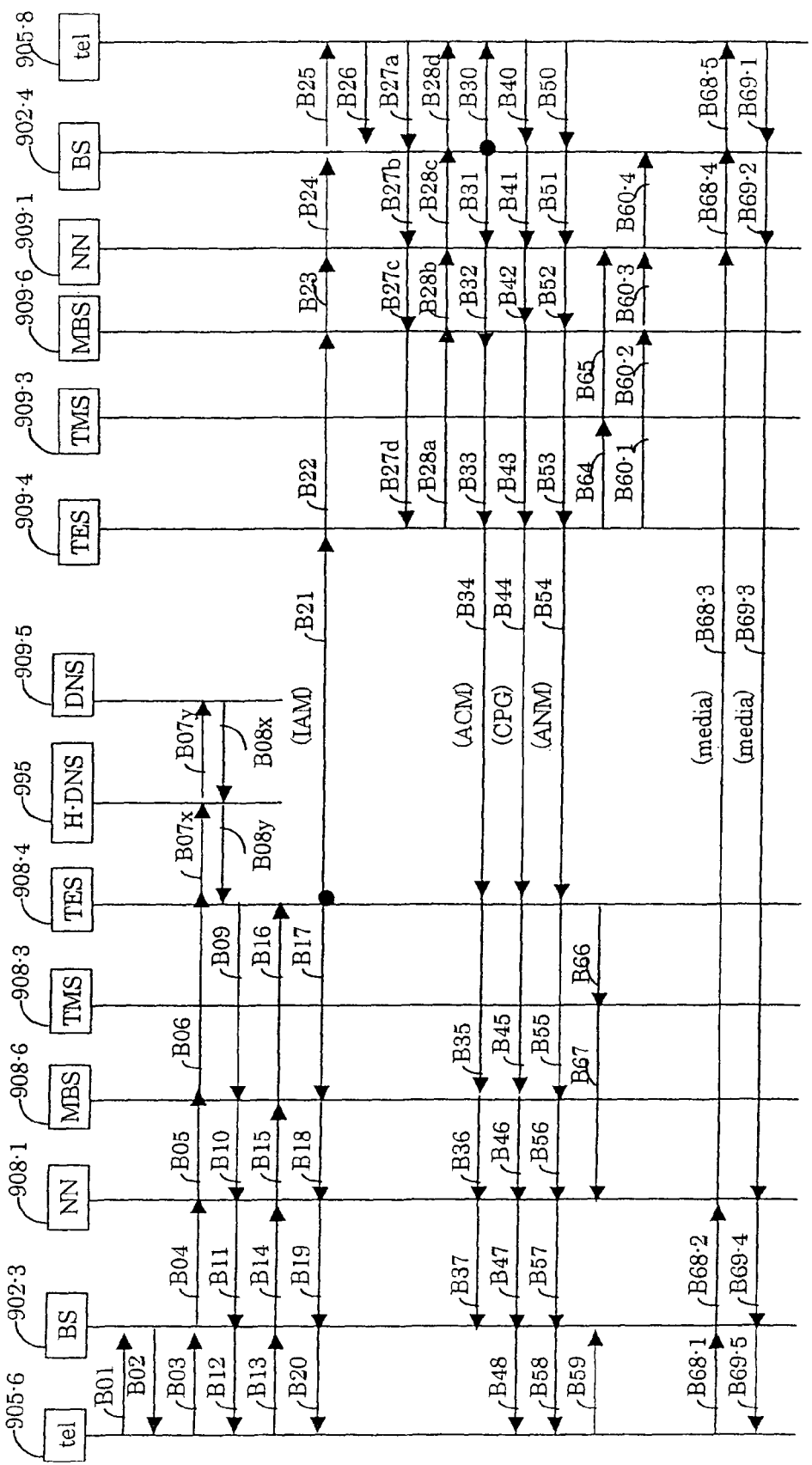
Figure 222:
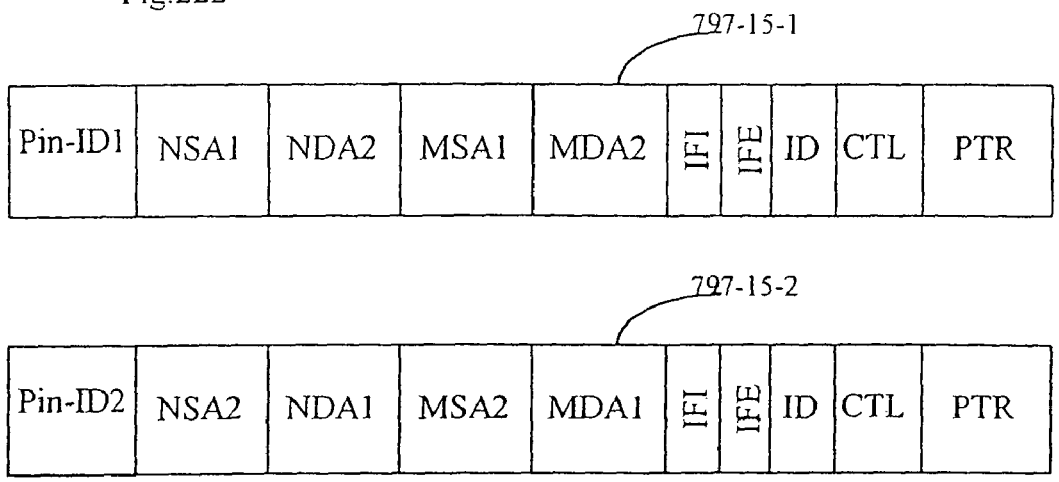
Figure 223:
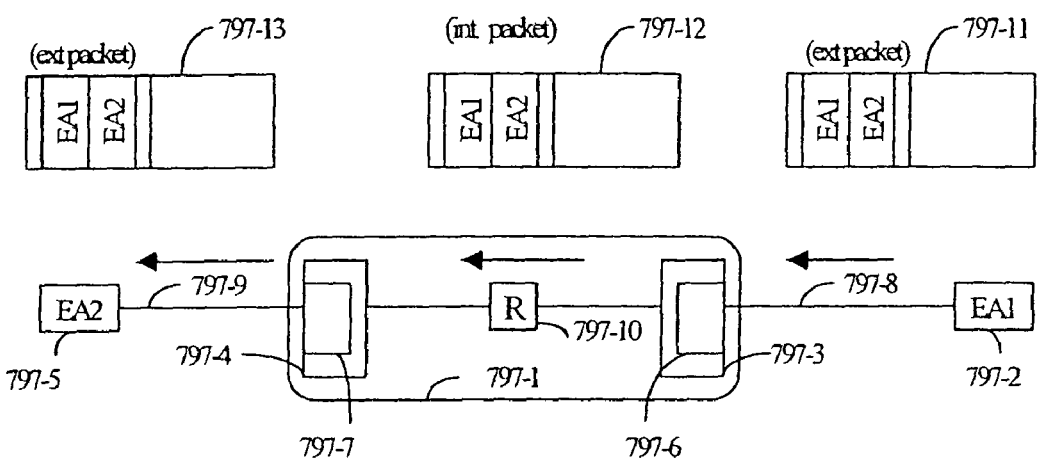
Figure 224:
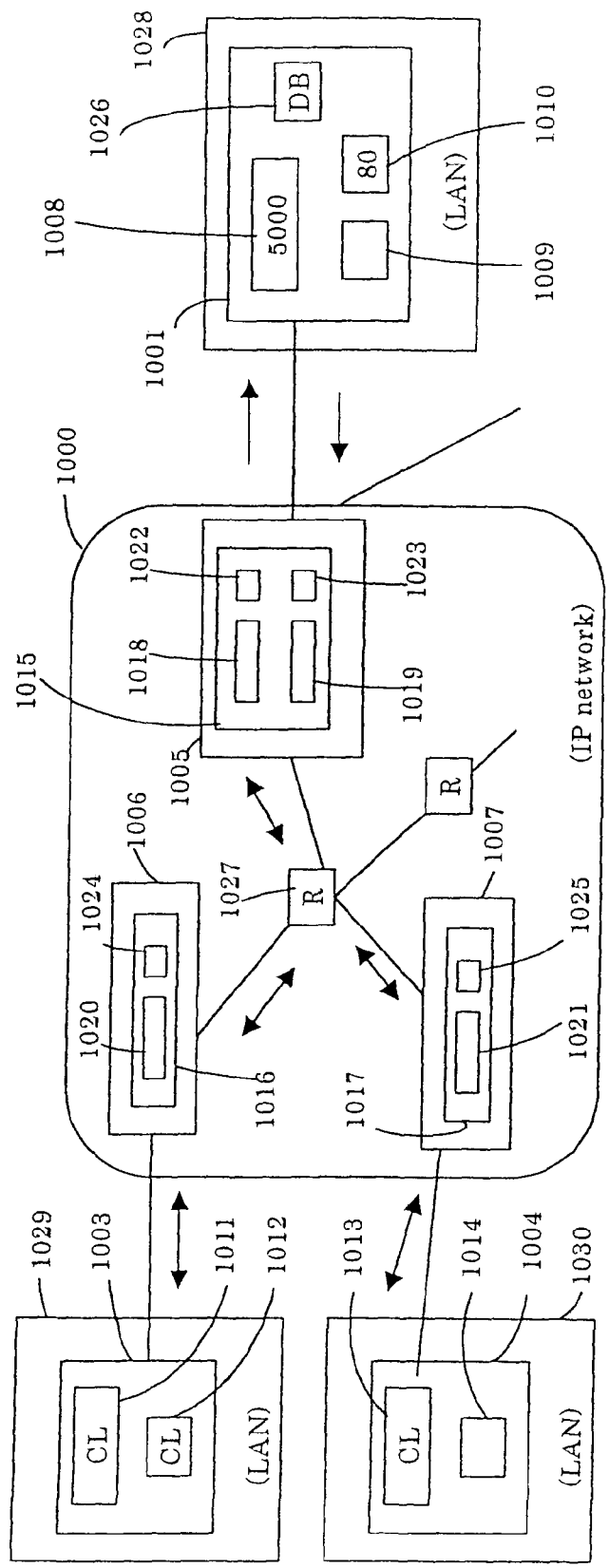
Figure 225:
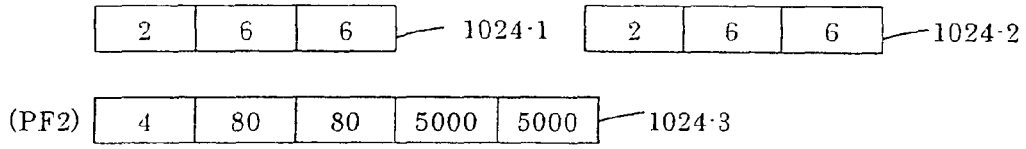
Figure 226:
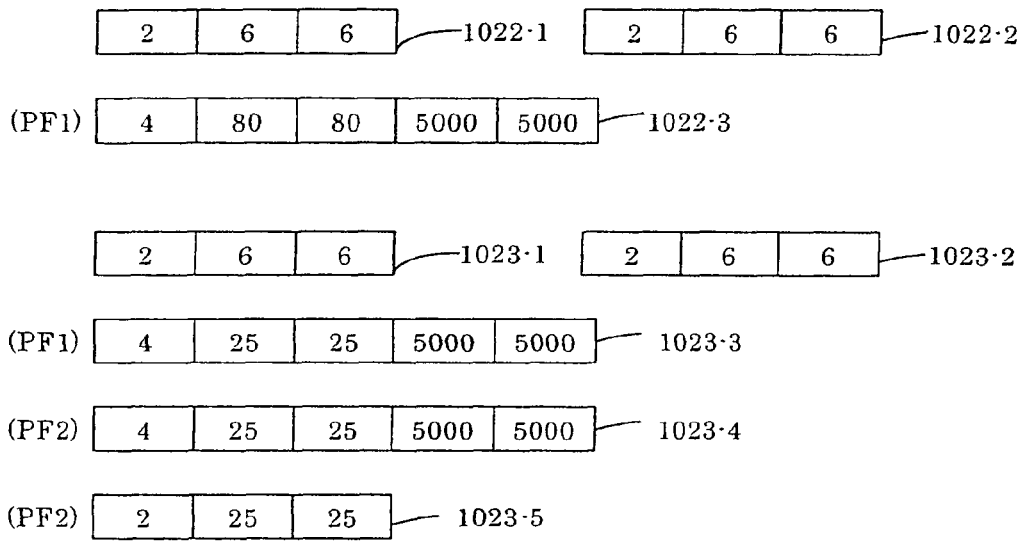
Figure 227:
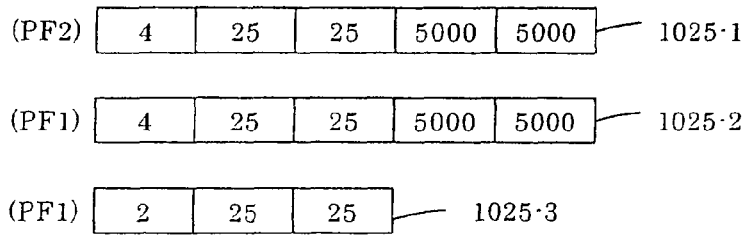
Figure 228:
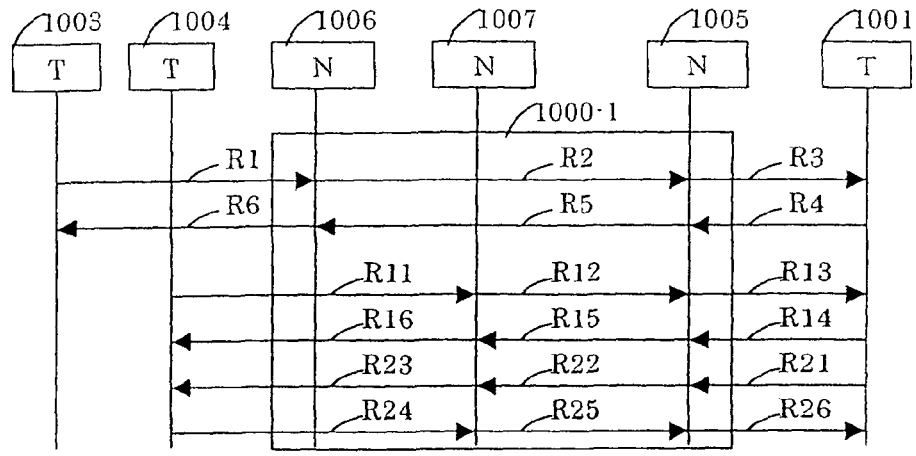
Figure 229:
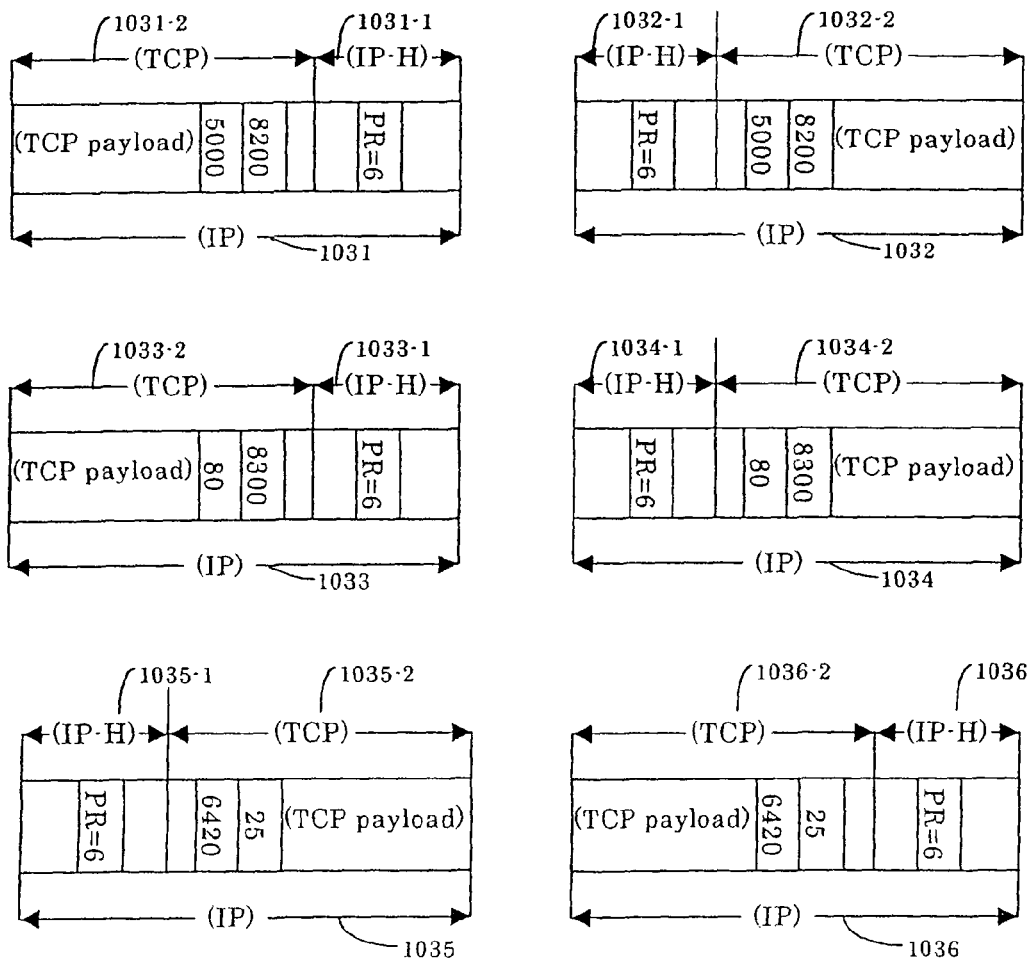
Figure 230:
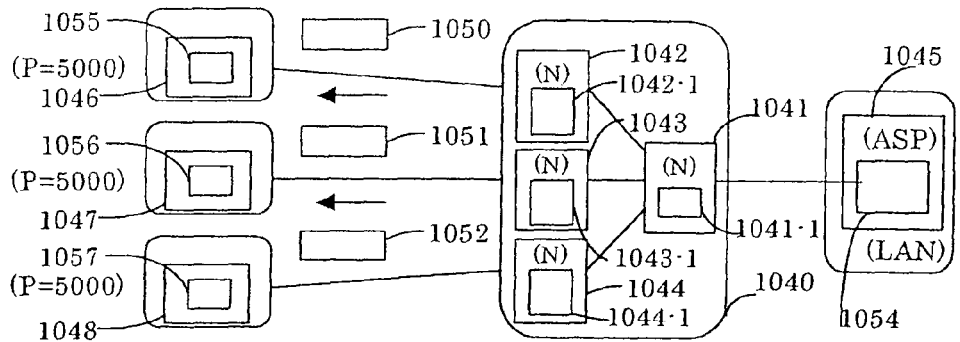
Figure 231:
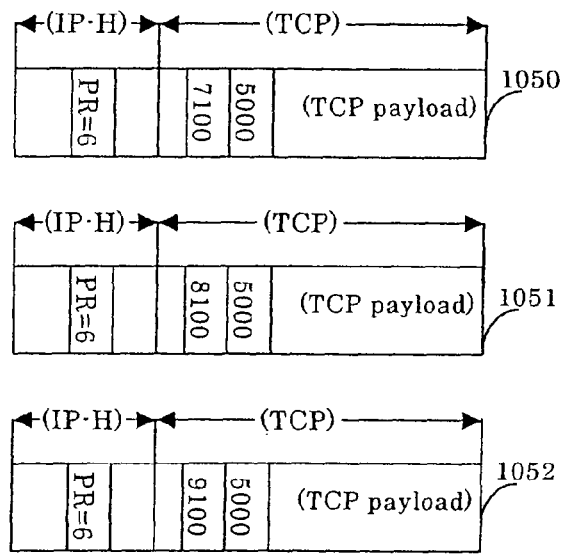
Figure 232:
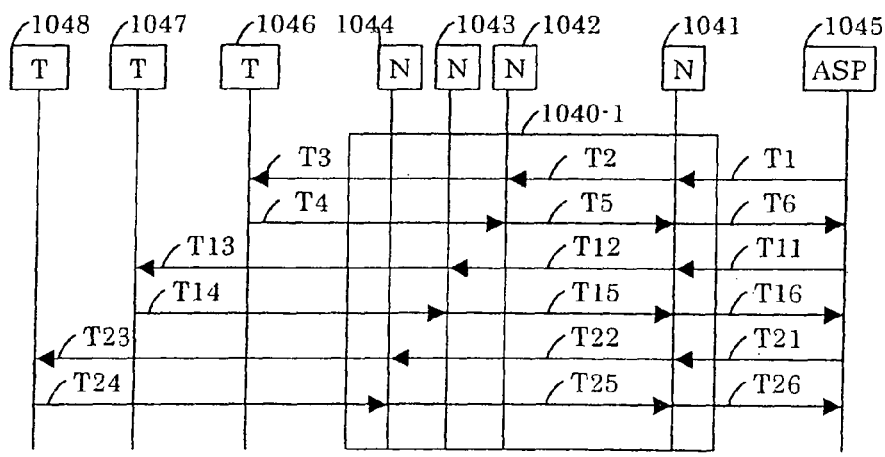
Figure 233:
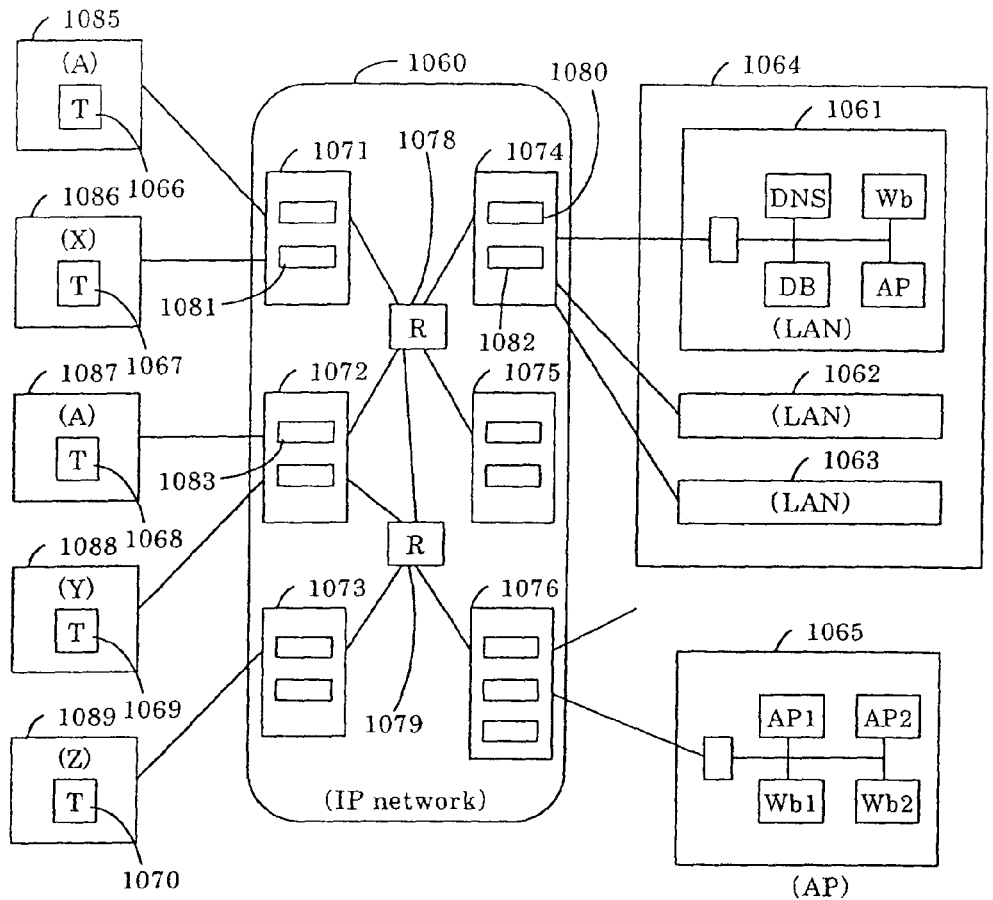
Figure 234:
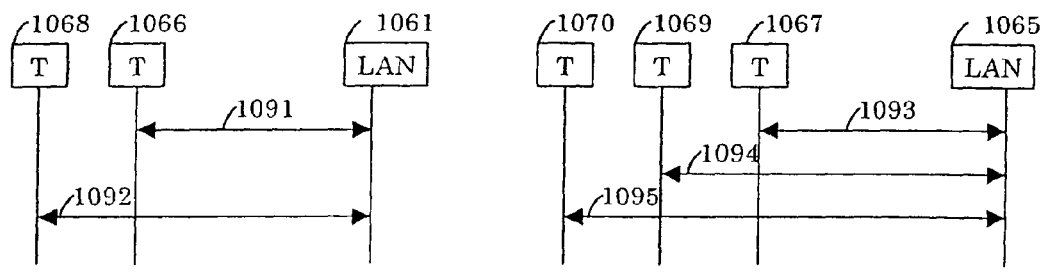
Figures 235, 236, 237:
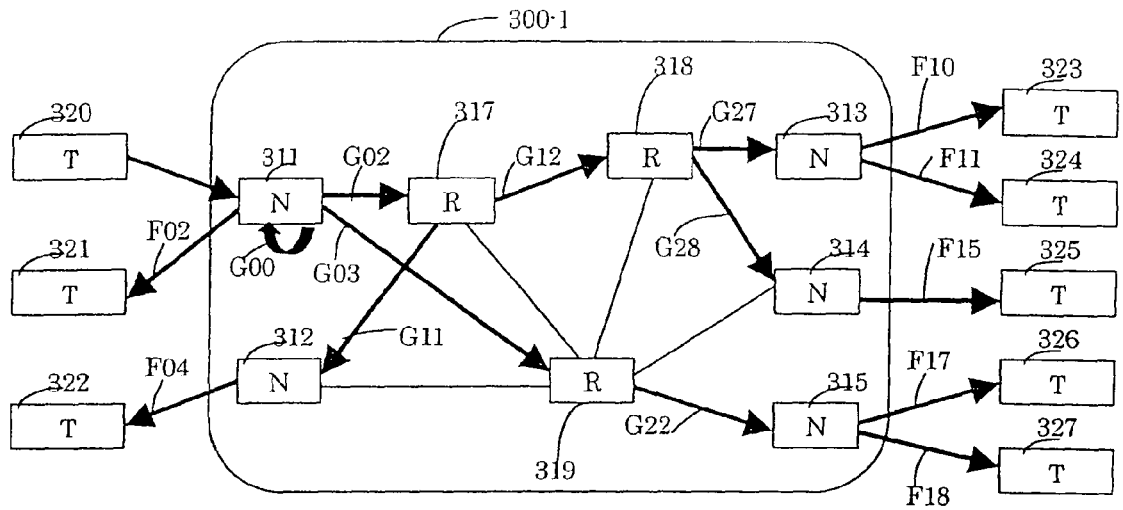
Figure 241:
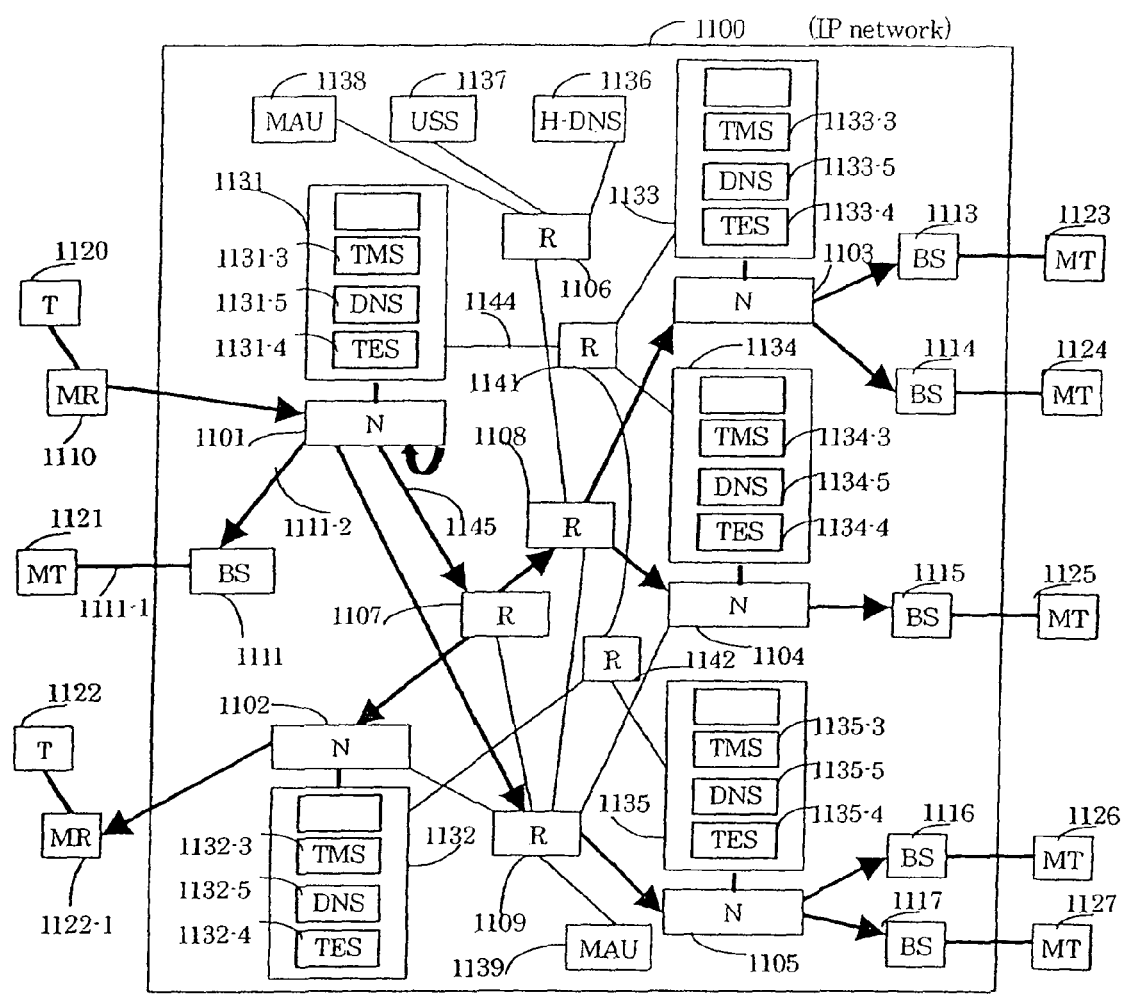
Figure 242:
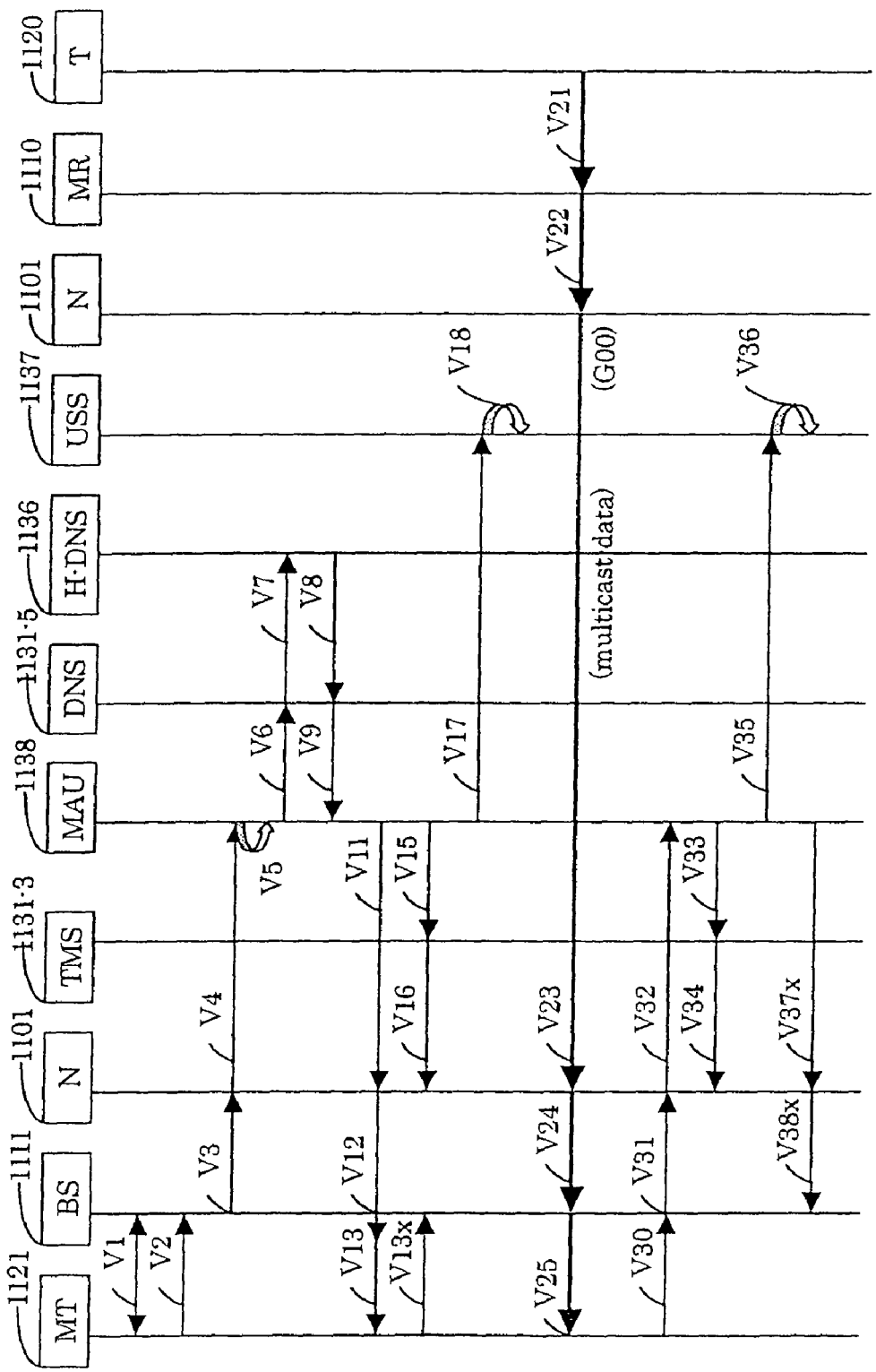
Figure 243:
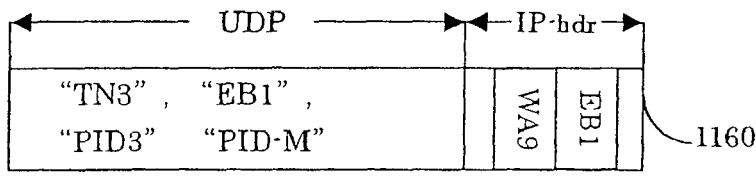
Figure 244:
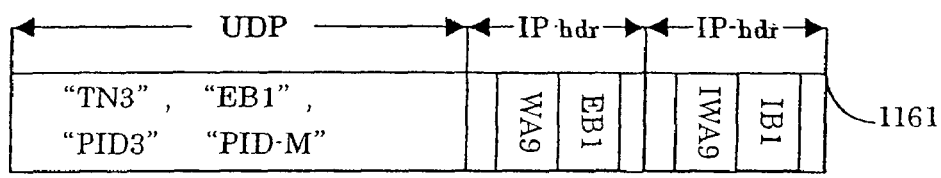
Figure 245:
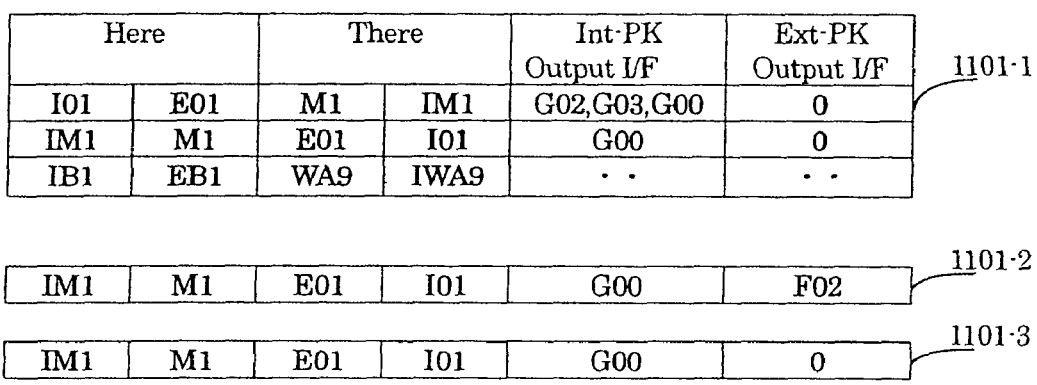

FIG. 131 is a figure showing an ANM message to be sent from a called-sided telephone management server to a calling-sided telephone management server, in Communication Case 1 of the eighth embodiment of the present invention;

FIG. 132 is a figure showing an IP packet to be transferred from a calling-sided media router to a called-sided media router, in Communication Case 1 of the eighth embodiment of the present invention;

FIG. 133 is a figure showing a state that an IP packet to be transferred from a calling-sided media router to a called-sided media router has been encapsulated into an internal packet, in Communication Case 1 of the eighth embodiment of the present invention;

FIG. 134 is a figure showing a REL message to be sent from a calling-sided telephone management server to a called-sided telephone management server, in Communication Case 1 of the eighth embodiment of the present invention;

FIG. 135 is a figure showing a RLC message to be sent from a called-sided telephone management server to a calling-sided telephone management server, in Communication Case 1 of the eighth embodiment of the present invention;

FIG. 136 is a figure showing Example 1 of the unit control table, to be used in Communication Case 1 to Communication Case 6 of the eighth embodiment of the present invention;

FIG. 137 is a figure showing Example 2 of the unit control table, to be used in Communication Case 1 to Communication Case 6 of the eighth embodiment of the present invention;

FIG. 138 is a figure showing Example 3 of the unit control table, to be used in Communication Case 1 to Communication Case 6 of the eighth embodiment of the present invention;

FIG. 139 is a figure showing Example 4 of the unit control table, to be used in Communication Case 1 to Communication Case 6 of the eighth embodiment of the present invention;

FIG. 140 is a figure showing an outgoing-call management table, to be used in Communication Case 1 of the eighth embodiment of the present invention;

FIG. 141 is a figure showing an incoming-call management table, to be used in Communication Case 1 of the eighth embodiment of the present invention;

FIG. 142 is a figure explaining CIC information collection by an operation management server, in the eighth embodiment of the present invention;

FIG. 143 is a two-sheeted first figure showing a method for carrying out a communication from a mobile phone to a mobile phone in an IP network, in Communication Case 1 of the eighth embodiment of the present invention;

FIG. 144 is a two-sheeted second figure showing a method for carrying out a communication from a mobile phone to a mobile phone in an IP network, in Communication Case 2 of the eighth embodiment of the present invention;

FIG. 145 is a figure showing an IP packet to be transferred from a calling-sided radio base point to a network node unit, in Communication Case 2 of the eighth embodiment of the present invention;

FIG. 146 is a figure showing an IP packet to be transferred from a network node unit to a proxy telephone server, in Communication Case 2 of the eighth embodiment of the present invention;

FIG. 147 is a figure showing an IP packet to be transferred from a proxy telephone server to a telephone management server, in Communication Case 2 of the eighth embodiment of the present invention;

FIG. 148 is a figure showing a calling-sided CIC management table, in Communication Case 2 of the eighth embodiment of the present invention;

FIG. 149 is a figure showing an IP packet to be transferred from a telephone management server to a telephone number server, in Communication Case 2 of the eighth embodiment of the present invention;

FIG. 150 is a figure showing an IP packet to be sent from a telephone number server back to a telephone management server, in Communication Case 2 of the eighth embodiment of the present invention;

FIG. 151 is a figure showing an example of a calling-sided CIC management table, in Communication Case 2 of the eighth embodiment of the present invention;

FIG. 152 is a figure showing an example of an IP packet containing authentication request information to be transferred from a telephone management server to a telephone number server, in Communication Case 2 of the eighth embodiment of the present invention;

FIG. 153 is a figure showing an example of an IP packet containing authentication request information to be transferred from a proxy telephone server to a network node unit, in Communication Case 2 of the eighth embodiment of the present invention;

FIG. 154 is a figure showing an example of an IP packet containing authentication request information to be transferred from a network node unit to a radio base point, in Communication Case 2 of the eighth embodiment of the present invention;

FIG. 155 is a figure showing an example of an IP packet containing authentication answer information to be transferred from a radio base point to a network node unit, in Communication Case 2 of the eighth embodiment of the present invention;

FIG. 156 is a figure showing an example of an IP packet containing authentication answer information to be transferred from a network node unit to a proxy telephone server, in Communication Case 2 of the eighth embodiment of the present invention;

FIG. 157 is a figure showing an example of an IP packet containing authentication answer information to be transferred from a proxy telephone server to a telephone management server, in Communication Case 2 of the eighth embodiment of the present invention;

FIG. 158 is a figure showing an example of an IAM message to be sent from a calling-sided proxy telephone server to a called-sided telephone management server, in Communication Case 2 of the eighth embodiment of the present invention;

FIG. 159 is a figure showing an example of a called-sided CIC management table, in Communication Case 2 of the eighth embodiment of the present invention;

FIG. 160 is a figure showing an IP packet to be transferred from a telephone management server to a proxy telephone server, in Communication Case 2 of the eighth embodiment of the present invention;

FIG. 161 is a figure showing an IP packet to be transferred from a proxy telephone server to a network node unit, in Communication Case 2 of the eighth embodiment of the present invention;

FIG. 162 is a figure showing an IP packet to be transferred from a network node unit to a radio base point, in Communication Case 2 of the eighth embodiment of the present invention;

FIG. 163 is a figure showing an IP packet containing authentication request information to be transferred from a radio base point to a network node unit, in Communication Case 2 of the eighth embodiment of the present invention;

FIG. 164 is a figure showing an IP packet containing authentication request information to be transferred from a network node unit to a proxy telephone server, in Communication Case 2 of the eighth embodiment of the present invention;

FIG. 165 is a figure showing an IP packet containing authentication request information to be transferred from a proxy telephone server to a telephone management server, in Communication Case 2 of the eighth embodiment of the present invention;

FIG. 166 is a figure showing an IP packet containing terminal-unit authentication correctness/incorrectness to be transferred from a telephone management server to a proxy telephone server, in Communication Case 2 of the eighth embodiment of the present invention;

FIG. 167 is a figure showing an IP packet containing terminal-unit authentication correctness/incorrectness to be transferred from a proxy telephone server to a network node unit, in Communication Case 2 of the eighth embodiment of the present invention;

FIG. 168 is a figure showing an IP packet containing terminal-unit authentication correctness/incorrectness to be transferred from a network node unit to a radio base point, in Communication Case 2 of the eighth embodiment of the present invention;

FIG. 169 is a figure showing an ACM message to be sent from a called-sided telephone management server to a calling-sided telephone management server, in Communication Case 2 of the eighth embodiment of the present invention;

FIG. 170 is a figure showing an IP packet to be transferred from a called-sided radio base point to a network node unit, in Communication Case 2 of the eighth embodiment of the present invention;

FIG. 171 is a figure showing an IP packet to be transferred from a network node unit to a proxy telephone server, in Communication Case 2 of the eighth embodiment of the present invention;

FIG. 172 is a figure showing an IP packet to be transferred from a proxy telephone server to a telephone management server, in Communication Case 2 of the eighth embodiment of the present invention;

FIG. 173 is a figure showing a CPG message to be sent from a called-sided telephone management server to a calling-sided telephone management server, in Communication Case 2 of the eighth embodiment of the present invention;

FIG. 174 is a figure showing an IP packet to be transferred from a calling-sided telephone management server to a proxy telephone server, in Communication Case 2 of the eighth embodiment of the present invention;

FIG. 175 is a figure showing an IP packet to be transferred from a proxy telephone server to a network node unit, in Communication Case 2 of the eighth embodiment of the present invention;

FIG. 176 is a figure showing an IP packet to be transferred from a network node unit to a radio base point, in Communication Case 2 of the eighth embodiment of the present invention;

FIG. 177 is a figure showing an ANM message to be sent from a called-sided telephone management server to a calling-sided telephone management server, in Communication Case 2 of the eighth embodiment of the present invention;

FIG. 178 is a figure showing an IP packet to be transferred from a calling-sided radio base point to a called-sided radio base point, in Communication Case 2 of the eighth embodiment of the present invention;

FIG. 179 is a figure showing that an IP packet to be transferred from a calling-sided radio base point to a called-sided radio base point is encapsulated into an internal packet, in Communication Case 2 of the eighth embodiment of the present invention;

FIG. 180 is a figure showing an REL message to be sent from a calling-sided telephone management server to a called-sided telephone management server, in Communication Case 2 of the eighth embodiment of the present invention;

FIG. 181 is a figure showing an RLC message to be sent from a called-sided telephone management server to a calling-sided telephone management server, in Communication Case 2 of the eighth embodiment of the present invention;

FIG. 182 is a figure showing a method for carrying out a communication from a mobile phone to a fixed telephone set in an IP network, in Communication Case 3 of the eighth embodiment of the present invention;

FIG. 183 is a figure showing a method for carrying out a communication from a fixed telephone set to a mobile phone in an IP network, in Communication Case 4 of the eighth embodiment of the present invention;

FIG. 184 is a figure explaining a relationship between a mobile phone and a radio base point, in Communication Case 2 to Communication Case 4 of the eighth embodiment of the present invention;

FIG. 185 is a figure showing an embodiment of a channel-IP address correspondence table of within a radio base point, in the eighth embodiment of the present invention;

FIG. 186 is a figure showing an embodiment where a control signal or voice signal forwarded from an analog mobile phone is IP capsulated at a radio base point and transferred, in the eighth embodiment of the present invention;

FIG. 187 is a figure showing a manner that an IP packet containing control or voice forwarded from an IP mobile phone is transferred via a radio base point, in the eighth embodiment of the present invention;

FIG. 188 is a figure showing a manner that an IP packet containing control or voice forwarded from an IP mobile phone is transferred via a radio base point, in the eighth embodiment of the present invention;

FIG. 189 is a figure showing a method for carrying out a communication from a multimedia terminal unit to a multimedia terminal unit in an IP network, in Communication Case 5 of the eighth embodiment of the present invention;

FIG. 190 is a figure showing a relationship between a multimedia terminal unit and an IP network, in Communication Case 5 of the eighth embodiment of the present invention;

FIG. 191 is a figure showing the outline of a communication flow from a multimedia terminal unit to a multimedia terminal unit, in Communication Case 5 of the eighth embodiment of the present invention;

FIG. 192 is a figure showing a protocol stack in the communication of between multimedia terminal units, in Communication Case 5 of the eighth embodiment of the present invention;

FIG. 193 is a figure showing a communication connection procedure of between an IP terminal unit to another IP terminal unit, in Communication Case 6 of the eighth embodiment of the present invention;

FIG. 194 is a figure showing another communication connection procedure of between an IP terminal unit to another IP terminal unit, in Communication Case 6 of the eighth embodiment of the present invention;

FIG. 195 is a figure showing an IP packet to be transferred from a media router to a network node unit, in Communication Case 6 of the eighth embodiment of the present invention;

FIG. 196 is a figure showing an IP packet to be transferred from a network node unit to a proxy telephone server, in Communication Case 6 of the eighth embodiment of the present invention;

FIG. 197 is a figure showing an IP packet to be transferred from a proxy telephone server to a telephone management server, in Communication Case 6 of the eighth embodiment of the present invention;

FIG. 198 is a figure showing an IP packet containing a query content to a telephone management server, in Communication Case 6 of the eighth embodiment of the present invention;

FIG. 199 is a figure showing an IP packet containing an answer from a telephone management server, in Communication Case 6 of the eighth embodiment of the present invention;

FIG. 200 is a figure showing a transmission-sided CIC management table, in Communication Case 6 of the eighth embodiment of the present invention;

FIG. 201 is a figure showing an IP packet to be transferred from a telephone management server to another telephone management server, in Communication Case 6 of the eighth embodiment of the present invention;

FIG. 202 is a figure showing a reception-sided CIC management table, in Communication Case 6 of the eighth embodiment of the present invention;

FIG. 203 is a figure showing an IP packet to be transferred from a telephone management server to a proxy telephone server, in Communication Case 6 of the eighth embodiment of the present invention;

FIG. 204 is a figure showing an IP packet to be transferred from a proxy telephone server to a network node unit, in Communication Case 6 of the eighth embodiment of the present invention;

FIG. 205 is a figure showing an IP packet to be transferred from a network node unit to a media router, in Communication Case 6 of the eighth embodiment of the present invention;

FIG. 206 is a figure showing an IP packet to be transferred from an IP terminal to another IP terminal, in Communication Case 6 of the eighth embodiment of the present invention;

FIG. 207 is a figure showing an internal packet formed from an external IP packet forwarded from an IP terminal, in Communication Case 6 of the eighth embodiment of the present invention;

FIG. 208 is a figure explaining a registration procedure of a fixed telephone set, in Communication Case 1 of the eighth embodiment of the present invention;

FIG. 209 is a figure explaining an information exchange between telephone number servers, in the eighth embodiment of the present invention;

FIG. 210 is another figure explaining an information exchange procedure between telephone number servers, in the eighth embodiment of the present invention;

FIG. 211 is a figure explaining a registration procedure of a mobile phone, in Communication Case 2 of the eighth embodiment of the present invention;

FIG. 212 is a figure showing one of the external packets to be used in Communication Case 2 of the eighth embodiment of the present invention;

FIG. 213 is a figure showing one of the internal packets to be used in Communication Case 2 of the eighth embodiment of the present invention;

FIG. 214 is a figure explaining a position change procedure of a mobile phone, in the eighth embodiment of the present invention;

FIG. 215 is a figure explaining another registration procedure of a mobile phone, in the eighth embodiment of the present invention;

FIG. 216 is a figure explaining another position change procedure of a mobile phone, in the eighth embodiment of the present invention;

FIG. 217 is a figure showing a position, in the IP network, of a route telephone number server to be introduced when the scale of the IP network increases, in the eighth embodiment of the present invention;

FIG. 218 is a figure showing a communication between a route telephone number server and a superior telephone number server, in the eighth embodiment of the present invention;

FIG. 219 is a figure showing that communication is possible between route telephone number servers and superior telephone number servers, in the eighth embodiment of the present invention;

FIG. 220 is a figure explaining a method for obtaining an IP address via a superior telephone number server when a destination telephone set is a fixed telephone set, in the eighth embodiment of the present invention;

FIG. 221 is a figure explaining a method for obtaining an IP address via a superior telephone number server when a destination telephone set is a mobile phone, in the eighth embodiment of the present invention;

FIG. 222 is a figure showing an example of a communication record not for encapsulation in a network node unit, in a seventh embodiment of the present invention;

FIG. 223 is a figure showing an example of communication that an internal packet is the same as an external packet, in the seventh embodiment of the present invention;

FIG. 224 is a figure explaining a method for carrying out ASP service, in a ninth embodiment of the present invention;

FIG. 225 is a figure showing an embodiment of a protocol control record and port control record, in the ninth embodiment of the present invention;

FIG. 226 is a figure showing another embodiment of a protocol control record and port control record, in the ninth embodiment of the present invention;

FIG. 227 is a figure showing still another embodiment of a protocol control record and port control record, in the ninth embodiment of the present invention;

FIG. 228 is a figure showing a communication flow between an ASP site and a terminal unit, in the ninth embodiment of the present invention;

FIG. 229 is a figure showing a packet to be communicated between an ASP site and a terminal unit, in the ninth embodiment of the present invention;

FIG. 230 is a figure explaining a method to communicate with an ASP site by using a terminal-unit program as a server, in the ninth embodiment of the present invention;

FIG. 231 is a figure showing a packet to be communicated between a terminal-unit program and an ASP site, in the ninth embodiment of the present invention;

FIG. 232 is a figure showing a communication flow between a terminal-unit program and an ASP site, in the ninth embodiment of the present invention;

FIG. 233 is a figure showing LAN lease service and ASP-site joint utilization, in the ninth embodiment of the present invention;

FIG. 234 is a figure showing a communication flow concerning LAN lease service and ASP-site joint utilization, in the ninth embodiment of the present invention;

FIG. 235 is a figure explaining a multicast data flow within IP network, in a tenth embodiment of the present invention;

FIG. 236 is a figure showing a record of an address management table of within a network node unit, in the tenth embodiment of the present invention;

FIG. 237 is a figure showing a route table record of within a router, in the tenth embodiment of the present invention;

FIG. 238 is a figure comparing between a communication record of a unit control table and a record of an address management table, in the tenth embodiment of the present invention;

FIG. 239 is a figure explaining a multicast data flow within an IP network connected with media routers, in the tenth embodiment of the present invention;

FIG. 240 is a figure explaining a multicast data flow within an IP network connected with media routers and radio base points, in the tenth embodiment of the present invention;

FIG. 241 is a figure showing an IP network including terminal end section allowing multicast, in the tenth embodiment of the present invention;

FIG. 242 is a figure showing multicast receive request and end procedures, in the tenth embodiment of the present invention;

FIG. 243 is a figure showing an external packet to be used in a multicast receive request procedure, in the tenth embodiment of the present invention;

FIG. 244 is a figure showing an internal packet to be used in a multicast receive request procedure, in the tenth embodiment of the present invention; and FIG. 245 is a figure showing a change in the items within a record of an address management table of within a network node unit 1101, in the tenth embodiment of the present invention;

DESCRIPTION OF THE PREFERRED EMBODIMENTS

The present invention realizes a novel terminal-to-terminal communication control system for IP full service by a combination of an IP encapsulation technique disclosed in the prior patent, a method of dynamically setting an address management table, an IP address acquisition method using a telephone number as a domain name, a simplified encapsulation method disclosed in the prior patent application, a method of applying to an IP network a common channel signaling system disclosed in the prior patent application, and a multicast technique disclosed in the prior patent application. Furthermore, the foregoing problem is resolved by communicating line connection control messages, such as "IAM, ACM, CPG, ANM, REL, RLC" that a common channel signaling system is applied to an IP, between a mobile communication network and an IP network, or establishing a communication path for terminal-to-terminal communication by communicating line connection control messages applied to an IP network after establishing a TCP communication path between a source-sided telephone management server and a destination-sided telephone management server, or applying a multicast function to TV conference, or applying a multicast function to a terminal-to-terminal communication to connect between a mobile communication and an IP network, or setting an external address set in an external IP packet to an address area of an internal packet to form an internal packet.

Japanese Patent Application No. 128956/1999 discloses that an integrated IP communication network is internally separated into a plurality of IP networks, i.e. an IP data network, an IP telephone network, an IP voice image network, a best effort network and an IP data multicast network so that the network node units can be connected to any of the IP networks. Herein, the IP network separation into a plurality is realized by utilizing a technique of connection to any of the IP networks correspondingly to a record of within a network node unit managing encapsulation and decapsulation, i.e. by utilizing a difference in the address registered in an address administration record managing encapsulation and decapsulation. However, in the case that there is no difference in the addresses to be registered in the record, a method for separating into a plurality of IP networks has not been disclosed.

1. Embodiment 1 of Terminal-to-Terminal Communication Connection Control using Mobile Communication and IP Networks In FIG. 17, numeral 100 is an IP network under the operation and management of a communication company X, numeral 101 is a mobile communication network under operation and management of a communication company Y, numeral 102 is a public switched telephone network (PTSN), numeral 103 is a terminal-unit gateway, numeral 104 is a terminal-unit control section, numerals 105 and 105-1 are network node units, numeral 106 is a relay gateway, numeral 107 is a relay control section, numeral 108 is a voice control section and numeral 113 is a network node unit. The network node unit 113 encapsulates or decapsulates a voice IP packet in passage. Numerals 110 and 111 are routers, numerals 112 and 115 are control communication lines, numerals 114 and 114-1 are voice communication lines, numeral 116 is a media router, numeral 117 is a communication line, numerals 120 and 121 are toll switches, numeral 122 is a terminal-unit exchange, numeral 123 is a service information node, numeral 124 is a signal end point (SEP), numeral 125 is a signal transfer point (STP), numeral 126 is a speech path section of the exchange 122, numeral 127 is a speech path section of the toll switch 120, numerals 128-1 to 128-3 are relay units, numerals 129-1 to 129-3 are communication lines, numeral 130 is a radio base point in the mobile communication network 101. Numerals 131, 132 and 170 are control communication lines on the common channel signaling system, numerals 133, 134 and 171 are voice communication lines, and numeral 138 is a radio communication line. Numeral 140 is a telephone set for connection to the telephone network 102. Numeral 141 is a telephone set, and numeral 142 is a telephone set for connection to the media router 116 by way of the communication line 137. The set of the control communication line 131 and the voice communication line 133 is an NNI (network-network interface) of an exchange network while the set of the control communication line 132 and the voice communication line 134 is also an NNI. Numerals 120 to 123 are connected together by a communication line via any of the relay units 128-1 to 128-3 and allowed to exchange information with each other. The telephone set 141 has a function to communicate with a base point via a radio communication line, hence to be considered as a mobile phone. The phone sets 140 and 142 to be considered as fixed phone set.

Between the IP network 100 and the public switched telephone network 102, communication is possible via an NNI line formed by a set of a control communication line 170 and a voice communication line 171. The detailed procedure of communication is disclosed in the prior patent application (fourteenth embodiment, etc.).

<<Connection Phase>>

Figure 18:
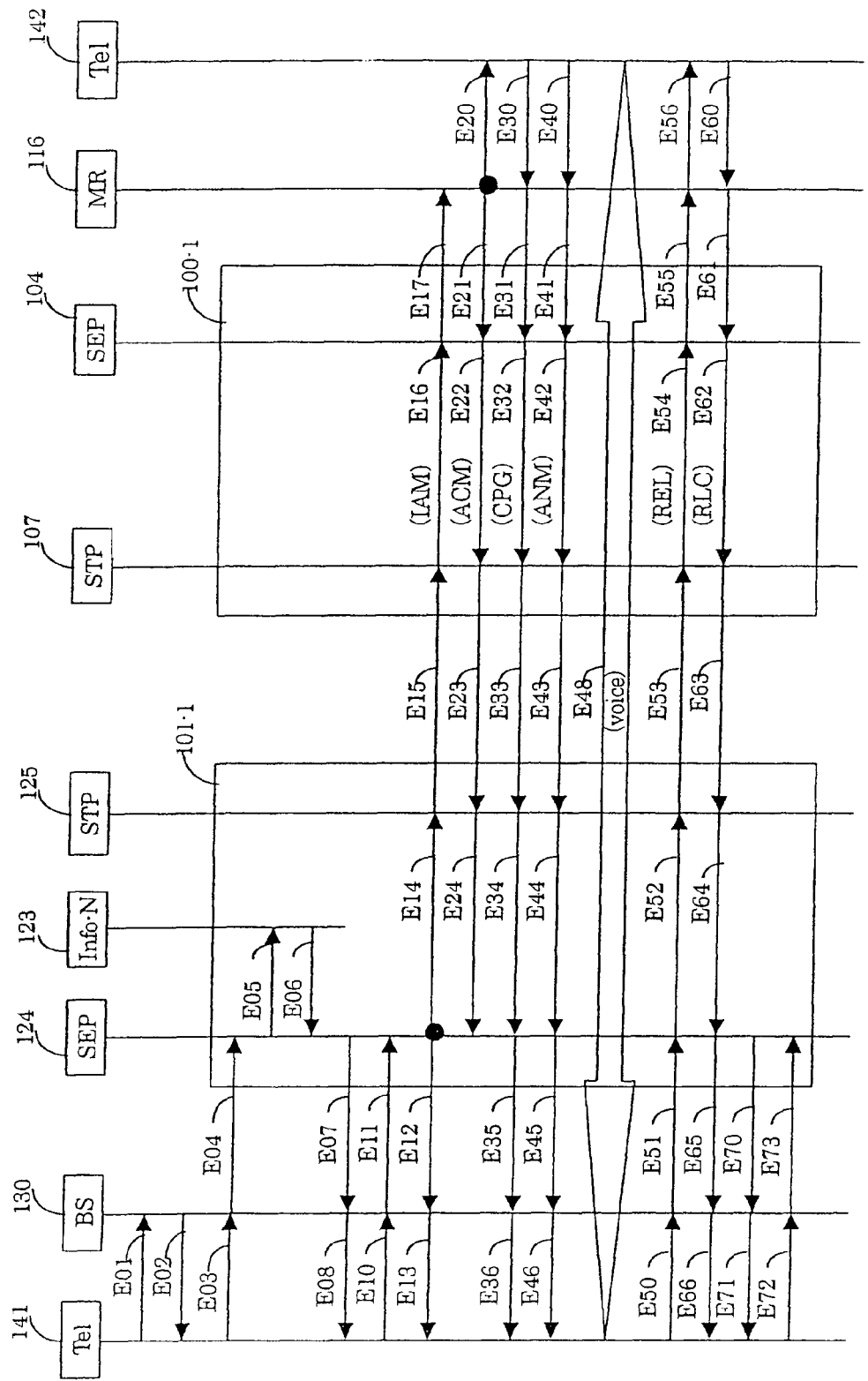
FIG. 18 is a figure explaining a method of controlling terminal-to-terminal communication connection via a mobile communication network and IP network, in the first embodiment of the present invention.

This is an example of telephone communication from the telephone set 141 to the telephone set 142. In FIG. 18, numeral 100-1 represents a range of the IP network 100 while numeral 101-1 a range of a mobile communication network. Within the range 100-1, communicated are a series of line control messages (IAM, ACM, CPG, ANM, REL, RLC, etc.) stored in an IP packet conforming, at least, to the common channel signaling system. Within the range 101-1, communicated are a series of line control messages (IAM, ACM, CPG, ANM, REL, RLC, etc.) defined, at least, by the common channel signaling system. When the telephone set 141 forwards a connection request via the radio communication line 138, a radio channel connection request signal is conveyed to the radio base point 130 (Step E01.) The radio base point 130 make an acceptance confirmation to the base point (Step E02).

Then, call-set request information including a telephone number "TN1" of a telephone 141 as an origin and a telephone number "TN2" of a telephone 142 as a destination is forwarded from the telephone set 141 to a radio base point 130 (Step E03). The radio base point 130 sends a call-set request information to a signal end point 124 of within the terminal-unit exchange 122 via the communication line 135 (Step E04). The signal end point 124 receives the call-set request information and examines a content of the call-set request information, to forward a transmission-information inquiry message including the received telephone number "TN2" of the telephone set 142 to a service information node 123 (Step E05). The service information node 123, considering the telephone number "TN2" as information for connection, answers a signaling point code "PC125" of the signal transfer point 125 to the signal end point 124 (Step E06). Call-set acceptance information is sent from the signal end point 124 to the radio base point 130 (Step E07). The radio base point 130 sends a call-set acceptance information to the telephone set 141 (Step E08).

Figure 1:
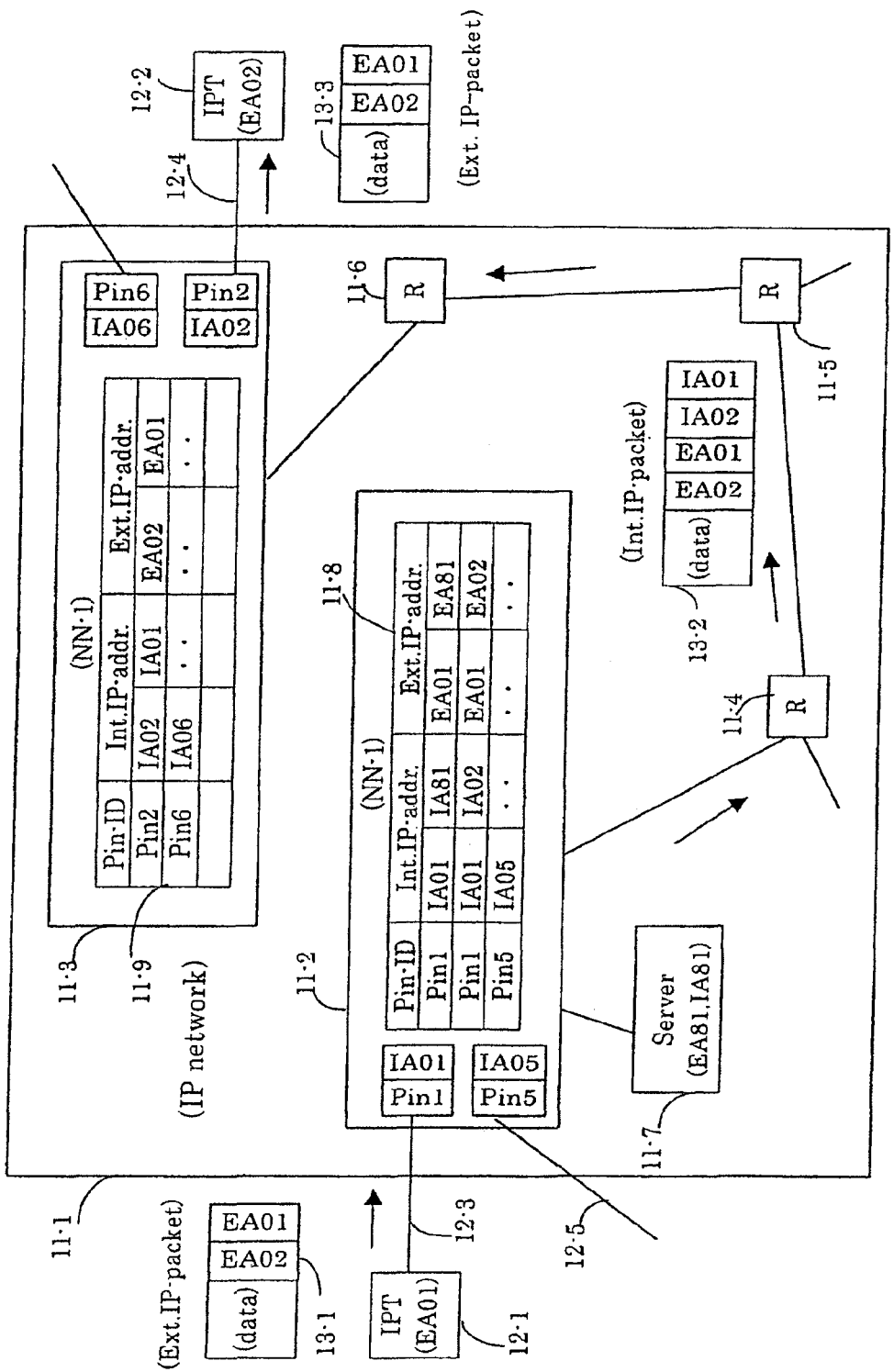
FIG. 1 is a figure explaining a conventional encapsulation technique for an IP packet.
Figure 2:
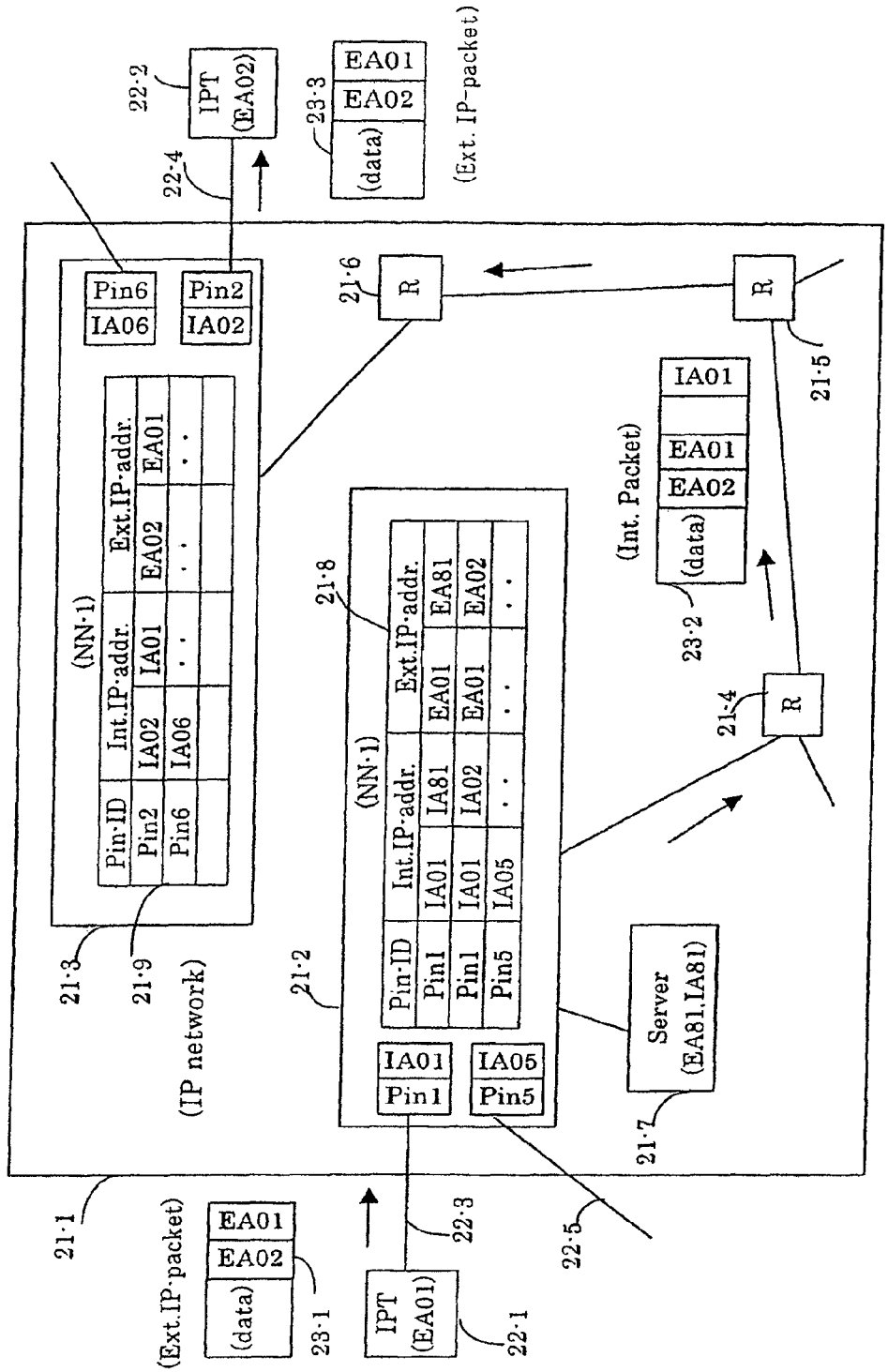
FIG. 2 is a figure explaining a conventional simplified encapsulation technique for an IP packet.
Figure 3:
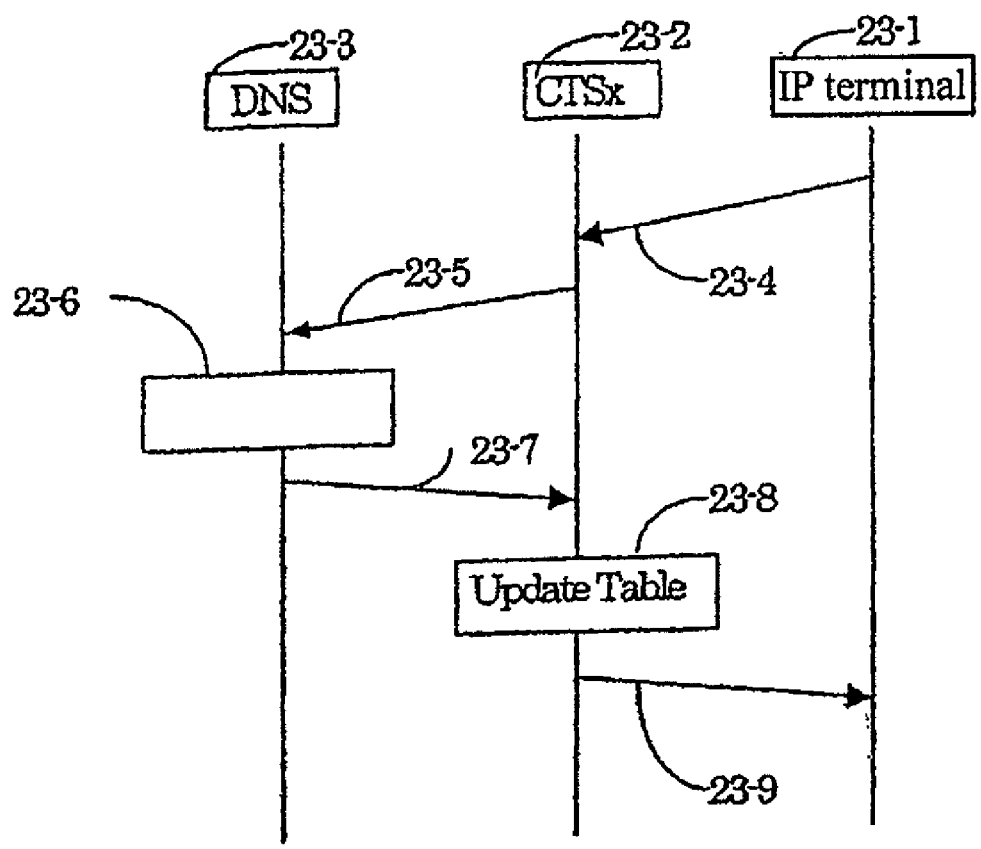
FIG. 3 is a figure explaining a conventional method for operating an address management table of within a network node unit from a user terminal unit.
Figure 4:
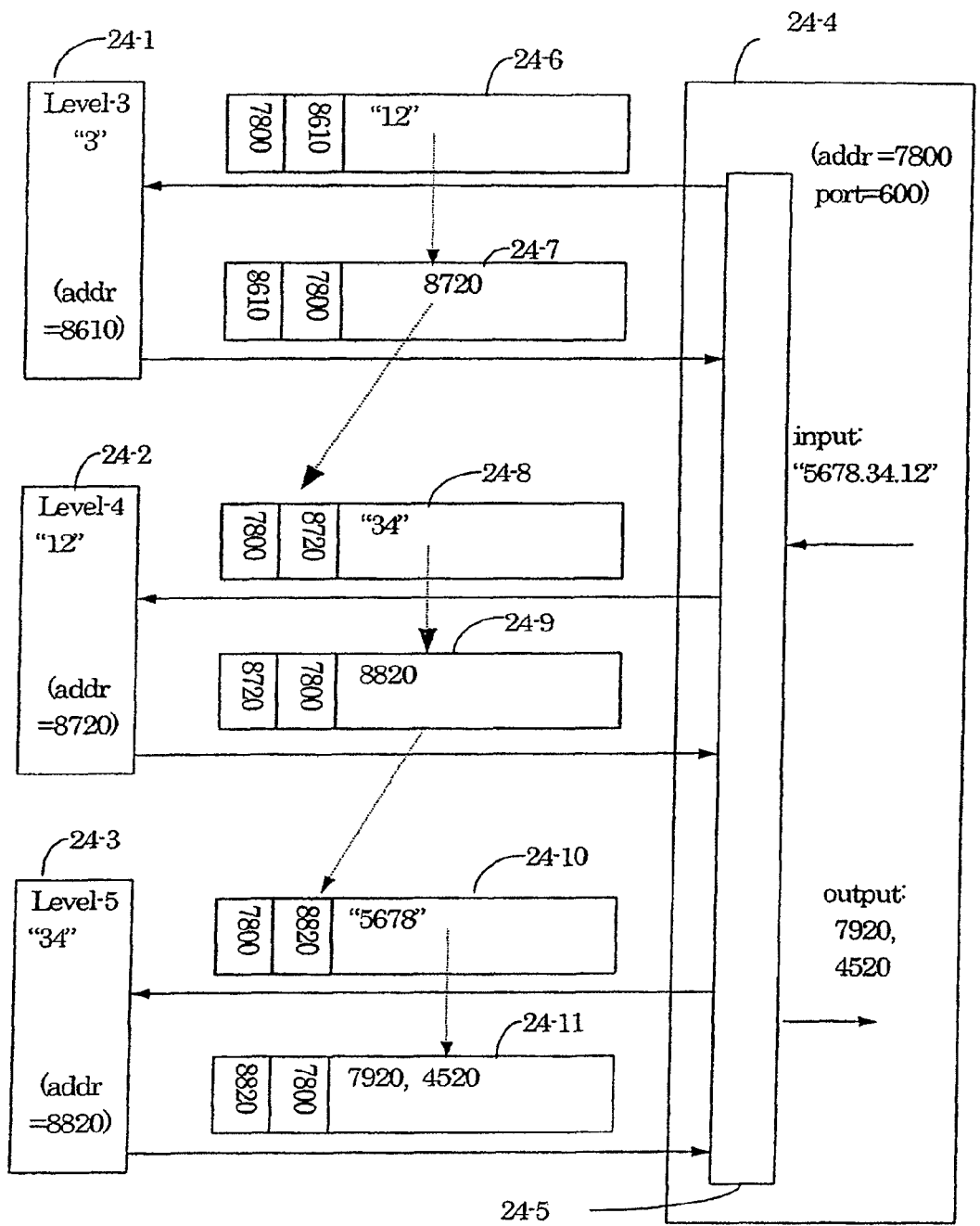
FIG. 4 is a figure explaining a conventional technique that a conversion table server accesses a domain name server.
Figure 5:
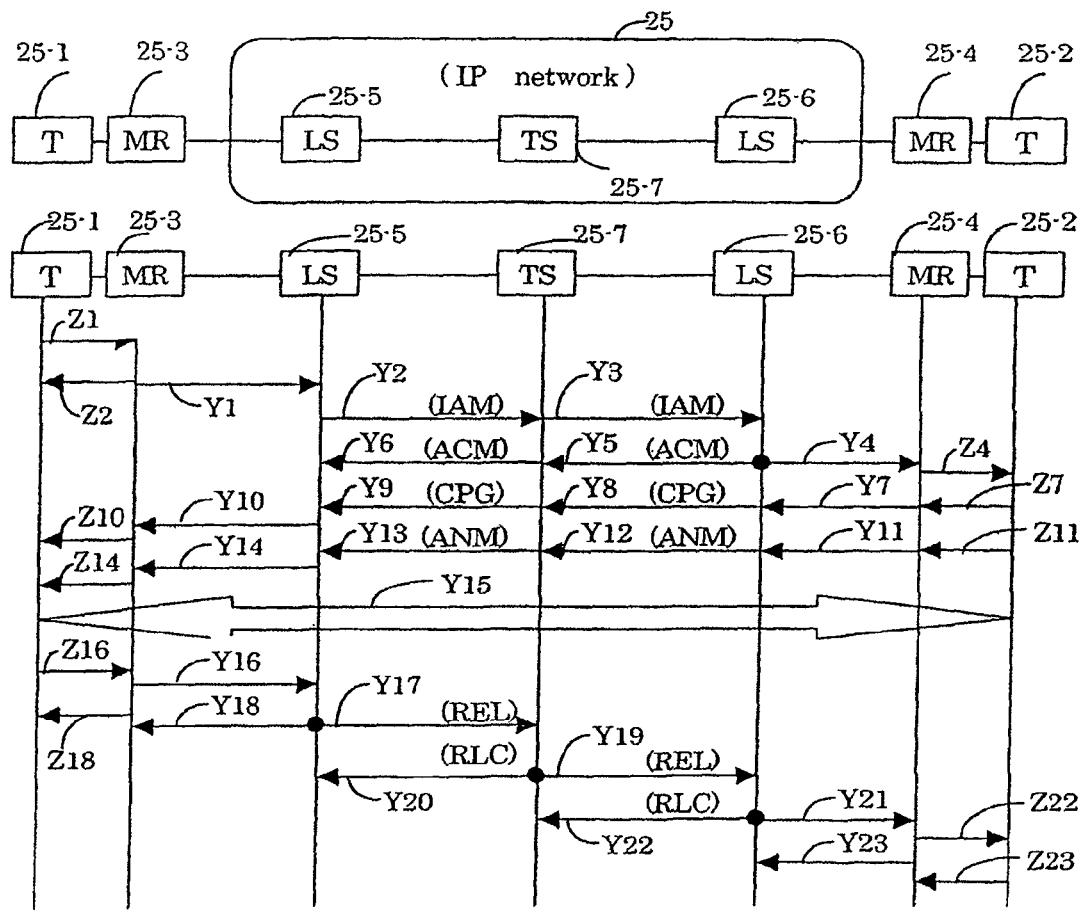
FIG. 5 is a figure explaining a hierarchical structure of a conventional communication function when a common channel signaling system is applied to an IP network.
Figure 6:
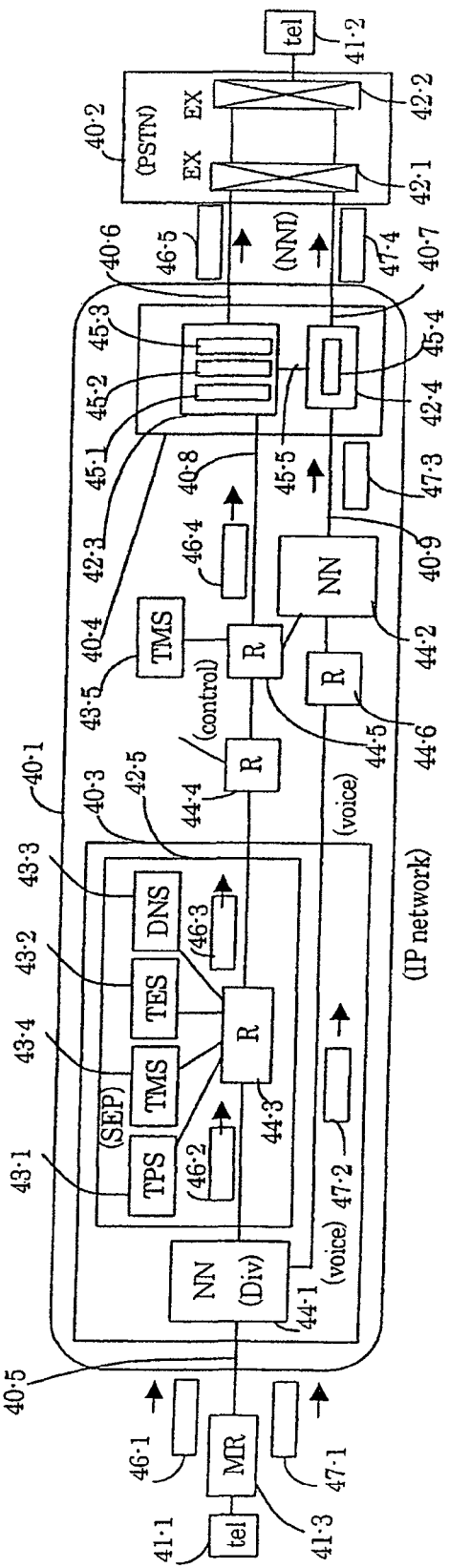
FIG. 6 is a figure explaining a conventional IP network employing a common channel signaling system.
Figure 11:
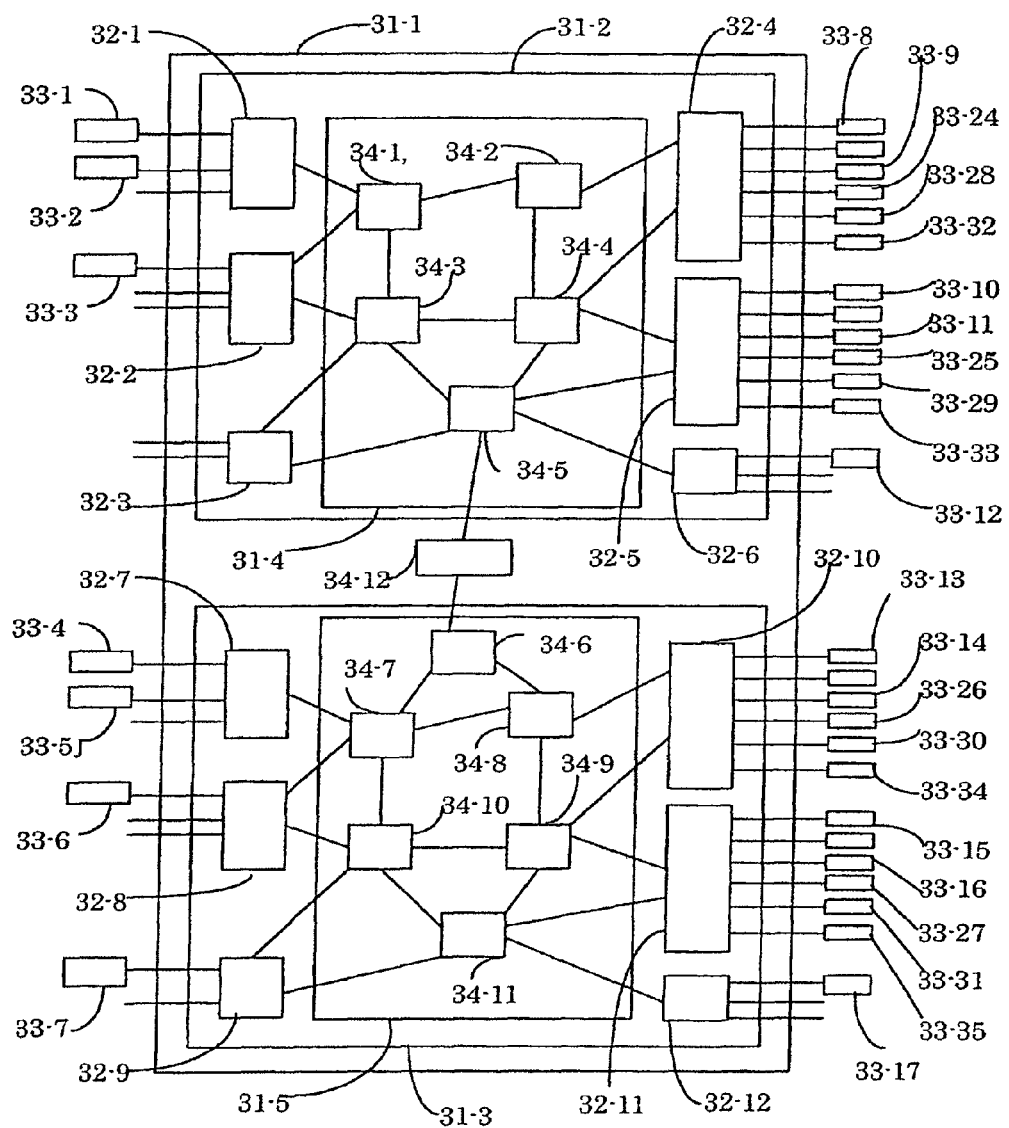
FIG. 11 is a figure explaining the conventional packet transfer by multicast.
Figure 12:
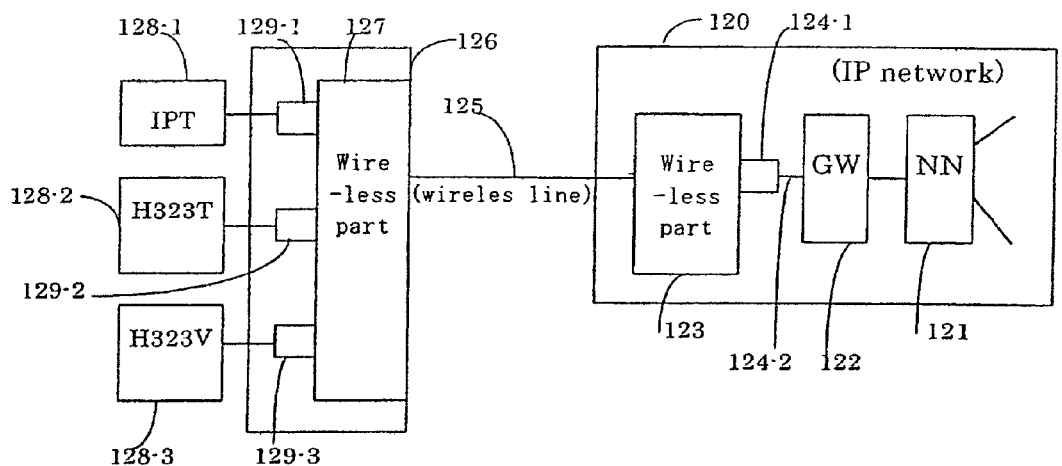
FIG. 12 is a figure explaining a conventional concept of communication via a radio communication path from a mobile terminal unit.
Figure 13:
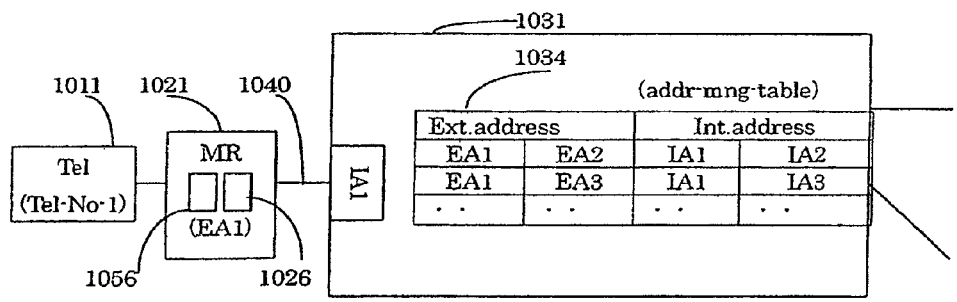
FIG. 13 is a figure explaining a conventional concept concerning telephone communication via a media router.
Figure 14:
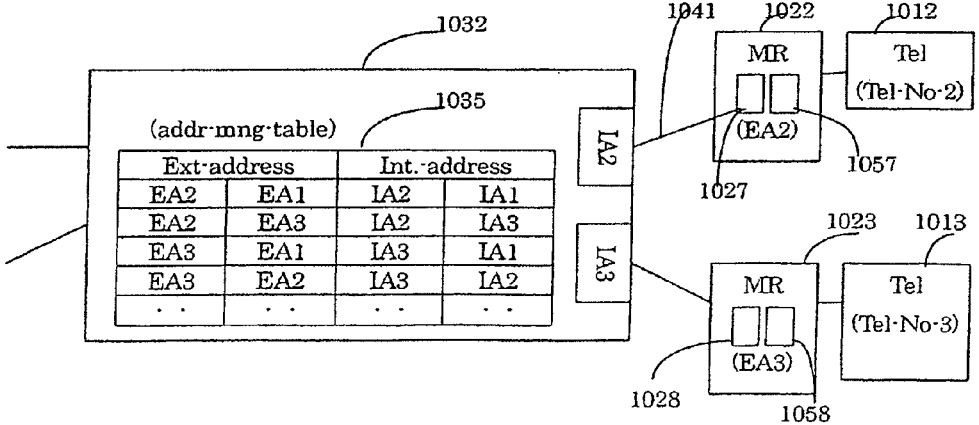
FIG. 14 is a figure explaining a conventional concept concerning telephone communication via a media router.
Figure 15:
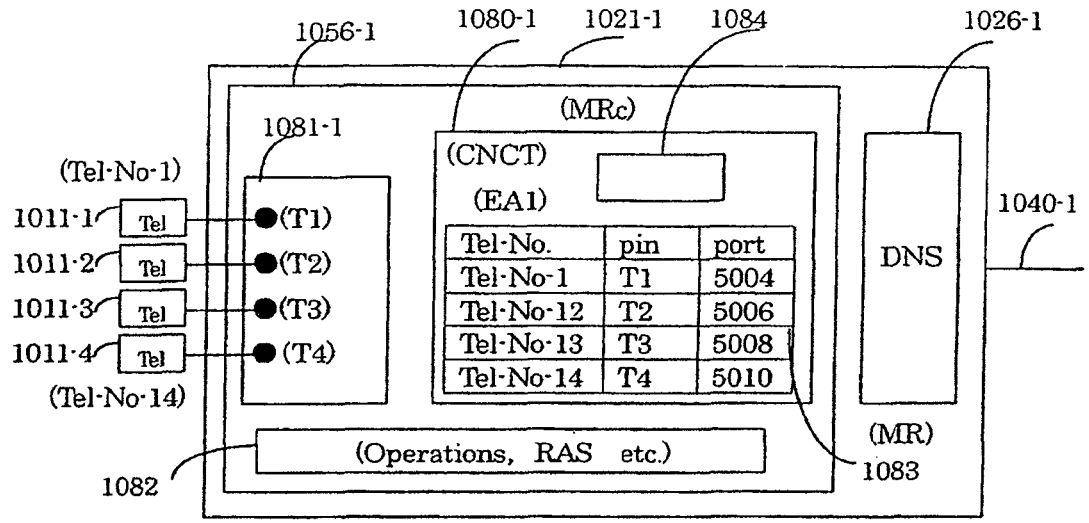
FIG. 15 is a figure explaining a conventional concept concerning media router configuration.
Figure 16:
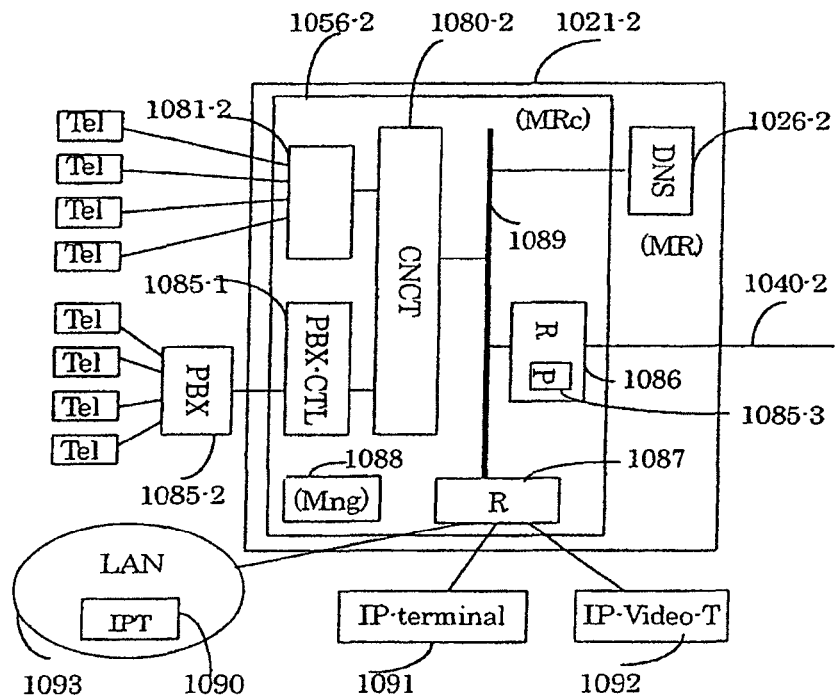
FIG. 16 is a figure explaining a conventional concept concerning media router configuration.
Figure 17:
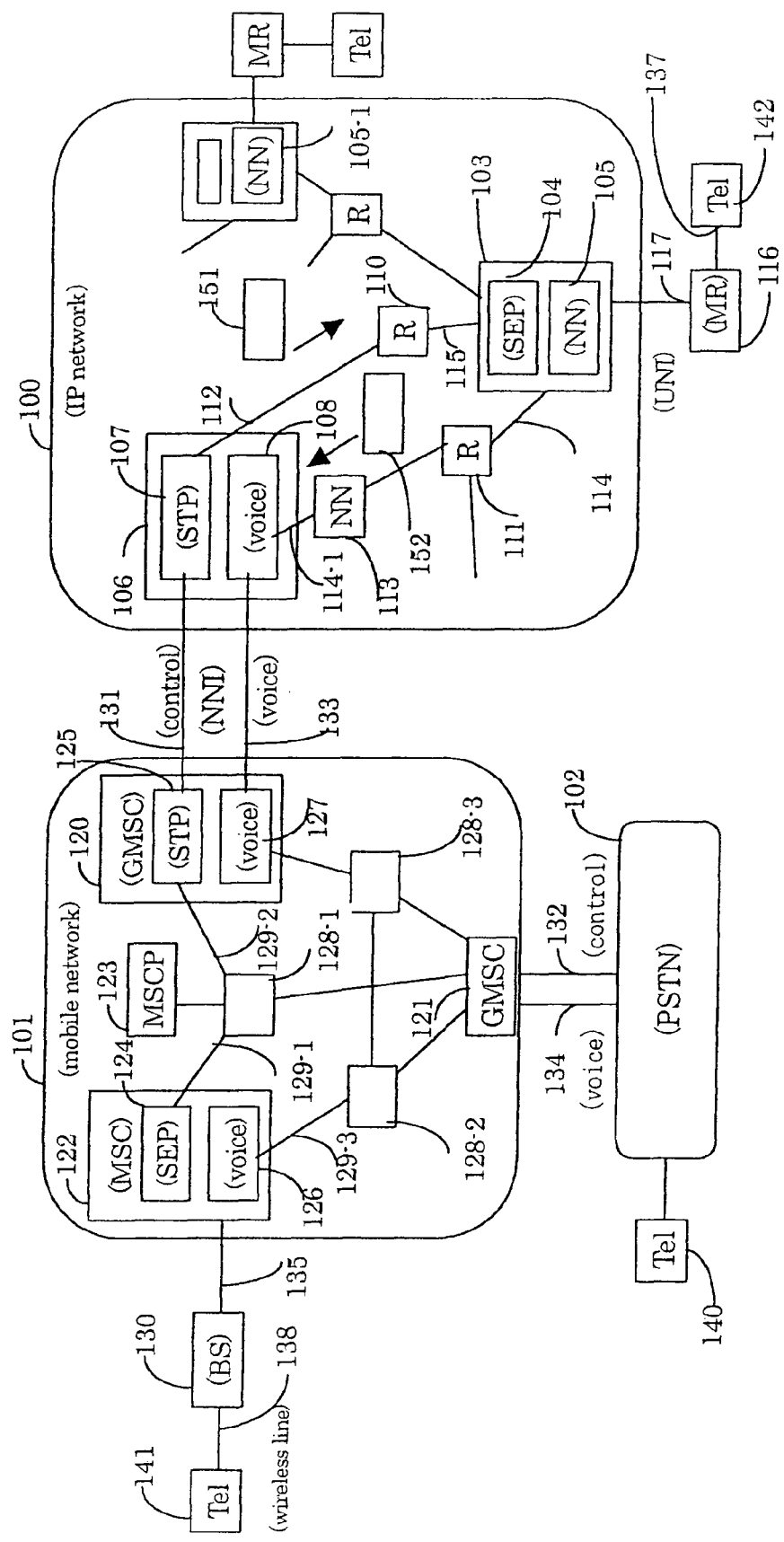
FIG. 17 is a figure explaining a communication between a mobile communication network and an IP network, in a first embodiment of the present invention.
Figure 19:
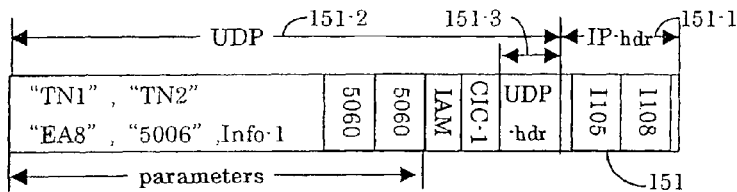
FIG. 19 is a figure explaining an IP packet form used in terminal-to-terminal communication connection control, in the first embodiment of the present invention.

Then, the terminal-unit authentication information formed by information unique to the telephone set 141 is sent from the telephone set 141 to the signal end point 124 of within the terminal-unit exchange 122 (Step E11) via the radio base point 130 (Step E10). The signal end point 124 examines the received terminal-unit authentication information, to notify speech-channel set information to a mobile radio unit via the radio base point 130 (Steps E12, E13). The signal end point 124 forms an initial address message (IAM) defined by the common channel signaling system, and forwards it onto a communication line 129-1. Thereupon, the initial address message reaches the signal transfer point 125 by way of a communication line 129-1, a relay unit 128-1 and communication line 129-2 (Step E14). When the signal transfer point 125 forwards the received initial address message onto a control communication line 131 (Step E15), the initial address message defined by the common channel signaling system, in the relay control section 107, is converted into an IAM packet 151 for transfer within the IP network 100 (FIG. 17, FIG. 19). The IAM packet 151 is forwarded onto a communication line 112 to reach the terminal-unit control section 104 of within a terminal-unit gateway 103 by way of a router 110 and communication line 115 (Step E16).

The IAM packet 151 contains a source IP address "I107", a destination IP address "I104", a circuit identification code "CIC-1", a message "IAM" and a parameter. The parameter includes the telephone numbers "TN1" and "TN2". The source IP address "I107" is an IP address provided to the relay control section 107 while the destination IP address "I104" is an IP address provided to the terminal-unit control section 104. The IAM packet 151 contains an IP packet header 151-1 and, in its payload section, a UPD segment 151-2. The source port number in the UPD header 151-3 is used to identify a telephone management server of within the relay control section 107. The destination port number in the UPD header 151-3 is used to identify a telephone management server of within the terminal-unit control section 104.

Figure 20:
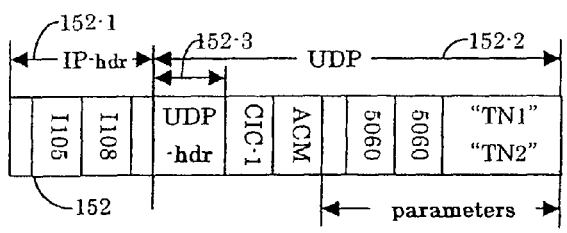
FIG. 20 is a figure explaining an IP packet form used in terminal-to-terminal communication connection control, in the first embodiment of the invention.

The terminal-unit control section 104 forms an IP packet notifying a call request and sends it to the media router 116 on the basis of a received IP packet 151 for call connection control (Step E17). The media router 116 receives the IP packet. The media router 116 notifies a call-set request to the telephone set 142 (Step E20). The media router 116 then sends an IP packet notifying a reception in the Step E17 back to the terminal-unit control section 104 (Step E21). The terminal-unit control section 104 forms an ACM packet 152 (FIG. 17, FIG. 20) containing an address completion message in its payload section of an IP packet on the basis of the IP packet notifying the reception, and sends it back to the relay control section 107 (Step E22). The ACM packet 152 is converted, in the relay control section 107, into an ACM message on the common channel signaling system to be handled in the mobile communication network 101, and transferred over a control line 131 to reach the relay control section 125 (Step E23), then reaching the relay control section 124 by way of a communication line 129-2, a relay unit 128-1 and a communication line 129-1 (Step E24). The ANM packet 152 contains an IP packet header 152-1 and, in its payload section, a UDP segment 152-2. The source port number in the UPD header 152-3 is used to identify a telephone management server of within the terminal-unit control section 104. The destination port number in the UPD header 152-3 is used to identify a telephone management server of within the relay control section 107.

Figure 21:
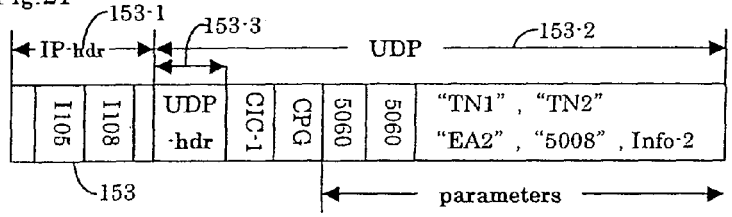
FIG. 21 is a figure explaining an IP packet form used in terminal-to-terminal communication connection control, in the first embodiment of the present invention.

When the telephone set 142 notifies an in-calling notification to the media router 116 (Step E30), the notification is forwarded to the terminal-unit control section 104 via a media router 116 and communication line 117 (Step E31). The terminal-unit control section 104 forms, in its payload section of an IP packet, a CPG packet 153 (FIG. 21) containing a call progress message notifying an incoming call ringing on the basis of the IP packet notifying an incoming call ringing, and sends it back to the relay control section 107 (Step E32). In the relay control section 107, the CPG packet 153 is converted into a CPG message on the common channel signaling system to be handled in the mobile communication network 101, to reach the relay control section 125 via the control line 131 (Step E33). The CPG packet 153 contains an IP packet header 153-1 and, in its payload section, a UDP segment 153-2.

Furthermore, reaching the relay control section 124 by way of a communication line 129-2, a relay unit 128-1 and a communication line 129-1 (Step E34), a signal notifying an incoming call ringing is notified to the radio base point 130 (Step E35), while a ring back tone is notified onto the telephone set 141 (Step E36). The ANM packet 154 contains an IP packet header 154-1 and, in its payload section, a UDP segment 154-2.

Figure 22:
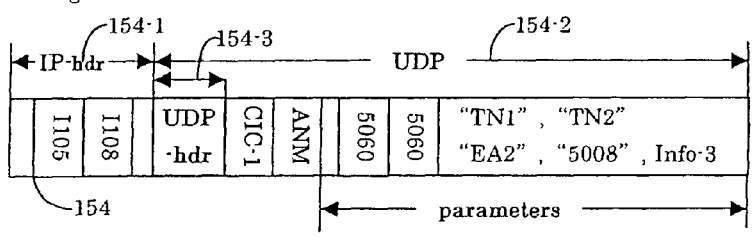
FIG. 22 is a figure explaining an IP packet form used in terminal-to-terminal communication connection control, in the first embodiment of the present invention.

When the telephone set 142 reply, a response notification reaches the media router 116 and the terminal-unit control section 104 (Step E40, Step E41). The terminal-unit control section 104 forms an ANM packet 154 (FIG. 22) containing, in a payload section of IP packet, an answer message notifying an incoming call ringing on the basis of the IP packet notifying response and sends it back to the relay control section 107 (Step E42). In the relay control section 107, the ANM packet 154 is converted into an ANM message on the common channel signaling system to be handled on the mobile communication network 101. By way of the relay control section 125, a relay router 128-1, a relay control section 124 and a radio base point 130, a response is notified to the telephone set 141, thus allowing for telephone communication (Steps E43 to E46).

Figure 23:
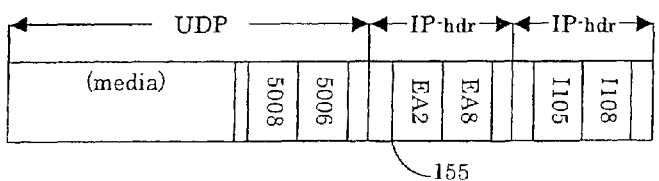
FIG. 23 is a figure explaining an IP packet form used in terminal-to-terminal communication connection control, in the first embodiment of the present invention.

A voice IP packet is communicated between the telephone set 141 and the telephone set 142, to effect voice communication (Step E48). The voice sent from the telephone set 141 reaches the telephone set 142 by way of the radio communication line 138, the radio base point 130, the communication line 135, the speech path section 126, the communication line 129-3, the relay units 128-2, 128-3, the speech path section 127, the voice communication line 133, the voice control section 108, the network node unit 113, the router 111 and the communication line 114 and by way of the network node unit 105, the communication line 117 and the media router 116. The voice forwarded from the telephone set 142 is transferred in a direction reverse to the above, to reach the telephone set 141. It is disclosed in Embodiment 13 (FIG. 227, etc.) of the prior patent application that, in the voice control section 108 and network node unit 105, digitized voice data is IP-encapsulated or -decapsulated for an IP packet. Numeral 155 in FIG. 23 shows an example of an IP packet storing digitized voice data.

When the telephone set 141 issues a release request (Step E50), carried out is a series of procedures for call release and release completion of under telephone line connection control according to the common channel signaling system (Steps E51 to E56, Steps E60 to E66). Then, a radio channel disconnect signal is forwarded from the exchange 122 and notified to the radio base point 130 (Step E70), thereby being notified to the telephone set 141 via the radio base point 130 (Step E71). The telephone set 141 sends a disconnection confirmation signal back to the radio base point 130, and the disconnect signal passes the telephone set 141 (Step E72) to reach the exchange 122 (Step E73).

Figure 24:
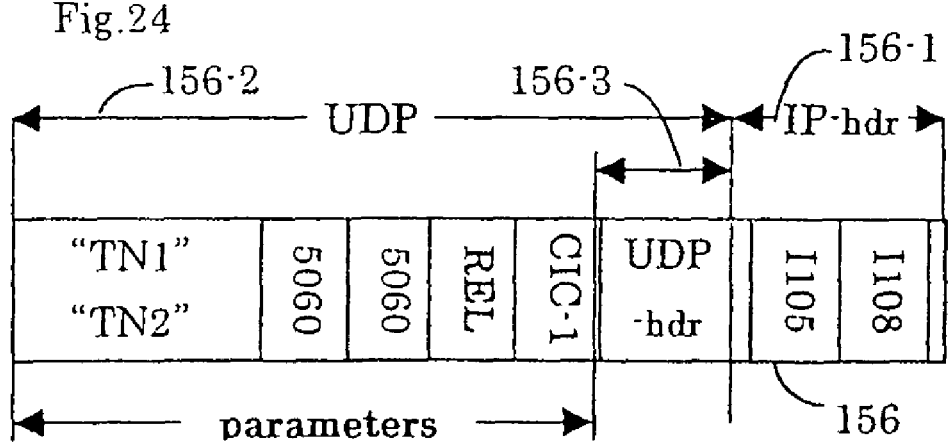
FIG. 24 is a figure explaining an IP packet form used in terminal-to-terminal communication connection control, in the first embodiment of the present invention.
Figure 25:
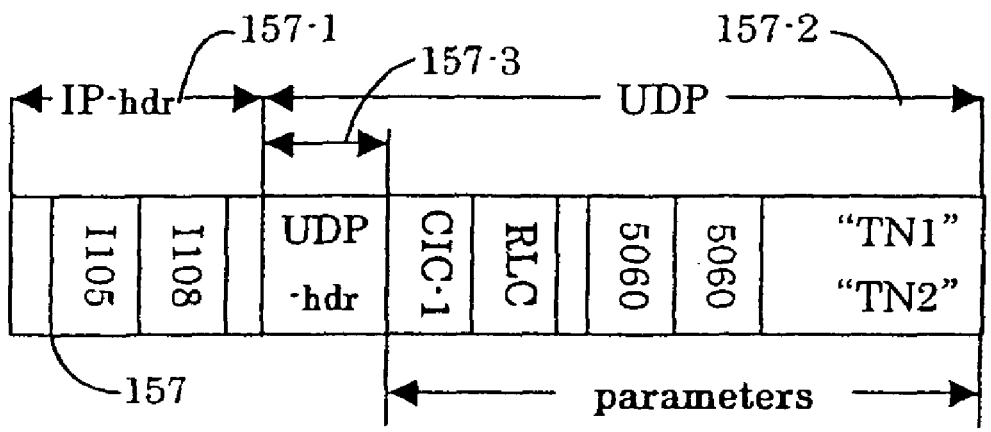
FIG. 25 is a figure explaining an IP packet form used in terminal-to-terminal communication connection control, in the first embodiment of the present invention.

The series of Steps E01-E73 enables a telephone communication at between the telephone sets 141 and 142. Incidentally, in the Step E54, there has been formed and transferred an REL packet 156 (FIG. 24) containing a release message notifying a release of telephone communication (closure of voice communication) formed in a payload section of the IP packet. In Step E62, there has been formed and transferred an RLC packet 157 (FIG. 25) containing a release completion message notifying a release completion of telephone communication (confirmation of a release) in a payload section of the IP packet. The REL packet 156 contains an IP packet header 156-1 and, in its payload section, a UDP segment 156-2. The RLC packet 157 contains an IP packet header 157-1 and, in its payload section, a UDP segment 157-2. The internal IP packet, to be communicated between the terminal-unit control section 104 and the relay control section 107, has a prototype in its IP packet header designated "UPD", to contain the line-connection control messages, as an NNI interface, in a UPD payload section set in the internal IP packet payload section.

Incidentally, the communication step of between the radio base point 130 and the terminal-unit signal transfer point 124 (UNI interface) can be changed in procedure to the other than the above, e.g. changing the Steps E07 and E11 to other steps or omitting them.

<<Explanation of Port Number>>

Explanation is made on "EA8", "5006" and "Info-1" contained in a parameter area of the IAM packet 151 of FIG. 19. "EA8" is an IP address provided to a voice communication port within the voice control section 108. "5006" is a port number within the UDP packet holding a digital voice to be transmitted from the voice control section 108. "Info-1" is attendant information, e.g. in a voice compression form, to be forwarded from the relay control section 107 toward the media router 116, having a significance only for a call having a call identifier "CIC-1". Explanation is made on "EA2", "5008" and "Info-2" contained in a parameter area of the CPG packet 153 of FIG. 21. "EA2" is an IP address provided to a voice communication port within the terminal-unit control section 104. "5008" is a port number within the UDP packet holding a digital voice to be transmitted from the terminal-unit control section 104. "Info-2" is attendant information to be forwarded from the terminal-unit control section 104 toward the relay control section 107, having a significance only for a call having a call identifier "CIC-1". This is true for "EA2", "5008" and "Info-3" contained in a parameter area of the ANM packet 154 of FIG. 22, wherein "Info-3" is attendant information to be forwarded from the terminal-unit control section 104 toward the relay control section 107.

Figure 26:
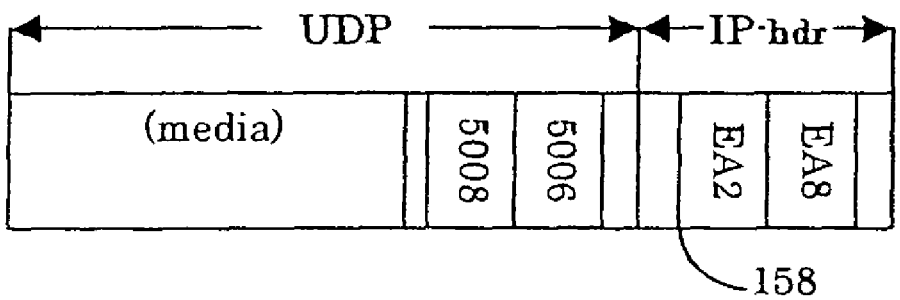
FIG. 26 is a figure explaining an IP packet form used in terminal-to-terminal communication connection control, in the first embodiment of the present invention.

Next, in the case of changing the network node unit 105 and voice control section 108 into another network node unit and voice control section not having an IP encapsulation function, a digitalized voice is in a form of "158" in FIG. 26 wherein an IP header for IP encapsulation is not provided.

<<Transmission from IP-Network-sided Telephone Set to Mobile-Network-sided Telephone Set>>

Figure 27:
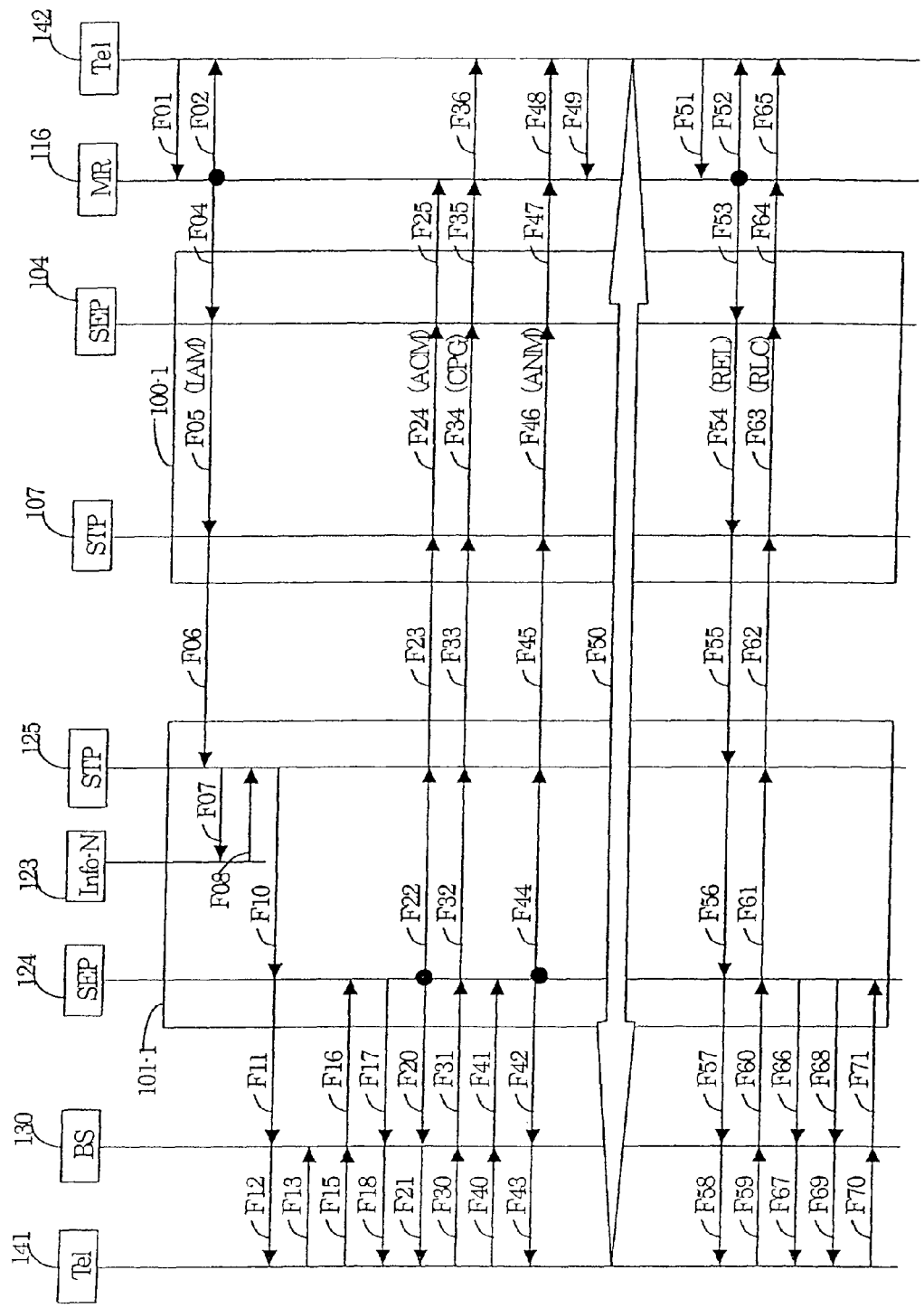
FIG. 27 is a figure explaining a method of controlling terminal-to-terminal communication connection via a mobile communication network and IP network, in the first embodiment of the present invention.

With reference to FIG. 27, explanation is made on a telephone communication of from a telephone set 142 for connection on a side of the IP network 100 to a telephone set 141 for connection on a side of the mobile communication network 101.

First, a connect request is forwarded from the telephone set 142 (Step F01), and the media router confirms an acceptance (Step F02). The media router 116 sends, to the terminal-unit control section 104, the call-set request information including a telephone number "TN2" of the telephone set 142 as an origin and a telephone number "TN1" of the telephone set 141 as a destination (Step F04). The terminal-unit control section 104, receiving the call-set request information, forms an initial address message (IAM) for transfer within the IP network 100, and forwards it to the control communication line 115 (Step F05). The initial address message reaches the relay control section 107. The relay control section 107 converts the initial address message (IAM) into an initial address message in the form of the common channel signaling system and forwards it onto the control communication line 131 (Step F06). The signal transfer point 125 extracts a transmission-information inquiry message including the telephone number "TN1" of the telephone set 141 from the received initial address message (IAM), and forwards it to the service information node 123 (Step F07). Thereupon, the service information node 123 answers a point code "PC124" of signal end point 124 as information to connect for the telephone number "TN1" (Step F08). The signal transfer point 125 sets again the point code "PC124" as a destination address of the received initial address message (IAM) and forwards it onto the communication line 129-2. Thereupon, the reset initial address message reaches the signal end point 124 by way of the communication line 129-2, a relay unit 128-1, and a communication line 129-1 (Step F10).

The signal end point 124 forwards a call-set request to the base point 130 on the basis of the received initial address message (IAM) (Step F11). The base point 130 notifies a call to the telephone set 141 via the radio communication path 138 (Step F12). The telephone set 141 reports a state of the radio communication path 138 (noise, voice quality, etc.) to the radio base point 130 (Step F13), and subsequently notifies the signal end point 124 of the information meaning a terminal-unit correctness, e.g. including password forwarding, by way of the radio base point 130 (Step F15, Step F16). The signal end point 124 notifies a communication channel set instruction to the telephone set 141 via the radio base point 130 (Step F17, Step F18). The signal endpoint 124 then notifies a call set request to the telephone set 141 via the radio base point 130 (Step F20, Step F21), and forms an address completion message (ACM) on the common channel signaling system notifying a reception permission of a call set request based on the initial address message and sends it to the signal transfer point 125 (Step F22). The address completion message (ACM) reaches the relay control section 107 via the control line 131 (Step F23). The address completion message (ACM) in the relay control section 107 is converted into an ACM packet in a form to be handled within the IP network, to reach the terminal-unit control section 104 via the router 110 (Step F24). The call set request information reaches the media router 116 via the communication line 117 (Step F25).

By forwarding an in-calling by the telephone set 141, an in-calling notification passes the base point 130 (Step F30) and reaches the signal end point 124 (Step F31). The signal endpoint 124 forms and forwards a call message (CPG) (Step F32). The call message (CPG) reaches the signal transfer point 125, the control communication line 131 and the relay control section 107 (Step F33, Step F34). The relay control section 107 notifies a ringing notification to the telephone set 142 via the media router 116 (Step F35, Step F36).

When the telephone set 141 responds, a response notification reaches the signal end point 124 via the base point 130 (Step F40). The signal end point 124 forwards a confirm notification to the telephone set 141 via the radio base point 130 (Steps F42, Step F43). The signal end point 124 forms and forwards an answer message (ACM) (Step F44). The answer message (ACM) reaches the relay control section 107 by way of the signal transfer point 125 and control communication line 131 (Steps F45, F46). The relay control section 107 notifies a response notification to the telephone set 142 via the media router 116, thereby enabling voice communication (Steps F47, F48).

By the above procedure, the voice IP packet is communicated between the telephone set 141 and the telephone set 142, thus effecting voice communication (Step F50). When the telephone set 142 issues a release request (Step F51), a procedure of call release and release completion similarly to the foregoing (Steps F52 to F70) is made to end the telephone communication. Herein, the Steps F54 to F56 are on a release request message REL while the Steps F61 to F63 are on a release completion message RLC.

Incidentally, the communication step of between the telephone set 141 and the terminal-unit signal transfer point 124 can be changed to the other procedure than the above, e.g. the Step F13 to Step F18 can be changed to other steps or omitted. It is possible that other messages of the common channel signaling system are introduced to this embodiment, examples are SUS message for suspending temporarily circuit connection control, and RES message for restarting the suspending.

<<Setting and Releasing Address Management Table in Network Node Unit>>

As in the foregoing, within the IP network, the external IP packet is IP-encapsulated into an internal IP packet. Consequently, used is a record of an address management table of within the network node unit. Accordingly, after establishing a series of call connection controls mentioned in FIG. 27, i.e. after sending/receiving an ANN message, set is an address management table record in the network node-unit. Also, after a series of call releases, i.e. after sending/receiving an RLC message, erased is the address management table in the network node unit. However, the record setting and release for encapsulation is disclosed in the prior patent or the patent application.

The IP network 100 employs a function of IP encapsulation and decapsulation used in the prior patent. The function of the IP network is to be summarized as in the following. The IP network 100 includes two or more network node units. When inputting an external IP packet from a logical terminal unit at an end of the communication line 117, the external IP packet turns into an internal packet under the control of the address management table within the network node unit 105. The internal packet is transferred in the IP network to reach a network node unit 113. The internal packet is restored as an external IP packet under the control of the address management table of within the network node unit 113.

<<Variation: Voice Image Communication through IP and Mobile-Communication Networks>>

Figure 28:
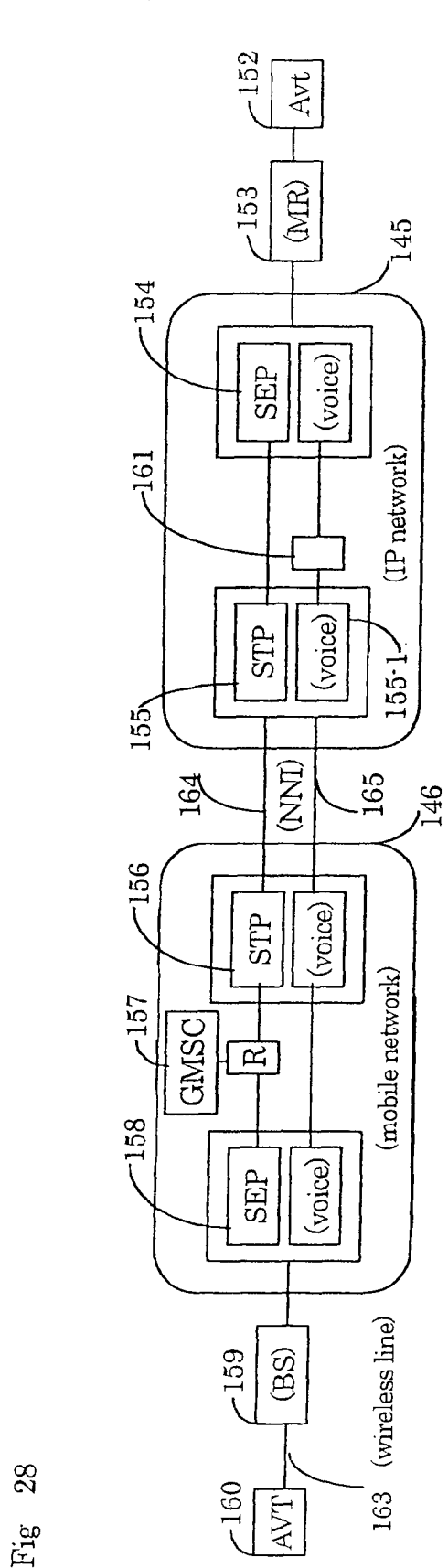
FIG. 28 is a figure explaining the communication between a mobile communication network and an IP network, in a first embodiment of the present invention.
Figure 29:
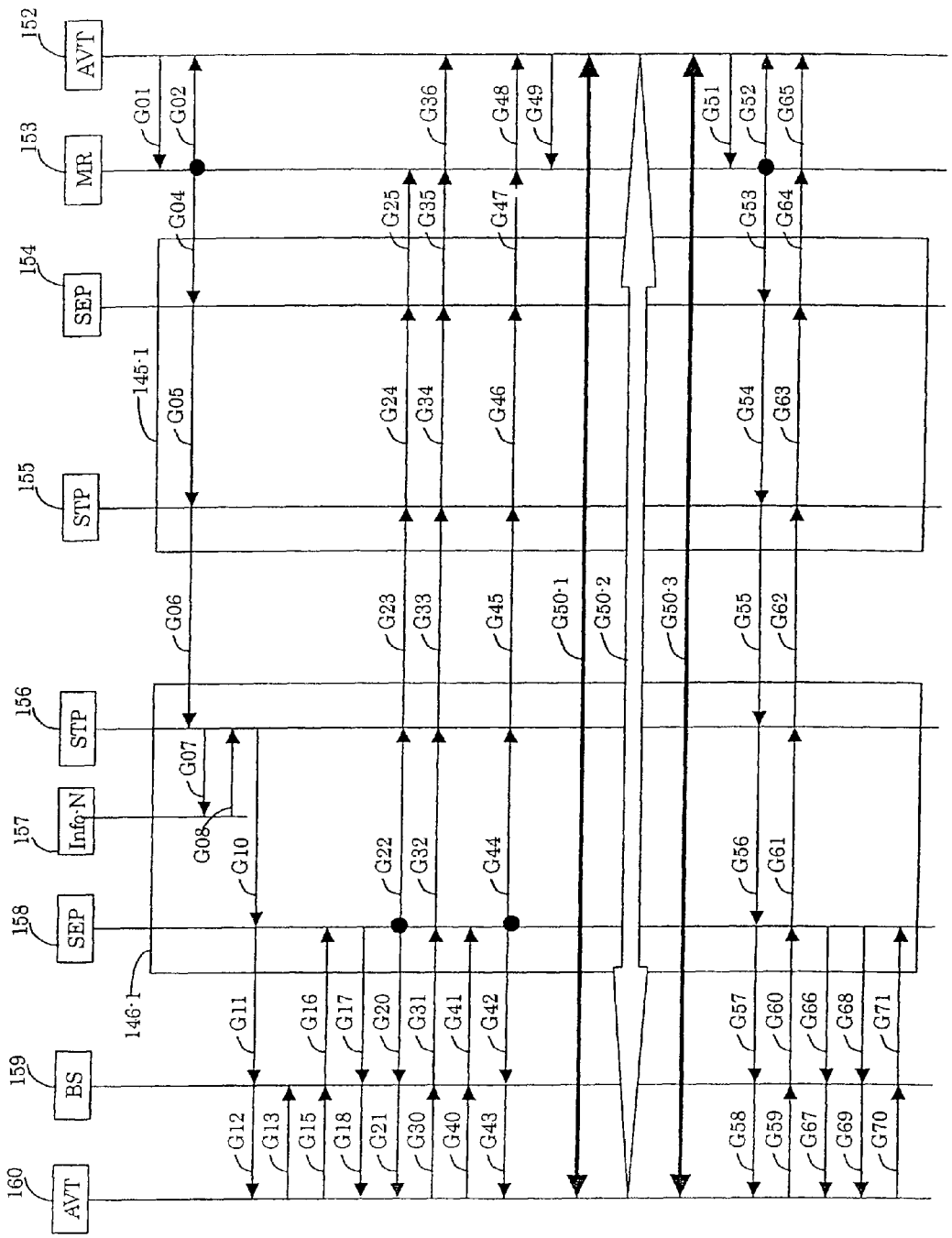
FIG. 29 is a figure explaining a method of controlling terminal-to-terminal communication connection via a mobile communication network and IP network, in the first embodiment of the present invention.

With reference to FIGS. 28 and 29, explanation is made on the voice image communication from a voice image unit 152 connected at the side of the IP network 145 to a voice image unit 160 connected at the side of the mobile communication network 146. Incidentally, the voice image units 152 and 160 can be a terminal unit or telephone set having a function to send/receive a voice and still image, a terminal unit or telephone set having a function to send/receive a voice and moving image, a cellular phone, or a TV broadcast transmitter or receiver.

A connection request is forwarded from the voice-image unit 152 (Step G01), and the media router 153 confirms an acceptance (Step G02). Then, the media router 153 sends, to the terminal-unit control section 154, the call-set request information including a telephone number "TN2" of the voice image unit 152 as an origin and a telephone number "TN1" of the voice image unit 160 as a destination (Step G04). The terminal-unit control section 154, receiving the call-set request information, forms an initial address message (IAM) and forwards it into the IP network 145 (Step G05). The initial address message reaches the relay control section 155. The relay control section 155 converts the initial address message into an initial address message (IAM) of the common channel signaling system to be used in the mobile communication network 146 and forwards it onto the control communication line 164 (Step G06). The signal transfer point 156 extracts a transmission-information inquiry message including the telephone number "TN1" of the voice image unit 160 from the received initial address message (IAM), and forwards it to the service information node 157 (Step G07). Thereupon, the service information node 157 answers a point code "PC158" of signal end point 158 as information for connection for the telephone number TN1 (Step G08). The signal transfer point 156 sets the point code "PC158" again as a destination address of the received initial address message (IAM) and forwards it into the mobile network 146. Thereupon, the reset initial address message reaches the signal endpoint 158 (Step G11). The signal end point 158 forwards a call-set request to the base point 159 on the basis of the received initial address message (Step G11). The base point 159 notifies the voice image unit 160 of a communication call of from the voice image unit 152, via the radio communication path 163 (Step G12). The voice image unit 160 reports a state of the radio communication path 163 to the radio base point 159 (Step G13), and subsequently notifies the signal end point 158 of the information meaning a terminal-unit correctness, e.g. including password forwarding, by way of the radio base point 159 (Step G15, Step G16). The signal end point 158 notifies a communication channel set instruction to the voice image unit 160 via the radio base point 159 (Step G17, Step G18). The signal endpoint 158 then notifies a call set request to the voice image unit 160 via the radio base point 159 (Step G20, Step G21), and forms an address completion message (ACM) on the common channel signaling system notifying a reception permission of a call set request based on the initial address message and sends it to the signal transfer point 156 (Step G22). The address completion message (ACM) reaches the relay control section 155 via the control line 164 (Step G23). The address completion message (ACM) is converted into an ACM packet in a form to be handled within the IP network in the relay control section 155, and transferred in the IP network 145 to reach the terminal-unit control section 154 (Step G24). The call set request information reaches the media router 153 (Step G25).

By forwarding an in-calling by the voice image unit 160, an in-calling notification passes the base point 159 (Step G30) and reaches the signal end point 158 (Step G31). The signal endpoint 158 forms and forwards a call message (CPG) (Step G32).

The call message (CPG) reaches the signal transfer point 156, the control communication line 164 and the relay control section 155, 154 (Step G33, Step G34). The relay control section 155 notifies a call notification to the voice image unit 152 via the media router 153 (Step G35, Step G36).

When the voice image unit 160 responds, a response notification reaches the signal end point 158 (Step G41) via the base point 159 (Step G40). The signal endpoint 158 forwards a confirm notification to the voice image unit 160 via the radio base point 159 (Steps G42, Step G43). The signal end point 158 forms and forwards an answer message (ACM) (Step G44). The answer message (ACM) reaches the relay control section 155, 154 by way of the signal transfer point 156 and control communication line 164 (Step G45, Step G46). The relay control section 155 notifies a response notification to the voice image unit 152 via the media router 153, thereby enabling voice image communication (Steps G47, G48, G49).

By the above procedure, a communication path for connecting the IP network and the mobile communication network is established at between the voice image unit 152 and the voice image unit 160. Next, the voice image unit 152 and the voice image unit 160 carry out a control procedure for voice image communication of opening a voice image communication logic channel, communication mode selection, flow-control designation and terminal-unit capability information exchange (Step G50-1). The control procedure can adopt, for example, a multimedia communication system H.245 control procedure under ITU-T recommendation. Next, an IP packet storing a multimedia data such as voice and image is communicated between the voice image unit 152 and the voice image unit 160, thereby effecting voice image communication (Step G50-2). The IP packet including multimedia data is transported through the voice communication line 165 of a mobile communication line. The voice image unit 152 and the voice image unit 160, when ending the voice image communication, execute a control procedure to close the opened voice image communication path (Step G50-3).

When the voice image unit 152 issues a release request (Step G51), a procedure of call release and release completion, as in the foregoing, is made (Steps G51 to G70) to release the communication path connecting between the IP communication network and the mobile communication network set up for voice image communication. At this time, one of the voice image units 152 and 154 issues a release request, to communicate a release request message REL and release completion message RLC in the mobile communication and IP networks, thus releasing the communication of between the two voice image units.

Incidentally, the communication step of between the voice image unit 160 and the terminal-unit signal transfer point 158 can be changed to the other procedure than the above, e.g. the Step G13 to Step G18 can be changed to another step or omitted. Also, although, in the above, a terminal-to-terminal connection request was issued from the voice image unit 152 connecting to the IP network 145 to the voice image unit 160 connecting to the mobile communication network 146, a terminal-to-terminal connection request can be issued in the reverse direction of from the voice image unit 160 to the voice image unit 152. This is disclosed by the similar example in the former half portion of this embodiment. The voice image unit can be provided with a function for sending and receiving a voice/moving image.

<<Summary>>

The mobile phone set 141 makes a telephone communication with the fixed phone set 142 by way of the radio communication path 138 and base point 130, and by way of terminal-unit exchange 122 in the mobile communication network, communication lines 129-1 to 129-2 in the mobile communication network, toll switch 120 in the mobile communication network, a combination of NNI communication lines 131 and 133 at between the mobile communication network and the IP network, a relay gateway 106 of the IP network, internal communication lines 112 and 115, 114 of the IP network, a terminal-unit gateway 103 of the IP network, a media router 116 and a communication line 137. Consequently, in the mobile communication network 101, line connection control is carried out based on the common channel signaling system. In the IP network, a communication path is established by communicating line connection control messages applying the common channel signaling system to the IP network, thus effecting telephone communication.

Meanwhile, the IP network includes two or more network node units. An external IP packet is inputted at a logic terminal at an end of the communication line. The external IP packet turns into an internal packet under the control of an address management table of within the source-network node unit. The internal packet is transferred in the IP network to reach a destination-sided network node unit. The internal packet is restored as an external IP packet under the control of an address management table of within the destination-sided network node unit.

Meanwhile, the voice image unit 1 carries out a voice image communication with the voice image unit 2 by way of the mobile communication network, NNI communication line and IP network. Consequently, in the mobile communication network, line connection control is effected on the common channel signaling system. In the IP network, a communication path is established by communicating the line connection control applying the common channel signaling system to the IP network. Thereafter, a control procedure for opening a voice image communication path (e.g. ITU-T or H.245 control procedure) is made between the two voice image units. An IP packet storing a voice and image can be communicated between the voice image unit 152 and the voice image unit 160, to effect voice image communication. When the voice image communication ends, the voice image unit 152 and the voice image unit 160 carry out a control procedure to close the opened voice image communication path (media communication path). Next, when the voice image unit 152 or 154 issues a request for releasing the communication path due to a line connection control message, a release request message REL and release completion message RLC is communicated within the mobile communication and IP networks, on the basis, for the mobile communication network, of a line connection control protocol based on the common channel signaling system and, for the IP network, of a line connection control protocol applying the common channel signaling system to the IP network, to thereby release the communication between the two voice image units.

A communication path is opened using telephone numbers between the voice image unit 1 and the voice image unit 2, to effect voice image communication. Thereafter, the voice image communication path is released. The image may be any of a still image and a moving image. In this embodiment, the internal IP packet has a prototype designated UDP in a header, wherein the circuit connection control message (IAM, ACM, CPG, ANM, REL, RLC) is set with a UDP segment in a payload of the IP packet (IPv4) defined under RFC 791. The other methods include a method of defining "CC" representative of line connection control as a new prototype to store line connection control messages in the payload of the internal IP packet. Furthermore, another method is to designate a protocol type as "ICMP" to store it in an ICMP message region to be set in a payload section of an internal IP packet. Also, a TCP segment can be provided in place of the UDP segment, which is explained in another embodiment. It is possible to carry out as an IP packet (IPv6) defined under RFC 1883.

Figure 30:
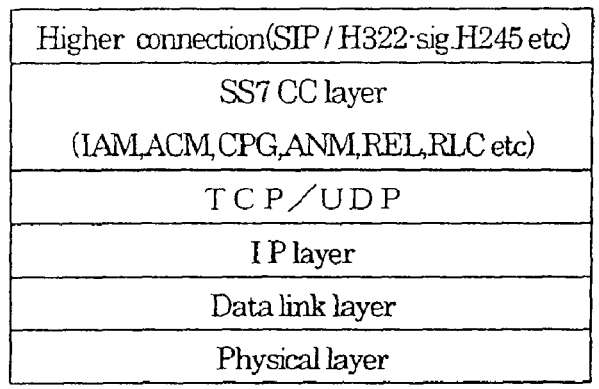
FIG. 30 is a figure explaining a communication function hierarchical structure, in a second embodiment of the present invention.

2. Embodiment 2 for Implementing Line Connection Control Protocol using Telephone Numbers, in Level above TCP Layer This embodiment is a method for carrying out a line connection control protocol in a level above a TCP layer, i.e. a method for carrying out a line connection control protocol after setting up a TCP communication path. FIG. 30 shows a communication function layers. There are shown a physical layer (communication first layer), a data-link layer (communication second layer), an IP layer (communication third layer or network layer) and a TCP/UDP layer (communication fourth layer or transport layer), in the order of from the lower to the upper. A line connection control protocol conforming to the common channel signaling system is provided in a level above the communication first to fourth layers. Furthermore, in the level above the line connection control protocol, SIP, H322 signaling protocol, H245 protocol or the like is set up as a communication protocol for terminal-to-terminal connection control described in the prior patent application or the like. The line connection control protocol conforming to the common channel signaling system refers to a call control message, such as IAM, ACM, CPG, ANM, REL or RLC, shown in Embodiment 1 in the prior patent application.

Figure 33:
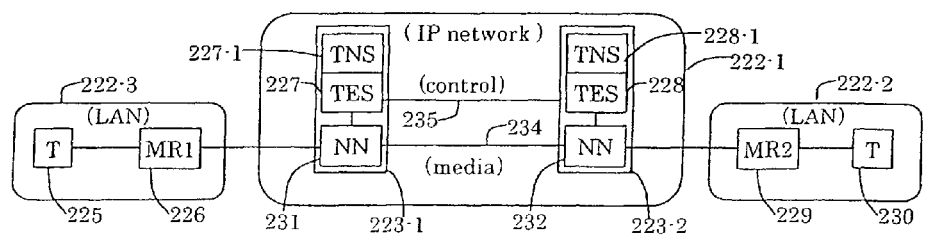
FIG. 33 is a figure explaining a communication via an IP network between two terminal units, in the second embodiment of the present invention.

Explanation is made with reference to FIG. 33. Numeral 221-1 is an IP transfer network, numerals 222-2 and 222-3 are LANs, numerals 223-1 and 223-2 are terminal-unit gateways, numerals 225 and 230 are terminal units, numerals 226 and 229 are media routers, and numerals 227 and 228 are telephone management servers. Network node units 231 and 232 include the function of IP-encapsulation and -decapsulation used in the prior patent. The IP network 222-1 includes two or more network node units. An external IP packet is inputted at a logic terminal at an end of the communication line. The external IP packet turns into an internal packet under the control of an address management table of within the source-sided network node unit. The internal packet is transferred in the IP network to reach a destination-sided network node unit. The internal packet is restored as an external IP packet under the control of an address management table of within the destination-sided network node unit.

Figure 31:
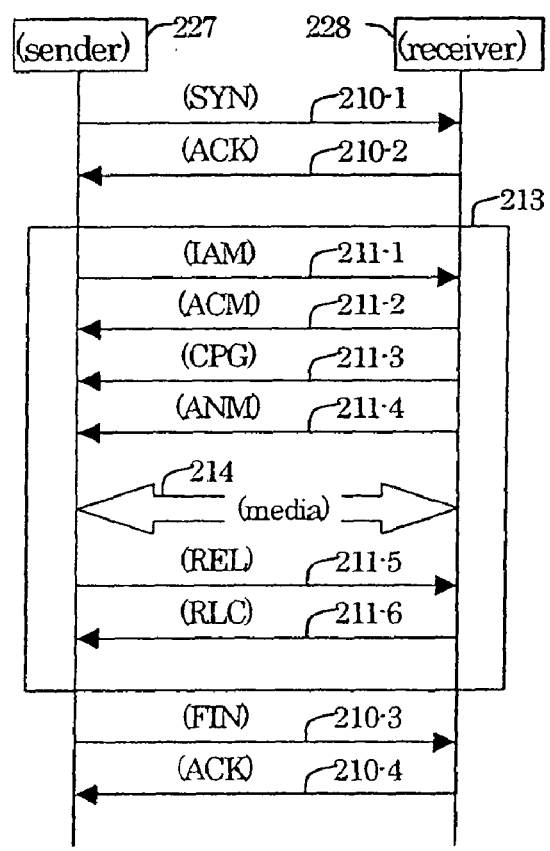
FIG. 31 is a figure explaining an application method of TCP technique, in the second embodiment of the present invention.

The terminal units 225 and 230 (FIG. 33) are terminal units having a function of digital media transmission/reception. A source-sided telephone management server 227 sends a "SYN" packet to a destination-sided telephone management server 228. The telephone management server 228 sends an "ACK" packet to the telephone management server 227. After establishing a TCP communication path within the telephone management servers 227 and 228, call control messages of IAM, ACM, CPG, ANM, REL, RLC and the like are processed in the level above the TCP layer, on the basis of the line connection control protocol. In the first method, as shown in FIG. 31, a "SYN" packet for establishing a TCP communication path is sent from the telephone management server 227 to the telephone management server 228 (Step 210-1 in FIG. 31), while a "ACK" packet is sent from the telephone management server 228 back to the telephone management server 227 (Step 210-2). Next, a series of call control messages IAM, ACM, CPG, ANM are communicated between the telephone management server 227 and the telephone management server 228, in order for setting a communication path based on the line connection control protocol between the both (Steps 211-1 to 211-4). Next, multimedia data such as voice or data is communicated between the terminal unit 225 and the terminal unit 230 (Step 214). In the Step 214, a telephone communication is possible using an SIP procedure or H323 procedure. Completing the communication of multimedia data, call control messages REL, RLC are communicated between the telephone management server 227 and the telephone management server 228, to release the communication path based on the line connection control protocol (Steps 211-5, 211-6). Next, a FIN packet for releasing the TCP communication path is sent from the telephone management server 227 to the telephone management server 228 (Step 210-3). The telephone management server 228 sends back an ACK packet (Step 210-4), to release the TCP communication path set up between the telephone management server 227 and the telephone management server 228.

Incidentally, by commencing to send a FIN packet from the telephone management server 228 to the telephone management server 227, it is possible to release the TCP communication path at between the telephone management server 227 and the telephone management server 228.

Figure 32:
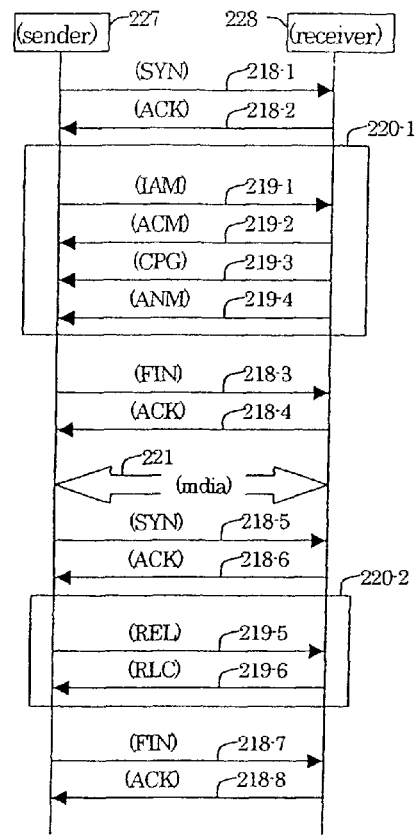
FIG. 32 is a figure explaining the application method of TCP technique, in the second embodiment of the present invention.

The second method includes, as shown in FIG. 32, transmission of a "SYN" packet for establishing a TCP communication channel from the telephone management server 227 to the telephone management server 228 (Step 218-1 in FIG. 32). An "ACK" packet is sent back from the telephone management server 228 to the telephone management server 227 (Step 218-2), to communicate a series of call-control messages of IAM, ACM, CPG and ANM for establishing a communication path based on a line connection control protocol at between the telephone management server 227 and the telephone management server 228 (Steps 219-1 to 219-4, i.e. Step 220-1). Then, a FIN packet for TCP communication path release is sent from the sender 227 to the recipient 228 (Step 218-3). The recipient 228 sends back an ACK packet (Step 218-4). Then, an operation is entered to communicate voice or data between the terminal unit 225 and the terminal unit 230 (Step 221). In the Step 214, a telephone communication is possible using an SIP procedure or H323 procedure. When multimedia data communication is ended, a "SYN" packet for TCP communication path establishment is sent from the telephone management server 227 to the telephone management server 228 (Step 218-5 in FIG. 32). An "ACK" packet is sent from the telephone management server 228 back to the telephone management server 227 (Step 218-6). Then, call-control messages REL and RLC for releasing the communication path based on the line connection control protocol are communicated between the telephone management server 227 and the telephone management server 228 (Steps 219-5, 219-6). A FIN packet is sent from the telephone management server 227 to the telephone management server 228 (Step 218-7). The telephone management server 227 sends back an ACK packet (Step 218-8), to release the TCP communication path set up between the telephone management server 227 and the telephone management server 228.

<<Summary-1>>

A TCP communication path is previously established between a source-sided telephone management server and a destination-sided telephone management server. After establishing media communication path by means of communicating line connection control messages IAM, ACM, CPG, ANM data and the like are communicated between the two terminal units. Line connection control messages REL and RLC are communicated between the source-sided telephone management server and the destination-sided telephone management server to release the media communication path, thus releasing the TCP communication path.

Another method includes establishing a TCP communication path between a source-sided telephone management server and a destination-sided telephone management server, to thereafter establish a media communication path communicating line connection control messages IAM, ACM, CPG and ANM, and release the TCP communication path. Between the two terminal units, multimedia data and the like are communicated. When one of the terminal units ends the communication of multimedia data, a new TCP communication path is established between the source-sided telephone management server and the destination-sided telephone management server. Thereafter, line connection control messages REL and RLC are communicated to release the media communication path for terminal-to-terminal communicating, thereby releasing the new TCP communication path.

Detail explanation is made on another method for communicating call control messages IAM, ACM, CPG, ANM, REL and RLC for terminal-to-terminal communicating connection control after setting up a TCP communication path, with reference to FIG. 34. When a connection request is sent from the terminal unit 225 to the media router 226 (Step 240), the media router 226 makes sending back (Step 241). The media router 225 when sending a connection request, an IP packet containing a transmission request reaches the telephone management server 227 via the network node unit 231 (Step 242). Herein, the IP packet contains a telephone number of a calling terminal unit 225 and a called terminal unit 230.

The telephone management server 227 forms a SYN packet in order to establish a TCP communication path and sends it to the telephone management server 228 via the control line 235 (Step 243). The telephone management server 228 sends back an ACK packet (Step 244). The telephone management server 228 forms an initial address message IAM in a way similar to the disclosure in a tenth embodiment (FIG. 164, etc.) of the prior patent application, and sends the initial address message IAM to the telephone management server 228 (Step 245). The telephone management server 228, receiving the initial address message IAM, sends a notification of call to the media router 229 (Step 246). The media router 229 sends a notification of incoming call to the terminal unit 230 (Step 247) and sends back an availability of the terminal unit 230 to the telephone management server 228 (Step 248). The telephone management server 228 forms an address completion message ACM in a way similar to the disclosure in the prior patent, and sends the address completion message ACM to the telephone management server 227 (Step 249). The telephone management server 227 sends an availability of the terminal unit 230 to the media router 226 (Step 250). The terminal unit 230, upon knowing a connection request by the Step 247, sends back a confirmation of request (Step 251). The terminal unit 230, furthermore, causes a ring-back tone and sends back a call start to the media router 229 (Step 252). The media router 229 notifies a call notification to the telephone management server 228 (Step 253). The telephone management server 228 forms a call progress message CPG in a way similar to the disclosure in the prior patent, and sends the call progress message CPG to the telephone management server 227 (Step 254). The telephone management server 227 notifies the media router 226 of an in-calling (Step 255). The media router 226 notifies the terminal unit of an in-calling (Step 256). The terminal 230, upon knowing a response by a terminal user, sends a notification of answer to the media router 229 (Step 257). The media router 229 sends the answer back to the terminal unit 230 (Step 258) and notifies it to the telephone management server 228 (Step 259). The telephone management server 228 forms an answer message ANM in a way similar to the disclosure in the prior patent, and sends the answer message ANM to the telephone management server 227 (Step 260). The telephone management server 227 notifies the media router 226 of an answer from the terminal unit 230 (Step 261). The media router 226 notifies the terminal unit 225 of the answer from the terminal unit 230 (Step 262). The terminal unit 225 sends a confirmation of answer back to the media router 226 (Step 263).

Through the above procedure, a communication path is established between the terminal unit 225 and the terminal unit 230. Between the both terminal units, communication is possible with digitalized multimedia data such as voice, text data, video data and the like (Step 264). Next, the terminal 225 issues a request for disconnecting a communication path of between the terminal unit 225 and the terminal 230 (Step 265). The media router 226 responds (Step 266), and the terminal unit confirms an answer (Step 267). Furthermore, the media router 226 notifies the telephone management server 227 of a request for disconnecting the communication path (Step 268). The telephone management server 227 replies (Step 269). The telephone management server 227 forms a release message REL in a way similar to the disclosure in the prior patent application, and sends the release message REL to the telephone management server 228 (Step 270). The telephone management server 228 sends back a release completion message RLC (Step 271). Then, the telephone management server 228 notifies the media router 229 of a notification of releasing the communication path (Step 272). The media router 229 replies (Step 274) and further notifies the terminal unit 230 of a call disconnection (Step 273). The terminal unit 230 sends back a confirmation of release (Step 275). The media router 229 sends a release completion to the terminal unit 230 (Step 276). The telephone management server 227, upon receiving a release completion message RLC by the Step 271, sends a FIN packet to the telephone management server 228 in order to release the TCP communication path established between the telephone management server 227 and the telephone management server 228 established in the Step 244 (Step 277). The telephone management server 228 sends an ACK packet back to the telephone management server 227 in order for confirmation (Step 278). The above releases the communication path between the terminal unit 225 and the terminal unit 230. It is possible that other messages of the common channel signaling system are introduced to this embodiment, examples are SUS message for suspending temporarily circuit connection control, and RES message for restarting the suspending.

The above initial address message IAM, address completion message ACM, call progress message CPG, answer message ANM, release message REL and release completion message RLC are stored in a form of a TCP packet 280 (see FIG. 35), respectively. In an extension of TCP header, can be inserted message segmentation "MSG" of the initial address message IAM, address completion message ACM, call progress message CPG, answer message ANM, release message REL and release completion message RLC disclosed in the prior patent application. However, the message segmentation "MSG" may be inserted in the TCP payload section.

Note that, in the procedure, it is possible to omit any of the Steps 250, 269 and 274 involved by the telephone management server 227 or 228. Furthermore, in the procedure, it is possible to omit any of the steps 241, 251, 258, 263, 266, 267, 275 and 276 involved by the telephone set 225 or 230.

<<Kind of Terminal Unit>>

In the above embodiment, in the case that the terminal unit 225 and the terminal unit 230 are telephone sets, a telephone communication is allowed by using a terminal-to-terminal communication path to be established by the foregoing method. Meanwhile, where the terminal unit 225 is a TV transmitter and the terminal unit 230 is a TV receiver, voice image communication using TV communication function is allowed by using a terminal-to-terminal communication path to be established by the foregoing method. Where the terminal units 225 and 230 are computers having data communication function, data communication through computer communication is allowed by using a terminal-to-terminal path to be established by the foregoing method.

<<Summary-2>>

This embodiment is the method for implementing a line connection control protocol in a level above a TCP layer (method for implementing a line connection control protocol after setting up a TCP communication path). The IP network includes two or more telephone management servers. The media router outside IP network is connected with a terminal unit having a function to transmit and receive digital media. An IP packet, for call setting, containing a calling telephone number and called telephone number is sent from the media router. The source-sided telephone management server forms a SYN packet to establish a TCP communication path and sends it to the destination-sided telephone management server via a control line. The destination-sided telephone management server sends back an ACK package responding with confirmation. The calling telephone management server forms an initial address message containing call setting and sends a formed initial address message to the called telephone management server. The called telephone management server sends a call setting to the called media router. Meanwhile, the called media router sends the call setting to the called terminal unit. The called telephone management server forms an address completion message and sends it to the calling telephone management server. The called telephone management server, upon receiving a report on an in-calling from the called terminal unit, forms a call progress message. The call progress message reaches the calling telephone management server. The calling telephone management server sends an in-calling report of the called terminal unit to the source-sided media router. The called telephone management server, upon receiving a response from the called terminal unit, forms an answer message. The answer message reaches the calling telephone management server. The calling telephone management server stops a ring-back tone on the called terminal unit. Thus, the calling terminal unit and the called terminal unit are allowed for terminal-to-terminal communication to send and receive digital media by way of the calling and called media routers. Then, a terminal-to-terminal communication disconnect request is sent from the calling or called media router to the telephone management server. A release is sent from the telephone management server to the telephone management server at the other end. A disconnect instruction is sent from the other-end telephone management server to the other-end media router. A release completion is notified from the other-end telephone management server to the telephone management server. A disconnection completion is sent to the media router. In order to release the TCP communication path established between the source-sided telephone management server and the destination-sided telephone management server, a FIN packet is sent to the destination-sided telephone management server. The destination-sided telephone management server sends an ACK packet to the source-sided telephone management server in order for conformation. In this manner, the connection and release of communication are carried out between the two terminal units.

Figure 36:
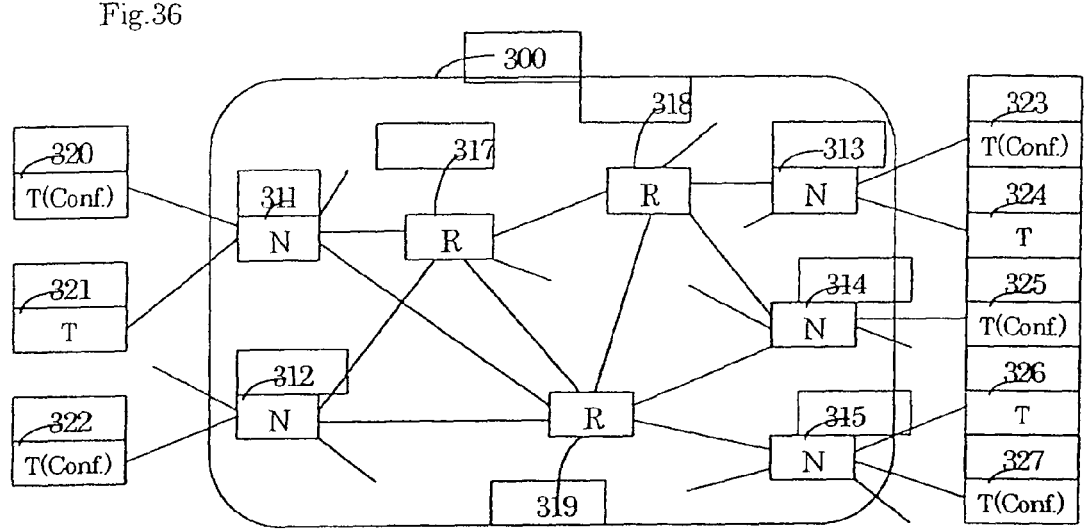
FIG. 36 is a figure explaining an IP network applied with a multicast technique, in a third embodiment of the present invention.

3. Embodiment 3 for TV Conference Communication Using IP-Network Multicast Function In FIG. 36, numeral 300 is an IP network, numerals 311 to 315 are network node units, numerals 317 to 319 are routers, and numerals 320 to 327 are terminal units having a function to send and receive IP packets. The network node units and the routers are connected directly by communication lines or indirectly through the routers. The terminal unit is connected to any of the network node units via a communication line. The terminal unit is given with an IP address. The network node units are to be set with an address management table on the same principle as that described, e.g. in FIGS. 293 to 295 of Embodiment 17 for multicast communication in the prior patent application. Namely, a multicast IP packet can be encapsulated to form an internal packet, and the internal packet can be decapsulated to restore a multicast IP packet.

The IP network 300 in its function is summarized, as follows. The IP network 300 includes two or more network node units. An external IP packet is inputted at a logic terminal at an end of a communication line. The external IP packet turns into an internal packet under the control of an address management table of within the source-sided network node unit. The internal packet is transferred in the IP network to reach a destination-sided network node unit. The internal packet is restored as an external IP packet under the control of an address management table of within the destination-sided network node unit.

The terminal units 320 to 327 are further provided with the function to send and receive voice and moving images so that the voice and moving images for TV conference can be sent and received by communicating IP packets between the terminal units. In this embodiment, the terminal unit 320, the terminal unit 322, the terminal unit 323, the terminal unit 325 and the terminal unit 327 operate to realize a TV conference transmitting and receiving the voice and moving images. In particular, the terminal unit 320, the terminal unit 323 and the terminal unit 327 serve as recipients and origins of voice and moving images at the same time.

Explaining with reference to FIGS. 37 and 40 to 42, in order to make the terminal unit 320 as an origin, a multicast internal address IM1 is set in the network node units 311 to 315 and routers 317 to 319. When an IP packet 340 having an external destination address M1 is sent from the terminal unit 320, the IP packet 340 reaches the network node unit 311 and is transferred to the routers 317 and 319 according to an address management table 331 of within the network node unit 311. The IP packet 341-1, reaching the router 317, is transferred to the network node unit 312 and router 318 by the use of a route table 337. The IP packet transferred to the network node unit 312 is transferred to the terminal unit 322 by the use of an address management table 332. The IP packet 341-3, reaching the router 318, is transferred to the network node units 313 and 314. The IP packet 341-4, reaching the network node unit 313, is decapsulated by the use of an address management table 333, and a restored IP packet 342-1 reaches the terminal unit 323. Meanwhile, the IP packet 341-5 reaching the network node unit 314 is decapsulated by the use of an address management table 334, and a restored IP packet 342-2 reaches the terminal unit 325. On the other hand, the IP packet 343-2, forwarded from the network node unit 311 and reached the router 319, turns into an IP packet 341-6 by the use of a route table 339. This is transferred over the communication line 344-3 to passes the network node unit 315, and applied by an address management table 335. A restored IP packet 342-3 reaches the terminal unit 327.

Figure 38:
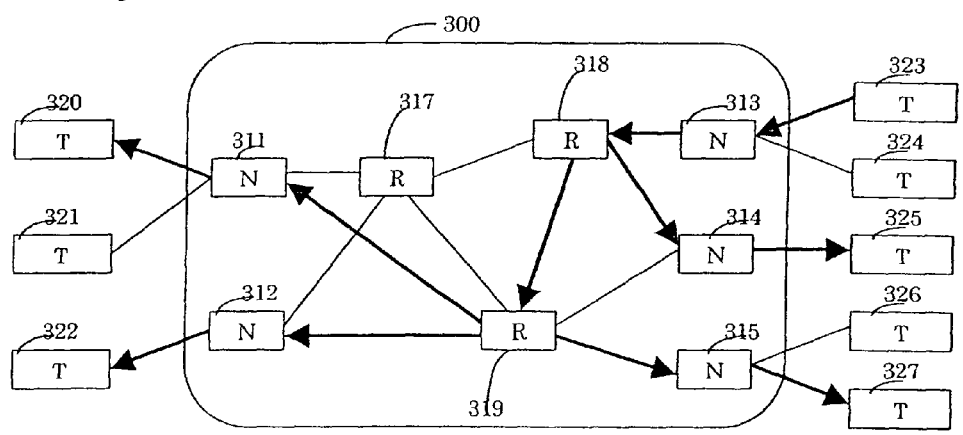
FIG. 38 is a figure explaining the multicast technique, in the third embodiment of the present invention.

Next explaining with reference to FIG. 38, in order to make the terminal unit 323 as an origin, a multicast internal address IM2 is set in the network node units 311 to 315 and routers 317 to 319. When an IP packet having an external destination address M2 is sent from the terminal unit 323, the IP packet reaches the network node unit 313, where the address management table 333 (see FIG. 42) of the network node unit 313 is used to form an internal packet. The internal packet is transferred to the router 318. Next, a route table (see FIG. 41) is used in the router 318 so that the internal packet reaches the terminal unit 325 via the network node unit 314. The other one IP packet reaches the terminal unit 327 by way of the router 319 and network node unit 315. The still other one IP packet is copied at the router 319, one of which reaches the terminal 320 via the network node unit 311 and the other reaches the terminal unit 322 via the network node unit 312.

Figure 39:
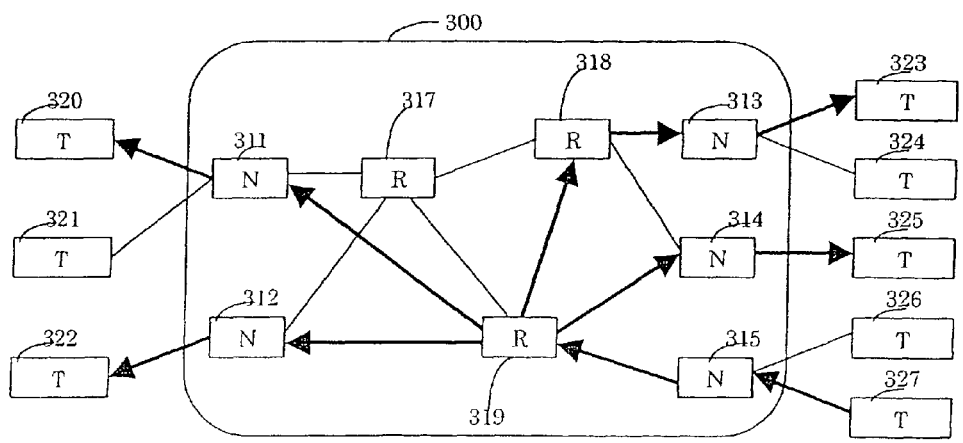
FIG. 39 is a figure explaining the multicast technique, in the third embodiment of the present invention.
Figure 40:
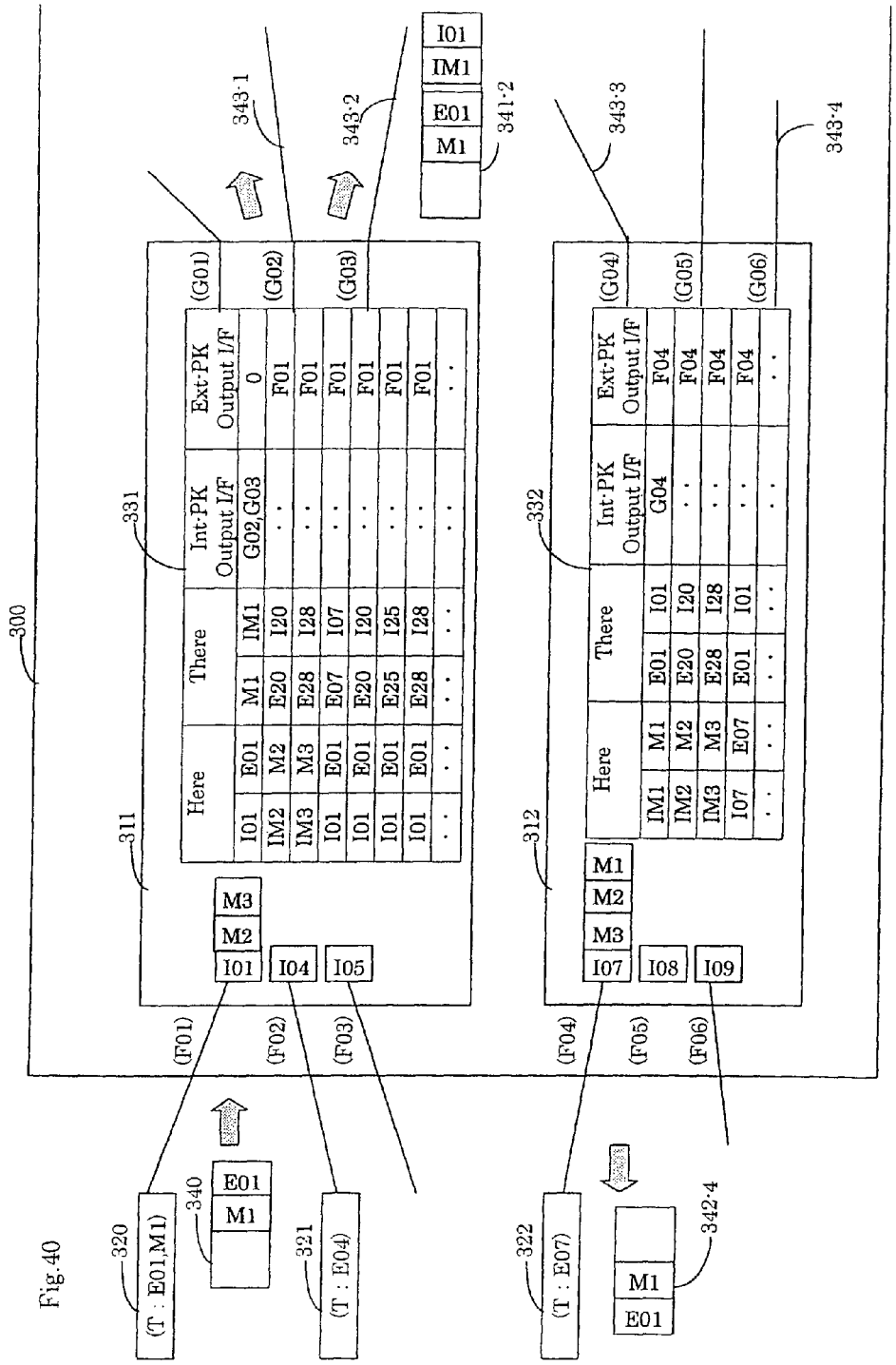
FIG. 40 is a figure explaining a manner of multicast packet transfer by the multicast technique, in the third embodiment of the present invention.
Figure 41:
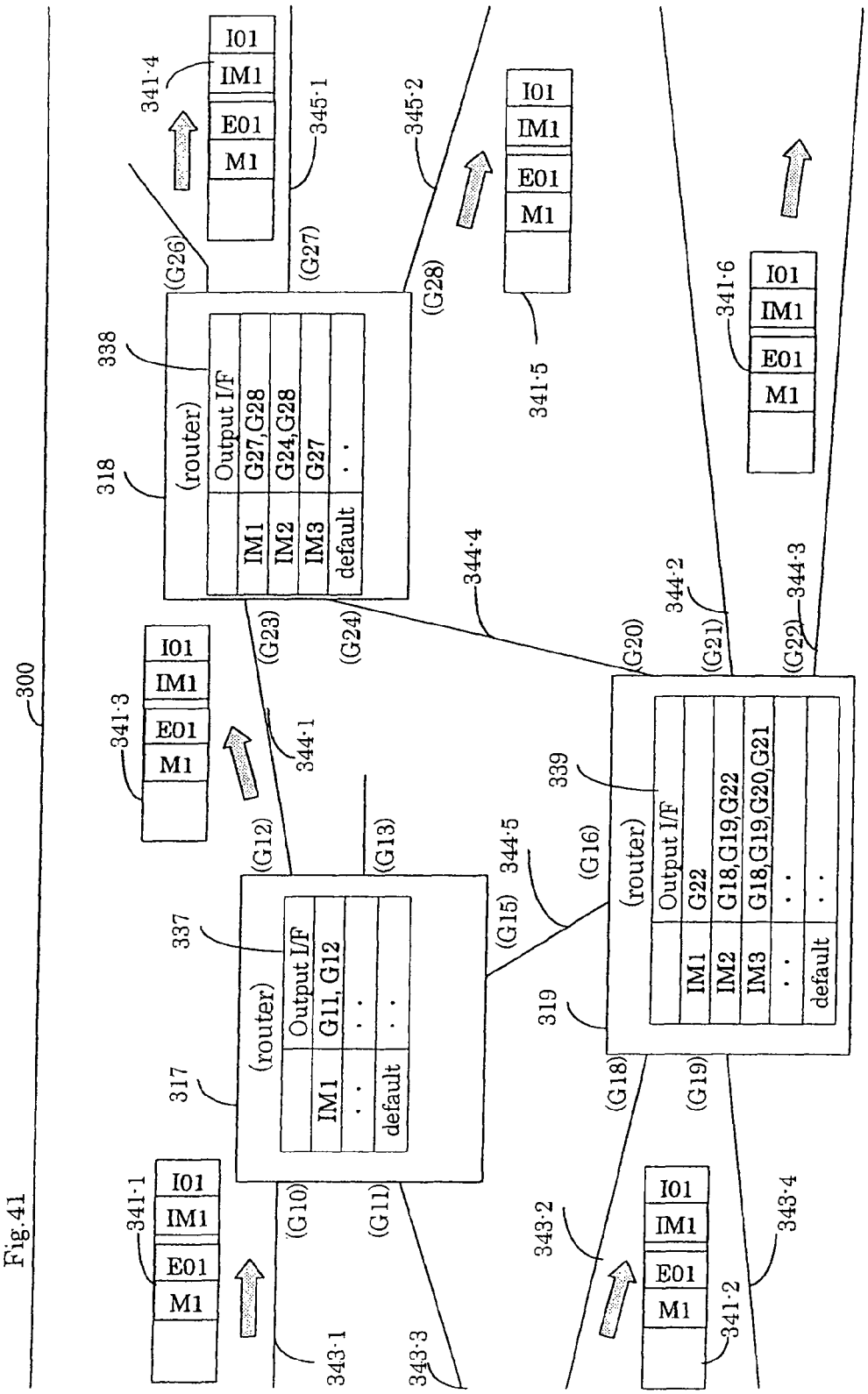
FIG. 41 is a figure explaining a manner of multicast packet transfer by the multicast technique, in the third embodiment of the present invention.
Figure 42:
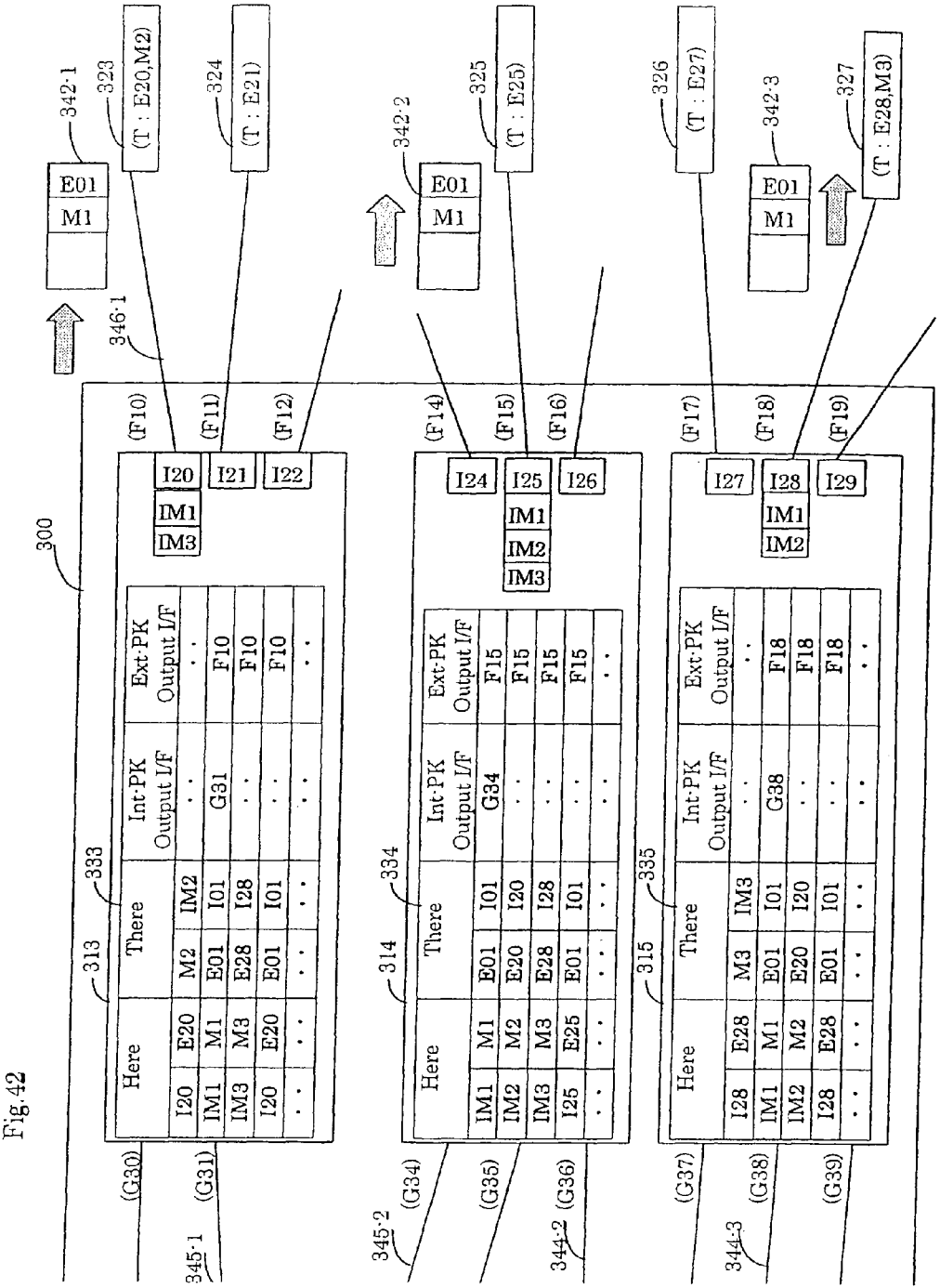
FIG. 42 is a figure explaining a manner of multicast packet transfer by the multicast technique, in the third embodiment of the present invention.

Explaining furthermore with reference to FIG. 39, in order to make the terminal unit 327 as an origin, a multicast internal address IM3 is set in the network node units 311 to 315 and routers 317 to 319. When an IP packet having an external destination address M3 is sent from the terminal unit 327, the IP packet reaches the network node unit 315. This reaches the terminal unit 320, the terminal unit 322, the terminal unit 323 and the terminal unit 325 by way of the routers and network node units similarly to the above. Note that the terminal units 322 and 325 are examples that receive voice and moving image data but do not transmit them.

<<Switching of Transmittal Right>>

The terminal unit 320 is allowed for information exchange with the terminal unit 322, the terminal unit 323, the terminal unit 325 and the terminal unit 327 by sending and receiving IP packets. The operation will be explained in the below.

There are settings of a record "I01, E01, E07, I07, ..." on line 4 from the top of the address management table 331 (see FIG. 40) in the network node unit 311 and a record "I07, E07, E01, I01, ..." on line 4 from the top of the address management table 332 in the network node unit 312. Consequently, the terminal unit 320 having an IP address E01 and the terminal unit 322 having an IP address E07 are allowed to send and receive an IP packet. Similarly, there are settings of a record "I01, E01, E20, I20, ..." on line 5 from the top of the address management table 331 and a record "I20, E20, E01, I01, ..." in the address management table 333. Accordingly, the terminal units 320 and 323 can send and receive an IP packet.

Similarly, there are settings of a record "I01, E01, E25, I25, ..." on line 6 from the top of the address management table 331 and a record "I25, E25, E01, I01, ..." in the address management table 334. Consequently, the terminal units 320 and 325 can send and receive an IP packet. Similarly, there are settings of a record "I01, E01, E28, 128, ..." on line 7 from the top of the address management table 331 and a record "I28, E28, E01, I01, ..." in the address management table 335. Accordingly, the terminal units 320 and 328 can send and receive an IP packet. With the above configuration, the terminal unit 320 can communicate IP packets and exchange information with the terminal unit 323 or terminal unit 327, making it possible to switch, for example, a sending terminal unit from the terminal unit 320 to the terminal unit 327. Also, the terminal units 322 and 325 can exchange information with the terminal unit 320.

<<Summary>>

In the network node unit within the IP network, set is an address management table for encapsulating and encapsulating a multicast IP packet. In the router within the IP network, set is a route table used for transferring a multicast IP packet. A sender 1, within the IP network, uses a multicast address M1 to transmit a multimedia data (voice and moving data) for TV conference communication, while recipients in plurality, within the IP network, use the multicast address M1 to receive the multimedia data. Meanwhile, a sender 2, in the IP network, uses a multicast address M2 to transmit a multimedia data, while recipients in plurality, in the IP network, use the multicast address M2 to receive the multimedia data. By the address management table in the network node unit, the IP packet is encapsulated and transferred within the IP network to be decapsulated in a terminal-unit network node unit, thus effecting communication for TV conference using an IP packet. The terminal unit 320 exchanges the IP packet with other terminal units, whereby it can exchange information for switching of transmittal right, etc. Three or more persons can attend the TV conference.

4. Embodiment 4 Showing a Configuration Method of Relay Gateway Connecting between IP Network and PSTN This embodiment shows a detailed-example of a relay gateway 106 (see FIG. 17) of Embodiment 1. This corresponds to a detail of the relay gateway (FIG. 197, etc.) in Embodiment 13 of the prior patent application. Explanation will be made with reference to FIG. 43.

Numeral 400 is a relay gateway, numeral 401 is a relay control section, numeral 402 is a voice control section, numeral 403 is an information line, numeral 404 is a control communication line on the common channel signaling system on a PSTN side, numeral 405 is a control IP communication line, numeral 406 is a voice communication line on the PSTN side, numeral 407 is a voice IP communication line, numeral 408 is an address connection table, numeral 409 is a gateway address management table, numeral 410 is a signaling point address management table and numeral 411 is a media path connection table. The relay gateway 400 corresponds to the relay gateway 106 shown in FIG. 17 on Embodiment 1, while the relay control section 401 to the relay control section 107, and the voice control section 402 to the voice control section 108. The relay gateway, relay control section, the voice control section, the information line, the PSTN-sided control communication line, the control IP communication line, the PSTN-sided voice communication line, the voice IP communication line, the address connection table, the gateway address management table, the signaling point address management table and the media path connection table shown at 400 to 411 are disclosed in Embodiments 13 and 14 of the prior patent application.

Numeral 415 (FIG. 43) is a gateway MIB control section, numeral 416 is a line connection control section, numeral 417 is a circuit identification code management table, numeral 418 is a control IP communication line interface, numeral 419 is a PSTN control line interface, numeral 420 is a voice-call control section, numeral 421 is a speech talk path section, numeral 422 is a media path control section, numeral 423 is a voice information control section, numeral 424 is an MIB control section, numerals 425 to 426 are channel state information sections, numeral 428 is a channel MIB control section, numeral 429 is a channel information management, numeral 430 is a voice IP communication line interface, numeral 431 is a converter section and numeral 432 is a PSTN voice communication line interface.

The elements of the relay gateway 106 (FIG. 17) of Embodiment 1 can be placed in correspondence to the elements of the relay gateway 400 (FIG. 43) of this embodiment, as follows. Namely, the relay control section 107 corresponds to the relay control section 401, the voice control section 108 is to the voice control section 402, the control communication line 112 in the IP transfer network 100 is to the control IP communication line 405, the voice communication line 114-1 in the IP transfer network 100 is to the voice IP communication line 407, the control communication line 131 on the common channel signaling system on the mobile communication network 101 is to the control communication line 404 on the common channel signaling system on the PSTN side, and the voice communication line 133 on a side of the mobile communication network 101 is to the voice communication line 406 on the common channel signaling system on the PSTN side. Herein, it is known that there is no substantial difference between the NNI on a common channel signaling system in the mobile communication network and the NNI on the common channel signaling system in the PSTN. Similarly, the gateway 155 (FIG. 28) can be placed in correspondence to the relay gateway 400 (FIG. 43) of this embodiment.

The gateway MIB control section 415 manages the operation status of the gateway overall. The line connection control section 416 manages whether call control is in normal operation. The circuit identification code management table 417 holds a circuit identification code for each call within the IP network. The control IP communication line interface 418 manages IP packet transmission and reception. The PSTN control line interface 419 manages signal unit transmission and reception to and from the PSTN. The voice-call control section 420 (FIG. 43) manages voice-call transfer paths and speech channel resources. The voice speech path 421 is a voice speech section. The media path control section 422 manages a media path connection table. The call information control section 423 records call information. The MIB control section 424 manages the operation status of the voice-call control section. The channel-state information sections 425 to 426 manage on the use and in occupation status of a voice channel within the voice PSTN communication line 406. Meanwhile, the channel MIB control section 428 grasps a voice channel resource state within the PSTN voice communication line 406. The channel information control 429 monitors a channel state within the voice speech path block. The voice IP communication line interface 430 transmits and receives the IP packets. The converter section 431 performs conversion between the digital voice in an IP packet and the voice block transferred in the PSTN communication circuit (code conversion or frame form conversion) and fluctuation control. The voice PSTN communication line interface 432 transmits and receives a voice frame transferred on the PSTN line.

<<Variation>>

Figure 44:
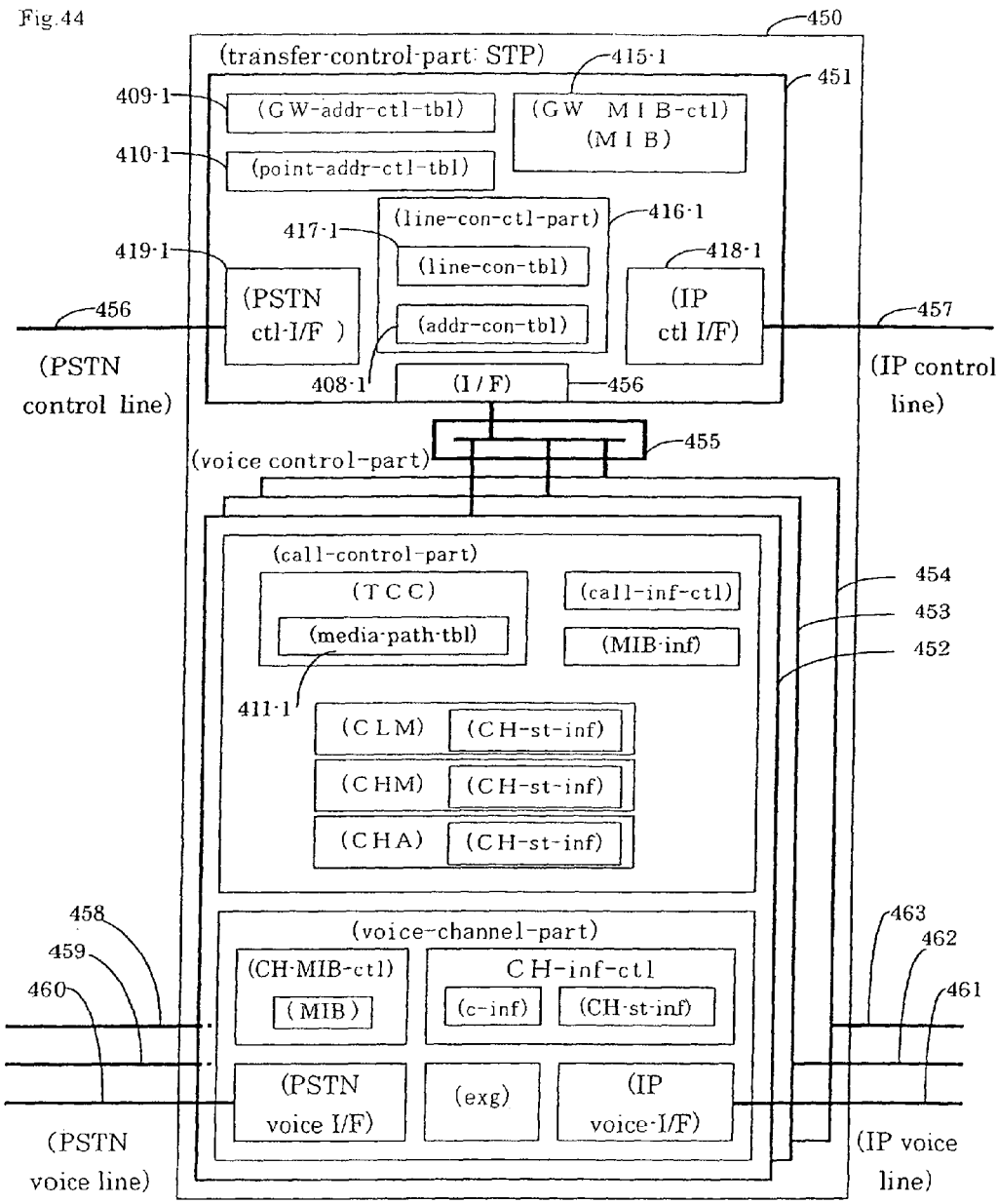
FIG. 44 is a figure explaining a relay gateway configuration, in the fourth embodiment of the present invention.

With reference to FIG. 44, explanation is made on another embodiment of the relay gateway. Numeral 450 is a relay gateway, numeral 451 is a relay control section, numerals 452 to 454 are a voice control sections, numeral 455 is an information line, numeral 456 is a control communication line on the common channel signaling system on the PSTN side, numeral 457 is a control IP communication line, numerals 458 to 460 are voice communication lines on the PSTN side, numerals 461 to 463 are voice IP communication lines.

The elements of the relay gateway 106 (FIG. 17) of the first embodiment can be placed in correspondence to the elements of the relay gateway 450 (FIG. 44), as follows. Namely, the relay control section 107 corresponds to the relay control section 451, the voice control section 108 is to the voice control sections 452 to 454, the control communication line 112 is to the control IP communication line 457, the voice communication line 114-1 is to the voice IP communication lines 461 to 463, the control communication line 131 is to the control communication line 456 at PSTN side, and the voice communication line 133 is to the voice communication lines 458 to 460 at PSTN side.

Figure 43:
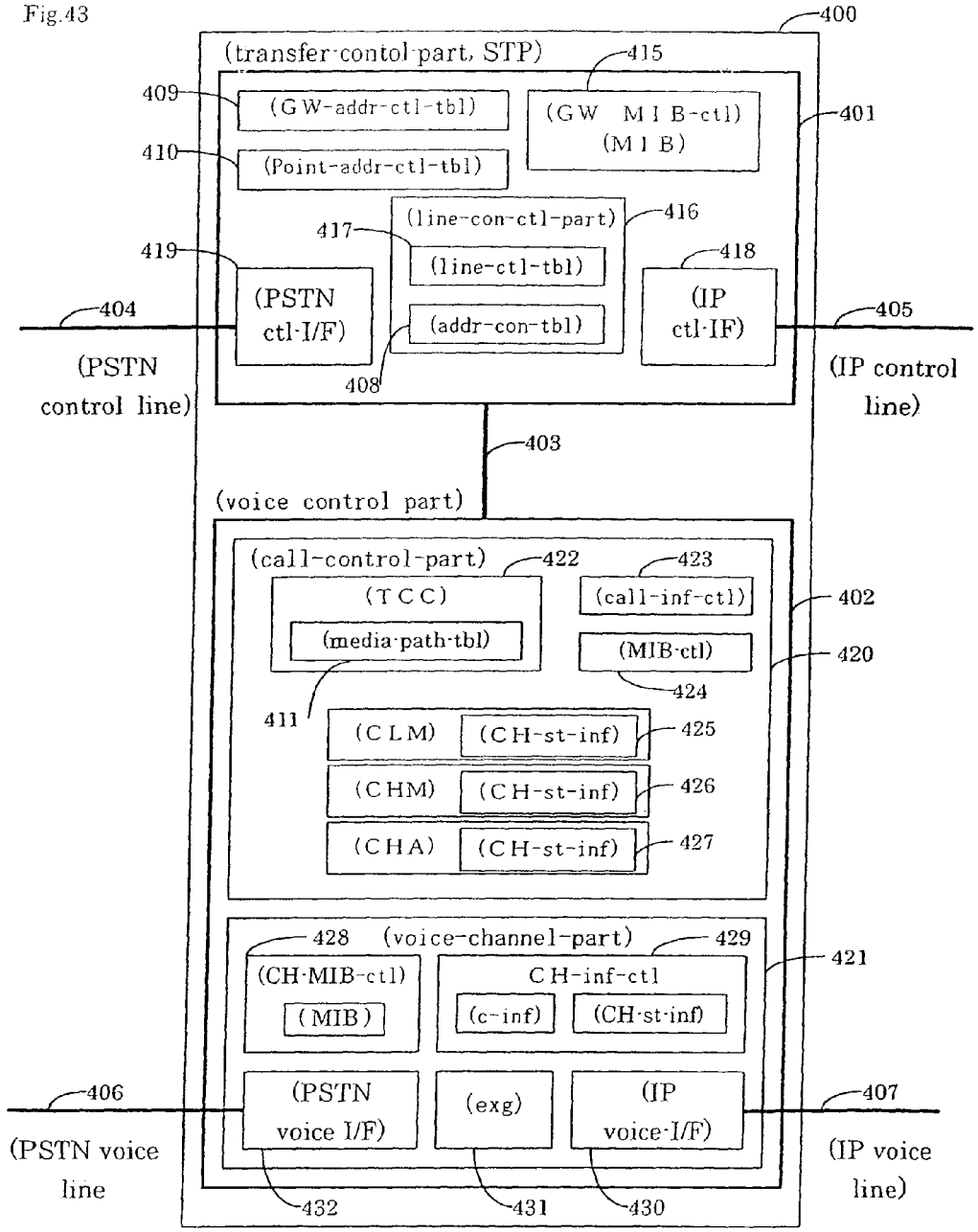
FIG. 43 is a figure explaining a relay gateway configuration, in a fourth embodiment of the present invention.

The relay control section 451 includes the same function as the relay control section 401 of FIG. 43, and can exchange information with any of the voice control sections 452 to 454 via the information line 455. The voice control sections 452 to 454, in any, have the same function as the voice control section 402 of FIG. 43, and can be mounted on a plurality of physically separated boards. The information line 455 is configured, for example, by an Ethernet branch line, and realized under conflict control on a CSMA/CD scheme. The voice communication lines 458 to 460 can use, for example, an ISDN logic communication line ("B+23D" or the like). The voice IP communication lines 461 to 463 can be connected to input/output circuit terminals of different routers.

<<Summary>>

This is an embodiment of the relay gateway of the first embodiment (106 in FIG. 17) or the like. The relay gateway 400 (FIG. 43) includes a communication line having an NNI interface of a PSTN or mobile communication network based on the common channel signaling system, a communication line having an NNI interface based on the common channel signaling system within the IP network, a relay control section and a voice control section, and used to implement a terminal-to-terminal communication connection control method using an IP network disclosed in the first embodiment. The relay gateway 450 (FIG. 44) has voice control sections to be mounted separately on a plurality of boards 452, 453, 454. The communication line having an NNI interface can be divided with a communication line having a control line interface and a voice communication line.

5. Embodiment 5 for Setting Entire or Part of External Addresses in Internal Packet Address Area Explanation will be made on a terminal-to-terminal communication connection control method of forming an internal packet by setting an entire or part of the external addresses in address area of an internal packet.

Figure 45:
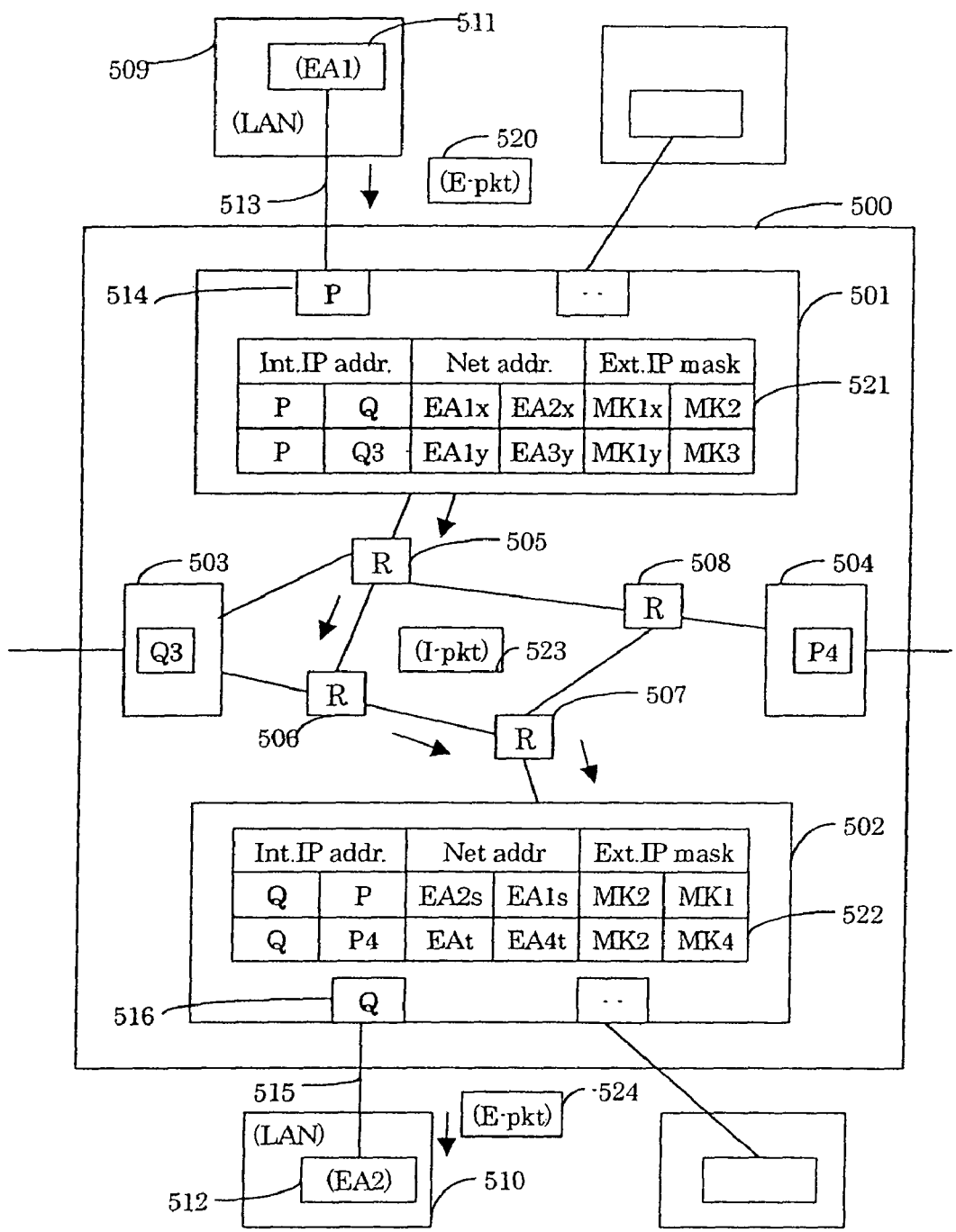
FIG. 45 is a figure explaining a manner of IP packet transfer via an IP network, in a fifth embodiment of the present invention.

In FIG. 45, Numeral 500 is an IP network, numerals 501 to 504 are network node units, numerals 505 to 508 are routers, numerals 509 and 510 are LANs, and numerals 511 and 512 are terminal units within the LAN. The terminal unit 511 is given with an IP address EA1 while the terminal-unit 512 is with an IP address EA2. The network node units and the routers are connected directly by communication lines or indirectly by way of the routers. The logic terminal 514 at a connection point between the logic communication line 513 and the network node unit 501 is given with an internal address P, while the logic terminal 516 at a connection point between the logic communication line 515 and the network node unit 502 is given with an internal address Q. When an IP packet 520 having a source address EA1 and destination address EA2, transmitted from the terminal unit 511, reaches the network node unit 501, it turns into an internal packet 523 by the use of an internal record of an address management table 521 on a method hereinafter referred. The internal packet 523 is forwarded from the network node unit 501 to reach the network node unit 502 by way of the communication line and routers 505, 506, 507. From the internal packet 523 reaching the network node unit 502, an external packet 524 is restored. The external packet 524 reaches the terminal unit 512 having an IP address EA2 via the logic communication line 515. The external packet 524 has the same content as the external packet 520.

Next, explanation is made on a method to form an internal packet from an external packet to restore an external packet from the internal packet. This embodiment explains that the external packet is an IP packet defined under RFC791 (IPv4: packet having an address length of 32 bits) and the internal packet is an IP packet defined under RFC1332 (IPv6: packet having an address length of 128 bits). However, the invention shown in this embodiment is unchanged in its substance if there is difference in packet type or address length. For example, the invention can be carried out by adopting IPv6 as an external IP packet. The external IP packet 520 (FIG. 45) examines as to whether there exists a record of the internal address P given in the input logic terminal 514 as an internal record of the address management table 521. In the present case, there exist a record on the first line and record on the second line in the address management table 521. Then, AND-operation (logical product) is made on the destination IP address EA2 of the input external IP packet 520 and the destination IP address mask MK2 on the first-lined record. It is examined whether the result agrees with a destination address EA2x described in the first-lined record, according to the below Equation (1).

$$\text{IF (``EA2'' AND ``MK2''=``EA2x'')} \quad (1)$$

Similarly, inspection is made on the second-lined record according to the below Equation (2).

$$\text{IF (``EA2'' AND ``MK3''=``EA3y'')} \quad (2)$$

In the present case, the above Equation (1) is held.

Next, AND-operation is made on the source IP address EA1 of the input external IP packet 520 and the source IP address mask MK1x on the first-lined record. It is examined whether the result agrees with a destination address EA1x existing in the first-lined record, according to the below Equation (3).

$$\text{IF (``EA1'' AND ``MK1x''=``EA1x'')} \quad (3)$$

In the present case, the above Equation (3) is held.

From the fact that the Equations (1) and (3) are held on the first-lined record, selected is a destination internal address Q described in the first-lined record. In this manner, fixed are the internal addresses P and Q for forming an internal packet. Incidentally, where comparing between external addresses EA2 and EA1 in their parts, it is satisfactory to provide bit "1" in a range to be compared of the masks MK2 and MK1x and bit "0" in the range excluded from the comparison. As hereinafter referred, when setting an external address in a part domain of an internal address, an internal address area for setting an external address can be previously omitted from the record of the address management table 521.

Figure 46:
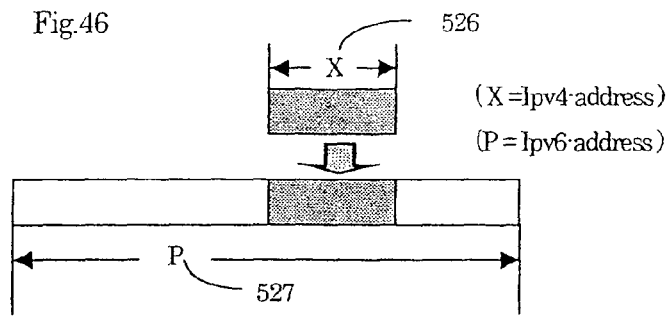
FIG. 46 is a figure explaining a correspondence between a 28-bit length address and a 128-bit length address, in the fifth embodiment of the present invention.
Figure 47:
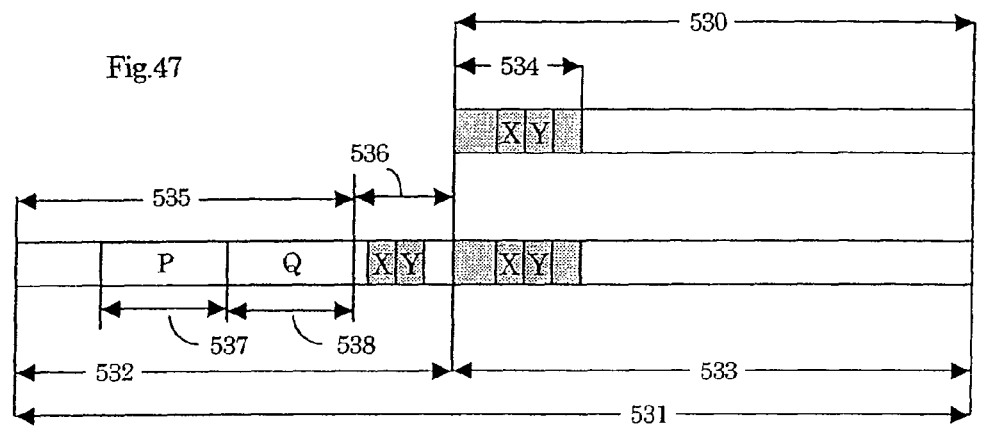
FIG. 47 is a figure explaining a relationship between an external IP packet and an internal packet, in the fifth embodiment of the present invention.
Figure 48:
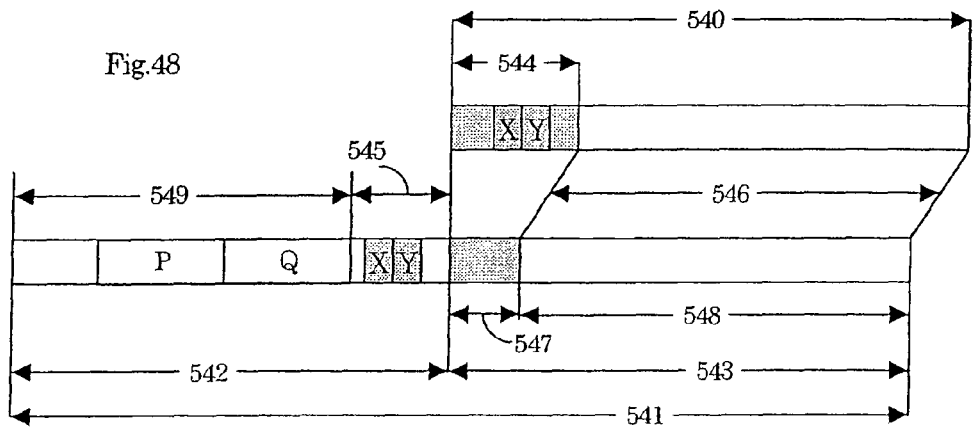
FIG. 48 is a figure explaining a relationship between an external IP packet and an internal packet, in the fifth embodiment of the present invention.

In FIG. 46, a sign "X" represents an address area 526 having a length of 32 bits, while a sign "P" represents an address area 527 having a length of 128 bits. FIG. 47 represents that an external IP packet 530 is stored in a payload section 533 of an internal packet 531 and further a source address X and destination address Y of an external IP packet 530 is stored in a header extension 536 of the internal packet 531. The header 535 stores an internal source address P(537) and an internal destination address Q(538). In FIG. 48, a payload 546 of an external IP packet 540 is stored in a part 548 of a payload 543 of an internal packet 541, the external IP packet 540 excluding a source address X and destination address Y from its header 544 is stored in a part 547 of the payload 543 of the internal packet 541. Furthermore, the source address X and destination address Y of the external IP packet 540 is stored in a header extension 545 of the internal packet 541. A header 549 stores an internal source address P and internal destination address Q.

Figure 49:
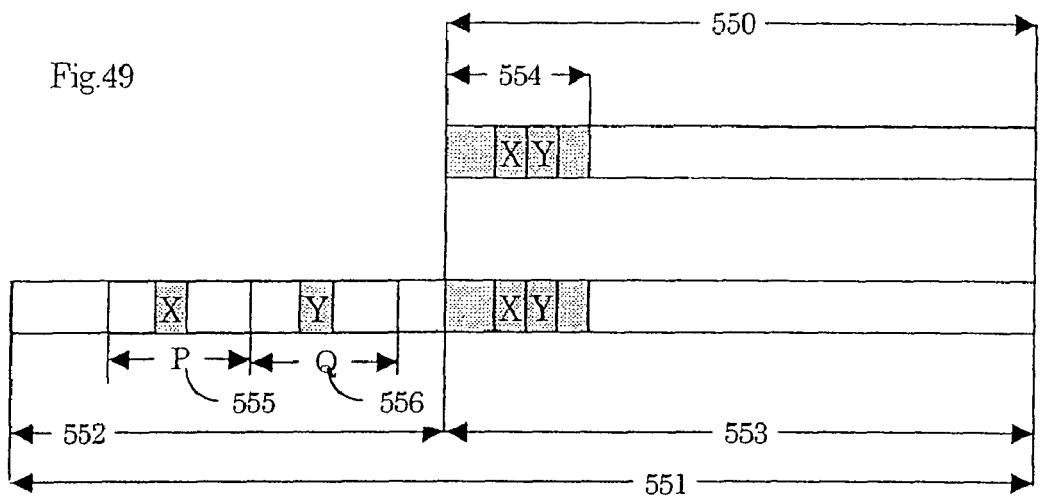
FIG. 49 is a figure explaining a correspondence between a 28-bit length address and a 128-bit length address, in the fifth embodiment of the present invention.
Figure 50:
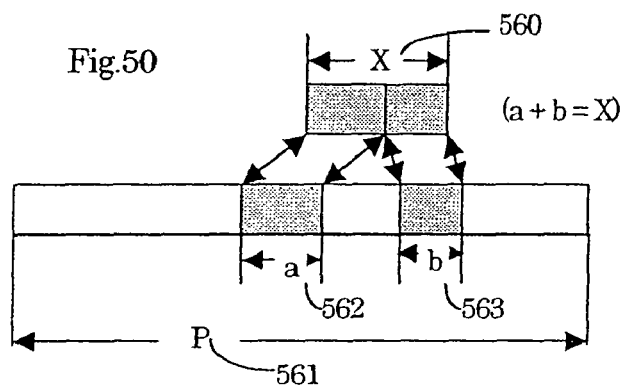
FIG. 50 is a figure explaining a correspondence between a 28-bit length address and a 128-bit length address, in the fifth embodiment of the present invention.
Figure 51:
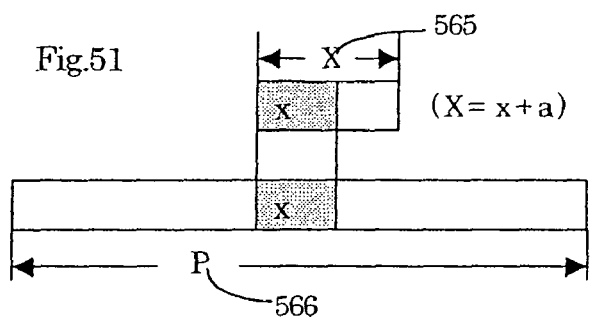
FIG. 51 is a figure explaining a relationship between an external IP packet and an internal packet, in the fifth embodiment of the present invention.

In FIG. 49, an external IP packet 550 is stored in a payload 553 of an internal packet 551, wherein an internal source address P(555) and internal destination address Q(556) is stored in a header 552 of the internal packet 551. This represent that a source address X of the external IP packet 550 is stored in an internal source address P(555) and a destination address Y of the external IP packet 550 is stored in an internal destination address Q(556). In FIG. 50, the sign "X" represents an address area 560 having a length of 32 bits while the sign "P" represents an address area 561 having a length of 128 bits. The address area 560 is divided into two parts "a" and "b", to represent that one part b is stored in a part domain a (562) of the address area 561 while the other part b is stored in a part domain b (563) of the address area 561. Incidentally, the address area 560 may be divided into three or more, to store them within the address area 561 by a way similar to the above. FIG. 51 represents that a part x of an address area 565 is stored within an address area 566.

Figure 52:
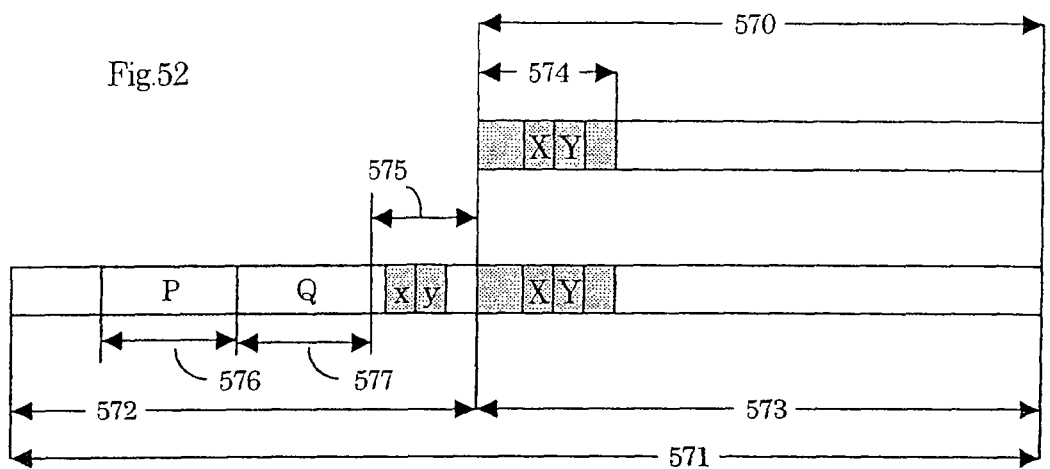
FIG. 52 is a figure explaining a relationship between an external IP packet and an internal packet, in the fifth embodiment of the present invention.

FIG. 52 represents that an external IP packet 570 is stored in a payload 573 of an internal packet 571 and a part x of source address X and part y of destination address Y of the external packet 570 is stored in a header extension domain 575 of the internal packet 571. Within a header 572 are stored internal source address P(576) and an internal destination address Q(577).

Figure 53:
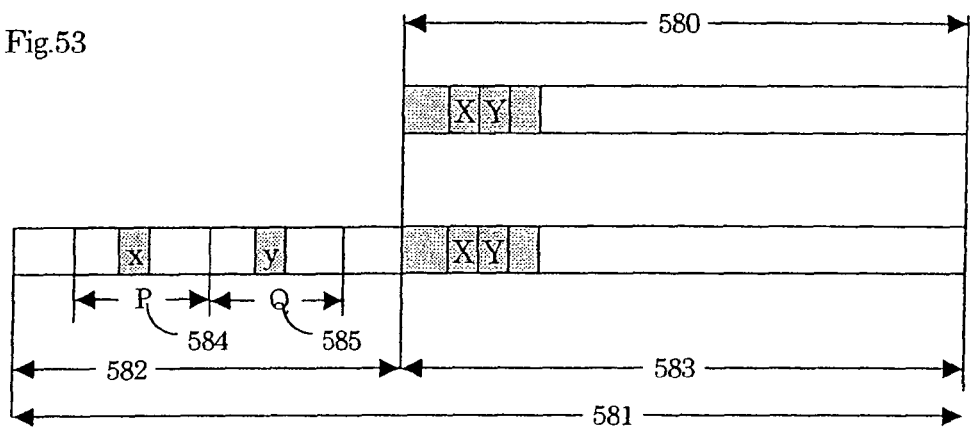
FIG. 53 is a figure explaining a relationship between an external IP packet and an internal packet, in the fifth embodiment of the present invention.

In FIG. 53, an external IP packet 580 is stored in a payload 583 of an internal packet 581, and a source address P and internal destination address Q is stored in a header 582 of the internal packet 581. This represents that a part x of a source address X of the external IP packet 580 is stored in an internal source address P(584) and a part y of a destination address Y of the external IP packet 580 is stored in an internal source address Q(585).

The record in the address management tables 521 and 522 can be set in plurality. By changing the external destination address of the external IP packet, the destination of transfer can be changed for the internal packet.

<<Summary>>

The IP network includes two or more network node units. An external IP packet is converted into an internal packet in an inputted-sided network node unit and transferred within the IP network and an external IP packet is restored from the internal packet in an output-sided network node unit. Under the control of the record in an address management table of within the input-sided network node unit, the entire or a part of an external address being set in the external IP packet is set in an address area of the internal packet. The record in the address management table can be set in plurality. By changing an external destination address of the external IP packet, the destination of transfer can be changed for the internal packet. Also, the address management table includes, at least, terminal-unit-address-related information of an external IP packet, i.e. destination address and address mask, as registration information. The terminal unit, whose terminal-unit address is not registered in the address management table, is excluded from communicating thereby enhancing the information security of IP communication.

6. Embodiment 6 for Setting Entire or Part of External Address into Internal Frame In the fifth embodiment case, there existed, as internal packet addresses, two internal addresses, i.e. a source internal address and a destination internal address. In this embodiment, the internal packet is referred to as an internal frame. The internal frame includes a destination internal address without including a source internal address, in respect of which there is a difference from the fifth embodiment. The external address in the entirety or in a part is set within an internal frame thereby forming an internal frame. The internal frame is in a layer less than a third layer of communication function layer, e.g. corresponding to a communication second layer or second and a half layer. When the address length defined as an internal frame is short, an extension domain or extension header is provided in the frame to store a destination external address and source external address. The internal frame containing only a destination internal address includes an optical frame and an MPLS frame.

Figure 54:
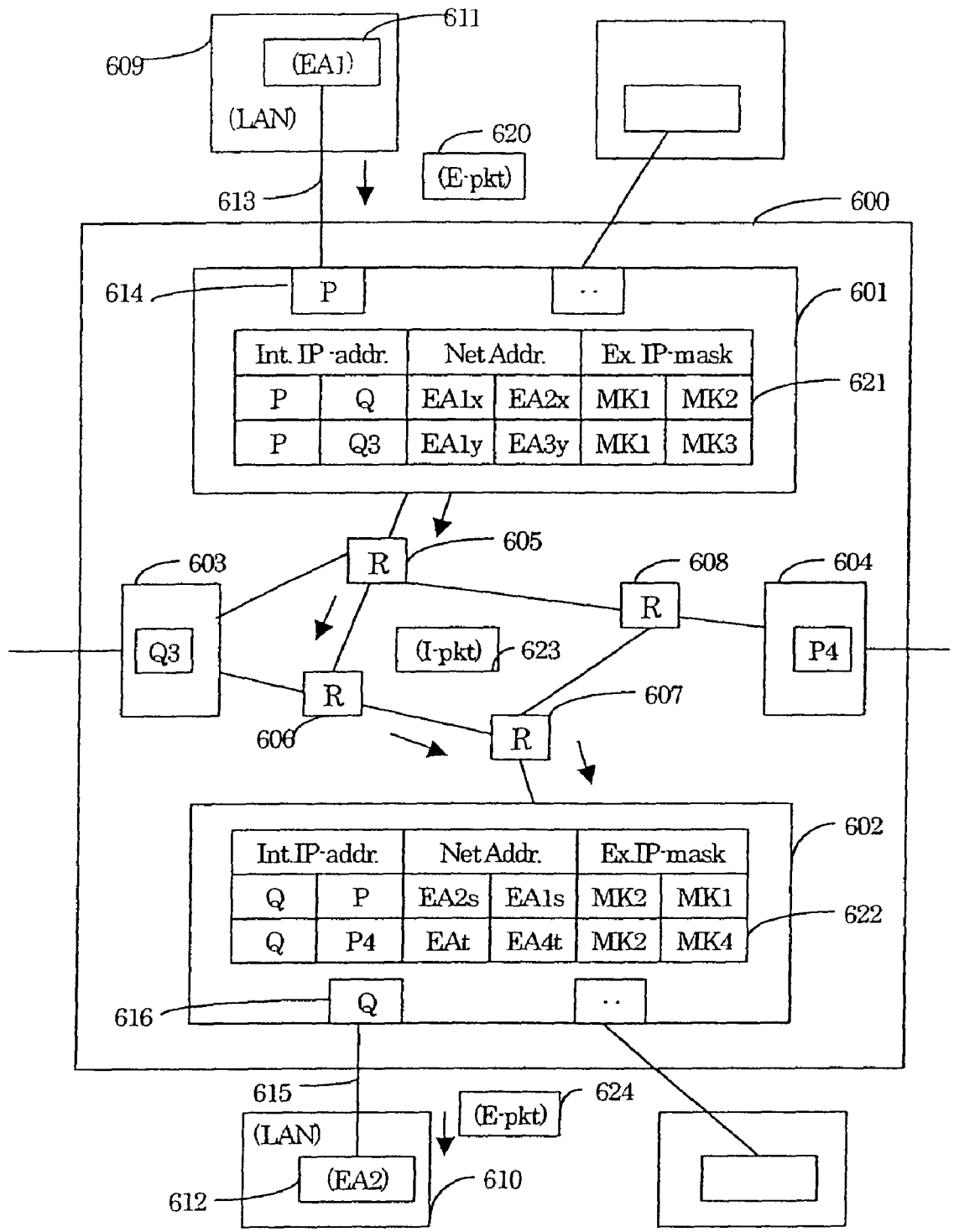
FIG. 54 is a figure explaining a manner of IP packet transfer via an IP network, in a sixth embodiment of the present invention.

In FIG. 54, numeral 600 is an IP network, numerals 601 to 604 are network node units, numerals 605 to 608 are routers, numerals 609 and 610 are LANs, and numerals 611 and 612 are terminal units within the LAN. The terminal unit 611 is given with an IP address EA1 while the terminal unit 612 is with an IP address EA2. The network node units and the routers are connected directly by communication lines or indirectly by way of the routers. The logic terminal 614 at a connection point between the logic communication line 613 and the network node unit 601 is given with an internal address P, while the logic terminal 616 at a connection point between the logic communication line 615 and the network node unit 602 is given with an internal address Q. When an IP packet 620 having a source address EA1 and destination address EA2, transmitted from the terminal unit 611, reaches the network node unit 601, it turns into an internal frame 623 by the use of an internal record of an address management table 621 on a method hereinafter referred. The internal frame 623 is forwarded from the network node unit 601 to reach the network node unit 602 by way of the communication lines and routers 606, 606, 607. From the internal frame 623 reaching the network node unit 602, an external packet 624 is restored. The external packet 624 reaches the terminal unit 612 having an IP address EA2 via the logic communication line 615. The external packet 624 has the same content as the external packet 620.

Next, explanation is made on a method to form an internal packet from an external packet to restore an external packet from the internal packet. This embodiment explains the external packet by an IP packet defined under IPv4 or IPv6. However, the invention shown in this embodiment is unchanged in its substance even if there is difference in packet type or address length. For example, the external packet can adopt IPv6. The external IP packet 620 is examined as to whether there exists a record of the internal address P given in the input logic terminal 614 as an internal record of the address management table 621. In the present case, there is correspondence between a record on the first line and a record on the second line of the address management table 621. AND-operation (logical product) is made on the destination IP address EA2 of the input external IP packet 620 and the destination IP address mask MK2 on the first-lined record. It is examined whether or not the result agrees with a destination address EA2x described in the first-lined record, according to the below Equation (4).

$$\text{IF (``EA2'' AND ``MK2''=``EA2x'')} \quad (4)$$

Similarly, inspection is made on the second-lined record according to the below Equation (5).

$$\text{IF (``EA2'' AND ``MK3''=``EA3y'')} \quad (5)$$

In the present case, the above Equation (4) is held.

Next, AND-operation is made on the source IP address EA1 of the input external IP packet 620 and the source IP address mask MK1 on the first-lined record. It is examined whether or not the result agrees with a destination address EA1x existing in the first-lined record, according to the below Equation (6).

$$\text{IF (``EA1'' AND ``MK1x''=``EA1x'')} \quad (6)$$

In the present case, the above Equation (6) is held. From the fact that the Equations (4) and (6) are held on the first-lined record, selected is the destination internal address "Q" described in the first-lined record. In this manner, fixed are the internal addresses "P" and "Q" for forming an internal frame. Incidentally, where comparing between parts of external addresses EA2 and EA1, it is satisfactory to provide bit "1" in a range to be compared of the masks MK2x and MK1x and bit "0" in the range excluded from the comparison. As hereinafter referred, when forming an internal frame, because an external address is set in a part domain of an internal address, an internal address area in a range for setting an external address can be previously omitted from the record of the address management table 621.

Figure 55:
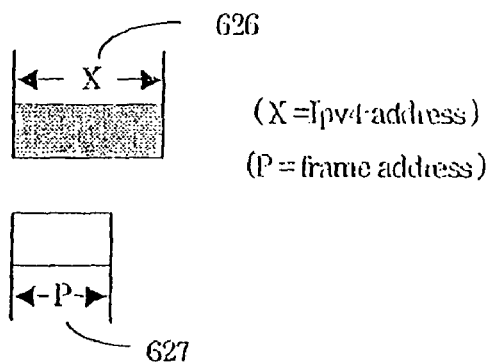
FIG. 55 is a figure explaining a relationship between an external IP packet and an internal frame, in the sixth embodiment of the present invention.
Figure 56:
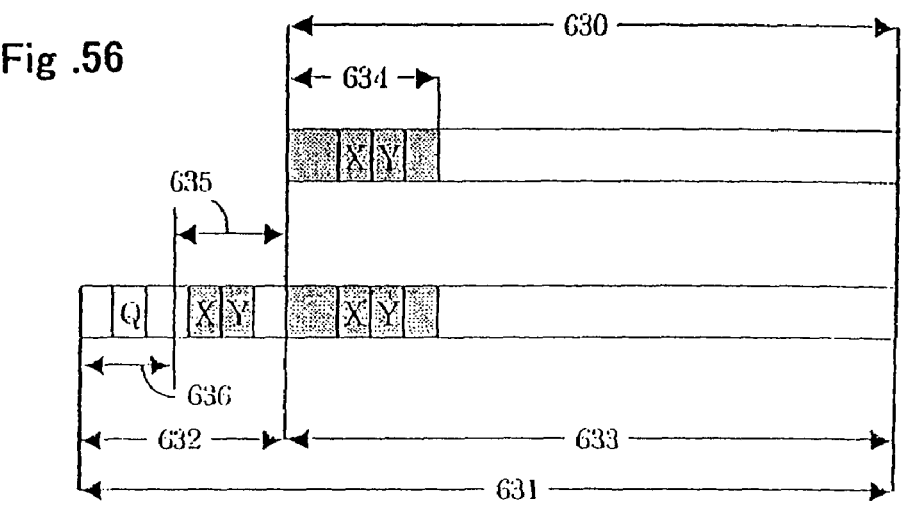
FIG. 56 is a figure explaining a relationship between an external IP packet and an internal frame, in the sixth embodiment of the present invention.

In FIG. 55, a sign "X" represents an address area 626 of an IP packet while a sign "P" represents an address area 627 of an internal frame. FIG. 56 represents that an external IP packet 630 is stored in a payload section 633 of an internal frame 631 and further a source address X and destination address Y of an external IP packet 630 are stored in a header-636 extension domain 635 in a header 632 of the internal frame 631. The internal frame header 632 stores an internal destination address Q.

Figure 57:
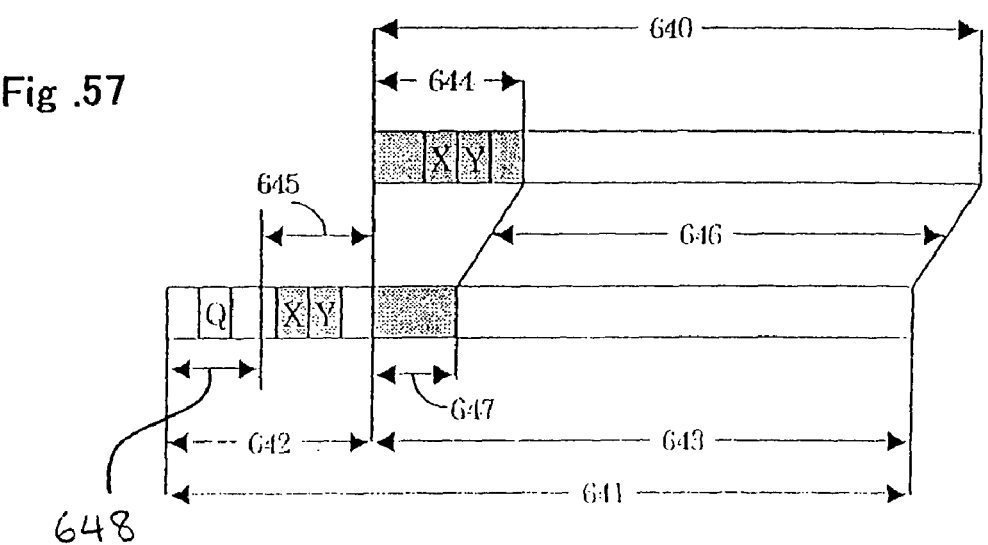
FIG. 57 is a figure explaining a relationship between an external IP packet and an internal frame, in the sixth embodiment of the present invention.
Figure 58:
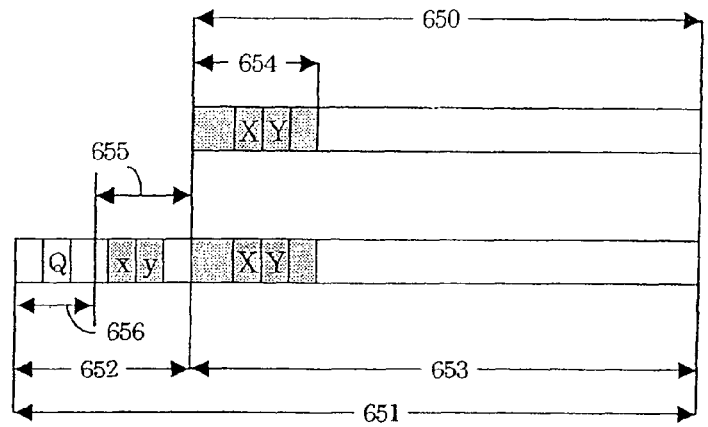
FIG. 58 is a figure explaining a relationship between an external IP packet and an internal frame, in the sixth embodiment of the present invention.

FIG. 57 shows another method for storing an external IP packet 640 in an internal frame 641. Of an external IP packet 640, the content of the external IP packet excepting a source address X and destination address Y is stored in a payload section 643 of the internal frame 641. The payload of the internal frame, in a part 647, does not contain a source address X and destination address Y of an external IP packet 640. An internal frame header 648 stores therein an internal destination address Q. FIG. 58 shows another method for storing an external IP packet 650 in an internal frame 6451, wherein an external IP packet 650 is stored in a payload section 653 of an internal frame 651. A part x of an external address X and a part y of an external address Y are stored in an extension domain 655 of a header 656 of the internal frame 641. The header 658 of the internal frame stores an internal destination address Q.

<<Summary>>

The IP network includes two or more network node units. An external IP packet, in an input-sided network node unit, is converted into an internal packet and transferred within the IP network. In an output-sided network node unit, an external IP packet is restored from the internal packet. An internal frame contains a destination internal address without containing a source internal address. Also, under the control of a record of an address management table in the input-sided network node unit, the external address being set in the external IP packet, in the entirety or in a part, is set within an address area of the internal packet. Meanwhile, the address management table includes, at least, terminal-unit-address-related information of an external IP packet, i.e. destination address and address mask, as registration information. The terminal unit, whose terminal-unit address is not registered in the address management table, is excluded from communicating thereby enhancing the information security of IP communication.

7. Embodiment 7 Showing Various Functions of Network Node Unit within IP Network This embodiment is concerned with the function and configuration of the network node unit 105 (FIG. 17) of the first embodiment and network node unit 231 (FIG. 33) of the second embodiment.

Figure 59:
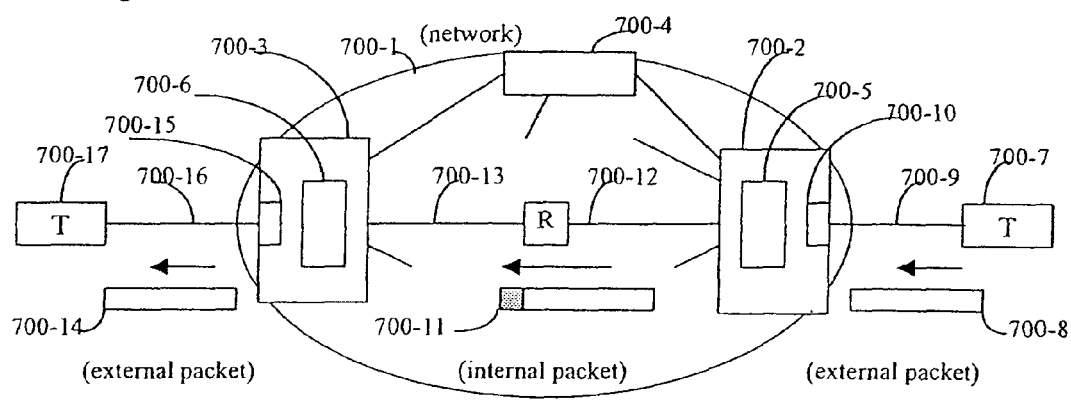
FIG. 59 is a figure explaining a relationship between a communication network and network node units, in a seventh embodiment of the present invention.

In FIG. 59, a communication network 700-1 include network node units 700-2 to 700-4. The network node units 700-2 and 700-3 include unit control tables 700-5 and 700-6 formed by a set of various control records concerning terminal-to-terminal communication connection control. An external packet 700-8 forwarded from a terminal unit 700-7 is inputted to the network node unit 700-2 via a logic terminal 700-10 at an end of an external communication line 700-9, and converted into an internal packet 700-11 in a source-sided network node unit 700-2. The internal packet 700-11 reaches a destination-sided network node unit 700-3 by way of internal communication lines 700-12 to 700-13. In the network node unit 700-3, an external packet is restored. The restored external packet 700-14 reaches a destination terminal unit 700-17 by way of a logic terminal 700-15 and external communication line 700-16. The unit control tables 700-5 and 700-6, both, are used in converting an external packet into an internal packet and in converting an internal packet into an external packet. Meanwhile, the network node units 700-2 to 700-3 are characterized to have a packet filter function and a function to convert a destination address and port number (hereinafter, referred to as "multicast recipient address converting function" or "multicast NAT function) in multicast control. The packet filter function is to select under the control of the unit control table in converting the external packet into the internal packet whether to or not to pass an external packet through a network node unit. This is true for the case to restore an external packet from an internal packet wherein selection is made under the control of the unit control table whether to or not to pass through a network node unit.

The external packet to be transferred by the communication network includes an IPv4 packet, an IPv6 packet and an Ethernet frame. An internal packet is applicable to an IPv4 packet, an IPv6 packet, an Ethernet frame, an extension Ethernet frame, an MPLS frame, an HDLC frame, an extension-tagged external packet or the like. Furthermore, this embodiment can define and use an external packet and internal packet, as follows. Namely, the external packet and internal packet are made as a data block having a bit-based value to be transferred over a communication line, to include a destination address and source address. The internal packet cannot contain a source address. Meanwhile, the internal packet is made to include an external packet. The external packet has a domain to hold a source port number and destination port number for use in identifying an application program within a terminal unit or an apparatus (telephone set, printer or the like) for connection to the terminal unit. Otherwise, a source port number and destination port number may be included in a TCP or UDP segment placed in a payload section of the external packet.

Next, explanation is made on an embodiment that the communication network 700-1 is an IP network and both external and internal packets are IPv4. The other packet form and communication network will be explained in the latter half of this embodiment.

<<IP Network for IPv4 Packet Transfer>>

Figure 60:
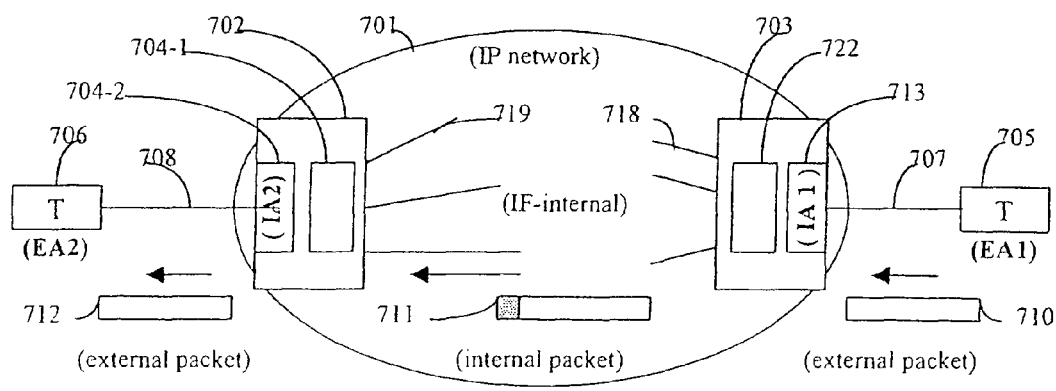
FIG. 60 is a figure explaining a relationship between an IP network and network node units, in the seventh embodiment of the present invention.

In FIG. 60, numeral 701 is an IP network, numerals 702 and 703 are network node units, numerals 704-1 and 722 are unit control tables, and numerals 705 and 706 are terminal units having a function to send and receive an IP packet. The terminal unit 705 is given with an external address EA1 while the terminal unit 706 is with an external address EA2. A logic terminal 713 at a connection point between the communication line 707 and the network node unit 703 is given with an internal address IA1. A logic terminal 704-2 at a connection point between the communication line 708 and the network node unit 702 is given with an internal address IA2. An external IP packet 710 forwarded from the terminal unit 705 is inputted to the network node unit 703 through the logic terminal 713 and via the communication line 707. The network node unit 703 uses an information processing mechanism 721 (FIG. 61) and unit control table 722, to convert the external IP packet 710 into an internal packet 711 (FIG. 60) and forward it onto an internal communication line 718. The internal packet 711 is transferred in the IP network 701 to the network node unit 702 including the logic terminal 704-2 given with a destination address IA2 for the internal packet 711 via an internal communication line 719. The network node unit 702 uses the information processing mechanism and unit control table included therein to restore an external packet 712 from the internal packet 711. This is forwarded onto the communication line 708 via the logic terminal 704-2. Thus, the external packet 712 reaches the terminal unit 706.

Figure 61:
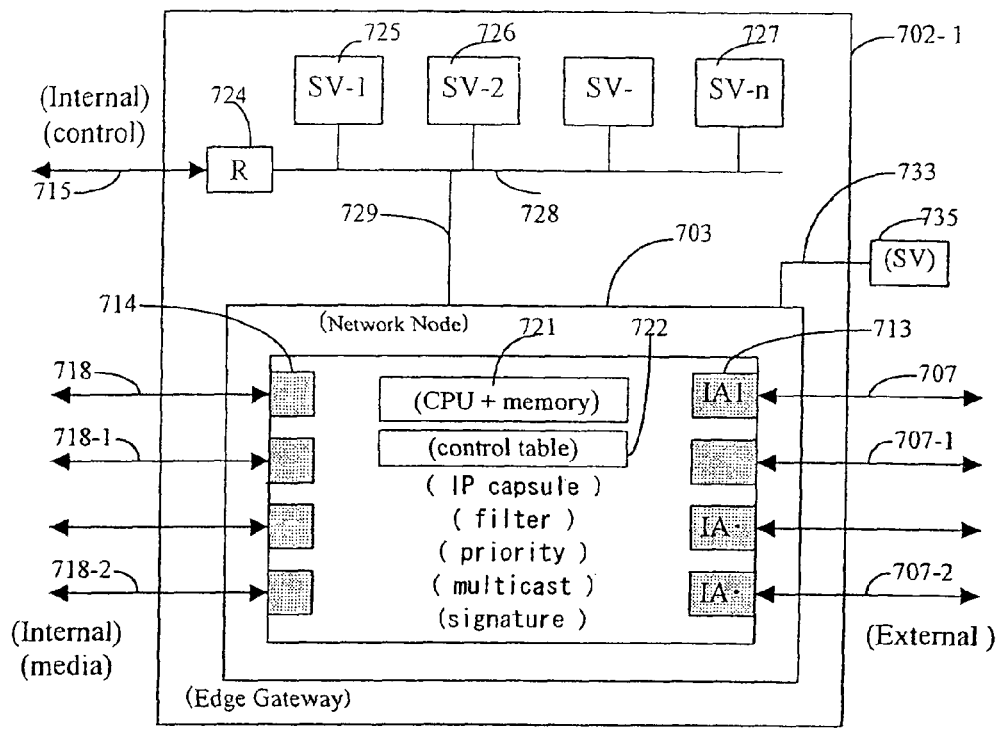
FIG. 61 is a figure explaining a relationship between the network node unit and the terminal unit gateway appearing in another embodiment or the prior patent application, in the seventh embodiment of the present invention.

FIG. 61 is a diagram for explaining the relationship between the network node unit 703 (FIG. 60, FIG. 61) and the network node unit shown in the second embodiment (FIG. 33) and prior patent application. A router 724 and servers 725 to 727 are connected to the network node unit 703 through communication lines 728 and 729. A control line 715 in an IP network 701 is connected to the router 724. A terminal-unit gateway 702-1 corresponds, for example, to the terminal-unit gateway 223-1 in the second embodiment (FIG. 33) of the invention. The servers 725 and 726 correspond to a server "TES" (telephone management server) or "TNS" (telephone number server 227-1) within the terminal-unit gateway 223-1. Note that 713 can be referred to as an external logic terminal because of being connected to an external communication line and 714 be referred to as an internal logic terminal because of being connected to an internal communication line.

Furthermore, the servers 125 to 727 correspond to the telephone management server or telephone number server (FIG. 197 on a thirteenth embodiment in the prior patent application). 733 is an overflow line for use in multicast control, having a function to recover, on the recipient-sided network node unit, the IP packets sent back from multicast recipients (e.g. FIG. 311 on a seventeenth embodiment in the prior patent application). Note that, although the prior patent application terms 702-1 as a terminal-unit gateway having encapsulation function or terminal-unit gateway, the invention refers it to as a "terminal-unit gateway".

<<Function of Network Node Unit>>

The network node unit 703 can use a unit control table 722 (FIG. 61) to carry out the following five functions. The first function converts an external IP packet into an internal packet (hereinafter, referred also to as "encapsulation") and restores an external IP packet from the internal packet (hereinafter, referred also to as "decapsulation"). The second function is a packet filter function. Namely, conversion of from one to the other of an external IP packet and an internal packet is suppressed or not suppressed by a given selection method regulated in the unit control table. In other words, an external packet or internal packet is allowed or not allowed, in the network node unit, to pass. The packet filter function is divided as a protocol filter function and a port filter function. Also, the third function controls the priority of sending into the IP network an external IP packet inputted externally of the IP network, thus controlling the priority to forward an internal packet arrived from the interior of the IP network toward the outside of the IP network.

Furthermore, the fourth function is divided into two. The first (multicast control 1) is to forward an IP packet having a multicast destination address to a plurality of destinations so that, when detecting an IP packet directed in the reverse direction, or toward the multicast data source, the IP packet can be transferred to the overflow line. The second of the fourth function (multicast control 2) is a destination address converting function (multicast recipient address converting function) in multicast control, to send an IP packet restored to an individual IP address and port number of a reception-sided terminal unit from the destination-sided network node unit. The fifth function is to convert an external IP packet of after being provided by an electronic signature in a payload section into an internal packet so that an electronic signature can be provided to a payload section of an external packet restored from the internal packet. The five functions are implemented with using a plurality of communication records or various control records set within the unit control table 722.

<<Relationship between Unit Control Table and Address Management Table>>

The unit control table in the prior patent used in this embodiment includes a function of a conversion table in respect of controlling IP packet encapsulation and decapsulation, and similarly a function of an address management table used in the prior patent application and the other embodiment of the invention.

<<Communication Record Form>>

Numeral 738 (FIG. 62) shows a form of a communication record to manage the major function of the network node unit. This has item names of, from left, "ISA", "IRA", "NSA", "NDA", "MSA", "MDA", "IFI", "IFE", "ID", "CTL" and "PTR". The item ISA is an internal transmission IP address, the item IRA is an internal incoming IP address, the item NSA is a network source address, the item NDA is a network destination address, the item MSA is a source IP address, the item MDA is a destination IP address mask, the item IFI is an internal logic terminal identifier, the item IFE is an external logic terminal identifier, the item ID is a record ID, the item CTL is record control information and item PTR is a pointer to a sub-table.

Numeral 738X (FIG. 62) shows another form of communication record. This includes a logic terminal identifier "PinID" at the extreme left end but has the other items same as 738. The use of the logic terminal identifier helps shorten a search time for an internal address "ISA" in a communication record. In this embodiment, although communication record form is explained with 738, a form of 738X can be similarly carried out.

FIG. 63 is an example expressing a content of a communication record in a program language C, representing the items of the communication record "ISA", "IRA", "NSA", "NDA", "MSA", "MDA", "IFI", "IFE", "ID", "CTL" and "PTR". In a control item CTL, provided are bit positions denoting bit positions of, from left, "00", "01", . . . , "31". The bit position "00" shows a validity of the communication record. The bit positions "01" to "04" show a concrete method of protocol filter function. The bit positions "05" to "08" show a concrete method of port filter function. Also, the bit position "09" shows whether to carry out priority control or not. The bit position "10" shows whether to carry out multicast control 1 or not. The bit position "11" shows whether to carry out multicast control 2 or not. Furthermore, the bit position "12" shows whether to carry out transmission signature control or not. The bit position "13" shows whether to carry out reception signature control or not. The bit positions "14" to "30" are undefined domains. The bit position "31" shows whether to carry out record memory protect control or not.

<<First Function: Function of Encapsulation and Decapsulation>>

The first function is similar to as the IP capsulation and decapsulation by the prior patent. Explanation is made with reference to a unit control table 722-1 (FIG. 64) and flowchart of FIGS. 65 and 66.

An external IP packet 710 (FIG. 60) has a source IP address of "EA1" and a destination IP address of "EA2". This is inputted to the network node unit 703 via a logic terminal 713 provided with an internal address IA1 (Step 740-1 in FIG. 65). The information processing mechanism 721 identifies the external IP packet 710 and examines whether there is a communication record having the acquired internal address IA1 within the unit control table 722 or not (Step 740-2). In the present case, fallen under are the items of the record on the second line in the unit control table 722-1 (FIG. 64) (Step 740-3), wherein there are found "IA1", "IA2", "NSA1", "NDA2", "MSA1", "MDA2", "IF714", "IF713", "ID1", "CTL1" and "PTR1". When the item CTL of the detected record on the second line has a bit position "00" value "1", the record is determined invalid. Thus, another record is processed. Note that, where there is no detection of a record fallen under, the accepted external packet 710 is dumped.

When the item CTL1 of the detected record has a bit position "00" value of "0", AND-operation is made, in 1-bit correspondence, of the destination address EA2 of the external IP packet and the destination mask MDA2 acquired from the record, to examine whether an operation result agrees with a network destination address NDA2 or not (Equation (7)). Where in agreement in the operation result, AND-operation is made, in 1-bit correspondence, of the source address EA1 of the external IP packet and the destination mask MSA1 acquired from the record, to examine whether an operation result agrees with a network source address NSA1 or not (Equation (8)). The above procedure is shown in Step 740-4 of FIG. 65.

IF ("EA2") AND ("MDA2")="NDA2"  (7)

IF ("EA1") AND ("MSA1")="NSA1"  (8)

For example, in the case that the destination IP address EA2 has a value "192.3.4.5", the destination mask MDA2 has a value "255.255.255.0" and the destination address NDA2 has a value "192.3.4.0", the above Equation (7) is held. Furthermore, because the above Equation (7) is held for the case the destination IP address EA2 has a value in a range of from "192.3.4.1" to "192.3.4.255", it is helpful in decreasing the total number of communication records. The above Equation (8) also is helpful in decreasing the total number of communication records on the similar principle.

Furthermore, it is possible to use "MDA2", "NDA2", "MSA1"and "NSA1" with a value "0.0.0.0" in all of them. With this, the Equations (7) and (8) are unconditionally held regardless of values of the IP addresses "EA2", "EA1". As an effect of this, because the external IP packet is encapsulated into an internal packet regardless of the external IP packet destination address "EA2" and source address "EA1", a virtual private line can be realized within the IP network 701.

Furthermore, it is possible to use "MDA2" and "MSA1" with a value "255.255.255.255" in them, "NDA2" with a value of an external IP packet destination address "EA2", and "NSA1" with a value of an external IP packet source IP address "EA1". With this, the Equations (7) and (8) are unconditionally held. Accordingly, it is possible to limit the source IP address "EA1"and the destination IP address "EA2" into one, i.e. to use as a record for communication between a terminal having an IP address "EA1" and a terminal having an IP address "EA2". The communication record in a conversion table in the prior patent has a form having a mask value "255.255.255.255".

Figure 65:
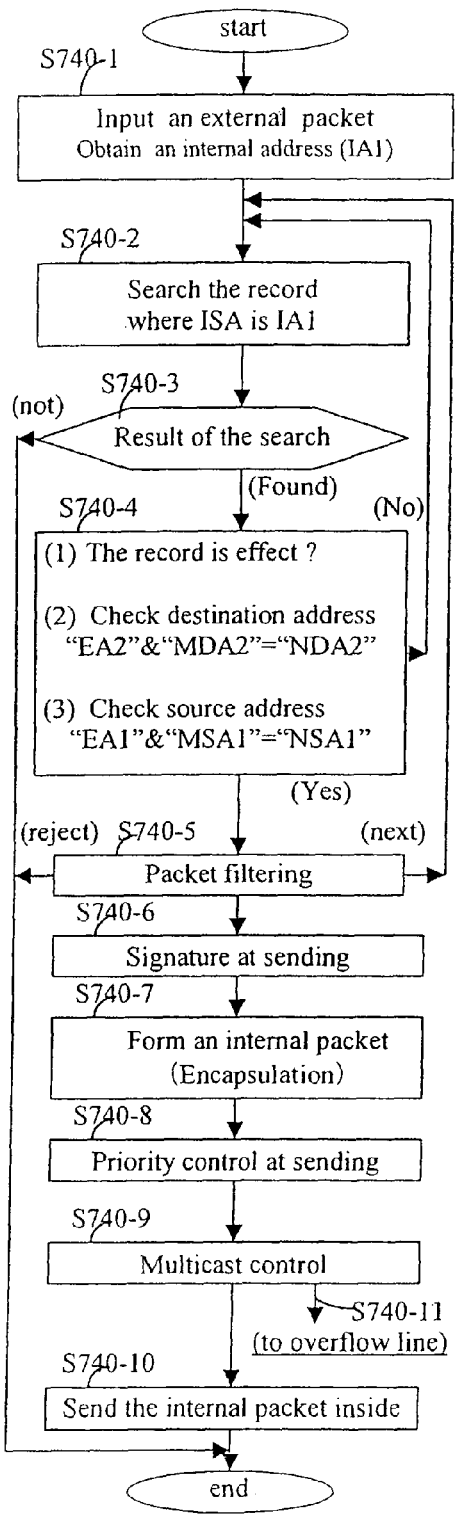
FIG. 65 is a figure representing a process flow of the network node unit at transmission, in the seventh embodiment of the present invention.

When the Equations (7) and (8) are both held, an internal packet 711 is formed that has a destination internal address IA2, the second item of the record, taken as a destination address and an internal address IA1 taken as a source address (Step 740-7). This is forwarded onto the internal communication line 718 via an internal logic terminal 714 to be identified by an internal logic terminal interface IF714, a record seventh item (Step S740-10). Incidentally, in the above procedure, the Step 740-5 (packet filter control), the Step S740-6 (signature provision), the Step S740-8 (transmission priority control) and Step S740-9 (multicast control) shown in FIG. 65 are options selectable to carry out and not to carry out. The above procedure uses an example not to be selected.

The forwarded internal packet 711 is transferred within the IP network 701 by the use of a destination internal address IA2 of within the internal packet 711, reaching the network node unit 702. The network node unit 702 uses an information processing mechanism and unit control table contained therein to restore an external packet 712 from the internal packet 711. The restored external packet 712 is forwarded onto the communication line 708 via the logic terminal 704-2 (FIG. 60). The external packet 712 reaches the terminal unit 706.

Next, explanation is made on external IP packet transfer of from the terminal unit 706 to the terminal unit 705. The external IP packet having a source external address EA2 and destination external address EA1, forwarded from the terminal unit 706, is transmitted over the communication line 708 and inputted to the network node unit 702 via the external logic terminal 704-2. An internal packet is formed and transferred within the IP network 701, then reaching the internal node unit 703. The internal packet contains an external IP packet in its payload section. This is an internal source address IA2 and internal destination address IA1 of the internal packet.

Figure 66:
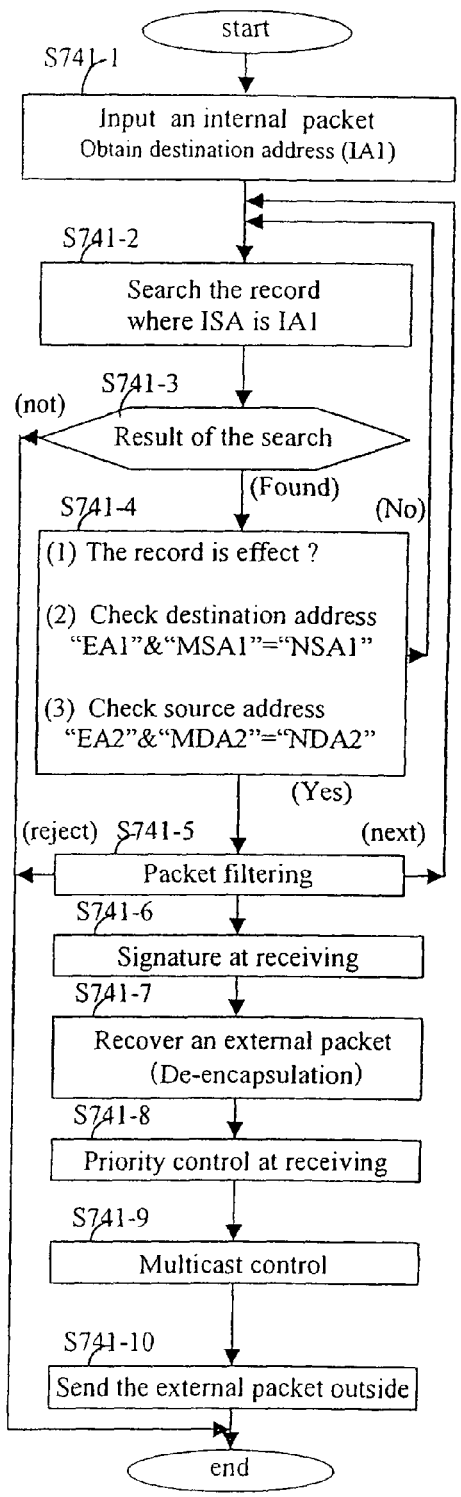
FIG. 66 is a figure representing a process flow of the network node unit at reception, in the seventh embodiment of the present invention.

From now on, explanation is made using FIG. 66. The internal packet is inputted to the network node unit 703 via the internal logic terminal 714 (FIG. 61) (Step S741-1). The information processing mechanism 721 at the inside of the network node unit 703 examines whether or not there exist a communication record having an internal-packet destination internal address IA1 in the unit control table 722-1 (Step S741-2). In the present case, fallen under is the items of a record on the second line of the unit control table 722-1 (Step 741-3). Note that, when there is no detection of a record fallen under, an accepted internal packet is dumped. When the item CTL of a detected record has a bit position "00"value of "0", AND-operation is then made, in 1-bit correspondence, of the destination address EA1 of the external IP packet contained in the payload of the internal packet and the destination mask MSA1 acquired from the second-lined record, to examine whether an operation result agrees with a network source address NSA1 or not (Equation (9)). Where agreement in the operation result, AND-operation is made, in 1-bit correspondence, of the source address EA2 of the external IP packet contained in the internal packet and the destination mask MSA2 acquired from the second lined record, to examine whether an operation result agrees with a network source address NDA2 or not (Equation (10)).

$$\text{IF ("EA1") AND ("MSA1")}=\text{"NSA1"} \quad (9)$$

$$\text{IF ("EA2") AND ("MDA2")}=\text{"NDA2"} \quad (10)$$

When the Equations (9) and (10) are both held, the external IP packet is taken out of the payload section of the internal packet (restoring an external IP packet). The restored external IP packet is forwarded onto the external communication line 707 via an external logic terminal 713 to be identified by an external logic interface IF 713, an eighth item of the second-lined communication record. The restored external IP packet reaches the terminal 705. Incidentally, in the above procedure, the step S741-5 (packet filter control) shown in FIG. 66 is the second function of the network node unit, the step S741-6 (signature provision) is the fifth function of the network node unit, the step S741-8 (arrival priority control) is the third function of the network node unit and the step S741-9 (multicast control) is the fourth function of the network node unit. This is the case not to carry out them.

<<Relationship between Main Table and Sub-Table>>

Figure 67:
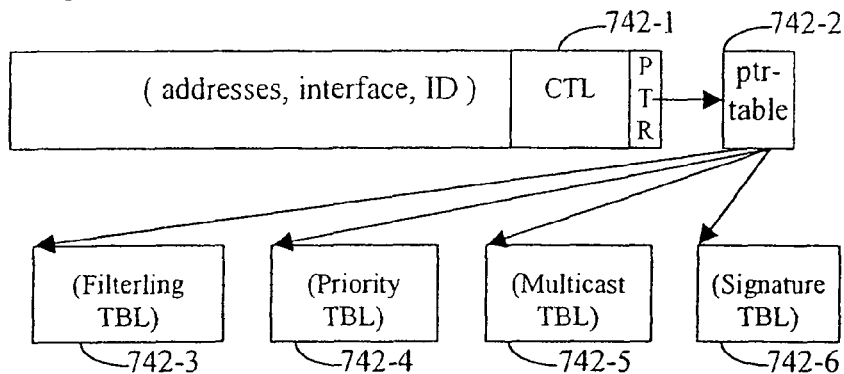
FIG. 67 is a figure explaining on how to make reference from a main table to a sub-table, in the seventh embodiment of the present invention.

FIG. 67 explains a method of making reference to various control records as sub-tables of a unit control table from a communication record 742-1 as a main table of the unit control table. Namely, the pointer item 742-2 at the last of the communication record stores the pointers representative of whereabouts of a sub-table of filter control record 742-3, a sub-table of priority control record 742-4, a sub-table of multicast control record 742-5 and a sub-table of signature control record 742-6. How to use the sub-tables will be described later. Incidentally, the filter control record is explained with an example of further separation with a protocol control record and a port control record. However, unless the filter control record is separated with a protocol control record and a port control record, the invention in its substance is not changed.

<<Second Function-1: Protocol Filter>>

Figure 68:
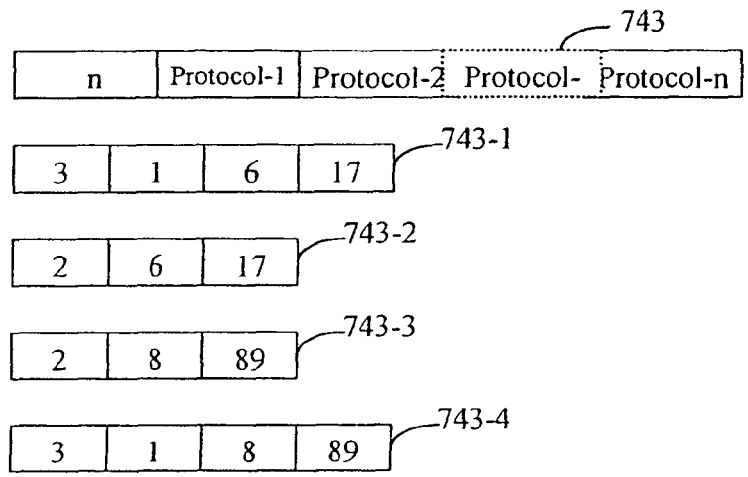
FIG. 68 is a figure representing a protocol filter control record form, in the seventh embodiment of the present invention.

The second packet filter function is divided as a protocol filter function and a port filter function. The filter control record is divided as a protocol control record and a port control record. The protocol filter comprises four forms of protocol filters (protocol filters 1 to 4) to be designated with a bit position "01" to "04" at an inside of communication-record control item CTL (in FIG. 63). The protocol control record for designating a protocol filter 1 to 4 has a form 743 (FIG. 68) as a record having a length of (n+1) bytes and comprising (n+1) items each having 1 byte. The extreme left item represents the number of protocols to be described in this record. The following items, in the number of "n", include protocol representative values (8 bits) in the number of n defined under TCP/IP art.

The protocol filter 1 defines a protocol for allowing an internal packet, formed from an external IP packet by the network node unit, to be transmitted into the IP network (referred to as transmission permission). For example, 743-1 allows the external IP packets of three protocols, i.e. protocol-numbers "1", "6" and "17", to pass the network node unit and be transmitted as internal packets. The external IP packets having the other protocol number than those are to be discarded. The protocol filter 2 defines an external IP packet protocol for allowing an external packet restored by the network node unit from an internal IP packet arrived from the inside of the IP network to be forwarded toward an outside of the IP network (referred to as arrival permission). For example, 743-2 allows the restored external IP packets of two protocols, i.e. protocol-numbers "6" and "17", to be forwarded from the network node unit. The external IP packets having the other protocol number than them are to be discarded.

The protocol filter 3 defines a protocol for blocking, by the network node unit, an internal packet formed from an external IP packet from being transmitted into the IP network (referred to as "transmission blocking"). For example, with 743-3, the external packets of two protocols, i.e. protocol-numbers "8" and "89", are discarded. The external packets having the other protocol number than them are to be converted into an internal packet and thereafter transmitted. The protocol filter 4 defines an external IP packet protocol for blocking, by the network node unit, an external packet restored from an internal IP packet arrived from the inside of the IP network from being forwarded (referred to as "arrival blocking"). For example, with 743-4, the restored external IP packets of three protocols, i.e. protocol-numbers "1", "8"and "89", are discarded. The external IP packets having the other protocol number than them are allowed to pass the network node unit.

The communication record adopts a rule not to simultaneously designate the protocol filter 1 and the protocol filter 3. However, when simultaneously designated, the network node unit can be defined for operation to designate only either one of the protocol filter 1 or the protocol filter 3. Similarly, the communication record adopts a rule not to simultaneously designate the protocol filter 2 and the protocol filter 4. However, when simultaneously designated, it is possible to designate only either one of the protocol filter 2 or the protocol filter 4.

<<Second Function 2: Port Filter>>

Figure 69:
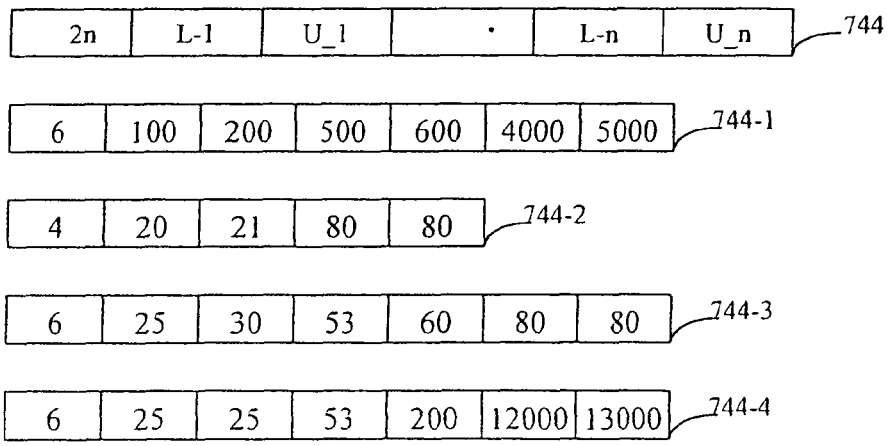
FIG. 69 is a figure representing a port filter control record form, in the seventh embodiment of the present invention.

The port filter comprises four forms of port filters (port filters 1 to 4) to be designated with a bit position "05" to "08" at an inside of the communication-record control item CTL. The port control record, for designating a port filter 1 to 4, has a form 744 (FIG. 69) of a record having a length of (2n+2) bytes and comprising (n+1) items each having 2 bytes. The extreme left item represents twice (2n) the numeral of port number described in the record. The following items, in the number of 2n, define the sections of port representative values (16 bits) under TCP/IP art, including n pairs comprising port number upper value and port number lower value.

The port filter 1 allows to transmit an internal packet having an external-IP-packet source port number (transmission permission source (origin) port number) in a payload section of an internal packet formed from an external IP packet, and designates a destination port number (arrival permission destination port number) allowing an external packet restored from an internal IP packet to be forwarded to an outside of the IP network. The principle of division of source port number and destination port number is in accordance with the TCP-communication client server model rule that the source port number used in transmission and the destination port number used in arrival are in the same value. For example, 744-1 designates three port number sections, i.e. port number of from 100 to 200, port number of from 500 to 600 and port number of from 4000 to 5000. This port number is an external IP packet source port number in a payload section of an internal packet to be transmitted into the IP network (transmission permission source port number) or a destination port number of an external packet restored from an internal. IP packet (arrival permission destination port number). The external IP packet or internal packet having a port number of other than a designated condition is blocked from passing the network node unit. The port filter 2 allows to transmit an internal packet having a external-IP-packet destination port number (transmission permission destination port number) in a payload section of an internal packet formed from an external IP packet, and designates an external-IP-packet source port number (arrival permission source port number) allowing an external packet restored from an internal IP packet to be transmitted to an outside of the IP network. For example, 744-2 designates two port number sections, i.e. port number of from 20 to 21 and port number of from 80 to 80. This port number is a transmission permission destination port number or arrival permission source port number. The external IP packet or internal packet having a port number of other than a designated condition is blocked from passing the network node unit. Meanwhile, in the case the port filter 1 and the port filter 2 are designated with the same port number range, the two designations are both effective, resulting in impossible to distinguish whether at transmission or arrival. Also, it is not distinguished whether the port number is a destination port number or a source port number. In both, the packet is allowed for passing.

The port filter 3 blocks from being transmitted an internal packet having an external-IP-packet source port number (transmission prevention source port number) in a payload section of an internal packet formed from an external IP packet, and designates an external-IP-packet destination port number (arrival blocking source port number) blocking an external IP packet restored from an internal IP packet from being forwarded to an outside of the IP network. For example, 744-3 designates three port number sections, i.e. port number of from 25 to 30, port number of from 53 to 60 and port number of from 80 to 80. This port number is a transmission prevention source port number or arrival prevention destination port number. The external IP packet having a port number of other than a designated condition is not prevented but converted into an internal packet and transmitted into the IP network, or forwarded as a restored external packet onto the external communication line.

The port filter 4 is, for the network node unit, to prevent from being transmitted an internal packet having an external-IP-packet destination port number (transmission prevention destination port number) in a payload section of an internal packet formed from an external IP packet, and to designate an external-IP-packet source port number (arrival prevention source port number) preventing an external IP packet restored from an internal IP packet from being forwarded to an outside of the IP network. For example, numeral 744-4 designates three port number sections, i.e. port number of from 25 to 25, port number of from 53 to 200 and port number of from 12000 to 13000. This port number is a transmission prevention destination port number or arrival prevention source port number. The external IP packet having a port number of other than a designated condition passes the network node unit. Meanwhile, when the port filter 3 and the port filter 4 are both designated, the two designations are both effective, resulting in impossible to distinguish whether at transmission or arrival. Also, it is not distinguished whether the port number is a destination port number or a source port number. In both, the packet is prevented from passing. Incidentally, in the above case preventing an external IP packet from passing in the port filter 1 to port filter 4, upon transmission, communication record search is resumed at step S740-2 (FIG. 65) while, upon arrival, communication record search is resumed at step S741-2 (FIG. 66). Note that, in designating both permission and prevention to the protocol filter, it is possible to define effective only for permission.

IP address provides a function to identify terminal, and port numbers can identify application program in terminal or gadgets connected. A pair of IP address and port number are called socket. The port filter can provide secure socket communication between terminals. The functions of the protocol filter and port filter described above can be carried out upon forming an internal packet from an external packet (Step 740-5 in FIG. 65) and upon restoring an external packet from an internal packet (Step 741-5 in FIG. 66).

<<Relationship between Protocol Filter and Port Filter>>

In the protocol filter, the measure is properly defined and used for the case a TCP or UDP including a port number is designated without designating a port filter. For example, when the protocol filter 1 (transmission permission) is designated, TCP or UDP transmission is defined to allow transmission regardless of a port number value. When the protocol filter 2 (arrival permission) is designated, TCP or UDP transmission is defined to allow arrival regardless of a port number value. When the protocol filter 3 (transmission prevention) is designated, TCP or UDP transmission is defined to prevent transmission regardless of a port number value. When the protocol filter 4 (arrival prevention) is designated, TCP or UDP transmission is defined to prevent arrival regardless of a port number value.

In a case that the protocol filter and the port filter are both designated, when an IP packet a protocol filter is applied is prevented or deleted, the IP packet to which the port filter is to be applied is considered not existing. Meanwhile, it is possible to define such that port filter designation is effective only in the case the higher-order protocol of an IP packet, a subject of application, is TCP or UDP while the IP packet is deleted when the higher-order protocol is other than TCP or UDP.

Furthermore, as a case not to separate the filter control record with a protocol control record and a port control record, it is possible to define and use a filter control record capable of designating such a condition that, for example, upon transmission a protocol number value 17 only is allowed and destination port number values 3000 and 80 and source port number value 25 are allowed while, upon arrival, a protocol number value 17 only is allowed and source port number values 3000 and 80 and source port number value 25 are allowed.

<<Third Function: Packet Priority Control>>

Packet priority control is designated with a bit position "09" in the communication record control item CTL. A priority "0" to "7" is provided by designating a port number, wherein priority is increased as the numeral increases.

FIG. 70 explains an overall flow of packet priority control. Numeral 746 is an IP network, numerals 747-1 to 747-3 are network node units, and numerals 748-1 to 748-5 are terminal units. An external IP packet 750-1 is forwarded from the terminal unit 748-1, an external IP packet 750-2 is forwarded from the terminal unit 748-2, and external IP packets 750-3 and 750-4 are forwarded from the terminal unit 748-3. These four external IP packets reach the network node unit 747-1 nearly at a same time. The network node unit 747-1 forwards, by its transmission priority control function, internal IP packets 751-1, 751-3 and 751-2 in the order onto an internal communication line 749-1, and an internal IP packet 751-4 onto an internal communication line 749-2. Herein, the internal IP packets 751-1 to 751-4 are formed from the external IP packets 750-1 to 750-4. The transmission priority for forwarding the internal IP packets is defined based on each internal communication line, by the use of a priority control record. The detail will be described later.

Next, explanation is made on a flow of arrival priority control. Internal IP packets 751-6 and 751-7 arrive the network node unit 747-2 via an internal communication line 749-3 while internal IP packets 751-8 and 751-9 arrive the network node unit 747-2 via an internal communication line 749-4. These four internal IP packets reach the network node unit 747-2 nearly at the same time. The network node unit 747-2, by its reception priority control function, forwards external IP packets 752-8, 752-7 and 752-9 in the order onto an internal communication line 753-1, and an external IP packet 752-6 onto an external communication line 753-2. Herein, the external IP packets 752-6 to 752-9 have been restored from the internal IP packet 751-6 to 751-9. The arrival priority for forwarding the external IP packets is defined based on each internal communication line, by the use of a priority control record. The detail will be described later.

As a method to designate a port number defining a transmission priority, defined are a priority control type "0" and a priority control type "1". The type "0" is to designate a source port number upon transmission and a destination port number upon arrival. The type "1" is to designate a destination port number upon transmission and a source port number upon arrival. The principle of division between source port number and destination port number is in accordance with the TCP-communication client server model rule for dividing between source port number and destination port number.

FIG. 71 represents a priority control record form 754-1. This record comprises three items storing a flag, a protocol and a port number. FIG. 72 represents the priority control record in a program language C with somewhat greater detail. The flag is 8 bits. A flag bit position "0" represents whether the record continues or not. A bit position "1" divides between priority control type "0" and priority control type "1". Bit positions "2" to "4" represents basic priorities while bit positions "5" to "7" represents contract priorities.

FIG. 73 shows another priority control table 755 comprising three priority control records. The priority control record on the first line is an example of the priority control type "0", having a basic priority "1", a contract priority "2", a protocol 6 (TCP) and a port number "4096". The priority control record on the second line is an example of the priority control type "1", having a basic priority "1", a contract priority "4", a protocol 6 (TCP) and a port number "1024". The priority control record on the third line is an example of the priority control type "0", having a basic priority "1", a contract priority "3", a protocol 17 (UDP), wherein designation for a port number is not made. Because the flag on the third line has a continuation bit "0", there is no priority control record on the following fourth line.

In transmission priority control of among the above priority controls, a priority provided for an internal packet to be formed is defined due to the designation by the priority control table 755 (Step 740-8 in FIG. 65). In arrival priority control, a priority provided for an external packet to be restored is defined due to designation by the priority control table 755 (Step 741-8 in FIG. 66).

<<Fourth Function-1: Multicast Control Function-1>>

Figure 74:
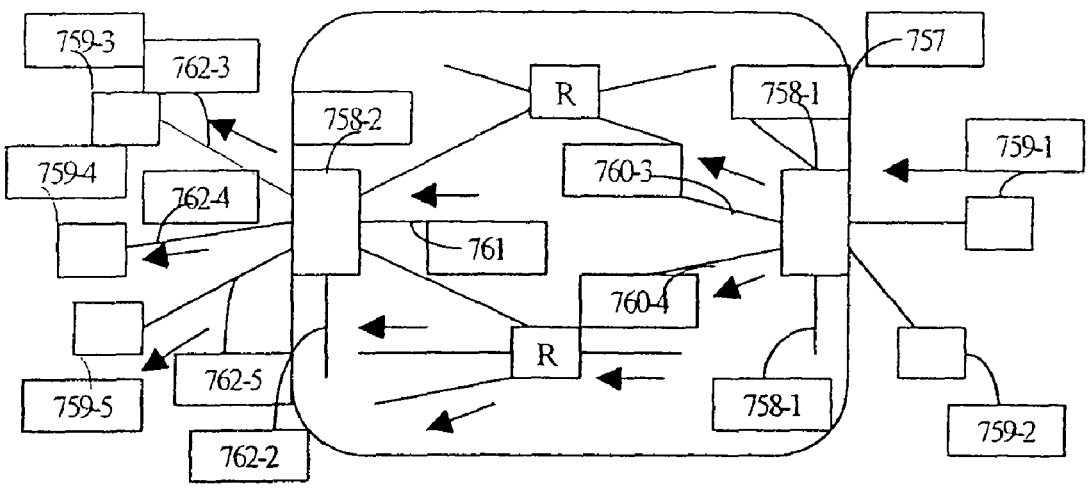
FIG. 74 is a figure explaining the overall flow of multicast, in the seventh embodiment of the present invention.

The first function of multicast control function is designated with a bit position "10" in the communication-record control item CTL. In the present case, the bit position "10"in the control item CTL is set in value "1". In FIG. 74, numeral 757 is an IP network, numerals 758-1 and 758-2 are network node units, and numerals 759-1 to 759-5 are terminal units.

Figure 75:
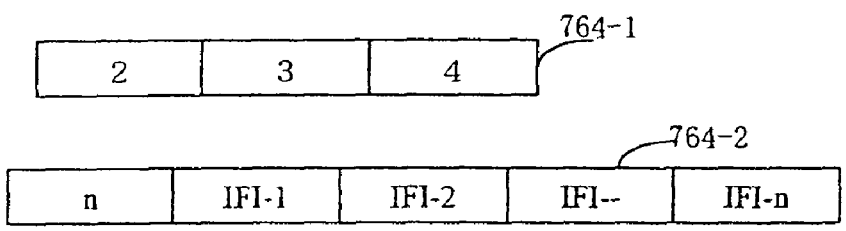
FIG. 75 is a figure showing an example of a multicast control record, in the seventh embodiment of the present invention.

First, explanation is made on a multicast control function upon transmission. An external IP packet having a multicast destination is forwarded from the terminal unit 759-1 to reach the network node unit 758-1 via the communication line, thereby reaching Step S740-9 by way of a series of steps S740-1 to 740-8 shown in FIG. 65. Thereupon, because of setting "1"in the bit position "10" value in the communication-record control item CTL, the network node unit 758-1 looks an MC control record 764-1 (FIG. 75) and knows internal logic terminal identifiers "3" and "4". Designation is made to forward the internal packet formed from the external IP packet in step S740-7 (FIG. 65) onto an internal communication line 760-3 identified by the internal logic terminal identifier "3", and designation is made to forward it onto an internal communication line 760-4 identified by the internal logic terminal identifier "4". Thereupon, in Step S740-10, the formed internal packet is forwarded onto the internal communication lines 760-3 and 760-4. Incidentally, the MC control record form includes the number of internal logic terminal identifiers "n" and internal identifiers IFI-j (j=1, 2, ... n) in the number of "n", as shown at 764-2. In variation, the internal logic terminal identifier "3" may be previously set within the internal logic terminal identifier IFI of the communication record and the internal logic terminal identifier "4" only be set in the MC control record, to use the internal logic terminal identifiers "3" and "4". Meanwhile, in a case that the value of the control item CTL bit position "10" is "0", the multicast control function will not operate. Thus, the internal packet is forwarded onto an internal communication line defined by the internal logic terminal identifier IFI of the communication record.

Figure 76:
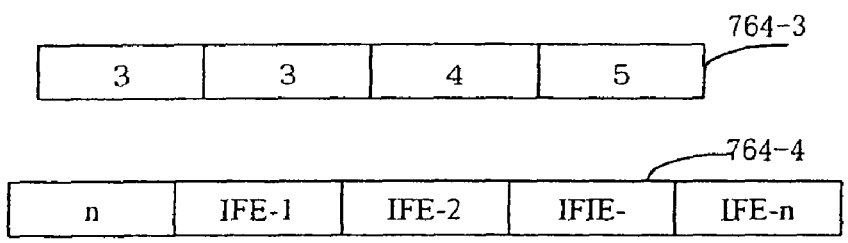
FIG. 76 is a figure showing another example of a multicast control record, in the seventh embodiment of the present invention.

Next, explanation is made on the multicast control function upon arrival. An internal IP packet having a multicast destination is transferred in the IP network 757 to reach the network node unit 758-2 via an internal communication line 761, thereby reaching Step S741-9 by way of a series of Steps S741-1 to S741-8 shown in FIG. 66. Thereupon, because of setting "1" in the bit position "10" value in the communication-record control item CTL, the network node unit 758-2 looks an MC control record 764-3 (FIG. 76) and knows external logic terminal identifiers "3", "4" and "5". Designation is made to forward the internal packet restored from the internal IP packet in step S741-7 (FIG. 66) onto an external communication line 762-3 identified by the external logic terminal identifier "3", designation is made to forward it onto an external communication line 762-4 identified by the external logic terminal identifier "4" and further designation is made to forward it onto an external communication line 762-5 identified by the external logic terminal identifier "5". Thereupon, the restored internal packet, in Step S741-10, is forwarded onto the external communication lines 762-3 and 762-5.

Incidentally, the external-logic-terminal identifier control record form includes the number of external logic terminal identifiers "n" and internal identifiers IFE-j (j=1, 2, ... n) in the number of "n", as shown at 764-4. In variation, the internal logic terminal identifier "3" may be previously set within the external logic terminal identifier IFE of the communication record to use the external logic terminal identifier "3" set therein. Meanwhile, in a case that the value of the control item CTL bit position "10" is "0", the multicast control function will not operate. Thus, the restored external packet is forwarded onto an external communication line defined by the external logic terminal identifier IFE of the communication record.

<<Overflow Line Control>>

Figure 77:
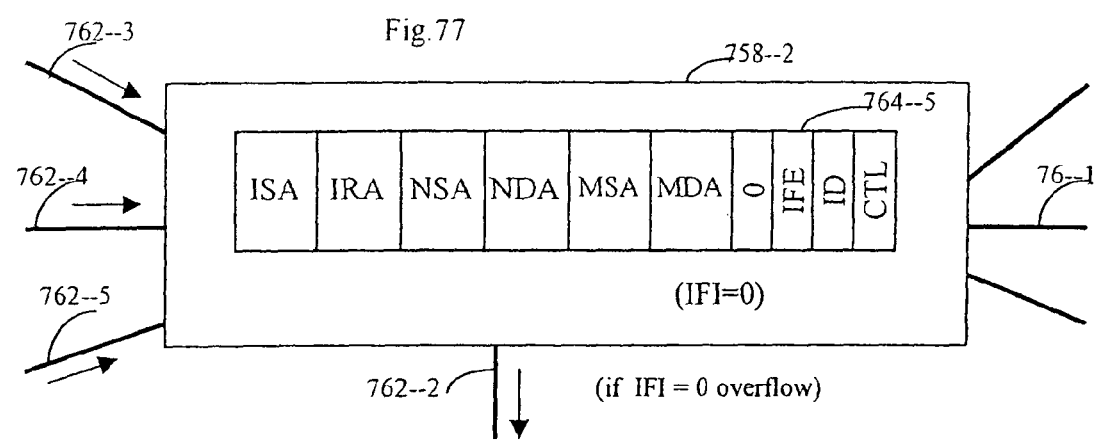
FIG. 77 is a figure explaining overflow line control in multicast, in the seventh embodiment of the present invention.

In FIG. 74, when an external IP packet, having as a destination address an address "MA" same as a destination multicast address "MA" contained in an IP packet transferred from the network node unit 758-2 to the terminal units 759-3 to 759-5, is inputted from the external communication lines 762-3 to 762-5 to the network node unit 758-2, if the internal logic terminal identifier IFI of the communication record 764-5 is set in value "0" (FIG. 77), the inputted multicast external IP packet is not formed into an internal packet in the network node unit 758-2 but transferred onto the communication line 762-2 while remaining in an external IP packet form.

<<Fourth Function-2: Multicast Control Function-2>>

The second function of multicast control (destination address converting function in multicast, multicast NAT function) is designated with a bit position "11" in the communication-record control item CTL (in FIG. 63). In the present case, the bit position "11" in the control item CTL is set in value "1".

Figure 78:
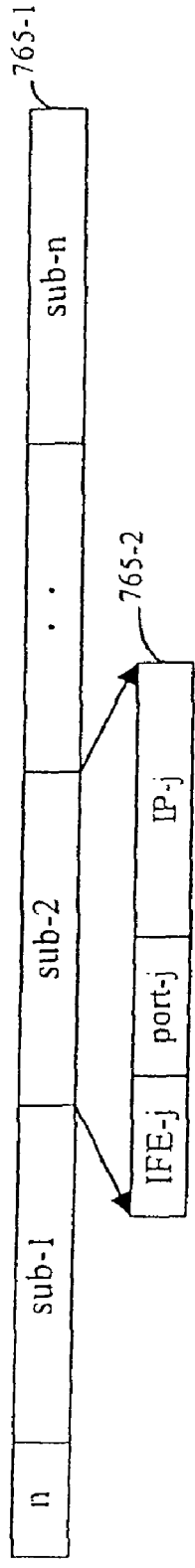
FIG. 78 is a figure showing another example of a multicast control record, in the seventh embodiment of the present invention.

FIG. 78 shows a form of a second control record 765-1 in multicast control. The first item in the left is "n", the second item "Sub-1", the third item "sub-2", ..., and the (n+1)-th item "sub-n". The first shows the number of sub-items, and the second to (n+1)-th show sub-items in the number of "n". Numeral 765-2 shows a more-detailed definition than that of the sub-items, having "IFE-j", "port-j" and "IP-j". A terminal unit having an IP address of IP-j is connected to a communication line having an external logic terminal identifier IFE-j. The terminal unit is represented using a port number "port-j" to receive multicast data.

Figure 79:
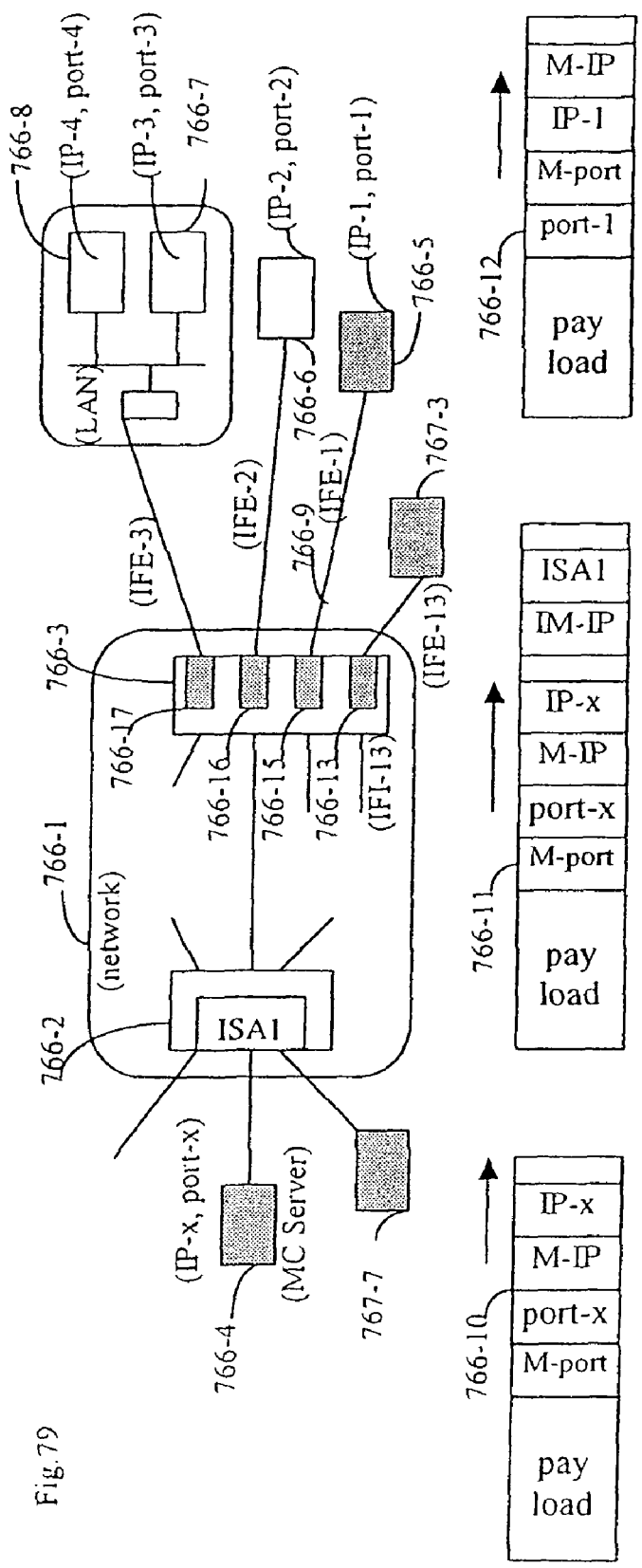
FIG. 79 is a figure showing a multicast control function—2, in the seventh embodiment of the present invention.
Figure 80:
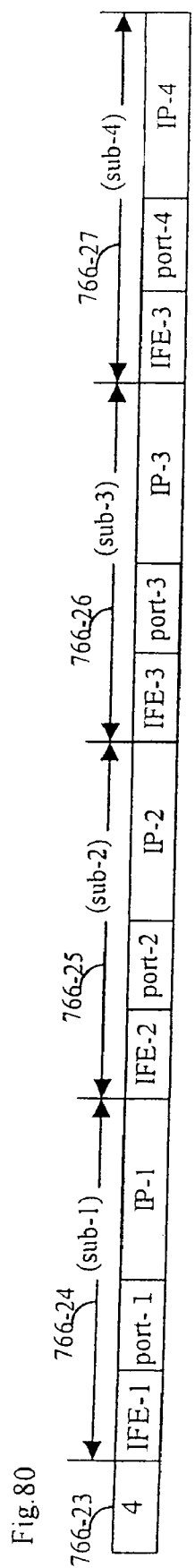
FIG. 80 is a figure showing a form 4 of a second multicast control record used for carrying out the multicast control function—2, in the seventh embodiment of the present invention.

In FIG. 79, numeral 766-1 is an IP network, numerals 766-2 and 766-3 are network node units, and numerals 764-4 to 765-8 are terminal units. The terminal unit 766-4 has an IP address "IP-x", the terminal units 766-5 to 766-8 have respective IP addresses of "IP-1", "IP-2", "IP-3" and "IP-4". At first, the terminal unit 766-4 forwards an external IP packet 766-10 having a source IP address "IP-x", source port number "port-x", destination multicast IP address "M-IP" and destination port number "M-port" (Step S768-1 in FIG. 82). The external IP packet 766-10 passes over the communication line and further through the network node unit 766-2 where it is applied by an encapsulation function and turned into an internal packet 766-11. The internal packet 766-11 has a transmission internal address "ISA1" and arrival internal address "IM-IP". The internal packet 766-11, in its payload section, is an external IP packet 766-10. At this time, the internal packet 766-11 is transferred over an internal communication line of the IP network 766-1 (Step S768-2) to reach the network node unit 766-3, reaching Step S741-9 by way of a series of Steps S741-1 to S741-8 shown in FIG. 66. The communication record, on the first line from above in a unit control table 766-30 (FIG. 81) in the network node unit 766-3, is used in decapsulation. However, it is the relevant communication record "IM-IP", "ISA1", "NSA30", "NDA30" and " ... ". The communication-record control item CTL on the first line has a bit position "11" value set to "1". Because a second capsule control record 766-23 (FIG. 80) has "4" in the first item from left, sub-items are four in the number.

According to the designation "IFE-1", "port-1", "IP-1"in the first sub-item 766-24, an external packet 766-12 having a destination external IP address IP-1 and destination port number port-1 is formed from the internal packet 766-11. The external packet 766-12 is forwarded onto a communication line 766-9 having an external logic terminal identifier IFE-1 (Step S768-5 in FIG. 82). The external packet 766-12 has a source IP external address "M-IP" and source port number "M-Port", wherein the source IP address M-IP and source port number M-Port is transferred from a destination external IP address M-IP and destination port number M-Port for an external IP-packet 766-10 in a payload section of the internal packet 766-11. The destination IP address of the external IP packet 766-12 uses an IP address "IP-1" unique to a terminal unit 766-5 to be connected to the external logic terminal identifier IFE-1.

Subsequently, according to the content "IFE-2", "port-2", "IP-2" of a sub-item 766-25 of a multicast second control record, an external IP packet having a source address M-IP and source port number M-port is forwarded to the terminal unit 766-6 having an IP address IP-2 connected to the external logic terminal identifier IFE-2 (Step S768-6). From now on, similarly, according to the content "IFE-3", "port-3", "IP-3"of a sub-item 766-26, an external IP packet having a source address M-IP and source port number M-port is forwarded to the terminal unit 766-7 having an IP address IP-3 connected to the external logic terminal identifier IFE-3 (Step S768-7). Subsequently, according to the content "IFE-3", "port-4", "IP-4" of a sub-item 766-27, an external IP packet having a source address M-IP and source port number M-port is further forwarded to the terminal unit 766-8 having an IP address IP-4 connected to the external logic terminal identifier IFE-3 (Step S768-8). Herein, it is possible to connect a plurality of terminals 766-7 and 766-8 to a communication line designated by the external logic terminal identifier IFE-3. By the above procedure, the terminals 766-5 to 766-8 end the reception of multicast data.

The terminal units 766-5 to 766-8, after receiving multicast data, can report of a reception or answer to the multicast data transmission terminal unit 766-4 and multicast transmission management terminal 767-7. Explanation is made on an example to reply from the terminal unit 766-5. The terminal unit 766-5 forms an external IP packet 767-1 (in FIG. 83) and forwards it onto the communication line 766-9 (Step S768-10 in FIG. 82). The external IP packet 767-1 has an IP address and a port number respectively exchanged with in source and destination with the IP address and port number of a received external IP packet 766-12 (in FIG. 79). Namely, they are the source IP address IP-1 and source port number port-1 and the destination IP address M-IP and source port number M-port of the external IP packet 767-1.

The external IP packet 767-1 is turned into an internal packet 767-2 (in FIG. 83) by the use of a record "IS5, IS73, NSA5, NDA5, . . . " on the fourth line of the unit control table 766-30 in the network node unit 766-3, and forwarded onto the internal communication line 767-4 to reach the network node unit 766-3 (Step S768-11). This is decapsulated by the application of a communication record "IS73, IS5, NDA5, NSA5, . . . " on the seventh line of the unit control table 766-30 (FIG. 81). The restored external packet reaches the terminal unit 767-3 via a communication line 767-5 defined by the logic terminal identifier IFE13 of the communication record (Step S768-12).

The multicast data proxy terminal unit 767-3 forms an IP packet including the content of an answer packet received from the terminal unit 766-5 and sends the IP packet to the multicast data sending terminal unit 766-4 (Steps S768-14 to S768-16 in FIG. 82). At this time, used is a communication record "IS73, IS64, . . . " on the eighth line of the unit control table 766-30. Furthermore, the multicast data response proxy terminal unit 767-3 can send an IP packet containing the answer to the multicast data transmission management terminal unit 767-7 (Step S768-18 to S768-20). At this time, used is a communication record "IS73, IS67, . . . " on the ninth line of the unit control table 766-30. The terminal unit 767-3 has a function to handle an answer from the terminal unit 766-6 to 766-8 similarly to an answer from the terminal unit 766-5. Furthermore, it can receive all the answers from the terminal units 766-5 to 766-8 and send them collectively in one IP packet.

<<Fifth Function: Signature Function>>

Figure 84:
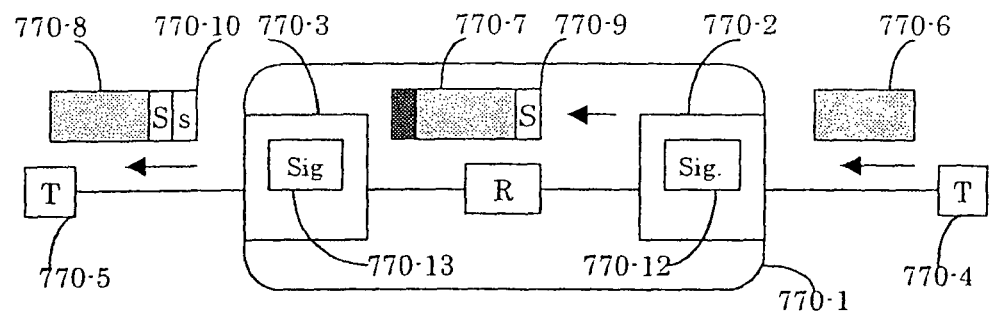
FIG. 84 is a figure explaining the overall flow of electronic signature, in the seventh embodiment of the present invention.
Figure 85:
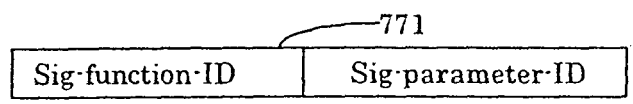
FIG. 85 is a figure showing an electronic signature control record form, in the seventh embodiment of the present invention.

The signature control function is designated with a bit position "12" to "13" in the communication-record control item CTL (in FIG. 63). In the present case, the bit positions "12"and "13" in the control item CTL are set in value "1". In FIG. 84, numeral 770-1 is an IP network, and numerals 770-2 and 770-3 are network node units, numerals 770-4 and 770-5 are terminal units. An external IP packet 770-6 is forwarded from the terminal unit 770-4 to reach the network node unit 770-2 via a communication line, reaching Step S740-6 by way of a series of Steps S740-1 to S740-5 shown in FIG. 65. In Step S740-6, because of setting "1" in the bit position "12" value in the communication-record control item CTL, signature function and parameters are acquired from a signature control record 771 (FIG. 85) to be made reference to from the relevant communication record. Using a signature function section 770-12, provided is a signature 770-9 for the payload section of the external packet 770-6. Then the process proceeds to the next Step S740-7.

Next, explanation is made on a signature providing function upon arrival. An internal IP packet is transferred in the IP network to reach the network node unit 770-3, reaching Step S741-6 by way of a series of Steps S741-1 to S741-5 shown in FIG. 66. In Step S741-6, because of setting "1" in the bit position "13" value in the communication-record control item CTL, signature function and parameters are acquired from a signature control record to be made reference to from the relevant communication record. Using a signature function section 770-13, provided is a signature 770-10 for an external-packet 770-6 payload section existing in a payload section of the internal packet. Then the process proceeds to the next step S741-7.

The signer can be a common carrier operating and managing the IP network 770-1. The signature 770-9 and signature 770-10 can contain a time the packet 770-6 and 770-7 passes the network node unit. Note that the signature function section 770-12 and 770-13 can be implemented as internal hardware of the network node units 770-2 and 770-3 or a program module. Meanwhile, a signature function server can be provided and used connected to the network node unit.

<<Separation within IP Network>>

Figure 86:
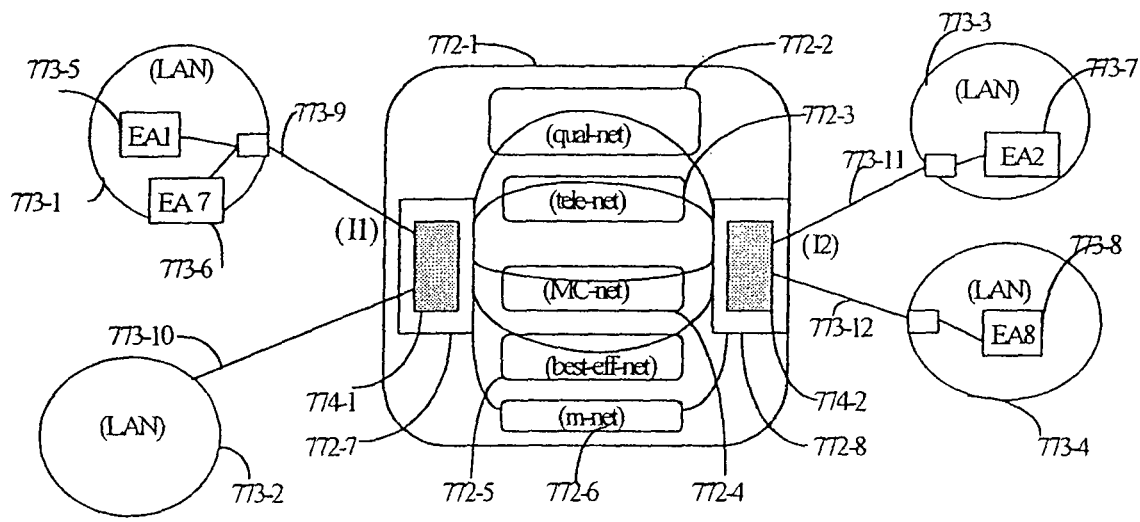
FIG. 86 is a figure explaining on how to separate the IP network into a plurality of internal IP networks, in the seventh embodiment of the present invention.
Figure 87:
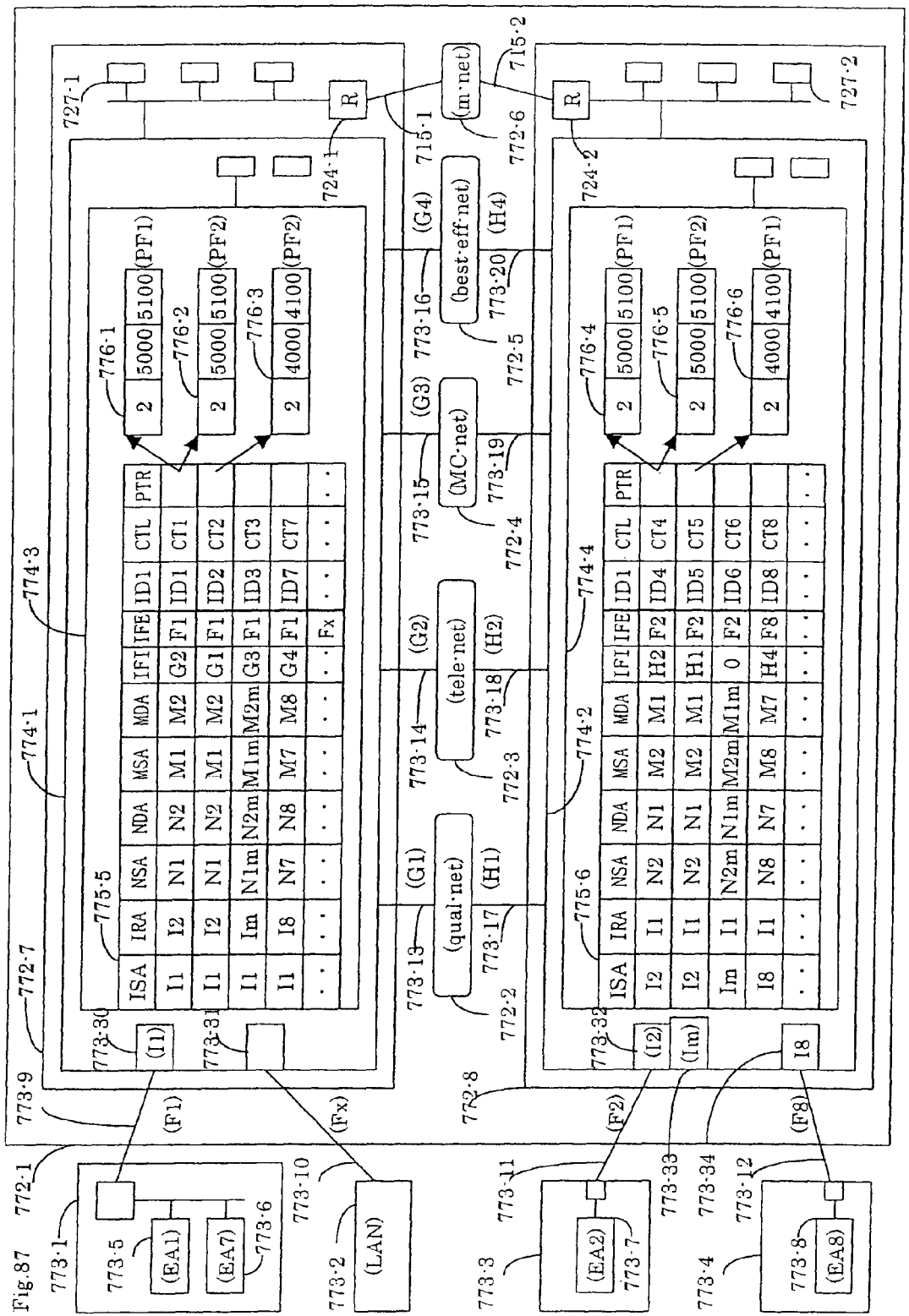
FIG. 87 is a figure explaining a function of the unit control table for separating the IP network into a plurality of internal IP networks, in the seventh embodiment of the present invention.

The IP network can be separated into a plurality of internal networks by a method of transferring an internal packet into the network according to a port number value in an external IP packet. With reference to FIGS. 86 and 87, explanation is made on a method to separate the IP network into a plurality of internal IP networks by using a communication record and port filter function. Numeral 772-1 is an IP network, numerals 772-2 to 772-6 are IP networks within the IP network 772-1. Numerals 773-1 to 782-4 are LANs, numerals 772-7 to 772-8 are terminal-unit gateways, numerals 774-1 and 774-2 are network node units, numerals 774-3 and 774-4 (FIG. 87) are memory areas including unit control tables, 775-5 to 775-6 are unit control tables comprising a plurality of communication records, and 776-1 to 776-6 are port filter control records (one of unit control table elements).

<<Separation within IP Network-1: Telephone Network Case>>

An external IP packet having a source IP address EA1 and destination IP address EA2 is forwarded from the terminal unit 773-5 to pass over the communication line 773-9 and inputted to the network node unit 774-1 via a logic terminal 773-30 given with an internal address I1. The IP packet has a payload of a UDP segment, in which case a source port number thereof is "5004" and a destination port number is "5008". In the present case, the record on the first line is fallen excluding the record representing a title of a unit control table 775-5. The first-lined record has, from left, "I1", "I2", "N1", "N2", "M1", "M2", "G2", "F1", "ID1" and "CT1". An internal address I1, provided to the logic terminal 773-30 the external packet has been inputted, is the first item I1 in the communication record. A result of AND-operation, in a 1-bit correspondence, of the destination address EA2 of the external IP packet by a destination mask M2 acquired from the record agrees with an network address N2 of the communication record. Furthermore, a result of AND-operation, in a 1-bit correspondence, of the source address EA1 by a destination mask M1 agrees with a network destination address N1, in this case. In the present case, the IP packet has passed an address-condition inspection in respect of the first-lined communication record.

Next, designated are a port filter control record 776-1 and port filter control record 776-2 related from the communication record. The port filter control record 776-1 is a designation for a port filter 1 when the bit position "05" value in the communication-record "CTL" domain is "1", thus designating that a source port number at transmission and destination port number at arrival is within a port number section of 5000-5100. This case is a case that an external IP packet is converted into an internal packet and transmitted into the IP network, wherein a source port number "5004" of the external IP packet exists within the port number section "5000"-"5100".

Similarly, the port filter control record 776-2 is a designation of a port filter 2 because the bit position "06"value in the communication-record "CTL" domain is "1", designating that a source port number at arrival and destination port number at transmission is within a port number section of 5000-5100. This case is a case that an external IP packet is converted into an internal packet and transmitted into the IP network, wherein a destination port number "5008"of the external IP packet exists within the port number section "5000"-"5100". Namely, the inputted external IP packet passes an address-condition inspection in respect of the communication record, to satisfy the condition of port number section on the port filter control record 776-1 and port filter control record 776-2. Accordingly, the external IP packet condition satisfies the condition of being converted into an internal packet. The internal packet formed by the above is forwarded onto the internal communication line 773-14 of an internal logic terminal identifier item G2 of the communication record.

Next, explanation is made on the relationship between the inputted external IP packet and the communication record on the second line of the unit control table 775-5 excluding the record representing a title. The second-lined communication record has items of, from left, "I1", "I2", "N1", "N2", "M1", "M2", "G1", "F1", "ID2" and "CT2". The external IP packet passes an address-condition inspection in respect of also the second-lined communication record. Next, the port filter control record 776-3 related from the communication record has a communication-record "CTL" domain bit position "06" value of "1" and hence a designation for the port filter 2, designating that a source port number at arrival and destination port number at transmission is within a port number section of 4000-4100. This case is a case of transmission into the IP network. Because an external-IP-packet destination port number "5008" does not exist within the port number section "4000"-"4100", it is prevented to form an internal packet from the external IP packet and transfer it into the IP network.

Furthermore, the external IP packet cannot be formed into an internal packet because of not satisfying the condition of encapsulation in respect of the other record of the unit control table 775-5. The internal packet formed using the first-lined communication record is transferred into the IP network 772-3 via an internal communication line 773-14 identified by the internal logic terminal identifier G2, to reach the network node unit 774-2 via an internal communication line 773-18. Within the network node unit 774-2, the unit control table 775-6 has, on the first line excluding the record representing a title, "I2", "I1", "N2", "N1", "M2", "M1", "H2", "F2", "ID4" and "CT4", from left. Thus, this record passes an address-condition inspection, and the port filter records 776-4 and 776-5 are applied on the similar principle as the port filter control records 776-1 and 776-2. By the above method, an external IP packet is restored from the internal packet to reach the terminal unit 773-7 via a communication line 773-1. In the case of reversed transmission direction, i.e. in transmission of from the terminal unit 773-7 to the terminal unit 773-5, a communication record and port filter control record is used in the similar way to the above, effecting the communication through the IP network 772-3.

A telephone set is connected inside the terminal unit 773-5, and a port number "5004" is provided to the telephone set. A telephone set is connected inside the terminal unit 773-7, and a port number "5008" is provided to the telephone set. In the present case, the source port number "5004" and "5008" within an external packet adopts an SIP communication protocol, one of a technique for the IP telephone. The telephone set within the terminal unit 773-5, for conversion of voice into a digital voice and storing it within the IP packet, has a UDP segment in a payload section of the IP packet. A source port number is given with "5004" and a destination port number is with "5008", to send a digital voice packet toward the terminal 773-7. The telephone set within the terminal unit 773-7 restores an analog voice from a received digital voice.

The telephone communication by the above method is to be effected exclusively through the internal IP network 772-3. The internal IP network 772-3 is used as a telephone communication private network. Incidentally, as TCP or UDP communication technique is known a technique that a plurality of application program including a telephone program are set up within one terminal unit wherein the terminal unit has one IP address and different individual port numbers are assigned to the application programs to transmit and receive an IP packet with the application program similarly included in another terminal unit.

<<Separation within IP Network-2: Quality Network Case>>

This is the case that the application program within the terminal unit 773-5 operates as a client while the application program within the terminal unit 773-7 operates as a server. The server has a port number "4000" to "4100". However, a client port number cannot be previously defined. An external IP packet having a source IP address EA1 and destination IP address EA2 is forwarded from the terminal unit 773-5 and inputted to the network node unit 774-1 by way of the communication line 773-9 and a logic terminal 773-30 given with an internal address I1. The external IP packet has a payload of TCP segment having a destination port number of "4000" to "4100". In the present case, candidates are a record-on the first line of a unit control table 775-5 and a record on the second line thereof. The first-lined communication record has, from left, "I1", "I2", "N1", "N2", "M1", "M2", "G2", "F1", "ID1"and "CT1". Thus, the first-lined communication record passes an address-condition inspection. The port number section, defined by port filter control records 776-1 and 776-2 related from the communication record, designates to be within a port number section 5000-5100 at both transmission and reception and both in source and destination. In the present case, the external IP packet forwarded from the terminal unit 773-5, having a destination port section of "4000" to "4100", does not satisfy the condition of port number section. Thus, the external packet is not converted into an internal packet.

Next, the second-lined communication record has, from left, "I1", "I2", "N1", "N2", "M1", "M2", "G1", "F1", "ID2"and "CT2". Thus, the relevant communication record passes an address-condition inspection. The communication record has a "CTL"-domain bit position "06" of a value "1". Consequently, designation is to the port filter 2. The port number section, defined by the port filter control record 776-3, designates a destination port number section at transmission of 4000-4100, hence satisfying the condition and being converted into an internal packet. The internal packet is forwarded onto an internal communication line 773-13 for an seventh item G1 of the second-lined communication record, and transferred within the IP network 772-2 to reach the network node unit 774-2 via an internal communication line 773-17. In the network node unit 774-2, a unit control table 774-2 has the second-lined record items of, from left, "I2", "I1", "N2", "N1", "M2", "M1", "H1", "F2", "ID5" and "CT5", from left. This communication record passes an address-condition inspection, and the communication record has a "CTL"-domain bit position "05" value of "1". Consequently, designation is to the port filter 1. The port filter control record 776-6 is applied by a destination port number section at arrival of "4000" to "4100". Thus, an external IP packet is restored from the internal packet, which reaches the terminal unit 773-7 via a communication line 773-11.

In the case reverse in communication direction to the above, i.e. when an external IP packet is sent from the terminal unit 773-7 to the terminal unit 773-5 (note that the source port number in an IP-packet TCP segment is "4000" to "4100") and converted into an internal packet in the node network unit 774-2. In transmitting the internal packet, the port filter control record 776-6 is applied by the source port number section at transmission of "4000" to "4100". Consequently, the internal packet is transferred to the network node unit 774-1 by way of the internal communication line 773-17, IP network 772-2 and internal communication line 773-13. When the network node unit 774-1 receives the internal packet to restore an external IP packet, the port filter control record 776-3 is applied by a source port number section at transmission of "4000" to "4100".

In brief, the terminal units 773-5 and 773-7 use telephone sets connected respectively to carry out telephone communication within a port number section of "5000" to "5100". The application program on the terminal unit 773-7 operates as a server applied by a port number "4000" to "4100". The other application programs on the terminal unit 773-5 operate as a client using the application program on the terminal unit 773-7. At this time, a telephone-communication internal network 772-3 is used in telephone communication, and an internal network 772-2 is used in the communication between the client and the server. The communication lines 773-9 and 773-11 are commonly used in telephone communications and client-server communication. The internal network 772-3 as a telephone network is reduced in the number of router stages (also called the number of hops) for delay reduction. The internal network 772-2 as a client-server communication network can be reduced in communication failure and offered as a quality network assuring communication quality.

<<Separation within IP Network-3: Multicast Network Case>>

Explanation is made on a method that an application program in the terminal unit 773-5 is operated as a multicast transmission server while the application program in the terminal unit 773-7 is operated as one person of a plurality of users who receives the multicast data forwarded from the multicast transmission server. In the present case, an IP packet for multicast transmitted from the terminal unit 773-5 is inputted to the network node unit 774-1 via the communication line 773-9, wherein used is the third-lined record of a unit control table 775-5. The third-lined record has, from left, "I1", "Im", "N1$m$", "N2$m$", "M1$m$", "M2$m$", "G3", "F1", "ID3" and "CT3". In the case that the inputted multicast external IP packet passes an address-condition inspection, a multicast internal packet is formed. The internal packet is forwarded onto the communication line 773-15 designated by an item G3.

From then on, it reaches the network node unit 774-2 by way of a multicast internal network 772-4 and communication line 773-19. Because the multicast external IP packet has a destination address as an IP address inherent to multicast, the internal packet will not be transferred to the internal network 772-2 or internal network 772-3 by the address-condition inspection. The internal packet reaches the network node unit 774-2 where the third-lined record of the unit control table 775-6 is used. The third-lined record has, from left, "Im", "I1", "N2$m$", "N1$m$", "M2$m$", "M1$m$", "0", "F2", "ID6" and "CT6". A multicast external packet is restored from the internal packet. The restored external packet is delivered to the terminal 773-7 via a communication line 773-11 designated by the item F2.

<<Separation within IP Network-4: Best-Effort Network Case>>

Explanation is made on an IP communication method using an internal network 772-5 between the terminal unit 773-6 and the terminal unit 773-8.

The internal network 772-5, different from the foregoing internal network, is a best-effort network as an IP network to suppress communication fee instead of assuring communication quality. The terminal 773-6 is given with an address EA7 while the terminal 773-8 is with an address EA8. The address EA7 uses a value different from every IP address used within the LAN 773-1 to be connected to the communication line 773-9. Similarly, the address EA8 is different from every IP address used within the LAN 773-4 to be connected to the communication line 773-12. For an external IP packet having a source IP address EA7 and a destination IP address EA8 to be inputted to the network node unit 774-1 from the terminal unit 773-6 via the communication line 773-9, the communication record satisfying an address-condition inspection is solely the fourth-lined record in the unit control table 775-5. An internal packet, formed by using a communication record having record items of "I1", "I8", "N7", "N8", "M7", "M8", "G4", "F1", "ID7" and "CT7", is forwarded onto a communication line 773-16 designated by the item G4.

From then on, the internal packet reaches the network node unit 774-2 by way of the internal network 772-5 and further communication line 773-20. In the network node unit 774-2, the fourth-lined record of the unit control table 775-6, i.e. "I8", "I1", "N8", "N7", "M8", "M7", "H4", "F8", "ID8" and "CT8", is used in a decapsulation method. A restored IP packet reaches the terminal unit 773-8 via the communication line 773-12. An external IP packet in a reverse direction to the above, i.e. external IP packet forwarded from the terminal unit 773-8 to the terminal unit 773-6, reaches the terminal unit 773-6 by way of the communication line 773-20, best-effort network 772-5 and communication line 773-16 in a way similar to the foregoing. The server 727-1 in the terminal-unit gateway 772-7 and the server 727-2 in the terminal-unit gateway 772-8 shown in FIG. 71 are allowed to communicate by sending and receiving an IP packet by way of the router 724-1, communication line 715-1, internal network 772-6, communication line 715-2 and router 724-2.

<<Another Method for Referring to Control Record From Communication Record>>

Figure 88:
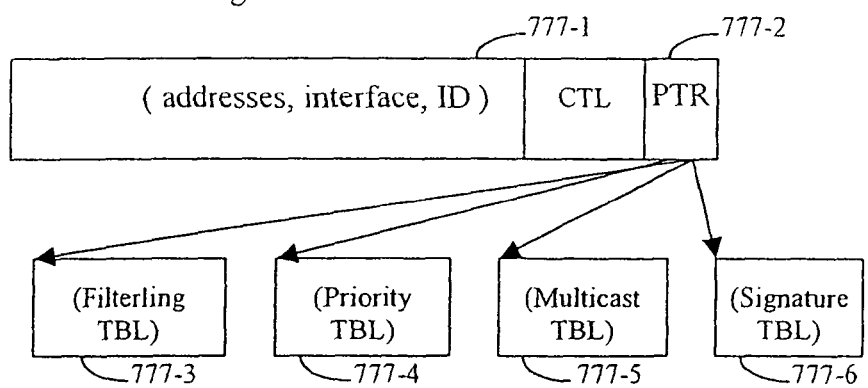
FIG. 88 is a figure explaining another method for finding out various control records from a communication record, in the seventh embodiment of the present invention.
Figure 89:
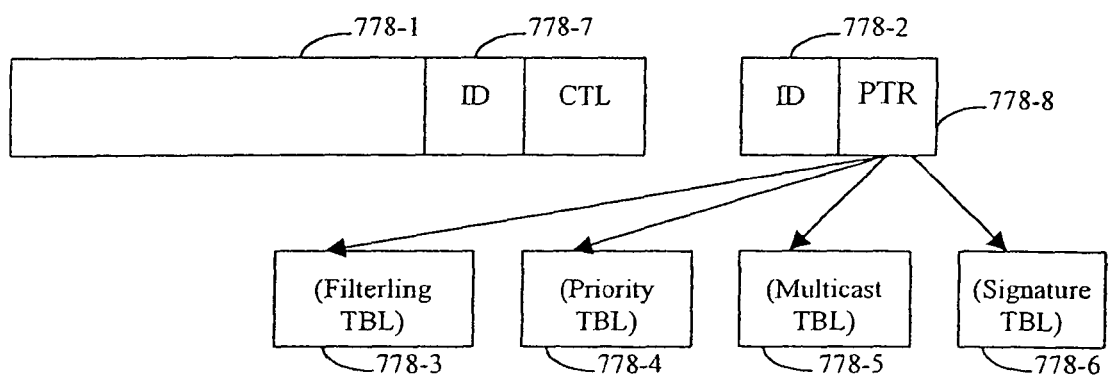
FIG. 89 is a figure explaining still another method for finding out various control records from a communication record, in the seventh embodiment of the present invention.

FIG. 88 explains another method to find, out of a communication record 777-1, a filter control record 777-3, a priority control record 777-4, a multicast control record 777-5 or a signature control record 777-6. In this embodiment, the pointer item 777-2 at the last of the communication record 777-1 stores all the pointers representative of respective whereabouts of a filter control record 777-3, a priority control record 777-4, a multicast control record 777-5 and a signature control record 777-6. FIG. 89 explains still another method to find, out of a communication record 778-1, a filter control record 778-3, a priority control record 778-4, a multicast control record 778-5 or a signature control record 778-6. Using a communication record ID 778-7 within the communication record 778-1, a record ID 778-2 has a content having a value of the communication record ID 778-7. By combining the record ID 778-7 with the pointer 778-8 to show whereabouts of the control records 778-3 to 778-6, individual control records 778-3 to 778-6 can be found out of the communication record 778-1 through the record ID 778-2.

<<Another Form of Communication Record>>

Figure 62:
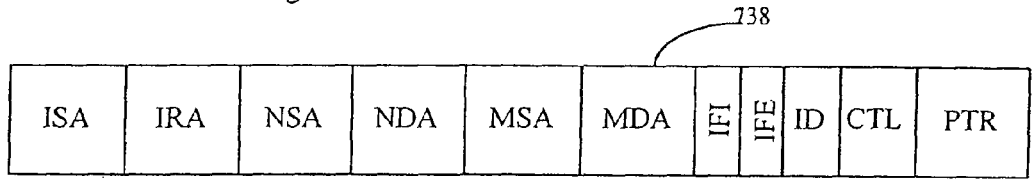
FIG. 62 is a figure showing a communication record, in the seventh embodiment of the present invention.
Figure 90:
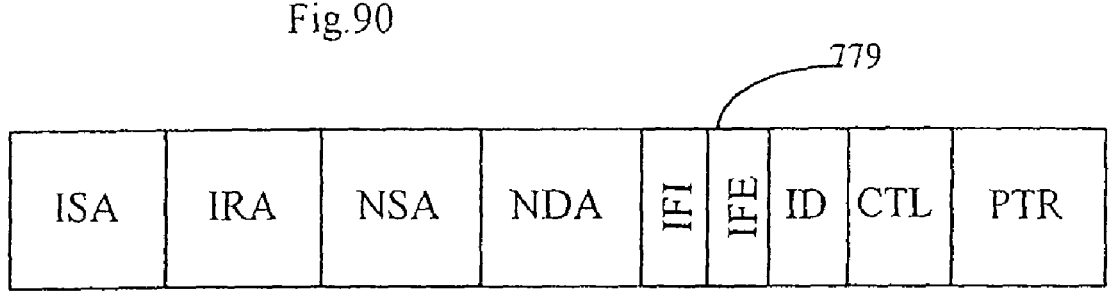
FIG. 90 is a figure showing another form of a communication record, in the seventh embodiment of the present invention.

When carrying out the first function of the network node unit, i.e. encapsulation and decapsulation, in the case that the values of "MDA2" and "MSA1" are both given with "255.255.255.255" in the Equations (7) and (8), the two masks can be omitted. The communication record 779 (FIG. 90) is a communication record omitting the items MSA and MDA in the communication record 738 (FIG. 62).

<<Another Form of External and Internal Packets>>

In the above, the external IP and the internal packets are both explained with the example with IPv4. Next, another example is explained that the external packet adopts an IPv6 packet, an Ethernet frame or the like while the internal packet employs an IPv6 packet, an Ethernet frame, an extension Ethernet frame, an MPLS frame, an HDLC frame, or tagged frame. Although, in the above, the address was an IP address having an IPv4 32-bit length, the address is changed to an IPv6 address, MAC address or HDLC address due to packet or frame change. Furthermore, for the internal address of an internal packet or a hereinafter-referred extension tag, explanation is made on a case with two addresses and a case with one address.

<<Another Embodiment that Internal Packet Contains Source and Destination Addresses>>

FIG. 91 shows a manner that an external IP packet 781-11 is forwarded from the terminal unit 781-2 having an address EA1 onto a communication line 781-6, the external IP packet 781-11 being converted into an internal packet 781-12 (FIG. 92) within the network node unit 781-4 of the IP network 781-1 and transferred in the IP network 781-1, an external IP packet 781-13 being restored from the internal packet 781-12 in the network node unit 781-5, the restored external IP packet 781-13 reaching the terminal unit 781-3 having an address EA2 via a communication line 781-9. The internal packet 781-12, in a payload, contains at least the external IP packet 781-11. The logic terminal 781-7 at an end of the communication line 781-6 is given with an internal address IA1 while the logic terminal 781-8 at an end of the communication line 781-9 is given with an internal address IA2. In the present case, the internal packet 781-12 is in an IPv6 form. The internal packet 781-12, in a header, contains two internal addresses IA1 and IA2. Numeral 781-10 is a router having at least an IPv6 packet transfer function. In the communication record 780 (FIG. 93), the first item ISA from left is an IPv6 internal source address having a 128-bit length. The second item IRA from left is an IPv6 internal destination address having a 128-bit length. The other items are the same as the communication record 738 (FIG. 62), wherein the principle of encapsulation and decapsulation is the same.

In the above explanation with reference to FIGS. 91 to 93, the external IP packet can be in any of the IPv4 packet form or the IPv6 packet form. Incidentally, in the case of the IPv6 packet form, of among the communication record 780 the third to sixth items, i.e. "NSA", "NDA", "MSA" and "MDA", each have a length as long as 128 bits.

FIG. 94 shows a manner that an external IP packet 784-11 is forwarded from the terminal unit 784-2 having an address EA1 onto a communication line 784-6, the external IP packet 784-11 being converted into an internal packet 784-12 (FIG. 95) in the network node unit 784-4 and transferred within the IP network 784-1, an external IP packet 784-13 being restored from the internal packet 784-12 in the network node unit 784-5, the restored external IP packet 784-13 reaching the terminal unit 784-3 having an address EA2 via a communication line 784-9. The internal packet 784-12, in a payload, contains at least the external IP packet 784-11. The logic terminal 784-7 at an end of the communication line 784-6 is given with an internal address IA1 while the logic terminal 784-8 at an end of the communication line 784-9 is given with an internal address IA2. In the present case, the internal packet 781-12 is characterized in a MAC frame to contain two internal addresses IA1 and IA2. The internal packet 784-12 is a MAC frame, and numeral 784-10 is a router capable of transferring a MAC frame. Incidentally, when using a MAC frame or MPLS frame having three or less layered communication functions, the packet may be also called a frame. In the communication record 783 (FIG. 96), the first item ISA from left is an internal transmission MAC address having a 48-bit length. The second item IRA from left is an internal destination MAC address having a 48-bit length. The other items are the same as the communication record 738 (FIG. 62), wherein the principle of encapsulation and decapsulation is the same.

A protocol kind in a header of an external IP packet 784-11 is used for the foregoing protocol filter function as a second function of the network node unit. Namely, reference is made to a protocol kind in a TCP or UDP segment in the external IP packet 784-11 under the control of a communication record 783 (FIG. 96) of in the unit control table. A selected external IP packet turns into an internal frame (internal packet). Under the control of the unit control table in the network node unit 784-7, reference is made to a protocol kind in the TCP or UDP segment in the external IP packet in the internal frame to restore an external IP packet (protocol filter). Meanwhile, a port number in the TCP or UDP segment placed in a payload section of the external IP packet 784-11 is used for the port filter function. Namely, under the control of the communication record 783, reference is made to a port number in a TCP or UDP segment of an external IP packet. A selected external IP packet turns into an internal frame (port filter). Under the control of a unit control table, reference is made to a port number of a TCP or UDP segment in the external IP packet of the internal frame. An external IP packet is restored from a selected internal frame.

FIG. 97 shows a manner that an external IP packet 791-11 is forwarded onto a communication line 791-8 from the terminal unit 791-2 having an address EA1, the external IP packet 791-11 being converted into an internal packet 791-12 in the network node unit 791-3 and transferred within the IP network 791-1, in the network node unit 791-4 an external IP packet 791-13, being restored from the internal packet 791-12, the restored external IP packet 791-13 reaching the terminal unit 791-5 having an address EA2 via a communication line 791-9. The internal packet 791-12 is formed having an extension tag 791-15 added to the external IP packet 791-11. The extension tag 791-15 is a data block including at least two internal addresses. The internal address is defined in a proper length on an internal rule of the IP network 791-1, e.g., 20 bits, 32 bits or 48 bits. An internal address IA1 is provided to a logic terminal 791-6 at an end of a communication line 791-8. An internal address IA2 is provided to a logic terminal 791-7 at an end of a communication line 791-9. In the present case, the extension tag 791-15 forming the internal packet 791-12 is characterized including two internal addresses IA1 and IA2. Numeral 791-10 is a router capable of transferring the internal packet 791-12. The communication record 792-1 (FIG. 98) has the first item ISA, from left, that is a domain to store an internal source address as the internal address IA1. The second item IRA, from left, is a domain to store an internal destination address as the internal address IA2. The other items are the same as the communication record 738 (FIG. 62). The extension tag 791-15 can include the information other than the internal address, e.g. priority of an internal packet to pass the router 791-10 (DiffServ router priority, etc.). Furthermore, the communication record 792-1 can be designed to include priority field, and the priority in the record 792-1 can be copied into the internal packet 791-12 when generated.

Summarizing the embodiment of FIGS. 91 to 98, in the case that an external packet is inputted from a logic terminal on an external communication line. In case that, three sets of a source-sided logic terminal identifier (internal address or identifier of a logic terminal given with an internal address), a source external address in the external packet and a destination external address are defined; a transfer-destination internal address of an internal packet is defined under the control of a unit control table of within a source-sided network node unit. Incidentally, in case two sets of source-sided logic terminal identifying information and a destination external address of in the external packet are defined, variation is possible such that a transfer destination internal address of the internal packet is defined under the control of the unit control table of within the source-sided network node unit.

<<Embodiment of Internal Packet Including Only Destination Address>>

FIG. 99 shows a manner that an external IP packet 791-41 is forwarded onto a communication line 791-28 from the terminal 791-22 having an address EA1, the external IP packet 791-41 being converted into an internal packet 791-42 in the network node unit 791-23 and transferred within the IP network 791-21, in the network node unit 791-24 an external IP packet 791-43 being restored from the internal packet 791-42, the restored external IP packet 791-43 reaching the terminal unit 791-25 having an address EA2 via a communication line 791-29. The internal packet 791-42 is formed having an extension tag 791-33 provided to the external IP packet 791-41. The extension tag is a data block including destination internal addresses. The internal packet 791-42 (in FIG. 99) is different from the internal packet 791-12 (in FIG. 97) in respect of including a destination internal address IA2 but not including a source internal address IA1. The internal address is defined in a proper length on an internal rule of the IP network 791-21, e.g. 20 bits, 32 bits or 48 bits. An internal address IA1 is provided to a logic terminal 791-26 at an end of a communication line 791-28. An internal address IA2 is provided to a logic terminal 791-27 at an end of a communication line 791-29. Numeral 791-40 is a router capable of transferring the internal packet 791-42. The communication record 792-2 (FIG. 100) has the first item ISA, from left, that is a domain to store an internal source address as the internal address IA1. The second item IRA, from left, is a domain to store an internal destination address as the internal address IA1. The communication record 791-2 is used in forming an internal packet 791-40 from the external packet 791-41.

The other items of the communication record 792-2 are similar to the communication record 738 (FIG. 62). The principle of encapsulation and decapsulation is also similar. The extension tag 791-33 can include the information other than an internal address, e.g. priority of an internal packet to pass the router 791-40 (DiffServ router priority, etc.).

Figure 101:
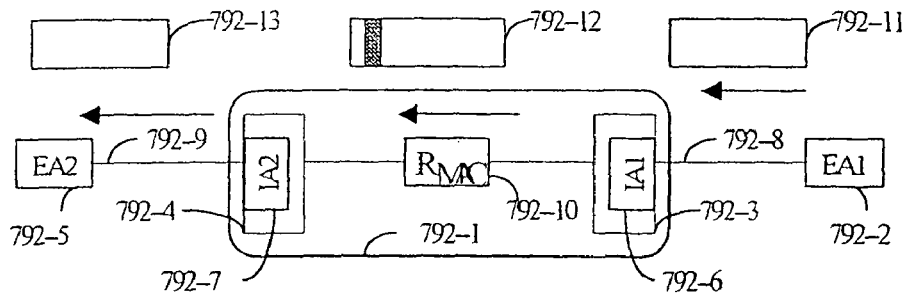
FIG. 101 is a figure showing an example of conversion to and transfer of a MAC frame having an extended tag, in the seventh embodiment of the present invention.
Figure 102:
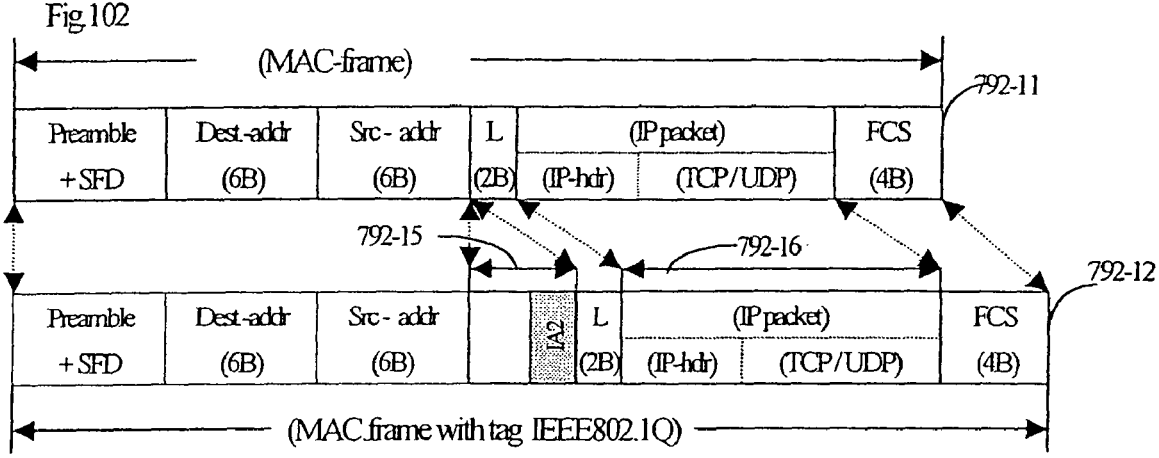
FIG. 102 is a figure explaining configurations of a MAC frame and a MAC frame having an extended tag, in the seventh embodiment of the present invention.

FIG. 101 shows a manner that an external MAC frame 792-11 is forwarded onto a communication line 792-8 (FIG. 101) from the terminal unit 792-2 having an MAC address EA1 having a 48-bit length, the external MAC frame 792-11 being converted into an internal MAC frame 792-12 in the network node unit 792-3 and transferred within an Ethernet network 792-1, in the network node unit 792-4 an external MAC frame 792-13 being restored from the internal MAC frame 792-12, the restored external MAC frame 792-13 reaching the terminal unit 792-5 having an MAC address EA2 via a communication line 792-9. The internal MAC frame 792-12 (FIG. 102) includes an extension tag 792-15. The other frame domains are in the same form as the MAC frame 792-11. The external MAC frame 792-11 includes, in its information domain, an external IP packet 792-16 to be forwarded from the terminal unit 792-2 to the terminal unit 792-5.

Figure 103:
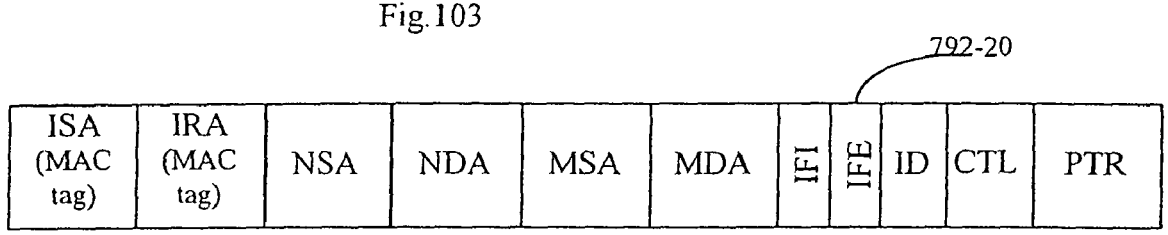
FIG. 103 is a figure showing an example of a communication record for a MAC frame having an extended tag, in the seventh embodiment of the present invention.

The protocol kind in a header of an external IP packet 792-16 can be used for a protocol filter function as a second function of the network node unit. Namely, reference is made to a protocol kind of an IP packet 792-16 in an external frame 792-11 under the control of a communication record 792-20 (FIG. 103) in the unit control table. A selected external frame 792-11 turns into an internal frame 792-12. Furthermore, reference is made to a protocol kind of the IP packet 792-16 in the external frame 792-11 in the internal frame 792-12, to restore an external frame 792-13. Meanwhile, a port number in a TCP or UDP segment placed in a payload section of an IP packet 792-16 is used for the port filter function on the basis of the above method. Incidentally, the extension tag can employ, for example, a VLAN tag standardized under IEEE802.1Q.

An internal address IA1 is provided to a logic terminal 792-6 at an end of a communication line 792-8 (FIG. 101). An internal address IA2 is provided to a logic terminal 792-7 at an end of a communication line 792-9. The extension tag 792-15 can include, as internal destination address, any one of internal addresses IA1 and IA2. 791-10 is a router capable of transferring the internal MAC frame 792-12. The communication record 792-2 (FIG. 103) has the first item ISA, from left, of an internal address IA1. The second item IRA, from left, is an internal address IA2. The internal MAC frame 792-12 includes, as a destination internal address, a second item value IA2 of the communication record 792-20. Meanwhile, in the network node unit 792-3, an internal MAC frame arrives from the internal of an Ethernet network 792-1. When restoring an external MAC frame, the first item IA1 of the communication record 792-20 is used to examine whether the destination internal address of the arrived MAC frame is an address IA1 or not. The communication record 792-20 (FIG. 103) is in the same form as the communication record 738 (FIG. 62). For example, mask operation is made on the external MAC address on the same principle as the Equations (1) and (2). Furthermore, used are protocol information in the external-IP-packet header in the external MAC frame or a source port number and destination port number in a TCP or UDP packet of a payload section of the external IP packet. In a case that the external packet is an Ether frame, a protocol kind in an IP packet 792-16 in the Ether frame can be used to carry out a protocol filter function. Furthermore, a port number in a TCP or UDP segment in an IP packet in the Ether frame can be used to carry out a port filter function or multicast NAT function.

Figure 104:
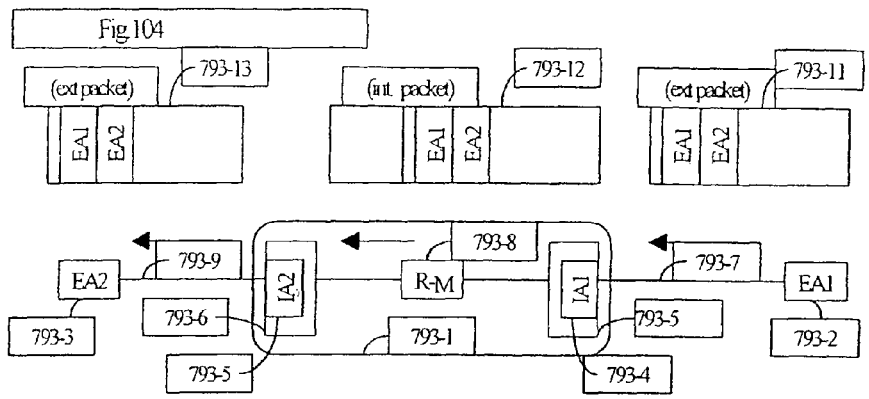
FIG. 104 is a figure showing an example of conversion to and transfer of an MPLS frame, in the seventh embodiment of the present invention.
Figure 105:
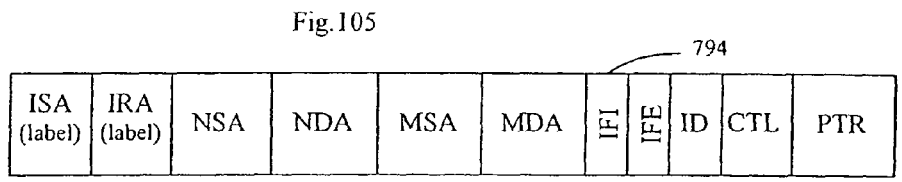
FIG. 105 is a figure explaining a communication record for an MPLS frame, in the seventh embodiment of the present invention.

FIG. 104 shows a manner that an external IP packet 793-11 is forwarded onto a communication line 793-7 from the terminal unit 793-2 having an address EA1, the external IP packet 793-11 being converted into an internal frame 793-12 in the network node unit 793-5 and transferred within a communication network 793-1, in the network node unit 793-6 the internal frame 793-12 is restored into an external IP packet 793-13 that reaches the terminal unit 793-3 having an address EA2 via a communication line 793-9. An internal address IA1 is provided to a logic terminal 793-4 at an end of the communication line 793-7. An internal address IA2 is provided to a logic terminal 793-5 at an end of the communication line 793-9. In the present case, the header of the internal frame 793-12 is characterized by an MPLS frame header including a destination internal address IA2. The internal address corresponds to an MPLS label (e.g. 20 bits). The MPLS label employs an MPLS label multiplex technique capable of adding other MPLS labels one after another. The communication record 794 (FIG. 105) is in the same form as the communication record 738 (FIG. 62). Furthermore, the internal frame 793-12 may include priority for transport. The communication record 794 can be designed to include priority field, and the priority in the record 794 can be copied into the internal frame 793-12 when generated.

Figure 106:
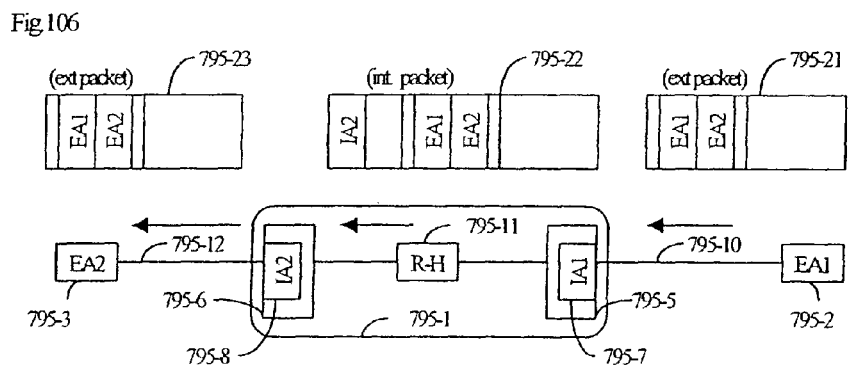
FIG. 106 is a figure showing an example of conversion and transfer of an HDLC frame, in the seventh embodiment of the present invention.
Figure 107:
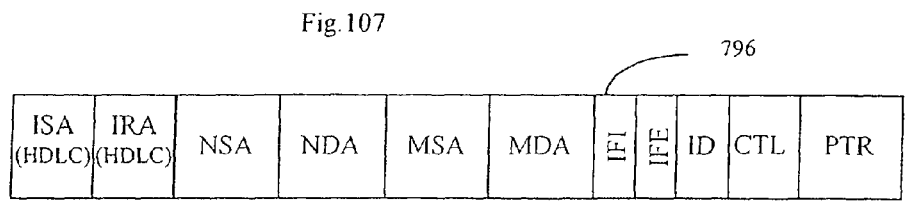
FIG. 107 is a figure explaining a communication record for an HDLC frame, in the seventh embodiment of the present invention.

FIG. 106 shows a manner that an external IP packet 795-21 is forwarded onto a communication line 795-10 from the terminal unit 795-2 having an address EA1, the external IP packet 795-21 being converted into an internal frame 795-22 in the network node unit 795-5 and transferred within a communication network 795-1, in the network node unit 795-6 an external IP packet 795-23 is restored from the internal frame 795-22 that reaches the terminal unit 795-3 having an address EA2 via a communication line 795-12. An internal address IA1 is provided to a logic terminal 795-7 at an end of the communication line 795-10. An internal address IA2 is provided to a logic terminal 795-8 at an end of the communication line 795-12. The internal frame can be made, for example, by an optical frame using an HDLC address. Numeral 795-11 is a router capable of transferring the internal frame 795-22. The header of the internal frame 795-11 is characterized by including a destination internal address IA2. Also, can be included a priority for transferring an internal frame. The communication record 796 (FIG. 107) is in the same form as the communication record 738 (FIG. 62). The communication record 796 has the first item ISA, from left, that is a domain to store an internal source address as the internal address IA1. The second item IRA, from left, is a domain to store an internal destination address as the internal address IA2. The internal address IA1 is used in restoring an external packet from the internal packet transferred from the network node unit 795-7 into the IP network 795-1 to reach the network node unit 795-8. The other items of the internal IP packet are the same as the communication record 738 (FIG. 62). Furthermore, the communication record 796 can be designed to include priority field, and the priority in the record 796 can be copied into the internal frame 795-22 when generated.

<<Variation of Address Inspection within Network Node Unit>>

FIG. 222 shows the communication records 797-15-1 and 797-15-2 different from 738X (in FIG. 62) in unit-control-table communication record form. The communication records 797-15-1 and 797-15-2 are the communication records having a form excluding the second item "ISA" and third item "IRA" from the communication record 738X. This embodiment is characterized in that the internal packet 797-12 form in a communication network 797-1 (FIG. 223) is the same as the external packet 797-11 form in the communication network 797-1 and furthermore communication network 797-1 internal and external addresses are given with addresses on a unified standard. The terminal unit 797-2 has an address "EA1" while the terminal unit 797-5 has an IP address "EA2". The packet is, for example, in a form of IPv4 or IPv6. The address is, for example, a unified global IP address.

An external packet 797-11 forwarded from the terminal unit 797-2 is inputted onto the communication network 797-1 from a logic terminal 797-6 via a communication line 797-8, to search, in the network node unit 797-3, for a communication record given with a logic terminal identifier "Pin-ID1" for identifying a logic terminal 797-6. When a communication record 797-15-1 is found in the network node unit 797-3, AND-operation is made, in a 1-bit correspondence, on a destination address "EA2" of the external IP packet 797-11 and a destination mask "MDA2" acquired from the record, to examine whether an operation result agrees with the network destination address "NDA2" or not (Equation (11)). In the case of agreement in the operation result, AND-operation is made, in a 1-bit correspondence, on a source address "EA1" of the external IP packet 797-11 and a destination mask "MSA1" acquired from the record, to examine whether an operation result agrees with the network source address "NSA1" or not (Equation (12)).

$$IF\ (\text{``EA2''})\ AND\ (\text{``MDA2''}) = \text{``NDA2''} \qquad (11)$$

$$IF\ (\text{``EA1''})\ AND\ (\text{``MSA1''}) = \text{``NSA1''} \qquad (12)$$

When the Equations (11) and (12) are both not held, the external packet 797-11 is discarded. When held, the external packet 797-11 is selected. The external packet 797-11 is rendered as an internal packet 797-12 without change.

The internal packet 797-12, selected by an address inspection using the registration information in the network node unit using the Equations (11) and (12), is transferred in a direction toward the destination address "EA2" of the internal packet 797-12. As a result, it passes the router 797-10 in the communication network 797-1 to reach the network node unit 797-4. The internal packet 797-12 reached is applied by a communication record 797-15-2 of the network node unit 797-4, and applied by an address inspection similar to the foregoing. An external IP packet 797-13 selected and obtained passes a logic terminal 797-7 to reach the terminal unit 797-5 having an address "EA2" via a communication line 797-9. However, calculation is with reversed source and destination addresses. The address inspection by the Equations (11) and (12) is similar to the address inspection by the Equations (7) and (8). It is possible to omit one of the address inspection in a source-sided network node unit and the address inspection in a destination-sided network node unit.

With this configuration, it is easy to avoid such DOS attack as intensively sending insignificant garbage packets to the terminal units 797-5, thus improving the security of packet transmission and reception. This embodiment, although not carrying out the first function of the network node unit (capsulation and decapsulation), can carry out the other all functions, i.e. the second function (packet filter function), the third function (packet priority function), the fourth function (multicast control) and the fifth function (signature function). The second to fifth functions were explained in this embodiment.

The embodiment on FIGS. 222 and 223 is summarized as follows. The communication network includes two or more network node units. A packet is inputted through a logic terminal at an end of the external communication line 1 into the network node unit. The packet, selected by an address inspection using the registration information in network node unit, is transferred within the communication network in the source-sided network node unit. The packet reaches a destination-sided network node unit where it is again subjected to an address inspection using network-node-unit registration information and forwarded onto an external communication line 2 via the logic terminal. The address in the external packet and the address in the internal packet use the addresses conforming to the same standard. An encapsulation and decapsulation function is not made but at least packet filter function, packet priority control, multicast control and signature function are carried out thereby improving the information security of communication network.

<<Billing Using Record ID of Communication Record>>

The ninth item ID of the communication record 738 (FIG. 62) is a record ID to be used for identifying one record from another record. For example, the record ID can be used to specify a record of subject in order for the server 725 (FIG. 61) to read out or rewrite various control records of within the unit control table 722. Also, the control record can be specified for use in imposing communication fee. Also, by rewriting the first bit (FIG. 63) value in the tenth item CTL of the communication record 738 from "0" to "1", the first function (encapsulation and decapsulation) of the relevant network node unit making reference to the communication record can be temporarily stopped. Meanwhile, because the first bit value can be returned to "0" to return the network-node-unit first function to the normal operation, it is possible to temporarily shut down the communication of a communication-fee defaulter, for example.

<<Communication-Record Memory Protect Bit>>

The tenth item CTL last bit (FIG. 63) in the communication record 738 is a memory protect bit to allow or prohibit the rewrite of the communication record. When the memory protect bit is "1", the relevant communication record is prohibited from being rewritten. When "0", the communication record is allowed to be rewritten. Memory protection can be carried out in cooperation with a hardware function of within the network node unit 703 (FIG. 61).

Summarizing the embodiment on FIGS. 99 to 107, in case that an external packet is inputted at a logic terminal on an external communication line and three sets are defined of source-sided logic terminal identifying information, external-packet source external address and destination external address, an internal communication line for internal packet transfer is defined between source-sided and destination-sided network node units under the control of the unit control tables of within the source-sided and destination-sided network node units and the control table of a relay unit. Where the internal packet is applied with an MPLS frame, the internal communication line can be considered as an internal path. Incidentally, by defining the two sets of source-sided logic terminal identifying information and external-packet destination external IP address, variation is possible to provide such that an internal communication line for internal packet transfer is defined under the control of the unit control tables in the source-sided and destination-sided network node units and the control table in the relay unit.

<<Summary>>

The communication network includes two or more network node units. An external packet turns into an internal packet under the control of a unit control table in the network node unit. The internal packet is transferred within the communication network and restored as an external packet under the control of the unit control table of the destination-sided network node unit. The unit control table includes respective one or more communication records including external IP address related information used in the terminal-to-terminal communication outside the communication network and address related information contained in an internal packet. An external IP packet forwarded from an external terminal unit is inputted from a logic terminal at an end of an external communication line. Using a source internal address given to the source logic terminal, source-sided external IP address and destination external IP address in the external IP packet, and a unit-control-table communication record in the source-sided network node unit, a destination internal address of the internal packet is defined. The above address handling includes a function of the address inspection. The internal packet is transferred within the communication network to reach a destination-sided network node unit. An external IP packet is restored by the use of a unit-control-table communication record in the destination-sided network node unit and delivered to another terminal unit via another external communication line. The transfer destination of the internal packet can be made different by the difference in an external-IP-packet destination external address value. In the communication record, in the case that the set is even the same of internal transmission IP address ISA, network source address NSA and source IP address mask MSA, it is possible to change the set of network destination address NDA, destination IP address mask MDA and internal destination IP address IRA, resulting that the transferred point of the internal packet is changed.

The basic function of the network node unit is to encapsulate an external IP packet and forward it into the IP network, decapsulate an internal packet and forward it to an outside of the IP network and block an IP packet having an unregistered address. More specifically, the network node unit has, as a function of upon transmission, a function to convert an external IP packet into an internal IP packet when the three sets of an internal address given to the logic terminal at a contact between the external communication line and the network node unit, an external source IP address and an external destination IP address contained in an external IP packet inputted from the external communication line are includes in one of communication records of a unit control table in the network node unit.

Furthermore, the network node unit includes at least one of protocol filter function and port filter function. The protocol filter function controls, as a function of upon transmission, whether to or not to convert the external IP packet into an internal packet, according to a protocol in the inputted external IP packet. The port filter function, as a function of upon arrival, allows an internal packet to arrive from the inside of the IP network, restores an external packet from the internal packet according to an external-IP-packet port number contained in a payload section of the input internal IP packet, and controls whether to forward it onto an external communication line or not. Also, the port filter function controls whether to or not to restore an external packet from the internal IP packet according to an external-IP-packet port number contained in a payload section in the inputted internal IP packet. The unit control table has therein a plurality of communication records. By changing an external destination address, the transfer destination of an internal packet can be changed. An IP communication network can be architected such that, under the control of the unit control table, reference is made to a protocol kind of the external packet so that a selected external packet is turned into an internal packet while an not-selected external packet is discarded.

The network node unit has a function of upon transmission to determine a destination internal address of an internal packet when the set of external source IP and external destination IP addresses contained in an external IP packet inputted from an external communication line agrees with an address inspection of a communication record in a unit control table of within the network node unit. Also, the set of source and destination internal addresses of an internal packet can specify an internal communication line to transfer the internal packet. Furthermore, the function of converting an external IP packet in a network node unit into an internal packet and the function of reverse conversion can be carried out as a program within the network node unit. The function of converting an external IP packet into an internal packet and the function of reverse conversion can be carried out as a function circuit within the network node unit.

The packet filter function of the network node unit includes the functions of a protocol filter using a protocol kind in an external IP packet and of a port filter using a port number in a payload (such as TCP/UDP) of the external IP packet. The protocol filter allows a packet to pass or blocks a packet from passing according to a protocol passing condition of an external IP packet entering the network node unit. The port filter, also, allows a packet to pass or blocks a packet from passing according to a protocol passing condition of an IP packet entering the network node unit. Using a filtering control table, function is provided both upon transmission and upon arrival.

Of the functions of the network node unit, packet priority control, multicast control-1 and -2 and signature function are selectable options. The transmission priority control function in packet priority control is to control the priority in receiving an IP packet from an external communication line and in transmitting an IP packet into the IP network from the network node unit. The arrival priority control function is a function to control the priority in allowing an IP packet to arrive the network node unit from the inside of the IP network and in transmitting it onto an external communication line. Both cases use a packet priority control table. Multicast control-1 is a function to forward a packet having a multicast address to a plurality of destinations and detect and recover a packet in the reverse direction (overflow line control), using a multicast control table. Multicast control-2 is a function to convert a destination multicast IP address into another IP address (multicast recipient address conversion function). More specifically, it is possible to transmit an external packet restored through conversion of from a destination-sided network node unit into an IP address and port number individual of a reception terminal unit. Signature control is to provide, as a transmission signature function, a signature with time when an external packet passes a source-sided network node unit and to provide, as an arrival signature function, a signature with time to an external packet restored in a destination-sided network node unit. A signature control table is used.

By using a communication record and port filter, the IP network can be separated into a plurality of internal networks. An external packet turns into an internal packet under the control of a unit control table. The internal packet is transferred to a different internal network according to a port number in a payload (such as TCP/UDP) of the external IP packet. The internal networks can be set up two or more. The internal packet is restored into an external packet in a destination-sided network node unit. This method enables communication between two terminal units. Furthermore, on the basis of this method, the IP network can be separated into a plurality of internal networks.

A communication network can be architected such that, under the control of a unit control table, reference is made to a port number in a payload of an external packet so that a selected external packet is turned into an internal packet while a not-selected external packet is discarded. A communication network can be architected such that, under the control of a unit control table, reference is made to a port number in a payload of an internal packet so that an external packet is restored from a selected internal packet while a not-selected internal packet is discarded. A communication network can be architected having a particular-packet exclusion function to designate a protocol or port number for excluding an IP packet, by using a protocol filter 4 (blocking a designated protocol upon arrival) function, a port filter 3 or port filter 4 (blocking a designated port number) function.

By using a record ID in a communication record to specify a relevant communication record, it is possible to impose communication fee. Also, it is possible to temporarily cease or recover the function of encapsulation and decapsulation using a relevant communication record by using a record effective bit in the communication record, for an IP network. In a case that an external packet is an Ether frame, a protocol kind in an IP packet within the Ether frame can be used to carry out a protocol filter function. Furthermore, using a port number in a payload of an IP packet in an Ether frame, it is possible to carry out a port filter function or multicast control 2 function. The internal packet can be made by any of an IPv4 packet, an IPv6 packet, an Ethernet frame, an extension Ethernet frame, an MPLS frame, an HDLC frame and an external packet with extension tag. The communication record has internal source IP address, internal destination IP address, network source address, network destination address, source IP address mask, destination IP address mask, internal logic terminal identifier, external logic terminal identifier, record ID, record control information and IP encapsulation and decapsulation function, and includes, as sub-tables, filtering control table, packet priority control table, multicast control table and signature control table. The control table function can be realized as a network node unit, a communication function circuit or further a communication-function programming module.

The communication network variation is possible that the format of external packet and the internal packet are the same in the network using the address inspection in network node units. It is possible that the address administration table (FIG. 40 to FIG. 42) described in the embodiment 3 can be replaced with the unit control table (FIG. 136 or FIG. 62) described in the embodiment 7. Further variation, the unit control table described in FIG. 222 for the address inspection can be implemented in the Embodiment 3.

<<Relation to Conventional Inventions>>

The major part of the invention is in the packet filter function, the multicast recipient address conversion function (multicast NAT function) and the IP network inside separation using port numbers. The basic portion of encapsulation and decapsulation (first function) is disclosed in Embodiment 1 of the prior patent, the basic portion of priority control (third function) is in Embodiments 32 and 33 of the prior patent, the basic portion of multicast-control overflow line (fourth function-1) is in Embodiments 17 and 18 of the prior patent, and the basic portion of signature control is in Embodiments 21 of the prior patent. The present invention discloses a method of carrying out a combination of the packet filter and multicast NAT functions with the other function, wherein external and internal packets are disclosed within various embodiments.

8. Embodiment 8 for Carrying Out Fixed Telephone Set, Mobile Phone and Multimedia Communication on the Same IP Network In FIG. 108, an IP communication network 900 includes terminal-unit gateways 901-1 to 901-5. Fixed telephone sets 905-1 to 905-4 are connected to any of media routers 903-1 to 903-4 through respective wired communication lines. Mobile phones 905-5 to 905-8 are to be connected to any of respective radio base points 902-1 to 902-4 through respective radio communication lines. It is not fixed whether to connect the mobile phone 905-5 to 905-8 to any radio base point. The media router and radio base point is connected to any of network node units via a communication line having an IP packet transfer function. Numerals 905-10 to 905-17 are terminal units having an IP packet transmission/reception function, each connected to the media router through respective communication lines.

Numeral 915 is an operation management server of the IP communication network 900, which is connected to the router 911-1 via the communication line. The mobile phone can be as any of a voice telephone set, an image-input/output-functioned telephone set, a voice image transmission/reception unit and a mobile terminal unit. The terminal-unit gateway 901-1 includes a network node unit 906-1 and a terminal-unit control section 914-1. The network node unit 906-1 includes a unit control table 910-1. The terminal-unit control section 914-1 includes a management telephone server 906-2, a table management server 906-3, a telephone management server 906-4, a telephone number server 906-5, a proxy mobile phone server 906-6 and a router 916-1. The servers 906-2 to 906-5, the network node unit 906-1 and the router 916-1 are connected together directly or indirectly through communication lines. Similarly, the terminal-unit gateway 901-2 includes a network node unit 907-1 and a terminal-unit control section 914-2. The network node unit 907-1 includes a unit control table 910-2. The terminal-unit control section 914-2 includes a proxy telephone server 907-2, a table management server 907-3, a telephone management server 907-4, a telephone number server 907-5, a proxy mobile phone server 907-6 and a router 916-2.

Similarly, the terminal-unit gateway 901-3 includes a network node unit 908-1 and a terminal-unit control section 914-3. The network node unit 908-1 includes a unit control table 910-3. The terminal-unit control section 914-3 includes a proxy telephone server 908-2, a table management server 908-3, a telephone management server 908-4, a telephone number server 908-5, a proxy mobile phone server 908-6 and a router 916-3. Similarly, the terminal-unit gateway 901-4 includes a network node unit 909-1 and a terminal-unit control section 914-4. The network node unit 909-1 includes a unit control table 910-4. The terminal-unit control section 914-4 includes a proxy telephone server 909-2, a table management server 909-3, a telephone management server 909-4, a telephone number server 909-5, a proxy mobile phone server 909-6 and a router 916-4.

Numeral 995 is a superior telephone number server, numerals 990-1 and 990-2 are users, numerals 991-1 and 991-2 are accepters, and numerals 992-1 and 992-2 are user service servers. In contrast to the superior telephone number server 995, the telephone number servers 906-5 to 909-5 are referred also to as lower-order telephone number servers.

In the invention, identification symbols are used also as telephone numbers and Internet host names (e.g. Host1. domain1. domain2.com.) in order to identify a telephone set or terminal unit. The telephone number server is inputted by an identification symbol to answer a corresponding IP address and the related information. The routers 916-1 to 916-4 are mutually connected by way of the communication lines and routers of the IP network 900. The communication lines 912-1 to 912-6 are referred to as control communication lines of the IP network 900. The communication lines 913-1 to 913-6 are referred to as media communication lines of the IP network 900.

<<NNI and UNI>>

The transmission/reception procedure of an IP packet mutually between the telephone management servers is referred to as an IP packet transmission/reception procedure in accordance with an NNI interface (Network-Network Interface). he NNI interface is standardized within the IP network 900. Meanwhile, the transmission/reception procedure of an IP packet between the media router and the telephone management server is referred to as an IP packet transmission/reception procedure in accordance with a UNI (User-Network Interface). The UNI is referred to as a media router UNI. Similarly, the IP packet transmission/reception procedure between the radio base point and the telephone management server is referred to as an IP packet transmission/reception procedure due to the UNI. The UNI is referred to as a radio base point UNI. In the case there is difference in the media router or radio base point, the UNI can be in a different form. The telephone number server holds the UNI of a media router and a radio base point UNI.

The radio base points 902-1 to 902-4, the media routers 903-1 to 903-4, the IP terminal units 905-10 to 905-17 have respective IP addresses to be distinguished from the others, from respective of which an IP packet can be forwarded to the proxy telephone server. For this purpose, the IP address possessed by the media router, radio base point, telephone set or terminal unit is set in a communication record of a unit control table in a network node unit to be connected through a communication line. The detailed method of practicing a communication record is explained in another embodiment of the invention. In a communication Case 1 to 5, the NNI interface adopts a form applying a terminal-to-terminal communication connection method based on a common channel signaling system to the IP network.

<<Communication Case 1: Communication between Fixed Telephone Sets>>

Figure 109:
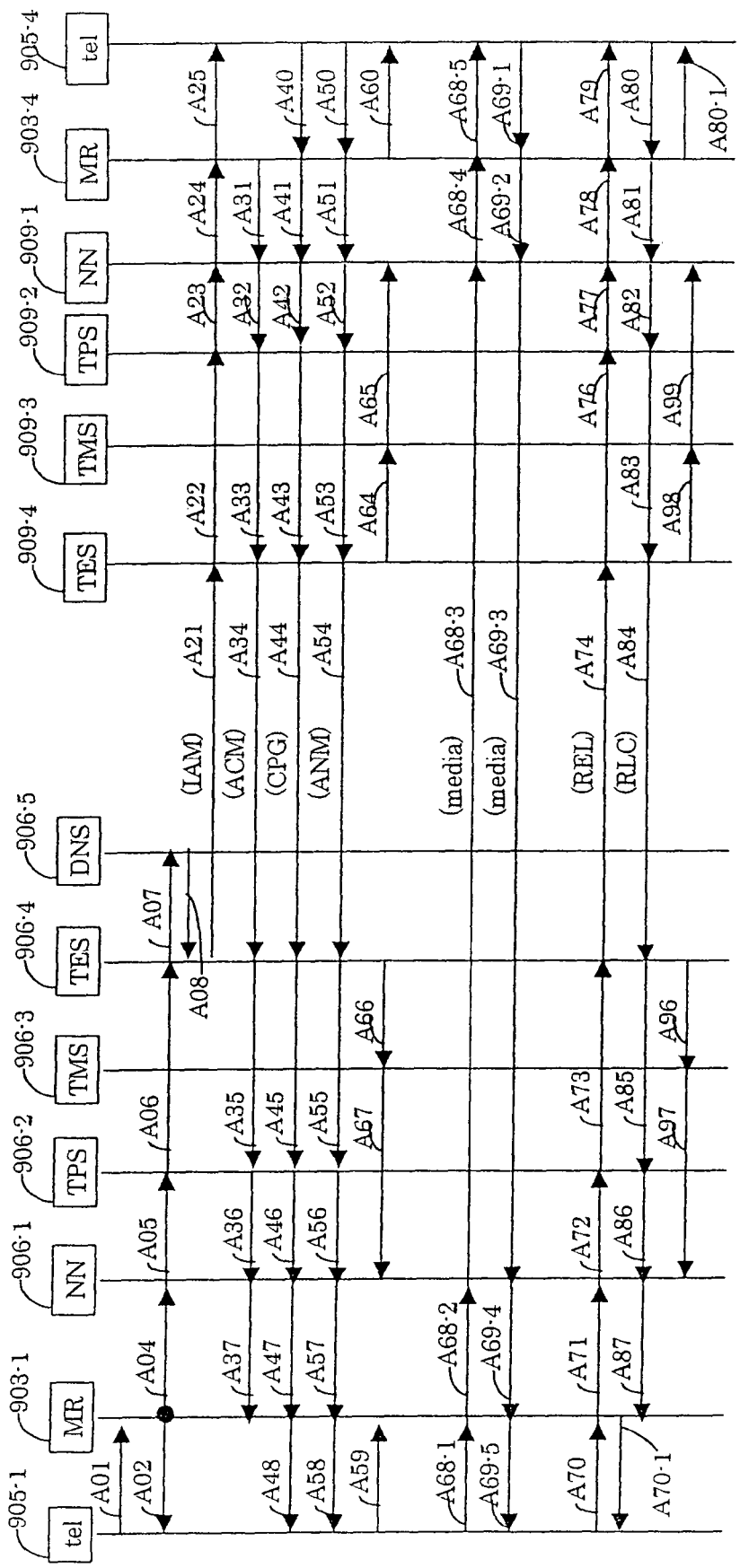
FIG. 109 is a figure showing a method for carrying out a communication from a fixed telephone set to a fixed telephone set in an IP network, in Communication Case 1 of the eighth embodiment of the present invention.

FIG. 109 is a diagram explaining the telephone communication from the mobile phone 905-1 to the fixed telephone set 905-4. The telephone set 905-1 has a telephone number "TN1" while the telephone set 905-4 has a telephone number "TN2". Herein, the media router 903-1 includes an external IP address "EA1" while the media router 903-4 includes an external IP address "EA2". An internal IP address "IA1" is provided to a logic terminal at an end of the communication line 917-1 while an internal IP address "IA2" is provided to a logic terminal at an end of the communication line 917-2. The proxy telephone server 906-2 is given with an external IP address "EA81" and internal IP address "IA81" while the proxy telephone server 906-4 is with an internal IP address "IA91". Similarly, the proxy telephone server 909-2 is given with an external IP address "EA82" and internal IP address "IA82" while the proxy telephone server 909-4 is with an internal IP address "IA92". The telephone number server 906-5 is given with an internal address "IA96".

<<Connection Phase>>

Taking a transceiver of the telephone set 905-1, a call connection request is sent to the media router 903-1 (Step A01). The media router 903-1 sends back a call connection request acceptance (Step A02). Next, the media router 903-1 forms an IP packet 920 (FIG. 110) including an source IP address "EA1", destination IP address "EA81", source telephone number "TN1", destination telephone number "TN2", UDP port number "5006" used in telephone voice transmission and attendant information "Info1", and sends it to the network node unit 906-1 (Step A04). The payload of the IP packet 920 is a UDP packet having its source and destination port numbers both given with "5060". The attendant information "Info1" is a voice compression scheme kind or the like of the telephone set 905-1. The media router 903-4 at the other of communication uses the attendant information "Info1".

The network node unit 906-1 uses an internal IP address "IA1" given to the end of the communication line the external IP packet 920 has inputted and a destination IP address "EA81" in the IP packet 920, to search through the unit control table 910-1 (FIG. 136). In the present case, the first-lined record, i.e. record of "IA1, IA81, NA1, NA81, MA1, MA81, . . . ", is applied to form an internal packet 921 (FIG. 111). This is sent to a proxy telephone server 906-2 having an internal IP address "IA81" (Step A05). Note that it is possible to adopt a method of using the third item "NA1" and the fifth item "MA1" rendered zero in both values. This case is with an application method relaxing a source IP address condition in encapsulation as a first function of the communication record explained using the Equation (8).

In the case that the proxy telephone server 906-2 receives an IP packet 921, it forms an IP packet 922 (FIG. 112) containing a payload section of an IP packet 921 and addresses "EA1, IA1, EA81, IA81" in the payload section and sends it to the telephone management server 906-4 (Step A06).

<<Regulation in the Number of Outgoing Calls on Each Line>>

The telephone management server 906-4 extracts a source IP address "EA1" from a received IP packet 922 and compares it with a call management table 918-1 (FIG. 140). Concerning the record having an IP address "EA1", this embodiment has the number of lines in service of "2". The number of lines in service is increased by "1" to "3", to be compared with the upper limit number of lines. Because the upper limit number of lines is "5", the process proceeds to the next procedure. When not so, the subsequent process is suspended.

<<Circuit Identification Code Management>>

The telephone management server 906-4 reads out an IP packet 922 (FIG. 112) and extracts a source telephone number "TN1" and destination telephone number "TN2", to calculate a circuit identification code "CIC-2" for managing terminal-to-terminal communication from a set of these two telephone numbers according to a predetermined rule. Next, as a second lined record of a CIC management table 923 (FIG. 113), written are a circuit identification code "CIC-2", source telephone number "TN1", destination telephone number "TN2", external IP address "EA1" and internal IP address "IA1", external IP address "EA81" and internal IP address "IA81", internal IP address "IA91" in the telephone management server 906-4, procedure section "IAM" and write time (date and time) "St-2".

Furthermore, the telephone management server 906-4 shows an IP packet 924 (FIG. 114) containing a destination telephone number "TN2" and a query concerning the source telephone number "TN1" to the telephone number server 906-5 (Step A07). The telephone number server 906-5 answers the telephone management server 906-4 an IP packet 925 (FIG. 115) containing an external IP address "EA2" of the media router 903-4 the telephone set 905-4 is to connect and internal IP address "IA2" provided to the end of the communication line 917-2, an external IP address "EA82" and internal IP address "IA82" of the proxy telephone server 909-2, an IP address "IA92" of the telephone management server 909-4, and a UNI interface "UNI1" of the media router 903-1 and a UNI interface "UNI2" of the media router 903-4 (Step A08). Incidentally, the telephone number server 906-5 has acquired "UN12" by inquiring a UNI interface of the media router 903-4 to the telephone number server 909-5 via the superior telephone number server 995. The information exchange between the telephone number servers will be explained later.

The telephone management server 906-4 adds the IP addresses and UNI interface acquired from the telephone number server 906-5 to the CIC management table 923 (FIG. 113). This result is shown on the second-lined record in the CIC management table 926-1 (FIG. 116). The telephone management server 906-4, when exchanging the IP packet with the media router 903-1 side, uses the UNI interface "UNI1" of within the CIC management table 926-1 to employ the following communication procedure (Steps A35, A45, A55, A73, A85, etc.).

<<Variation in UNI Acquisition>>

Figures 117, 118, 119:
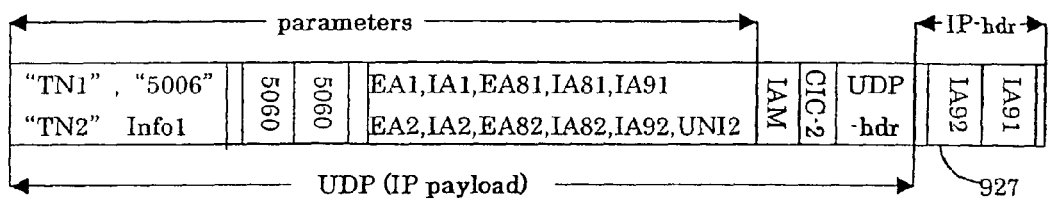
FIG. 117 is a figure showing a UNI look-up, in Communication Case 1 of the eighth embodiment of the present invention.
FIG. 118 is a figure showing an IAM message to be sent from a calling-sided telephone management server to a called-sided telephone management server, in Communication Case 1 of the eighth embodiment of the present invention.

Concerning the media router 903-1 UNI, the media router 903-1 UNI can be examined from an IP address of the proxy telephone server 906-2 by the use of a UNI look-up 925-1 (FIG. 117). In Step A07, the telephone management sever 906-2 makes an inquiry concerning only a destination telephone number "TN2". In this method, the proxy telephone server 906-2 is arranged to communicate with only a plurality of media routers having the same UNI. Incidentally, a plurality of proxy telephone servers can be set up within the terminal-unit gateway 901-1 such that proxy telephone servers for handling the respective UNIs, such as proxy telephone servers 1 exclusive for media router 1 and proxy telephone servers 2 exclusive for media router 2, are all previously provided to handle the UNIs of individual media routers at the other end of communication.

<<NNI>>

Next, the telephone management server 906-4 makes reference to IP address information of the CIC management table 926-1 (FIG. 116) to form, from the packet 922 (FIG. 112), an IP packet 927 (FIG. 118) for call set request (IAM packet), and sends the IP packet 927 to the telephone management server 909-4 (Step A21). Herein, the source IP address of the IP packet 927 is "IA91" of the telephone management server, and the destination IP address is "IA92" of the telephone management server 909-4.

<<Regulation in the Number of Incoming Calls on Each Line>>

The telephone management server 909-4 extracts an address "EA2" of the destination media router 903-4 from a received IP packet 927 (FIG. 118) and compares it with an incoming-call management table 918-2 (FIG. 141). In this embodiment, the number of lines in service is "2". The number of lines in service is increased by "1" to "3" and compared with the upper limit number of lines. Because the upper limit number of lines is "7", the process proceeds to the next procedure. If not, no further progress.

<<Management of Circuit Identification Code>>

The telephone management server 909-4, receiving an IP packet 927, extracts a circuit identification code "CIC-2" contained in its payload, a procedure section "IAM", a source telephone number "TN1", a destination telephone number "TN2", and an IP address ("EA1", "IA1", "EA81", "IA81", "IA91", "EA2", "IA2", "EA82", "IA82", "IA92", "UNI2") and UNI kind, and writes and records them, as a record, to the CIC management table 926-2 (FIG. 119) of under the management of the telephone management server 909-4. In the present case, these are a record on the first line, and a write time "St-3" is also written. From then on, the telephone management server 909-4, when exchanging an IP packet with the media router 903-4, employs a communication procedure (Step A22, A33, A43, A53, A76, A83, etc.) based on the UNI interface "UNI2" of in the CIC management table 926-1.

Figure 120:
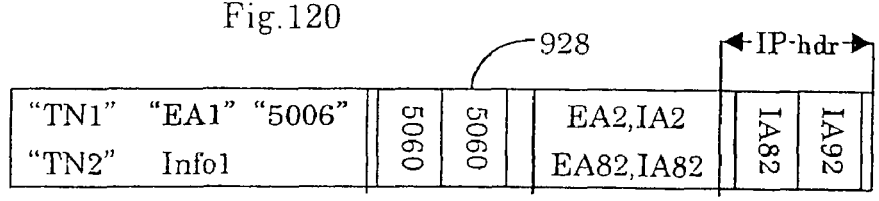

The telephone management server 909-4, subsequently, forms an IP packet 928 (FIG. 120) by using the information acquired from the IP packet 927, and sends it to the proxy telephone server 909-2 (Step A22). The payload of the IP packet 928 includes a UDP segment and address area, wherein the UDP segment contains therein an IP address "EA1" of a source media router 903-1. The address area includes IP addresses "EA2, IA2, EA82, IA82".

Figure 121:
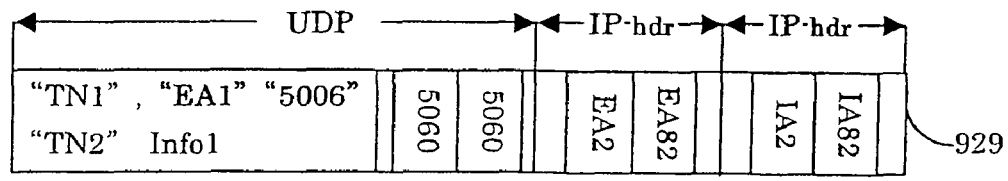
Figure 122:
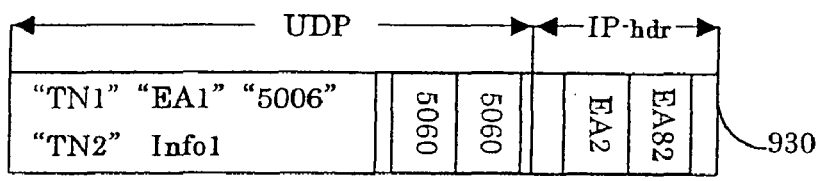

The proxy telephone server 909-2 uses the information acquired from the IP packet 928 to form an IP packet 929 (FIG. 121), and sends it to the network node unit 909-1. The IP packet 929 having a source address "IA82" and destination address "IA2" reaches the network node unit 909-1 (step A23). The network node unit 909-1 uses the unit control table 910-4 (FIG. 139) to decapsulate the received IP packet 929 thereby forming an IP packet 930 (FIG. 122) and thereafter sends the IP packet 930 to the media router 903-4 (Step A24). The media router 903-4 receives the IP packet 930 and confirms whether the contained destination telephone number "TN2" is arrivabLe. In the case of allowed arrival, an incoming call notification is made to the telephone set 905-4 (Step A25).

Figure 123:
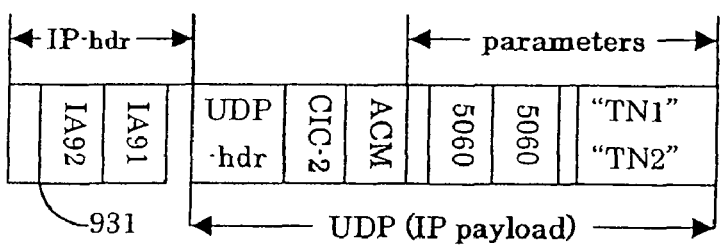

Furthermore, the media router 903-4 reads out and holds the content of the IP packet 930, i.e. source telephone number "TN1", destination telephone number "TN2", source IP address "EA1", source UDP port number "5006" and attendant information "Info1". The media router 903-4 forms an IP packet containing a source telephone number "TN1", destination telephone number "TN2" and arrivability in order to notify the arrivability at the telephone set 905-4 (partition of arrivability or nonarrivability), and notifies it to the telephone management server 909-4 (Steps A31, A32, A33). The telephone management server 909-4 receives the IP packet the media router 903-4 has formed and extracts the information of source telephone number "TN1", destination telephone number "TN2" and arrivability. Then, a circuit identification code "CIC-2" is calculated from the two telephone numbers, and an IP packet 931 (FIG. 123) (ACM packet) containing a circuit identification code "CIC-2" and arrival-allowing/notallowing information is formed and sent to the telephone management server 906-4 (Step A34). The telephone management server 906-4 extracts the circuit identification code "CIC-2" and procedure partition "ACM" from the received IP packet 931 and examines the CIC management table 926-1 (FIG. 116) held by the telephone management server 906-4 to find a record having a circuit identification code "CIC-2" thus rewriting a record procedure partition column into a procedure partition "ACM". Incidentally, the telephone management server 906-4 is allowed to generate an IP packet representative of ACM-packet reception (including arrivability information) and inform the media router 903-1 of it (Steps A35 to A37, option).

Figure 124:
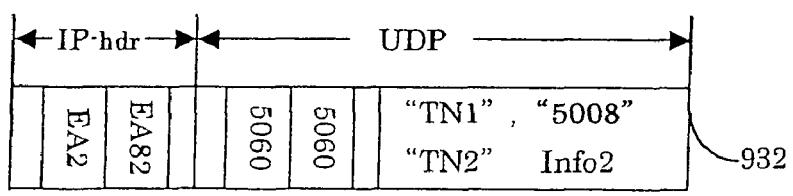
Figure 125:
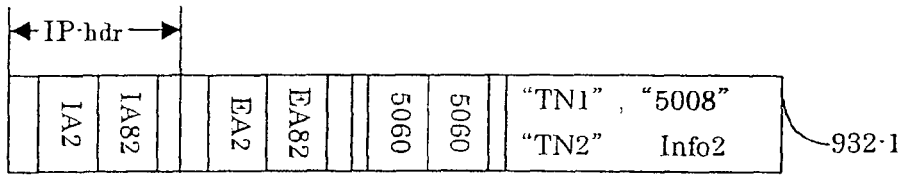
Figure 126:
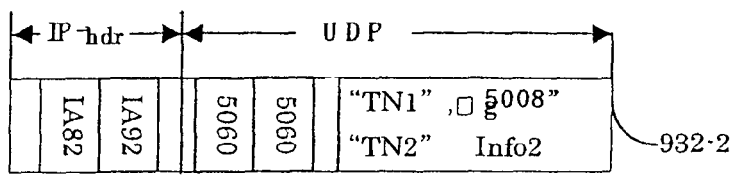

Meanwhile, following the Step A25, when the telephone set 905-4 reports an in-calling to the media router 903-4 (Step A40), the media router 903-4 forms an IP packet 932 (FIG. 124) containing a source telephone number "TN1", destination telephone number "TN2", UDP port number "5008" for use in voice communication by the telephone set 905-4, and attendant information "Info1", and forwards it to the network node unit 909-1 (Step A41). In the network node unit 909-1, the first-lined communication record "IA2, IA82, NA2, NA82, MA2, MA82, . . . " of a unit control table 910-4 (FIG. 139) is used to encapsulate the IP packet 932 into an IP packet 932-1 (FIG. 125) (Step A42). This turns into an IP packet 932-2 (FIG. 126) in the proxy telephone server 909-2 and notification is made to the telephone management server 909-4 (Step A43).

Figure 127:
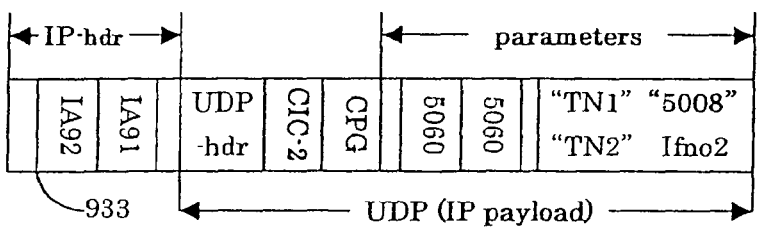
Figure 128:
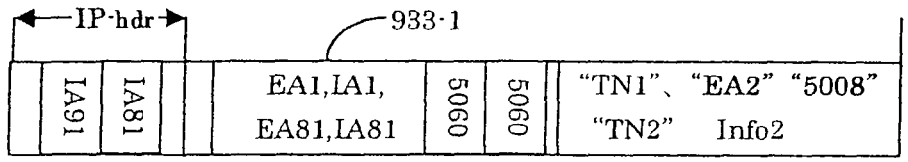

The telephone management server 909-4 extracts the source telephone number "TN1" and destination telephone number "TN2" from the IP packet 932-2 and calculates a circuit identification code "CIC-2" from the two telephone numbers, to form an IP packet 933 (FIG. 127, CPG packet) representative of an in-calling and send it to the telephone management server 906-4 (Step A44). The IP packet 933 contains the UDP port number "5008",and attendant information "Info2" acquired from the IP packet 932-2. The telephone management server 906-4 extracts the circuit identification code "CIC-2", procedure partition "CPG", UDP port number "5008" and attendant information "Info2" from the IP packet 933 and rewrites a procedure partition of a record having a circuit identification code "CIC-2" of the CIC management table 926-1 (FIG. 116) to "CPG". From the CIC management table 926-1, an IP address "EA1, IA1, EA81, IA81", source telephone number "TN1" and destination telephone number "TN2" is readout. Using the read-out information, an IP packet 933-1 (FIG. 128) is formed and sent to the proxy telephone server 906-2 (Step A45).

Figure 129:
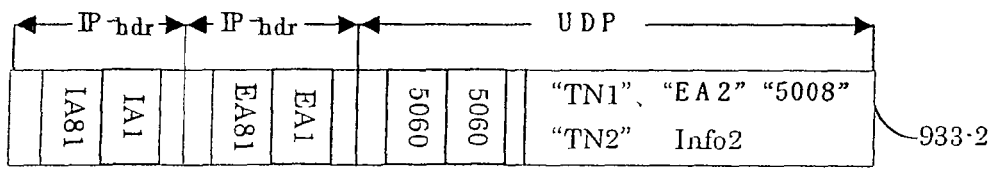
Figure 130:
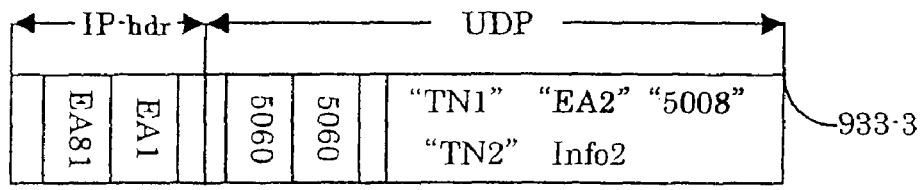

The proxy telephone server 906-2 forms an IP packet 933-2 (FIG. 129) and sends it to the network node unit 906-1 (Step A 46). The network node unit 906-1 decapsulates the IP packet 933-2 to form an IP packet 933-3 (FIG. 130) and sends it to the media router 903-1 (Step A47). The media router 903-1 reads a telephone numbers "TN1" and "TN2", IP address "EA2", UDP port number "5008" and attendant information "Info2" out of the IP packet 933-3, and holds it. The media router 903-1 forwards an in-calling signal to the telephone set 905-1 (Step A48).

Next, in the case that the telephone set 905-4 obtains an answer to a call having continued after the Step A40, it sends an answer on a destination telephone set to the media router 903-4 (Step A50). The media router 903-4 sends an IP packet containing a source telephone number "TN1" and destination telephone number "TN2" to the telephone management server 909-4 in order to notify the answer (Steps A51 to A53).

The IP packet informing the answer has a form similar to the form of the IP packet in Steps A41 to A43. Incidentally, the media router 903-4 can send an answer confirmation on the answer in the step A50 back to the telephone set 905-4 (Step A60, option).

The telephone management server 909-4 extracts the source telephone number "TN1" and destination telephone number "TN2" out of the received IP packet and calculates a circuit identification code "CIC-2" from the two telephone numbers, to form an IP packet 934 (FIG. 131) (ANM packet)

including at least a circuit identification code "CIC-2" notifying a response and send it to the telephone management server 906-4 (Step A54). The telephone management server 906-4 extracts the circuit identification code "CIC-2" and procedure partition "ANM" out of the received IP packet 934, and examines a CIC management table 926-1 (FIG. 116) held by the telephone management server 906-4 to find a record of a circuit identification code "CIC-2", thereby rewriting a procedure partition column of the record into a procedure partition "ANM".

Next, the telephone management server 906-4 notifies the media router 903-1 of an ANM packet reception, i.e. a response by the telephone set 905-4 to the call (Steps A55, A56, A57). The media router 903-1 sends an answer signal to the telephone set 905-1 (Step A58). The telephone set 905-1 can send back an answer confirmation signal to the answer signal (Step A59, option). In the Steps A45 to A47, notification of an in-calling is made, and in the Steps A55 to A57, a response of a destination telephone set is notified.

<<Setting of Communication Record>>

The telephone management server 909-4, after the Step A54, extracts an IP address "EA2", "EA1", "IA2", "IA1" from a record having a circuit identification code "CIC-2" from a CIC management table 926-2 (FIG. 119), and sends it to the table management server 909-3 (Step A64). The table management server 909-3 sets a third-lined record "IA2, IA1, EA2, EA1, MK2, MK1, . . . " of a unit control table 910-4 (FIG. 139) of within the network node unit 909-1 (Step A65). Herein, MK1=255.255.255.255, MK2=255.255.255.255. Similarly, The telephone management server 906-4, after the step A55, extracts an IP address "EA1", "EA2", "IA1", "IA2" from a record having a circuit identification code "CIC-2" from a CIC management table 926-1 (FIG. 116), and sends it to the table management server 906-3 (Step A66). The table management server 906-3 sets it as a second-lined record "IA1, IA2, EA1, EA2, MK1, MK2, . . . " of a unit control table 910-1 (FIG. 139) of within the network node unit 906-1 (Step A67). Each sub-table (filter control records, etc.) is set in the Step A64 and A66.

<<Communication Phase>>

The telephone communication between the telephone set 905-1 and the telephone set 905-4 has steps similar to those explained in the other embodiment. This uses the second-lined communication record ("IA1, 1A2, EA1, EA2, MK1, MK2, . . . ") set in the connection phase in the unit control table 910-1 (FIG. 136) and the third-lined communication record ("IA2, IA1, EA2, EA1, MK2, MK1, . . . ") in the unit control table 910-4 (FIG. 139). The voice by the telephone set 905-1 is digitalized and placed onto a payload of an IP packet 935 (FIG. 132). Herein, the destination address and UDP port number acquired in the above is used. Namely, the source address is an IP address "EA1" of the media router 903-1, and the destination address is an IP address "EA2" of a media router 903-4 to which destination telephone set 905-4 is to connect. The source UDP port number uses "5006", and destination UDP port number uses "5008". An analog voice is sent from the telephone set 905-1 (Step A68-1). In the media router 903-1, the voice is digitalized into a voice IP packet 935 to be sent to the network node unit 906-1 (Step A68-2). Herein, this is encapsulated into an IP packet 936 (FIG. 133), reaching the network node unit 909-1 via an IP communication line, i.e. by way of the routers 911-4 to 911-6 of FIG. 108 (Step A68-3). Herein, this is decapsulated to reach the media router 903-4 (Step A68-4) and returned into an analog voice, reaching the telephone set 905-4 (Step A68-5). The analog voice sent from the telephone set 905-4 is digitalized and contained in an IP packet, thus being sent in a reverse direction to the foregoing (Steps A69-1 to A69-5).

Summarizing the IP encapsulation in the above, an external packet is inputted at a logic terminal on the communication line of outside the IP network 900. By defining three sets of the inputted source-sided logic terminal identifier information, external-IP-packet source external IP address and destination external IP address, a transfer-destination internal address is defined for an internal packet under the control of the communication record of the unit control table. Thus, the internal packet is transferred within the communication network. This can be reworded that, between the source-sided and destination-sided network node units, an internal communication line for internal packet transfer is defined. The internal packet is transferred within the communication network, and restored into an external packet in the destination-sided network node unit. Note that it is possible to adopt an internal packet formed without using a source external IP address of within the external packet, by the use of two sets of the input source-sided logic terminal identifier information and the destination external IP address of within the external packet.

<<Release Phase>>

When the utilizer of the telephone set 905-1 notifies a release from telephone communication (Step A70 in FIG. 109), it is notified to the telephone management server 906-4 by way of the media router 903-1, network node unit 906-1 and proxy telephone server 906-2 (Steps A70 to A73). The telephone management server 906-4 writes an end time "Ed-1" into an end time column having a record of circuit identification code "CIC-2" in the CIC management table 926-1 (FIG. 116). Next, a release IP packet 937 (FIG. 134) (REL packet) is formed and notified to the telephone management server 909-4 (Step A74). Furthermore, the telephone management server 906-4 notifies a release instruction to the media router 903-1 by way of the proxy telephone server 906-2 and network node unit 906-1 (Step A85 to A87). The media router 903-1, receiving the release notification in the step A70, can send a disconnect confirmation to the telephone set 905-1 (Step A70-1, option).

The telephone management server 909-4, receiving the IP packet 937 (Step A74), writes an end time "Ed-2" in an end time column of a record having a circuit identification code "CIC-2" in the CIC management table 926-2 (FIG. 119), and forms a release completion IP packet 938 (FIG. 135) (RLC packet) and sends it back to the telephone management server 906-4 in order to report a reception of the release IP packet 937 (Step A84). Furthermore, the telephone management server 909-4 forwards a telephone-communication release instruction to the media router 903-4 by way of the proxy telephone server 909-2 and network node unit 909-1 (Step A76 to A78).

The media router 903-4 notifies a disconnect instruction for the release instruction to the telephone set 905-4 (Step A79) notifying a release report for the release instruction to the telephone management server 909-4 via the proxy telephone server (Step A81 to A83). The telephone set 905-4 can send a disconnect-instruction confirmation responsive to the disconnect instruction sent from the media router 903-4 (Step A80, option). Furthermore, the media router 903-4 can send a confirmation further to the disconnect-instruction confirmation (Step A80-1, option).

<<Deletion of Communication Record>>

After the Step A74, the telephone management server 906-4 sends the circuit identification code "CIC-2" of within the IP packet 937 to the table management server 906-3 (Step A96). The table management server 906-3 deletes the relevant communication record, i.e. in the present case, the second-lined record "IA1, IA2, EA1, EA2, MK1, MK2" of the unit control table 910-1 (FIG. 136) (Step A97). After the Step A74, the telephone management server 909-4 sends a circuit identification code "CIC-2" of within the received release IP packet 937 to the table management server 909-3 (Step A98). The table management server 909-3 deletes the relevant communication record, i.e. in the present case, the third-lined record "IA2, IA1, EA2, EA1, MK2, MK1" of the unit control table 910-4 (FIG. 139) (Step A99).

<<Post-Process to Regulation in the Number of Outgoing and Incoming Calls>>

After the Step A74, the telephone management server 906-4 subtracts "1" from the number of lines in service corresponding to an address "EA1" written in an outgoing-call management table 918-1 (FIG. 140). Similarly, after the Step A84, the telephone management server 909-4 subtracts "1" from the number of lines in service corresponding to an address "EA2" written in an incoming-call management table 918-2 (FIG. 141).

<<Collection of Voice-Communication Information>>

In the communication Case 1 explained above, the management control server 915 (FIG. 108) can exchange information with the telephone management servers 906-4 and 909-4 (Steps A100, A101 in FIG. 142) to obtain a telephone communication record described in the CIC management tables 926-1 (FIG. 116) and 926-2 (FIG. 119), e.g. source telephone number, destination telephone number, start time, end time, etc., thereby offering it for the purpose of imposing telephone communication fee. Meanwhile, the management control server 915 can exchange information with the table management servers 906-3 and 909-3 (Steps A102, A103) to obtain the information described in communication record in the unit control tables 910-1 and 910-4 (FIG. 108), thereby offering it for the purpose of IP network 900 operation or imposing telephone communication fee.

<<Communication Record Setting Method>>

The communication record for use in IP packet transmission and reception between the media router 903-1 and the proxy telephone server 906-2 (communication record used for terminal-to-terminal communication connection control), e.g. the first-lined communication record "IA1, IA81, NA1, NA81, MA1, MA81, . . . " of the unit control table 910-1 (FIG. 136), has been previously set prior to carrying out terminal-to-terminal communication. The communication record for use in media transmission and reception between the terminal units but not used in terminal-to-terminal communication connection control, such as the second-lined communication record "IA1, IA2, EA1, EA2, MK1, MK2, . . . " of the unit control table 910-1, is dynamically set or deleted through the table management server as in the foregoing explanation. Incidentally, the communication record to be previously set and the communication record to be dynamically set are set up on anther domain of a memory of within the network node unit, thus simplifying memory mounting. This is true for the communication cases 2 to 6 referred later.

<<Telephone Number Registration of Fixed Telephone Set>>

Figure 108:
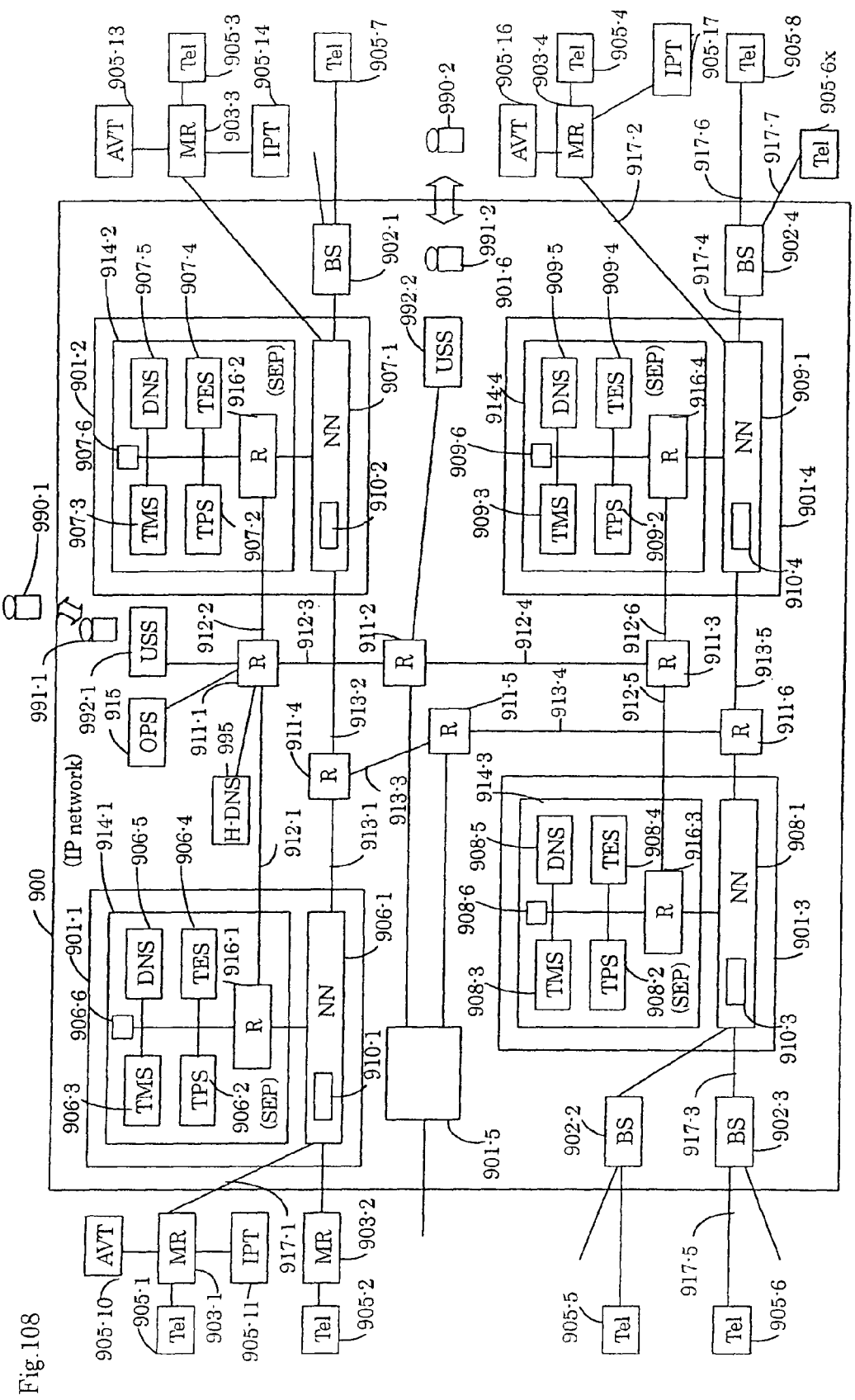
FIG. 108 is a figure explaining a method for carrying out fixed telephone communication and mobile phone communication on the same IP network and further a multimedia terminal-to-terminal communication using a telephone number, in an eighth embodiment of the present invention.

Explanation is made on a registration method of a fixed telephone set and communication record setting of a capsule control table in the communication case 1, with reference to FIGS. 108 and 208.

The user 990-1 of a fixed telephone set 905-1 defines an external IP address "EA1" and telephone number "TN1" according to an operation rule of the IP network 900 or by consultation with the common carrier, and offers an application for utilizing the fixed telephone set 905-1, including at least a user name and payment of communication fee, to a telephone accepter 991-1 (Step P1 in FIG. 208). The telephone accepter 991-1 examines an identification sign N903-1 of the media router the fixed telephone 905-1 is to connect, an identification number N906-1 of the network node unit 906-1 and an identification sign N917-1 of the communication line 917-1 by using an acceptance business data held by the telephone accepter 991-1, and notifies the user 990-1 of the identifiable information on the media router 903-1 the fixed telephone 905-1 is to connect. User 990-1 sets the external IP address "EA1" onto the fixed telephone 905-1.

Incidentally, in a case that an external IP address "EA1" is set into the media router 903-1, the telephone accepter 991-1 notifies an external IP address "EA1" to the user 990-1. The user 990-1 sets a telephone number "TN1" to the fixed telephone set 905-1. By the above procedure, the telephone accepter 991-1 acquires the acceptance information including, at least, an external IP address "EA1", a telephone number "TN1", a user name, communication-fee payment, an identification sign N906-1 of the network node unit 906-1, an identification sign N903-1 of the media router and an identification sign N917-1 of the communication line 917-1.

Next, the accepter 991-1 notifies the acceptance information to a user service server 992-1 (Step P2). The user service server 992-1 uses the identification sign N906-1 of the network node unit and the identification sign N917-1 of the communication line, to fix an internal IP address "IA1" and adds it to the acceptance information according to the internal address-providing rule data held in the user service server 992-1, thus holding the acceptance information including the internal address "IA1 in its database (Step P3). Next, the user server 992-1 notifies the telephone management server 906-4 of, at least, an external IP address "EA1", internal IP address "IA1", telephone number "TN1", identification sign N906-1 of the network node unit 906-1, identification sign N903-1 of a media router 903-1 related to the telephone number "TN1", identification sign N917-1 of the communication line 917-1, UNI of the media router 903-1, external address "EA81" and internal address "IA81" of the proxy telephone server 906-2 to exchange information with the media router 903-1, and internal address "IA91" of the telephone management server 906-4 to exchange information with the proxy telephone server 906-2 (Step P4). The telephone management server 906-4 notifies the telephone number server 906-5 of, at least, an external IP address "EA1", internal IP address "IA1" and telephone number "TN1" of among the acquired acceptance information (Step P5). The telephone number server 906-5 holds therein, of among the acquired information, at least an external IP address "EA1", internal IP address "IA1" and telephone number "TN1", according to a data storage form of a domain name server defined, for example, under RFC1996 or RFC1035 (Step P6). The telephone number server 906-5 notifies the superior server 995 of holding a telephone number "TN1" together with an identification sign N906-1 of the telephone server 906-5 and IP address (Step P7). The telephone number server 995 holds therein at least a set of an identification sign N906-1 of the telephone number server 906-5, the IP address and the telephone number "TN1" (Step P8). The superior telephone server 995 holds an identification sign and IP address of another telephone number server holding a telephone number "TN-x".

<<Variation>>

The Steps P5 to P8 (FIG. 208) can be changed to Steps P5x to P8x in the following. The telephone management server 906-4 notifies the telephone number server 906-5 (Step P6x) of at least an external IP address "EA1", internal IP address "IA1" and telephone number "TN1" of among the acquired acceptance information through the superior telephone number server 995 (Step P5*x*). The telephone number server 906-5 holds therein the received external IP address "EA1", internal IP address "IA1" and telephone number "TN1". Herein, the superior telephone number server 995 holds an identification symbol and IP address of the other telephone number server 906-5 holding the telephone number "TN-x". Meanwhile, the telephone number server 906-5 can report a result (Step P7*x*, Step P8*x*).

Furthermore, the user service server 991-1 can request the superior telephone number server 995 through the telephone management server 906-4 or directly without through the same, to rewrite or delete the content of the superior telephone number server 995. User service server 991-1 can hold the multicast reception authentication information can be held (option).

<<Information Exchange Function between Telephone Number Servers>>

FIG. 209 shows that mutual information exchange can be made between the superior telephone number server 995 within the IP network 900 and the inferior telephone number servers 906-5, 907-5, 908-5 and 909-5. Furthermore, the inferior telephone number servers 906-5, 907-5, 908-5 and 909-5 can perform information exchange through the superior telephone number server 995. For example, when the telephone number server 907-5 inquires the telephone number server 995 of an external IP address and internal IP address accompanied by the telephone number "N1" (Step P20 in FIG. 210), the telephone number server 995 inquires the telephone management server 906-5 holding therein an IP address accompanied by the telephone number "TN1" (Step P21) to acquire an external IP address "EA1" and internal IP address "IA1" (Step P22). Next, the telephone number server 995 notifies the telephone number server 907-5 of the obtained external IP address "EA1" and internal IP address "IA1" accompanied by the telephone number "TN1" (Step P23). The superior telephone number server 995 is characterized by holding an identification symbol of an inferior telephone number server holding a telephone number "TN-x" and identification symbol, IP address and multicast reception authentication information (option), and further holding terminal-unit authentication information in concerned with a mobile phone as described later.

<<Communication Case 2: Communication Between Mobile Phones>>

FIGS. 143 and 144 are a diagram explaining the telephone communication of from the mobile phone 905-6 to the mobile phone 905-8. The telephone set 905-6 has a telephone number "TN3", and the telephone set 905-8 has a telephone number "TN4". Herein, a radio base point 902-3 includes an external IP address "EB1", a radio base point 902-4 includes an external IP address "EB2", a communication line 917-3, at an end, is provided with an internal IP address "IB1", and a communication line 917-4, at an end, is provided with an internal IP address "IB2". The proxy mobile phone server 908-6 is provided with an external IP address "EB81" and internal IP address "IB81". The proxy telephone server 908-4 is provided with an internal IP address "IB91". The telephone number server 908-5 is given the internal IP address "IB96", the proxy mobile phone server 909-6 is given the internal IP address "IB82", the telephone management server 909-4 is given the internal IP address "IA92"respectively. The external addresses of the telephone number servers 906-6 to 906-6 to 909-5 are all "EA81", and the external addresses of the proxy mobile phone servers 906-6 to 909-6 are all "EB81".

<<Connection Phase>>

In the case that a call connection request is forwarded from the telephone set 905-6 via a radio communication line 917-5, a radio channel connection request signal is conveyed to the radio base point 902-3 (Step B01). The radio base point 902-3 sends a call connection request acceptance for the call connection request to the telephone set 905-6 (Step B02). Next, from the telephone set 905-6, a call set request including a source telephone number "TN3" and destination telephone number "TN4" is forwarded to the radio base point 902-3 (Step B03). The radio base point 90.2-3 forms an IP packet 920B (FIG. 129) containing a call set request comprising an source IP address "EB1", destination IP address "EB81", source telephone number "TN3", destination telephone number "TN4", port number "5006" used in telephone voice transmission by the radio base point 902-3 and attendant information "Info3" on the basis of a content of the received call set request, and sends it to the network node unit 908-1 (Step B04).

The network node unit 908-1 applies a first-lined record of the unit control table 910-3 (FIG. 138) to encapsulate the IP packet 920B and form an internal packet 921B (FIG. 146), thereby sending it to the proxy mobile phone server 908-6 (Step B05). The proxy mobile phone server 908-6 forms an IP packet 922B (FIG. 147) on the basis of the IP packet 921B and sends it to the telephone management server 908-4 (Step B06).

<<Circuit Identification Code Management>>

Next, the telephone management server 908-4 uses a content of the IP packet 922B (FIG. 147) to calculate a circuit identification code "CIC-3" from the set of a source telephone number "TN3" and destination telephone number "TN4", thus forming a CIC management table 923B (FIG. 148). Furthermore, the telephone management server 908-4 shows an IP packet 924B (FIG. 149) containing a query concerning the destination telephone number "TN4" and source telephone number "TN3" to the telephone number server 908-5 (Step B07) and receives an IP packet 925B (FIG. 150) containing an answer to the query (Step B08). The telephone management server 908-4 adds the CIC management table 923B (FIG. 148) with the acquired addresses and "UN13" of an UNI interface of the radio base point 902-3. The result of this is shown in a first-lined record of the CIC management table 926-1B (FIG. 151). The telephone management server 908-4, from now on, uses a communication procedure (Steps B09, B16, B17, B35, B45, B55, B73, B85, etc.) on the basis of the UNI interface "UNI3" in the CIC management table 926-1B.

Next, the telephone management server 908-4 forms an IP packet 939B09 (FIG. 152) containing a call set acceptance, authentication request, telephone numbers "TN3" and "TN4" and forwards it to the proxy mobile phone server 908-6 (Step B09). The proxy mobile phone server 908-6 forms an IP packet 939B10 (FIG. 153) and sends it to the network node unit 908-1 (Step B10). The network node unit 908-1 decapsulates the IP packet 939B10 to form an IP packet 939B11 (FIG. 154), and thereafter sends the IP packet 939B11 to the radio base point 902-3 (Step B11). The base point 902-3 notifies the telephone set 905-6 of a call set acceptance and authentication request on the basis of the information contained in the IP packet 939B11 received via a radio communication path 917-5 (Step B12).

The telephone set 905-6 forwards an authentication answer representative of terminal-unit correctness (password or the like) to the radio base point 902-3 via the radio communication path 917-5 (Step B13). The radio base point 902-3 forms an IP packet 939B14 (FIG. 155) containing an authentication answer and forwards it to the network node unit 908-1 (Step B14). A new IP packet 939B15 (FIG. 156) containing an authentication answer obtained by encapsulation in the network node unit 908-1, reaches the proxy mobile phone server 908-6 (Step B15). Next, a new IP packet 939B16 (FIG. 157) containing an authentication answer reaches the telephone management server 908-4 (Step B16).

The telephone management server 908-4 forwards an IP packet containing a terminal-unit authentication properness/improperness for communication channel set instruction to the proxy mobile phone server 908-6 (Step B17). The new IP packet containing a terminal-unit authentication properness/improperness reaches the network node unit 908-1 and decapsulated (Step B18), reaching the base point 902-3 (Step B19). The radio base point 902-3 notifies the IP-packet's terminal-unit authentication properness/improperness to the telephone set 9055-6 via the radio communication path 917-5 (Step B20). The IP packet transferred in the Step B17 to B19 has a form similar in address storage form or the like to the IP packet transferred in the Steps B09 to B11. Next, the telephone management server 908-4 makes reference to the IP address information of the CIC management table 926-1B (FIG. 151) and to the packet 922B (FIG. 147), to form an IP packet 927B (FIG. 158) (IAM packet) for a call set request and send the IP packet 927B to the telephone management server 909-4 (Step B21).

<<Circuit Identification Code Management>>

The telephone management server 909-4, receiving the IP packet 927B, extracts a circuit identification code "CIC-3", a procedure partition "IAM", a source telephone number "TN3", a destination telephone number "TN4", IP addresses in plurality and a UNI interface "UN14" contained in a payload thereof, and writes and records them as a record to the CIC management table 926-2B (FIG. 159). The write time "St-4" of the same is also written.

Next, the telephone management server 909-4 uses the received IP packet 927B to form an IP packet 928B (FIG. 160) containing a call set request, and forwards the IP packet 928B to the proxy mobile phone server 909-6 (Step B22). The proxy mobile phone server 909-6 forms an IP packet 929B (FIG. 161) and sends it to the network node unit 909-1 (Step B23). The network node unit 909-1 decapsulates the received IP packet 929B to form an IP packet 930B (FIG. 162) and thereafter sends the IP packet 930B to the radio base point 902-4 (Step B24). The base point 902-4 temporarily notifies the telephone set 905-8 of an incoming call via the radio communication path 917-6, on the basis of the received IP packet 930B (Step B25).

The telephone set 905-8, when receiving the call temporary notification (Step B25), reports a state of the radio communication path 917-6 (noise, voice quality, etc.) to the radio base point 902-4 (Step B26) and subsequently forwards the information signifying a terminal-unit correctness (password or the like) to the radio base point 902-4 via the radio communication path 917-6 (Step B27a). The radio base point 902-4 forms an IP packet 939B27B (FIG. 163) containing the information signifying a terminal-unit correctness and forwards it to the network node unit 909-1 (Step B27b). The IP packet 939B27B is encapsulated into an IP packet 939B27C (FIG. 164) in the network node unit 909-1. The IP packet 939B27C reaches the proxy mobile phone server 909-6 (Step B27c) and turns into an IP packet 939B27D (FIG. 165) thus reaching the telephone management server 909-4 (Step B27b).

The telephone management server 909-4 forwards an IP packet 93928A (FIG. 166) containing a terminal-unit authentication properness/improperness for communication channel set instruction to the proxy mobile phone server 909-6 (Step B28a). This, in the proxy mobile phone server 909-6, turns into an IP packet 939B28B (FIG. 167) and the IP packet 939B28B reaches the network node unit 909-1 (Step B28b). The IP packet 939B28B is decapsulated into an IP packet 939B28C (FIG. 168) thus reaching the base point 902-4 (Step B28c). The radio base point 902-4 notifies the information including an IP-packet's terminal-unit authentication properness/improperness to the telephone set 905-8 via the radio communication path 917-6 (Step B28d). Next, the radio base point 902-4 examines whether the destination telephone number "TN4" is arrivable, and notifies the telephone set 905-8 of an incoming call (Step B30). The radio base point 902-4 holds a content of the IP packet 930B, i.e. telephone numbers "TN3" and "TN4", address "EB1", port number "5006" and "Info3". Next, the radio base point 902-4 forms an IP packet containing telephone numbers "TN3" and "TN4" and arrival allowing/not-allowing report information and notifies it to the telephone management server 909-4 (Steps B31 to B33). The telephone management server 909-4 extracts a source telephone number "TN3", destination telephone number "TN4" and arrival allowing/not-allowing report information from the received IP packet. A circuit identification code "CIC-3" is calculated from the two telephone numbers, to form an IP packet 931B (FIG. 169) containing a circuit identification code "CIC-3" and information on the arrivability at the telephone set 905-8 (FIG. 169) (ACM packet) and sends it to the telephone management server 908-4 (Step B34). The telephone management server 908-4 extracts a circuit identification code "CIC-3" and procedure partition "ACM" from the received IP packet 931B and examines the CIC management table 926-1B (FIG. 151) to find a record having a circuit identification code "CIC-3" thereby rewriting the procedure partition to "ACM". Next, the telephone management server 908-4 can generate an IP packet representative of an ACM packet reception, notifying it to the radio base point 902-3 (Steps B35 to B37, option).

The radio base point 902-4, receiving an in-calling from the telephone set 905-8 (Step B40), forms a IP packet 932B (FIG. 170) containing a source telephone number "TN3" and destination telephone number "TN4", port number "5008" used in voice transmission by the telephone set 905-8, and attendant information "Info4" and sends it to the network node unit 909-1 (Step B41). The network node unit 909-1 encapsulates the IP packet 932B to form an IP packet 932-1B (FIG. 171), and sends it to the proxy mobile phone server 909-6 (Step B42). The proxy mobile phone server 909-6 forms an IP packet 932-2B (FIG. 172) and sends it to the telephone management server 909-4 (Step B43). The telephone management server 909-4 extracts the telephone numbers "TN3" and "TN4" from the received IP packet 932-2B to calculate a circuit identification code "CIC-3" from the two telephone numbers, to form an IP packet 933B (FIG. 173) (CPG packet) representative of an in-calling and send it to the telephone management server 908-4 (Step B44). The telephone management server 908-4 extracts the circuit identification code "CIC-3", procedure partition "CPG", UDP port number "5008" and attendant information "Info4" from the received IP packet 933B and rewrites a procedure partition of a record of circuit identification code "CIC-3" of the CIC management table 926-1B (FIG. 151) to "CPG". IP address "EB1, IB1, EB81, IB81", source telephone number "TN3" and destination telephone number "TN4" are read out. Using the acquired information, an IP packet 933-1B (FIG. 174) is formed and sent to the proxy mobile phone server 908-6 (Step B45).

The proxy telephone server 908-2 uses the received IP packet 933-1B to form an IP packet 933-2B (FIG. 175) and sends it to the network node unit 908-1 (Step B46). The network node unit 908-1 decapsulates the received IP packet 933-2B to form an IP packet 933-3B (FIG. 176) and sends it to the radio base point 902-3 (Step B47). The radio base point 902-3 reads out and holds telephone numbers "TN3" and "TN4", IP address "EB2", port number "5008" and attendant information "Info4" contained in the IP packet 933-3B. The radio base point 902-3 notifies the telephone set 905-6 of an in-calling of the destination telephone 905-8 (Step B48).

Next, the telephone set 905-8 responds to a call (Step B50). The radio base station 902-4 sends an IP packet containing a source telephone number "TN3" and destination telephone number "TN4" to the telephone management server 909-4 in order-to notify the answer (Steps B51 to B53). The telephone management server 909-4 extracts the source telephone number "TN3" and destination telephone number "TN4" from the received IP packet to calculate a circuit identification code "CIC-3" from the two telephone numbers, and forms an IP packet 934B (FIG. 177) (ANM packet) containing, at least, a circuit identification code "CIC-3" notifying the answer, thus sending it to the telephone management server 908-4 (Step B54). Note that the telephone management server 909-4 can send a response confirmation back to the radio base point (Steps B60-1 to 60-4, option).

The telephone management server 908-4 extracts a circuit identification code "CIC-3" and procedure partition "ANM" from the received IP packet 934B and examines the CIC management table 926-1B (FIG. 151) processed by the telephone management server 908-4 to find a record having a circuit identification code "CIC-3" thereby rewriting the procedure partition column to "ANM". Next, the telephone management server 908-4 notifies the radio base point 902-3 of a call response by the telephone set 905-8 by way of the proxy mobile phone server 908-6 and network node unit 908-1 (Steps B55 to B57). The radio base point 902-3 forwards a call signal to the telephone set 905-6 (Step B58). The telephone set 905-6 can send back a confirmation of response (Step B59, option).

<<Communication Record Setting>>

The telephone management server 909-4 makes reference to the CIC management table 926-2B (FIG. 159) to acquire communication-record change information, and sends it to the table management server 909-3 (Step B64). The table management server 909-3 sets it as a fourth-lined record "IB2, IB1, EB2, EB1, MK5, MK6, . . . " of a unit control table 910-4 (FIG. 139) in the network node unit 909-1 (Step B65). Herein, the mask information MK5 and MK6 is rendered "255.255.255.255". Similarly, the telephone management server 908-4 makes reference to the CIC management table 926-1B (FIG. 151) to acquire communication-record change information, and sends it to the table management server 908-3 (Step B66). The table management server 908-3 sets it as a third-lined record "IB1, IB2, EB1, EB2, MK6, MK5, . . . " of a unit control table 910-3 (FIG. 138) in the network node unit 908-1 (Step B67).

<<Communication Phase>>

The telephone communication between the telephone set 905-6 and the telephone set 905-8 has steps similar to those explained in the other embodiment, using a third-lined record "IB1, IB2, EB1, EB2, MK6, MK5, . . . " of the unit control table 910-3 and a fourth-lined record "IB2, IB1, EB2, EB1, MK5, MK6, . . . " of the unit control table 910-4. The voice on the telephone set 905-6 is digitalized and placed onto a payload of an IP packet 935B (FIG. 178). Herein, used is a destination address and UDP port number obtained in the connection phase. The voice is transferred in the form of a radio communication wave over the radio communication path 917-5 from the telephone set 905-6 (Step B68-1). In the radio base point 902-3, the voice is digitalized into a voice IP packet 935B (FIG. 178). This is sent to the network node unit 908-1 (Step B68-2) where it is encapsulated into an IP packet 936B (FIG. 179). Furthermore, this reaches the network node unit 909-1 via the router 911-6 (FIG. 108) and the communication-line 913-5 (Step B68-3), and decapsulated in the network node unit 909-1 thus reaching the radio base point 902-4 (Step B68-4). The voice restored in an analog voice is conveyed in the form of a radio communication wave over the radio communication path 917-6 to reach the telephone set 905-8 (Step B68-5). The analog voice sent from the telephone set 905-8 is digitalized and stored in an IP packet, thus being sent in a reverse direction (Step B69-1 to B69-5). In the Steps B68-1, B68-5, B69-1, B69-5, it is possible that digitalized voices are transferred via wireless paths 917-5, 917-6.

<<Release Phase>>

In the case that the utilizer of telephone set 905-6 notifies a release of telephone communication (Step B70 in FIG. 144), it is notified to the telephone management server 908-4 by way of the radio base point 902-3, the network node unit 908-1 and proxy mobile phone server 908-6 (Steps B70 to B73). The telephone management server 908-4 writes an end time "Ed-1" into an end time column of a record having a circuit identification code "CIC-3" in the CIC management table 926-1B (FIG. 151). Next, a release IP packet 937B (FIG. 180, REL packet) is formed for notification to the telephone management server 909-4 (Step B74). The telephone management server 909-4 notifies a telephone-communication release instruction to the radio base point 902-4 via the proxy mobile phone server 909-6 (Steps B76 to B78). Furthermore, the telephone management server 909-4 writes an end time "Ed-2" into an end time column of a record having a circuit identification code "CIC-3" in the CIC management table 926-2B (FIG. 159), and forms a release-completion IP packet 938B (FIG. 181, RLC packet) in order to notify a reception of the release IP packet 937B, thus sending it back to the telephone management server 908-4 (Step B84).

The telephone management server 908-4, receiving the Step B84, notifies a release instruction to the radio base point 902-3 by way of the proxy mobile phone server 908-6 and network node unit 908-1 (Steps B85 to B87). The radio base point 902-3 can also notify a disconnect instruction to the telephone set 905-6 via the radio communication path 917-5 (Step B70, option). The radio base point 902-4 notifies a disconnect instruction to the telephone set 905-8 (Step B79) and a release report to the telephone management server 909-4 through the proxy mobile phone server (Steps B81 to B83). The telephone set 905-8 can send a disconnect-instruction confirmation signal to the radio base point 902-4 (Step B80, option).

<<Communication Record Deletion>>

After the Step B73, the telephone management server 908-4 sends the circuit identification code "CIC-3" written in the release IP packet 937B to the table management server 908-3 (Step B96). The table management server 908-3 deletes a corresponding communication record, in the present case, the third-lined record "IB1, IB2, EB1, EB2, MK6, MK5, . . . " of the unit control table 910-3 (FIG. 138) (Step B97). Similarly, the telephone management server 909-4, after the step B76, extracts the "CIC-3" from the received IP packet 937B and sends it to the table management server 909-3 (Step B98). The table management server 909-3 deletes a corresponding communication record, in the present case, the fourth-lined record "IB2, IB1, EB2, EB1, MK5, MK6, . . . " of the unit control table 910-4 (FIG. 139) (Step B99).

<<Release Report Option and Radio Channel Disconnection>>

The telephone management server 909-4, receiving a release report (Step B83), is allowed to forward an IP packet confirming the release report. The IP packet confirming the release report reaches the radio base point 902-4 by way of the proxy mobile phone server 909-6 and further network node unit 909-1 (Steps B90*a* to B90*c*). Furthermore, the telephone management server 909-4 is allowed to forward an IP packet containing a radio channel disconnect signal. The IP packet containing a radio channel disconnect signal passes the proxy mobile phone server 909-6 and network node unit 909-1, to reach the base point 902-4 (Steps B91*a* to B91*c*). When the radio base point 902-4 forwards the IC packet containing a radio channel disconnection confirmation signal to the network node unit 909-1, the IP packet passes the network node unit 909-1 and proxy mobile phone server 909-6 to reach the telephone management server 909-4 (Steps B92*a* to B92*c*). Note that the steps B90*a* to B90*c*, B91*a* to B91*c* and B92*a* to B92*c* are an omittable option.

Similarly, ending the Step B85, the telephone management server 908-4 forwards an IP packet containing a radio channel disconnect signal to the proxy mobile phone server 908-6. The IP packet passes the network node unit 908-1 to reach the base point 902-3 (Steps B88*a* to B88*c*). The base point 902-3 notifies the radio channel disconnect signal taken out of the IP packet to the telephone set 905-6 via the radio communication path 917-5 (FIG. 108) (Step B88*d*). The telephone set 905-6 forwards the radio channel disconnection confirmation signal to the radio base point 902-3 through the radio communication path 917-6 (Step B89*a*). The radio base point 902-3 causes an IP packet containing a radio channel disconnection confirmation signal to reach the telephone management server 908-4 via the network node unit 908-1 and proxy mobile phone server 908-6 (Steps B89*c* to B89*d*). Note that the Steps B88*a* to B88*d* and B89*a* to B89*d* are an omittable option.

<<Regulating the Number of Outgoing Calls and Collection of Fee Information>>

In a telephone communication of the communication case 2 explained above, the procedure similar to a telephone communication in the communication Case 1 makes it possible to regulate the number of outgoing or incoming calls, collect information from the CIC management table or unit control table and carry out the process for IP-network 900 operation or fee charge.

<<Mobile Phone Number Registration>>

Explanation is made on a registration method of a mobile phone and setting of a communication record of a unit control table in the communication case 2, with reference to FIGS. 108 and 211.

The user 990-2 of a mobile phone 905-6 defines an external IP address "EB1" and telephone number "TN3" for use by the mobile phone 905-6 according to an operation rule of the IP network 900 or by consultation with the common carrier, and further offers an application for utilizing the mobile phone 991-2, including at least a user name and payment of communication fee, to a telephone accepter 991-2. The telephone accepter 991-2 provides terminal-unit authentication information "PID3" and notifies the user 990-2 of an external IP address "EB81" of a proxy mobile phone server (Step Q1 in FIG. 211). Incidentally, proxy mobile phone servers 906-6, 907-6, 908-6 and 909-6 have a common value "EB81" as external addresses. Furthermore, second terminal-unit authentication information "PID-M" can include multicast reception authentication information including multicast service identification symbol and reception permission password thereof and multicast-authentication-server external address "WA9".

Herein, terminal-unit authentication information "PID3" is provided for a combination of an external IP address "EB1" and a telephone number "TN3", which is handled as a secret value not to be opened to the third person other than the user 990-2. The user 990-2 sets the mobile phone 905-6 with a telephone number "TN3", external IP address "EB1", terminal-unit authentication information "PID3", external IP address "EB81" of the proxy mobile phone server, second terminal-unit authentication information "PID-M" (option). Then, the accepter 991-2 notifies acceptance information to a user service server 992-2 (Step Q2). The user service server 992-2 holds the acceptance information in its database (Step Q3).

Next, the user service server 992-2 notifies, at least, a telephone number "TN3" and terminal-unit authentication information "PID3" to the telephone management server 909-4 (Step Q4). The user service server 992-2 is selected with the telephone management server 909-4 according to an operation rule of the IP network 900 (e.g. selected with a telephone management server located near geographically). The telephone management server 909-4 notifies, at least, a telephone number "TN3" and terminal-unit authentication information "PID3" to the telephone number server 909-5 (Step Q5). The telephone number server 909-5 notifies acquisition information to a superior telephone number server 995 (Step Q6). The telephone number server 995 holds therein, at least, a telephone number "TN3" and terminal-unit authentication information "PID3" (Step Q7).

Furthermore, the multicast reception authentication information can be held (option). The user service server 992-2 can request the superior telephone number server 995 to rewrite or delete a content of the superior telephone number server 995, through the telephone management server 906-4 or directly without through the same.

<<Variation>>

The Steps Q5 to Q7 can be changed to the following Step Q5*x*. Namely, the telephone management server 909-4 notifies the superior telephone number server 995 of, at least, a telephone number "TN3" and terminal-unit authentication information "PID3" (StepQ5*x*). The telephone number server 995 holds therein the received telephone number "TN3" and terminal-unit authentication information "PID3".

<<Initial Position Registration of Mobile Phone>>

Explanation is made on a method that the mobile phone 905-6 registers its position to the IP network 900, with reference to FIGS. 108 and 211. Explanation is made on a case that the mobile phone 905-6 transmits the radio wave information including a position registration request and unexpectedly connected to the radio base point 902-3 through the radio communication line 917-5 (FIG. 108).

The radio base point 902-3 exchanges information with the mobile phone 905-6 to confirm a communicatability (Step Q10). This confirmation procedure is made with a communication layer 1 or 2 without the necessity of using a communication layer 3. Confirming a communicatability, the mobile phone 905-6 transmits position registration request information (Step Q11 in FIG. 211). The position registration request information includes a telephone number "TN3" used by the mobile phone 905-6, terminal authentication information "PID3", an external IP address "EB1", and an external IP address "EB81" of a proxy mobile phone server. Incidentally, it is possible as a variation to generate a cipher text C3 with "PID3" as an encryption key and a telephone number "TN3" as a plaintext, in place of the terminal-unit authentication information "PID3" to use a known authentication technique using an external IP address "EB1", a telephone number "TN3" and a cipher text C3. With this, the terminal-unit authentication information "PID3" in secret will not be transmitted over a radio communication line.

The radio base point 902-3 forms an external packet 997-1 (FIG. 212) containing a telephone number "TN3" included in the reception information, external IP address "EB1" and terminal-unit authentication information "PID3" or cipher text C3, and sends it toward the proxy mobile phone server 908-6. Herein, the external packet 997-1 has a source external IP address "EB1" and a destination external IP address "EB81". When the external packet 997-1 reaches the network node unit 908-1 (Step Q1), used is a fourth-lined record "IB1, IW81, K-zero, EB81, M-zero, M-one, . . . " of a capsule control table 910-3 (FIG. 138), to form an internal packet 997-2 (FIG. 213). The internal packet 997-2 is sent to the proxy mobile phone server 908-6 (Step Q13). Herein, "IW81" is an internal IP address of the proxy mobile phone server 908-6 while "M-one" is an address mask having its every value of "1". The proxy mobile phone server 908-6 receives an internal packet 997-2, and further forms an internal packet containing an internal IP address "IB1" contained in a header section of the internal packet 997-2 to send it to the telephone number server 908-5 (Step Q14). The telephone number server 908-5 holds, in a data storage form of a domain-name server, a telephone number "TN3", external IP address "EB1", internal IP address "IB1", terminal-unit authentication information "PID3" or cipher text "C3", from the received internal packet (Step Q15). Next, the acquired telephone number "TN3", terminal-unit authentication information "PID3" and identification symbol of the telephone number server 908-5 is notified to the superior telephone number server 995 (Step Q16). The telephone number server 995 examines, by comparison, as to whether the telephone number "TN3" and terminal authentication information "PID3" held in the step Q7 of telephone number registration agrees with the telephone number "TN3" and terminal-unit authentication information "PID3" acquired in the step Q16, to determine whether a terminal-unit authentication result is acceptable or unacceptable. Incidentally, in a case that a cipher text C3 is sent in place of the terminal-unit authentication information "PID3", used is a known communication opposite-side authentication technique that a cipher text C3 is generated with "PID3" as an encrypt key and telephone number "TN3" as a plaintext, to examine whether the received cipher text C3 agrees with the generated cipher text C3 so that determination is made as acceptable where there is agreement.

The superior telephone number server 995 reports the telephone number server 908-5 of the terminal-unit authentication result (Step Q20). The telephone number server 908-5, when the terminal-unit authentication result is unacceptable, discards the telephone number "TN3" and terminal-unit authentication information "PID3" held in the step Q15 (Step Q21). The telephone number server 908-5 reports the terminal-unit authentication result to the mobile phone 905-6 through a proxy mobile phone server 908-6, network node unit 908-1 and radio base point 902-3 (Steps Q22 to Q25).

<<Mobile Phone Position Change>>

Explanation is made on a case that a mobile phone 905-6 in a state completed an initial-position registration of the mobile-phone is changed in the position to be connected to the radio base point 902-3 via the radio communication line 917-5 to transmit the radio wave information including a position change request so that connection is unexpectedly done to the radio base point 902-4 via the radio communication line 917-7 (FIG. 108). In order to simplify explanation, explanation is made on a case that the mobile phone 905-6 is changed to a mobile phone 905-6*x* (FIG. 108).

The radio base point 902-4 exchanges information with the mobile phone 905-6*x*, to confirm a communicatability (Step Q10*x* in FIG. 214). The mobile phone 905-6*x* transmits position registration request information (Step Q11*x*). The position registration request information includes a telephone number "TN3" to be used by the mobile phone 905-6*x*, terminal-unit authentication information "PID3", an external IP address "EB1" mentioned before, and an external IP address "EB81" of the proxy mobile phone server. The radio base point 902-4 forms an external packet similar to an external packet 997-1 (FIG. 212) containing a telephone number "TN3" included in reception information, external IP address "EB1" and terminal-unit authentication information "PID3", and sends it toward the proxy mobile phone server 909-6. Herein, the external packet has a source external IP address "EB1" and a destination external IP address "EB81". When the external packet reaches the network node unit 909-1 (Step Q12*x*), used is a fifth-lined record "IB2, IW84, K-zero, WA8, M-zero, M-one, . . . " to form an internal packet similar to the internal packet 997-2 (FIG. 213). The internal packet is sent to the proxy mobile phone server 909-6 (Step Q13*x*). The proxy mobile phone server 909-6 receives the internal packet, and further forms a new internal packet containing an internal IP address "IB2" included in a header section of the internal packet, sending it to the telephone number server 909-5 (Step Q14*x*). The telephone number server 909-5 holds therein, from the received internal packet, a telephone number "TN3", external IP address "EB1", internal IP address "IB2" and terminal-unit authentication information "PID3" according to a data storage form of a domain name server (Step Q15*x*), and notifies the superior telephone number server 995 of the acquired telephone number "TN3" together with an identification symbol of the telephone number server 909-5 (Step Q16*x*).

The telephone number server 995 examines by comparison whether there is agreement between the telephone number "TN3" and terminal-unit authentication information "PID3" held in the Step Q7 (FIG. 211) of telephone number registration and the telephone number "TN3" and terminal-unit authentication information "PID3" acquired in the Step Q16*x*, thereby determining whether a terminal authentication result is acceptable or unacceptable. When unacceptable, the superior telephone number server 995 notifies the telephone number server 909-5 that terminal authentication is unacceptable (Step Q17*x*). The telephone number server 909-5 discards the telephone number "TN3" and terminal-unit authentication information "PID3" held in the step Q15*x* (Step Q18*x*) thus suspending the subsequent process.

When the terminal-unit authentication result is acceptable, the superior telephone number server 995 notifies the telephone number server 908-5 of a position change request to the terminal unit 905-6*x* and IP address "IP909-5" of the telephone number server 909-5 (Step Q19*x*). The telephone number server 908-5 stores all the pieces of information concerning the mobile phone 905-6 held in the Step Q15 (FIG. 211) in an IP packet formed with a destination IP address "IP909-5", and sends it to the telephone number server 909-5 (Step Q20*x*). Incidentally, the telephone number server 908-5 discards the information already transmitted. The telephone number server 909-5 can hold the information concerning the mobile phone 905-6 acquired in both procedure of Steps Q20*x* and Q15*x*. However, a position of the mobile phone is given as 905-6*x*. The telephone number server 909-5 reports the terminal-unit authentication result to the mobile phone 905-6x by way of the proxy mobile phone server 909-6, network node unit 909-1 and radio base point 902-4 (Steps Q22x to Q25x).

<<Variation of Collective Management by Superior Telephone Number Server>>

Explanation is made on a method that the superior telephone number server 995 manages the information concerned with mobile-phone number, IP address and the like and the telephone number servers 906-5 to 909-5 serve for only the fixed telephone sets, wherein the telephone number servers 906-5 to 909-5 are not involved in the registration and position change procedures for the mobile phones.

FIG. 215 shows another method for carrying out a mobile phone-registration procedure. The difference from FIG. 211 is in a procedure that the process by the telephone number servers 908-5 and 909-5 shown in FIG. 211 is relocated to a superior telephone number server 995. Accordingly, FIG. 215 does not include the telephone number servers 908-5 and 909-5. At first, the Steps U1 to U4 are carried out, wherein the Steps Q1, Q2, Q3, Q4 in FIG. 211 are replaced with the Steps U1, U2, U3, U4 in FIG. 215. Then, the telephone management server 909-4 makes notification directly to the superior telephone number server 995 (Step U5). The telephone number server 995 holds related information (Step U7). Furthermore, the Steps U10 to U13 are carried out, wherein the Steps Q10, Q11, Q12, Q13 in FIG. 211 are replaced with the Steps U1, U2, U3, U4 in FIG. 215. Then, the proxy mobile phone server 908-6 makes notification directly to the superior telephone number server 995 (Step U14). The telephone number server 995 carries out a terminal-unit authentication procedure and the like (Step U15) and notifies the proxy mobile phone server 908-6 of a process result (Step U20). Next, the Steps U23 to U25 are carried out, wherein the Steps Q23, Q24, Q25 in FIG. 211 are replaced with the Steps U23, U24, U25 in FIG. 215.

FIG. 216 shows another method for carrying out a mobile-phone registration procedure. The difference from FIG. 214 lies in that the procedure by the telephone number servers 908-5 and 909-5 shown in FIG. 214 is relocated to a superior telephone number server 995. At first, a procedure is carried out wherein the Steps Q10x, Q11x, Q12x, Q13x in FIG. 214 are replaced with the Steps U10x, U11x, U12x, U13x in FIG. 216. Then, the proxy mobile phone server 909-6 makes notification directly to the superior telephone number server 995 (Step U14x). The proxy mobile phone server 909-6 holds related information (Step U21x) and notifies a process result to the proxy mobile phone sever 909-6 (Step U22x). Next, a procedure is carried out, wherein the Steps Q23x, Q24x, Q25x in FIG. 214 are replaced with the Steps U23x, U24x, U25x in FIG. 216.

In the communication case 2, the proxy telephone server 908-2 can take the place of the proxy mobile phone server 908-6 by means that the server 908-2 includes the function of the proxy mobile phone server 908-6, and the server 908-6 can be deleted.

<<Communication Case 3: Communication between Mobile Phone and Fixed Telephone Set>>

FIG. 182 is a diagram explaining a telephone communication of from a mobile phone 905-6 to a fixed telephone set 905-4. The telephone set 905-6 has a telephone number "TN3" and the telephone set 905-4 has a telephone number "TN2". In the present communication case 3, the calling mobile phone 905-6 side, i.e. a calling UNI interface (communication procedure between the radio base point 902-3 and the telephone management server 908-4) agrees with the calling UNI interface (communication procedure between the radio base point 902-3 and the telephone management server 908-4) explained using FIGS. 143 and 144. Also, in the present case, the called fixed telephone set 905-4 side, i.e. a called UNI interface (communication procedure between the telephone management server 909-4 and the media router 903-4) agrees with the called UNI interface (communication procedure between the telephone management server 909-4 and the media router 903-4) explained using FIG. 109. Naturally, the communication procedure between the telephone management server 908-4 and the telephone management server 909-4 (NNI interface) is standardized within the IP network 900.

<<Connection Phase>>

When the telephone set 905-6 forwards a call connect request, a radio channel connect request signal is conveyed to the radio base point 902-3 (Step B01). The radio base point 902-3 sends back a call connect request acceptance (Step B02). Next, the telephone set 905-6 forwards a call set request to the radio base point 902-3 (Step B03). When the radio base point forwards a call set request, the call set request is sent to the telephone management server 908-4 by way of the network node unit 908-1 and proxy mobile phone server 908-6 (Steps B04 to B06). The telephone management server 908-4 makes an inquiry to the telephone number server 908-5, thereby obtaining an answer (Steps B07, B08).

Next, the telephone management server 908-4 forwards a call set acceptance and authentication request to notify it to the telephone set 905-6 by way of the proxy mobile phone server 908-6, network node unit 908-1 and radio base point 902-3 (Steps B09 to B12). The telephone set 905-6 sends an authentication answer representative of a terminal-unit correctness in a reverse direction to the above (Steps B13 to B16). The telephone management server 908-4 forwards an IP packet containing a terminal-unit authentication properness/improperness in a reverse direction to the above (Steps B17 to B20). Next, the telephone management server 908-4 forms an IAM packet for a call set request and sends it to the telephone management server 909-4 (Step A 21). The NNI interface is standardized within the IP network 900. The calling UNI is the same as the calling UNI in the communication case 2, while the called UNI is the same as the called UNI in the communication case 1. Accordingly, from now on, the implementation of the communication procedure shown in FIG. 182 provides an explanation that a telephone communication is enabled from the fixed telephone set 905-1 to the mobile phone 905-8.

<<Communication Case 4: Communication between Fixed Telephone Set and Mobile Phone>>

FIG. 183 is a diagram explaining a telephone communication of from the fixed telephone set 905-1 to the mobile phone 905-8. The telephone set 905-1 has a telephone number "TN1" and the telephone set 905-8 has a telephone number "TN4". In the present communication case 4, the calling fixed telephone set 905-1 side, i.e. a calling UNI interface (communication procedure between the media router 903-1 and the telephone management server 906-4) agrees with the calling UNI interface (communication procedure between the media router 903-1 and the telephone management server 906-4) explained using FIG. 109. Also, in the present case, the called mobile phone 905-8 side, i.e. a called UNI interface (communication procedure between the telephone management server 909-4 and the radio base point 902-4) agrees with the called UNI interface (communication procedure between the telephone management server 909-4 and the radio base point 902-4) explained using FIGS. 142 and 143. The communication procedure (NNI interface) of between the telephone management server 906-4 and the telephone management server 909-4 is standardized within the IP network 900.

With the above configuration, when the telephone set 905-6 sends a call connect request (Step A01), the media router 903-1 sends back a call connect request acceptance (Step A02) and the media router 903-1 sends a call set request (Step A04). The call set request reaches the telephone management server 906-4 (Steps A04 to A06). The telephone management server 906-4 makes an inquiry to the telephone number server 906-8, thereby obtaining an answer (Steps A07, A08). Next, the telephone management server 906-4 sends an IP packet (IAM packet) for a call set request to the telephone management server 909-4 (Step A21). The IAM packet has a content of a call notification reaching the telephone set 905-8 by way of a proxy mobile phone server 909-6, network node unit 909-1 and radio base point 902-4 (Steps B21 to B25). The NNI is standardized within the IP network 900. The calling UNI is the same as the calling UNI in the communication case 1, while the called UNI is the same as the called UNI in the communication case 2. Accordingly, from now on, the implementation of the communication procedure shown in FIG. 183 provides an explanation that a telephone communication is enabled from the fixed telephone set 905-1 to the mobile phone 905-8.

<<Variation in Communication Cases 1 to 4>>

The UNI forms of the media router and radio base point can be managed by the respective media router and radio base point, to make a notification to the telephone management server. For example, in a telephone communication of from the fixed telephone set 905-1 to the fixed telephone set 905-4 in the communication case 1, the media router 903-1 stores a UNI form of media router 903-1 in an IP packet 920 (FIG. 110) to notify it to the telephone management server 906-4 (Steps A04 to A06). In a telephone communication of from the mobile phone 905-6 to the mobile phone 905-8 in the communication Case 2 (FIG. 143), the radio base point 902-3 stores a UNI form of radio base point 902-3 in an IP packet 920B (FIG. 145) to notify it to the telephone management server 908-4 (Steps B04 to B06). Similarly, the radio base point 902-4 stores a UNI form of radio base point 902-4 in an IP packet to forward it to the network node unit 909-1 (Steps B27*b* or B31).

It is allowed that telephone number servers can be divided into two groups, i.e., the group for fixed telephone communications, and the group for mobile telephone communications, and the communications between telephone (mobile) servers can be limited within each group.

<<Radio Base Point>>

In this embodiment, the media router or fixed telephone set holds an IP address and the radio base point or mobile phone holds an IP address, which is explained in the below. In FIG. 184, numeral 950-1 is an IP communication network, numeral 950-2 is a network node unit, numeral 951-1 is a radio base point, numeral 951-2 is an IP communication line interface section, numeral 951-3 is a radio interface section, numeral 952-1 is an analog mobile phone, numeral 952-2 is a digital mobile phone, numerals 952-3 to 953-4 are IP mobile phones, and numerals 953-1 to 953-4 are radio communication paths.

An IP packet, containing a telephone line connection control message and digital voice, is communicated over the IP communication line 950-3 at between the radio base point 951-1 and the network node unit 950-2. The IP communication line interface section 951-2 holds a plurality of IP addresses, to manage IP addresses and port numbers by the use of a channel-IP address correspondence table 959 (FIG. 185). The control signal or voice signal 958-1 (FIG. 186) forwarded from the analog mobile phone 952-1 reaches a voice transmitting/receiving section 954-1, radio transmitting/receiving section 955-1, radio communication path 953-1, radio transmitting/receiving section 956-1 and radio interface section 951-3 to restore a control or voice signal. This reaches the IP communication line interface section 951-2 where the control or voice signal is digitalized and placed onto a payload of an IP packet 957-1. An example using an IP address "EA1" and UDP port number 5002 is shown in " . . . , EA1, 5002, CN9531, MID-1000" on a first line of a radio communication path-IP address correspondence table 959. This shows a radio communication path 953-1 shown at a channel ID "CN9531". A management ID "MID-1000 is used in billing management of IP address utilization. The case with a digital mobile phone 952-2 is similar to analog mobile phone 952-1. An example using an IP address "EA1" and UDP port number 5004 is shown in " . . . , EA1, 5004, . . . " on a second line of the radio communication path-IP address correspondence table 959.

In a case the digital mobile phone 952-3 does not hold an IP address, the digital mobile phone 952-3 receives an IP packet 958-3 instructing the use of an IP address "EA3" and port number "5012" from the IP communication line interface section 951-2 (FIG. 187). Next, sending an IP packet 957-3 (same as 958-4) digitally representing a control or voice signal, the IP communication line interface 951-2 forwards an IP packet 956-4 onto the IP line 950-3. Next, in a case the digital mobile phone 952-4 holds an IP address "EA4", the digital mobile phone 952-4 sends an IP packet 958-5 digitally representing a control signal or voice signal. The IP communication line interface 951-2 forwards an IP packet 957-4 (same as 958-5) onto the IP line 950-3. It is important that the IP communication line interface section 951-2 manages to lend an IP address "EA3" and port number "5012" to the IP mobile phone 952-3 by a third-lined record " . . . , EA3, 5012, . . . " of a channel—IP address correspondence table 959, and grasps the IP mobile phone 952-4 holding an IP address "EA4" to set it in an IP packet 958-5 by a fourth-lined record " . . . , EA4, . . . " of the channel—IP address correspondence table 959.

<<Route Telephone Number Server>>

Explanation is made on another implementing method for acquiring a related IP address or the like from a telephone number in order for application where the IP network 900 (FIG. 108) increases in its scale, with reference to FIG. 217.

Numerals 900-10 to 900-12 are IP networks, numerals 900-13 to 900-17 are terminal-unit gateways, numerals 900-18 to 900-21 are relay gateways, numerals 900-23 to 900-27 are media routers, numerals 900-30 to 900-32 are radio base points, numerals 900-33 to 900-35 are mobile phones, numerals 900-37 to 900-41 are fixed telephone sets, numerals 995-1 to 995-3 are superior telephone number servers, and numeral 995-4 is a route telephone number server. The relay gateways are connected together through IP communication lines. The IP networks 900-10 to 900-12 are managed individually by a common carrier.

The terminal-unit gateways 900-13 to 900-17 include respective individual telephone number servers similarly to the terminal-unit gateway 901-1 (FIG. 108). The relay gateways 900-18 to 900-21 are disclosed as the relay gateways connecting between the IP networks by IP communication lines in the prior patent application (FIG. 288 or the like). Similarly to the superior telephone number server 995 (FIG. 108) carrying out the process of acquiring an IP address from a telephone number within the IP network 900, the superior telephone number servers 995-1 to 995-3 (FIG. 217) respectively carry out processes concerning an related IP address or related information from telephone numbers within the IP networks 900-10 to 900-13. The superior telephone number servers 995-1 to 995-3 is allowed to communicate, with the route telephone number server 995-4, an IP packet containing the information concerning telephone number and IP address (Steps 995-10 to 995-12 in FIGS. 218 and 219). Also, the superior telephone number servers 995-1 and 995-3, after inquiring the route telephone number server 995-4 of another server's IP address and acquiring it, is allowed to use the acquired IP address, transmitting and receiving an IP packet containing the information concerning a telephone number or IP address (Step 995-13). The IP packet to be transferred between the IP networks 900-10 to 900-12 passes through the relay gateway 900-18 to 900-21.

The telephone number server in the terminal-unit gateway 900-13 presents a telephone number "TN900-35" to the superior telephone number server 995-1 in order to acquire an IP address or related information from the telephone number "TN900-35" of the mobile phone 900-35. The superior telephone number server 995-1 presents the telephone number "TN900-35" to the route telephone-number server 995-4. The route telephone number server 995-4 presents the telephone number "TN900-35" to the superior telephone number server 995-3. Thereupon, the superior telephone number server 995-3 sends back an IP address or related information concerning the telephone number "TN900-35". The IP packet containing the IP address or related information concerning the telephone number "TN900-35" flows in a reverse direction to the above, to pass the route telephone number server 995-4 and superior telephone number server 995-1, being delivered to a telephone number server in the inquiry-source terminal-unit gateway 900-13. The procedure for acquiring a related IP address between a plurality of telephone number servers can adopt a known art as a domain name server.

Meanwhile, the telephone number server within the terminal-unit gateway 900-13 inquires the superior telephone number server 995-1 of a telephone number "TN900-40" of the fixed telephone set 900-40 to acquire an IP address and related information, which can be carried out similarly to the foregoing series of procedures. In brief, in a case connected with a plurality of IP networks, the telephone number server in the IP network 1 can inquire and acquire an IP address and related information concerning a telephone number "TEL2" managed by the superior telephone number server 2, through the superior telephone number server 1, the route telephone number server and the superior telephone number server 2 in the IP network 2.

<<Variation for Invoking Superior Telephone Number Server>>

In the telephone communication procedure of from the fixed telephone set 905-1 to the fixed telephone set 905-4 shown in FIG. 109, the procedure (Steps A07, A08) related by the telephone management server 906-4 and telephone number server 906-5 can be changed to another procedure for invoking the superior telephone number server 995, which is explained with reference to FIG. 220. In FIG. 220, the telephone communication procedure steps excluding the Steps A07$x$, A07$y$, A08$x$ and A08$y$ are all the same as the Steps shown in FIG. 109. Explanation is made on the different Steps A07$x$, A07$y$, A08$x$ and A08$y$.

In the Step A07 of FIG. 220 (same as the Step A07 of FIG. 109), the telephone number server 906-5 receives an IP packet containing an inquiry on a destination telephone number "TN2" and source telephone number "TN1". The telephone number server 906-5 holds the address-related information about the telephone number "TN1" (various addresses and UNI kind). However, in a case without having the address information concerning the telephone number "TN2", the telephone number server 906-5 sends and inquires the information concerning the telephone number "TN2" to the superior telephone number server 995 (Step A07$x$). The superior telephone number server 995 sends a telephone number "TN2" to the telephone number server 909-5 holding the address-related information about the telephone number "TN2", to inquire of address related information (Step A07$y$). The telephone number server 909-5 answers the address-related information concerning the telephone number "TN2". Namely, answered are a media router address "EA2" and internal IP address "IA2" at an end of the communication line, an external IP address "EA82" and internal IP address "IA82" of the proxy telephone server, an IP address "IA92" of the telephone management server and a media-router UNI kind. The answered address-related information passes the superior telephone number server 995 (Step A08$x$) and further the telephone number server 906-5 (Step A08$y$) to reach the telephone management server 906-4 (Step A08). Note that answer is provided from the telephone number server 909-5 directly to the telephone number server 906-5 without passing the superior telephone number server 995. The series of Steps A07$x$, A07$y$, A08$x$ and A08$y$ can be carried out due to the recursive call function of a known domain name server.

Furthermore, in a procedure of the telephone communication from the mobile phone 905-6 to the mobile phone 905-8 shown in FIG. 143, a procedure is possible to invoke the superior telephone number server 995, which is explained with reference to FIG. 221. In FIG. 221, the telephone communication procedure steps excluding the Steps B07$x$, B07$y$, B08$x$ and B08$y$ are all the same as the Steps shown in FIG. 143. Explanation is made on the different Steps B07$x$, B07$y$, B08$x$ and B08$y$. The telephone management server 908-4, receiving an IP packet containing an inquiry concerning a destination telephone number "TN4" and source telephone number "TN3" (Step B06), inquires the superior telephone number server 995 of the address information or the like concerning the telephone number "TN4" (Step B07$x$). The superior telephone number server 995 inquires the telephone number server 909-5 of the address information or the like concerning the telephone number "TN4" (Step B07$y$). The telephone number server 909-5 responds an answer, including the address-related information to the question, to the telephone management server 908-4 (Step B08$y$) via the superior telephone number server 995 (Step B08$x$).

<<Communication Case 5: Multimedia Terminal-to-Terminal Communication Based on Common Channel Signaling System>>

FIG. 189 is a diagram explaining multimedia terminal-to-terminal communication based on call connection control. In contrast to the communication in the communication Case 1 (FIG. 109) carrying out a communication with call connection control by way of the fixed telephone set 905-1, the media router 903-1, the network node unit 906-1, the proxy telephone server 906-2, the telephone management server 906-4, the telephone management server 909-4, the proxy telephone server 909-2, the network node unit 909-1, the media router 903-4 and the fixed telephone set 905-4, the communication shown in FIG. 189 is a communication using a multimedia terminal unit 905-10 in place of the fixed telephone set 905-1 and a multimedia terminal unit 905-16 in place of the fixed telephone set 905-4. The multimedia terminal unit 905-10 and 905-16 are, for example, terminal units, desktop data processing units (personal computers or the like) or telephone sets having a function to transmit and receive a voice and still image, a portable-type data assistances (PDA), terminal units, telephone sets, cellular phones, TV transceivers having a function to transmit and receive a voice and still or moving image or a variety of data, or terminal units integrated with the functions of these units and appliances.

The Steps A01 to A60 for terminal-to-terminal communication connection shown in FIG. 109 correspond, one to one, the Steps J01 to J60 for terminal-to-terminal communication connection shown in FIG. 189. The Steps A70 to A80-1 correspond, one to one, the Steps J70 to J80-1 for terminal-to-terminal communication connection shown in FIG. 189. The terminal-to-terminal communication connecting control method of between the terminal unit 905-1 and the terminal unit 905-4 is the same as the terminal-to-terminal communication connecting control method of between the terminal unit 905-10 and the terminal unit 905-16.

A step J68 (FIG. 189) shows a range of terminal-to-terminal media communication, a step J69-1 a terminal-to-terminal high-level communication start procedure, a step J-69-2 a terminal-to-terminal media communication, and a step J69-3 a terminal-to-terminal high-level communication closing procedure. Steps J69-1 and J69-3 belong to a terminal-to-terminal high-level communication control layer, and a step J69-2 belongs to a terminal-to-terminal media communication layer.

Furthermore, explanation is made on a method that the terminal units 905-10 and 905-16 carry out terminal-to-terminal communication by using telephone numbers, with reference to FIGS. 190 and 191. FIG. 190 is a diagram of FIG. 108 simplified to explain a communication between the terminal units 905-10 and 905-16. The servers within the terminal-unit control sections 914-1 (FIG. 108) and 914-4 are omittedly described, hence omitting some procedures of within the terminal-unit control section 914-1. FIG. 191 is a simplification of FIG. 173.

A call connect request is forwarded from the terminal unit 905-10 (Step J01). The media router 903-1 sends back a call connect request acceptance (Step J02). Subsequently, the media router 903-1 sends a call set request, including a telephone number "TN5" of the terminal unit 905-10 as an origin and telephone number "TN6" of the terminal unit 905-16 as a destination, to the terminal-unit control section 914-1 within the terminal-unit gateway 901-1 (Step J04). The terminal-unit control section 914-1 forms an initial address message (IAM packet) containing the telephone numbers "TN5" and "TN6" and forwards it into the IP network 900 (Step J21). The IAM packet reaches the terminal-unit control section 914-4 via the control communication line 912-1 (FIG. 108). The terminal-unit control section 914-4 notifies an incoming-call notification obtained by receiving the IAM packet to the terminal unit 905-16 (Step J25) via the media router 903-4 (Step J24). The media router 903-4 replies (Step J31). Subsequently, the terminal-unit control section 914-4 forms an address completion message (ACM packet) notifying a possibility of reception of a call set request based on the IAM packet, and sends it back to the terminal-unit control section 914-1 (Step J34). The ACM packet reaches the terminal-unit control section 914-1 via the control communication line 912-1. Furthermore, it is possible to send the information representative of a possibility of reception of within the ACM packet to the media router 903-1 (Step J37, option).

When the terminal unit 905-16 notifies an in-calling to the media router 903-4 (Step J40), the media router 903-4 notifies an in-calling to the terminal-unit control section 914-4 (Step J41). The terminal-unit control section 914-4, receiving an in-calling, forms and forwards a call message "CPG" (Step J44). The call message "CPG" is transferred within the IP network 900, to reach the terminal-unit control section 914-1.

The terminal-unit control section 914-1 notifies an in-calling to the terminal unit 905-10 via the media router 903-1 (Steps J47, J48).

When the terminal unit 905-16 responds, the response passes the media router 903-4 (Step J50) to reach the terminal-unit control section 914-4 (Step J51). The terminal-unit control section 914-4 forms and forwards an answer message (ACM packet) (Step J54). The ACM packet is transferred within the IP network 900 to reach the terminal-unit control section 914-1. The terminal-unit control section 914-1 notifies the response to the terminal unit 905-10 via the media router 903-1 thereby enabling communication between the terminal units (Steps J57, J58). Note that the terminal unit 905-10 can forward a confirmation of answer also to the media router 903-1, subsequently to the Step J58 (Step J59, option). Meanwhile, the media router 903-4 can forwards a confirmation of answer to the terminal unit, subsequently to the Step J50 (Step J60, option).

Due to the above procedure, a communication path through the IP network was established by the procedure based on a common channel signaling system between the terminal units 905-10 and 905-16 established. Next, the terminal units 905-10 and 905-16 carry out a terminal-to-terminal high-level communication start procedure (Step J69-1). The terminal-to-terminal high-level communication start procedure can perform, for example, opening a voice image communication logic channel, communication mode selection, flow control designation, terminal-capability information exchange and so on. Next, a plurality of IP packets storing voice, images, text data and the like are communicated between the terminal unit 905-10 and the terminal unit 905-16, thus effecting terminal-to-terminal media communication (Step J69-2). The IP packet storing voice, images, text data and the like is transferred through the network node unit 906-1 and media-transfer communication line 913-3. When the terminal-to-terminal media communication ends, the terminal units 905-10 and 905-16 carry out the opened terminal-to-terminal high-level communication closing procedure (Step J69-3).

Next, when the terminal unit 905-10 issues a release request (Steps J70, J71), a REL packet notifying a release is forwarded from the terminal-unit control section 914-1 (Step J74). The terminal-unit control section 914-4 is sent back with a RLC packet notifying a completion of release (Step J84). The terminal-unit control section 914-4 notifies a release notification to the terminal unit 906-16 (Steps J78, J79) to receive a confirmation of release (Step J80, J81). The media router 903-4 can forward a release report confirmation (Steps J80-1, option). Also, the terminal-unit control section 914-1 notifies a release notification to the media router 903-1 (Step J87). The media router 903-1 can forward a confirmation of release (Step J70-1, option). By the above procedure, released is the communication path having been set up for terminal-to-terminal communication.

In FIG. 192, there is a UDP layer in a level above an IP communication layer. A line connection control (or signaling connection control, circuit connection control) layer based on the No. 7 common channel signaling system is provided in a level above the UDP layer. A terminal-to-terminal high-level communication control layer is provided in a level above the line connection control layer. A communication media layer is provided in a level above the terminal-to-terminal high-level communication control layer.

It is possible to place the line connection control layer based on the common channel signaling system in a level above the IP layer, thereby omitting the UDP layer. Incidentally, the technique of placing the line connection control layer in a level above the IP layer is disclosed in the prior patent (FIG. 206 in Embodiment 13, or the like). The line connection control layer placed in the level above the IP layer is defined as a new protocol to provide, in a header beginning of a new protocol segment of the line connection control layer, a port field (16 bits×2, when IPv4) in a form similar to a port field in a header of a UDP or TCP segment. This can overcome the defect that the UDP layer is omitted to disable the use of a port number. The new protocol segment of the line connection control layer is in a form similar to the UDP or TCP segment. There is an expectation on a merit that the IP communication unit is simplified. The technique, placing the line connection control layer based on a common channel signaling system in a layer above an IP layer, is applicable to all of communication cases 1 to 5.

<<Communication Case 6: Multimedia Terminal-to-Terminal Communication Set with Communication Records>>

FIG. 193 is a multimedia terminal-to-terminal communication method (communication record dynamical setting method) not based upon the common channel signaling system for setting a communication record. Explanation is made on a method of communication that the IP terminal unit 905-11 and the IP terminal unit 905-14 communicate respectively through telephone management servers 906-4 and 907-4.

The terminal unit 905-11 has an identification name "TN7" and an IP address "EA7". The terminal unit 905-14 has an identification name "TN8" and an IP address "EA8". Meanwhile, the terminal unit 905-11 performs transmission by using a port number "7070" while the terminal unit 905-14 performs transmission by using a port number "7080". The IP terminal units 905-11 and 905-14 are also multimedia terminal units to transmit and receive text data, digitalized voice, still or moving images by storing them in an IP packet. For example, the identifier "TN7" and "TN8" can be mail address and/or an identification code (URL) of home page provided by WWW server.

<<Connection Phase>>

An IP packet 971 (FIG. 195) is forwarded from the IP terminal unit 905-11 (Step K01 in FIG. 193). The IP packet 971 passes the media router 903-1 (Step K04), to pass the network node unit 906-1 where it is encapsulated into an internal IP packet 972 (FIG. 196) to reach the proxy telephone server 906-2 (Step K05) and turn into an IP packet 973 (FIG. 197), reaching the telephone management server 906-4 (Step K06). The IP packet 971 includes at least the "TN7", "TN8" and "7070" Incidentally, the technique that the IP packet forwarded from the IP terminal unit 905-11 passes the media router and reaches the network node unit without changing the IP address is applied with a known art described in the prior application patent (Japanese Patent Application No. 078270/2001).

<<CIC Management Table Preparation>

The telephone management server 906-4 defines a CIC number "CIC-8" from a source identification name "TN7" and destination identification name "TN8" obtained by reading the IP packet 973 by applying a rule previously defined in the IP network 900. Furthermore, the telephone management server 906-4 sends to the telephone number server 906-5 an IP packet 974 for inquiring various IP addresses related to the destination identification names "TN7" and "TN8", a UNI kind of the media router 903-3 the destination IP terminal unit 905-14 is to connect, and a port number the destination IP terminal 905-14 (FIG. 198) is to use (Step K07), to obtain an IP packet 975 (FIG. 199) containing an answer to the inquiry (Step K08).

The telephone management server 906-4 furthermore prepares a CIC management table 976-1 (FIG. 200) and writes therein a CIC number "CIC-8", a UNI kind "UNI1" of the media router 903-1, a UNI kind "UNI2" of the media router 903-3, a source identification name "TN7", a destination identification name "TN8", an external IP address "EA7" and internal IP address "IA8", a procedure partition "IAM", a write time "St-7" and an elapse time (timer value) to an end "Time7". The kind of information content to be written in the CIC management table 976-1 (FIG. 200) is defined relying upon a UNI kind "UNI1" of the media router 903-1.

<<Regulation in the Number of IP Packets on Each Line>>

The telephone management server 906-4 takes a source IP address "EA7" out of the CIC management table 976-1 and writes it to a transmission-count management table under control of the telephone management server 906-4. The number of lines in service is increased by "1" and compared with the upper-limit number of lines. Incidentally, where the number of lines in service is greater than the upper-limit number of lines, the process is suspended without proceeding to the following connection phase. The transmission-count management table is in the same form as an outgoing-call management table 918-1 (FIG. 140).

<<Notification of Communication Permission>>

Next, the telephone management server 906-4 forms and forwards an internal IP packet 978 (FIG. 201) notifying a communicatability between the IP terminal unit 905-11 and the IP terminal unit 905-14 (Step K55). The proxy telephone server 906-2 converts the IP packet 978 into an IP packet 979 (FIG. 202) and forwards it to the network node unit 906-1 (Step K56). An IP packet 980 (FIG. 203) obtained by decapsulation passes the media router 903-1 (Step K57) to reach the IP terminal unit 905-11 (Step K58). The IP packet 980 contains, as a content, an IP address "EA8" and port number "7080" of the destination IP terminal unit 905-14. Incidentally, the telephone management server 906-4, upon forming an IP packet 978, reads the IP address "EA8" and port number "7080" out of the IP packet 975 (FIG. 199) and writes it to the IP packet 978.

Next, the telephone management server 906-4 makes reference to the IP address information of the CIC management table 976-1 and forms an IP packet 977 (FIG. 201) for notifying a preparation of a communication record required in terminal-to-terminal communication, and sends the IP packet 977 to the telephone management server 907-4 (Step K21). The telephone control server 907-4 receives the IP packet 977, as explained in the method similarly with other communication cases, and forms the CIC management table 976-2.

<<Regulation in the Number of Incoming IP Packets on Each Line>>

The telephone management server 907-4 takes a destination IP address "EA8" out of the received IP packet 977 and writes it into an incoming-call-count management table. The number of incoming IP packets on each line is regulated, e.g. the number of lines in service is increased by "1".

<<Communication Record Setting>>

Following the Step K21, the telephone management server 906-4 takes an IP address "EA7, IA7, EA8, IA8" of a first-lined record of the CIC management table 976-1 (FIG. 200) and asks the table management server 906-3 (Step K66), so that the table management server 906-3 sets it as a fifth-lined communication record "IA7, IA8, EA7, EA8, MK25, MK26, . . . " of a unit control table 910-1 (FIG. 136) within the network node unit 906-1 (Step K67). Furthermore, the telephone management server 906-4 sets a time-elapse interrupt timer corresponding to the CIC number "CIC-8" according to a lapse time (timer value) "time7" to an end included in the CIC management table 976-1.

Similarly, the telephone management server 907-4 takes an IP address "EA8, IA7, EA8, IA7" of a first-lined record of the CIC management table 976-2 and asks the table management server 907-3 (Step K64), so that the table management server 907-3 sets it as a third-lined record "IA8, IA7, EA8, EA7, MK26, MK25, . . ." of a unit control table 910-2 (FIG. 137) within the network node unit 907-1 (Step K65). Furthermore, the telephone management server 907-4 sets a time-elapse interrupt timer corresponding to the CIC number "CIC-8" according to a lapse time "time7" to an end included in the CIC management table 976-2.

<<Terminal-to-Terminal Communication>>

The IP terminal unit 905-11, receiving an IP packet 980 (Step K58 in FIG. 203), acquires an IP address "EA8" and port number "7080" corresponding to the identification name "TN8" of the IP terminal unit 905-14 at the other end of communication. The IP terminal unit 905-11 forms an IP packet 981 (FIG. 206) to be sent to the IP terminal unit 905-14. The IP packet 981 forwarded from the IP terminal unit 905-11 passes the media router 903-1 (Step K68-1) to reach the network node unit 906-1 (Step K68-2). This turns into an internal packet 979 by the application of the fifth-lined communication record of the unit control table 910-1 (FIG. 136) having been set in the above. The internal packet 982 (FIG. 207) is transferred within the IP network 900 (Step K68-3) to reach the network node unit 907-1 where it is decapsulated to restore an IP packet 981. This is forwarded to pass the media router (Step K68-4) to reach the terminal unit 905-14 (Step K68-5). The IP packet forwarded from the IP terminal unit 905-14 is transferred in a reverse direction over the communication path, thus reaching the IP terminal 905-11 (Steps K69-1 to K69-5). The IP terminals 905-11 and 905-14 properly exchange data by communicating IP packets.

<<Communication Record Deletion>>

When the time-elapse interrupt timer corresponding to the set CIC number "CIC-8" starts up due to lapse of a predetermined time "time7", the telephone management server 906-4 instructs the table management server 906-3 to delete a relevant communication record in the unit control table 910-1 corresponding the CIC number "CIC-8" (Step K96 in FIG. 193). The table management server 906-3 deletes the communication record (Step K97). Similarly, when the time-elapse interrupt timer corresponding to the set CIC number "CIC-8" starts up due to lapse of a predetermined time "time7", the telephone management server 907-4 instructs the table management server 907-3 to delete a relevant communication record in the unit control table 910-2 (Step K98). The table management server 907-3 deletes the communication record (Step K99).

<<Another Delete Method of Communication Record>>

Explaining with reference to FIG. 194, nearly similar are Steps K01 to K69-5, i.e. steps of from carrying out to a completion of communication exchanging IP packet between the terminal 905-11 and the terminal 905-14 due to issuing an communication request from the terminal unit 905-11. The difference lies in that the telephone management servers 906-4 and 907-4 are both not provided with a time-elapse interrupt timer. When the terminal unit 905-11 forms and forwards an IP packet notifying a communication end (Step K70), the IP packet reaches the telephone management server 906-4 by way of the media router 903-1, network node unit 906-1 and proxy telephone server 906-2 (Steps K71 to K73). The IP packet forwarded from the terminal unit 905-11 has a form same as a form of the IP packet to be forwarded in the Step K01, wherein the difference is further inclusion of a notification of communication end "END". The IP packet to be forwarded in the Step K72 has a form same as a form of the IP packet 972 (FIG. 196) to be forwarded in the Step K05. Similarly, the IP packet to be forwarded in the Step K73 has a form same as a form of the IP packet 973 (FIG. 197) to be forwarded in the Step K06. The difference lies in including a notification of communication end "END".

Receiving a communication end notification in the Step K73, the telephone management server 906-4 first uses identification names "TN7" and "TN8" to calculate a CIC number "CIC-8", and notifies a communication end of "CIC-8" to the telephone management server 907-4 (Step K74). Next, the table management server 906-3 is instructed to delete a relevant communication record in the unit control table 910-1 (Step K96x). The table management server 906-3 deletes the relevant communication record (the fifth record) (Step K97x). Receiving the communication end notification of "CIC-8" in the Step K74, the telephone management server 907-4 instructs the table management server 906-3 to delete a relevant communication record (the third record) in the unit control table 910-2 (Step K98x). The table management server 906-3 deletes the relevant communication record (Step K99x).

<<Summary of Communication Case 6>>

The IP network includes the network node unit 1 and the network node unit 2. The terminal unit 1 forwards to the network node unit 1 an IP packet including an identification name 1 of the terminal unit 1 and identification name 2 of the terminal unit 2 to request a communication. The internal packet containing the identification name 1 and identification name 2 reaches the telephone management server 1. The telephone management server 1 acquires and sends back an IP address and port number corresponding to the identification name 2 through the telephone number server. The telephone management server 1 notifies the telephone management server 2 of a communication request of from the terminal unit 1 to the terminal unit 2. The telephone management server 1 asks the table management server 1 to set in the network node unit 1 a communication record for encapsulating an IP packet to be communicated between the terminal unit 1 and the terminal unit 2. The telephone management server 2 asks the table management server 2 to set in the network node unit 2 another communication record for encapsulating an IP packet to be communicated between the terminal unit 1 and the terminal unit 2. The terminal unit 1 receives the IP packet containing an IP address and port number via the network node unit 1. The terminal unit 1 forwards an IP packet having a destination of an IP address and port number corresponding to the acquired identification name 2. The IP packet, in the network node unit 1, is encapsulated into an internal packet by the use of the above set communication record. The internal packet is transferred within the communication network to reach the network node unit 2. This, in the network node unit 2, is decapsulated by the use of the above set communication record, to reach the terminal unit 2. The telephone management server 1 and the telephone management server 2, upon elapsing a predetermined time, delete the communication record.

Incidentally, the identification name 2 corresponds only in an IP address but not in a port number. The telephone management server can be provided not to send back a port number. It is possible, as a variation, for the terminal unit 1 or terminal unit 2 to forward a communication-end IP packet whereby the telephone management server asks the table management server to delete a communication record used for the terminal unit 1 and terminal unit 2.

<<Another Method for Designating Destination-Terminal Port Number>>

The embodiment of communication Case 6 showed the example that the terminal unit 905-14 used a port number "7080" so that the telephone management server 906-5 gave an answer by storing a port number "7080" in an IP packet 975. Another embodied method is a method that the telephone management server 906-5 does not answer a port number "7080". In this case, the IP packet 978 to IP packet 980 do not contain therein a port number "7080". In this case, a port number "7080" for use by the terminal unit 905-14 is previously notified, e.g. the port number "7080" of the terminal 905-14 is made public by communication carrier that manages the IP network 900. The terminal unit 905-11 uses an open port number. The CIC management table form and the record having a circuit identification code "CIC-8" are made common to the communication Case 1 to the case 5. This can apply a common rule of within the IP network 900, e.g. of operation management, fee charge and so on.

The terminal 905-14, a destination terminal, uses the third record "IA8, IA7, EA8, EA7, MK26, MK25, . . . ," in the unit control table 910-2 (see FIG. 137). The port control table (see FIG. 69, etc.) pointed from the record is set to have the port filter 1, which specifies both a source port number permitted at sending and a destination port number permitted at receiving. Then, the terminal 905-14 only receive the IP packet that destination port number is "7080", or only sends the IP packet that source port number is "7080". As the result, the terminal 905-14 does not receive an IP packet whose destination port number is excluding "7080", and the terminal 905-11 does not receive an IP packet that source port number is excluding "7080", that enhances communication security.

<<Secure Socket Communication between Terminals Using Port Filter>>

The terminal 2 can perform secure communication by only receiving the IP packet that includes the port number of the terminal 2, as its destination port number, where the terminal 2 makes its identification name and port number public in advance. Port numbers of the terminal 2 can be plural, examples are the port number "25" for e-mail, the port number "80" for WWW server. Then, both the e-mail communication and operation of WWW server can be implemented securely. The IP address of the terminal 2 becomes open because of the disclosure of its identification name of the terminal 2. By means of limiting the socket number of the terminal 905-14 as above, secure socket communication is achieved, where a socket number is a combination of an IP address and a port number.

Next, a communication between terminal 1 and terminal 2 is described. The terminal 1 shows the identification name of the terminal 2 to the telephone number server in the IP network, and obtains the IP address of the terminal 2. At this time, the telephone management server instructs the table management server to set the port filter 1 (which specifies both a destination port number permitted at receiving and a source port number permitted at sending) as pointed from the communication record in unit control table in the network node unit 2. Furthermore, the telephone management server instructs the table management server to set the port filter 2 (which specifies both a destination port number permitted at sending and a source port number permitted at receiving).

Next, the terminal 1 send the external IP packet that destination IP address is the IP address of the terminal 2, at the network node unit 1, the external IP packet is changed to an internal packet, and the internal IP packet is transported across the IP network, the IP packet, at the network node unit 2, is recovered to the external IP packet, and is sent to the terminal 2, while, the recovered IP packet can be rejected if the recovered IP packet does not include the destination port number which is recorded in the unit control table in the network node 2. For the inverse transportation of external IP packets, the terminal 2 sends an external IP packet, at the network node 2, the external IP packet is changed into an internal IP packet if the external IP packet includes the source port number which is recorded in the network control table of the network node 2, then the internal IP packet transported across the IP network, and from the internal packet, the external IP packet is recovered, and send to the terminal 1. Furthermore, addition to the communication between the terminal 1 and the terminal 2, at the network node 1, an external IP packet sent from the terminal 1 is only changed into an internal IP packet, where the external IP packet includes an IP address of the terminal 2, as destination IP address which is recorded in the network control table of the network node 1. Similarly, at the network node 1, an internal IP packet sent across the IP network is only recovered to an external IP packet, where the recovered external IP packet includes an IP address of terminal 2, as source IP address which is recorded in the network control table of the network node 1.

In short, a network node unit implements encapsulation (at sending) and decapsulation (at receiving), and the communication function 1 and the communication function 2 using unit control table in the node, and the network node unit can perform the socket communication between terminals, including more than one of the packet filtering function using protocols, priority control or multicast function, where the communication function 1 is that inputs an external packet, selecting the external packet and forms into an internal packet, depending the socket number in the external packet, and the communication function 2 is that inputs an internal packet and recovers an external packet, selecting the recovered external packet, depending the socket number in the recovered external packet.

Variation is that a network node unit implements the address test, and the communication function 1 and the communication function 2 using unit control table in the node, and the network node unit can perform the socket communication between terminals, including more than one of the packet filtering function using protocols, priority control or multicast function.

<<Overall Explanation of Communication Cases 1 to 6>>
<Higher-Level Protocol>

In the communication cases 1 to 6, the IP packets to be communicated between the network node unit 906-1, the proxy telephone server 906-2 and the telephone management server 906-4 have, in the header, protocol items that can be properly standardized and used within the IP network 900, e.g. can be used as "UDP". FIG. 192 shows, as a protocol stack figure, the communication procedures mentioned in Communication Cases 1 to 4 of this embodiment. There are, from a communication lower level toward a communication higher level, a physical layer (first layer), a data link layer (second layer), an IP layer (third layer), a UDP layer (fourth layer) and a communication function layer showing a line-connection control procedure based on a common channel signaling system using telephone numbers. In the further upper level, there is a high-level communication procedure to be defined by an application. The server-to-server communication within the IP network 900 uses an internal IP packet storing therein a UDP segment.

The protocol type item, in a header of an IP packet to be communicated with the telephone management server 906-4, can use further as "ICMP". Otherwise, it is possible to newly define a protocol type unique to the IP communication network 900 at its inside. The foregoing is true for the protocol type item in a header of an IP packet to be communicated between the network node unit 909-1, the proxy telephone server 909-2 and the telephone management server 909-4.

This embodiment was an embodiment that the line-connection control messages (IAM, ACM, CPG, ANM, REL, RLC) are by setting a UDP segment in a payload of an IP packet (IPv4) defined under RFC791. However, a TCP segment can be provided in place of the UDP segment, which has been explained in the other embodiment. Meanwhile, it is possible to place a line-connection control layer based on a common channel signaling system in a level above the IP layer, for implementation omitting the UDP layer.

Telephone number is a telephone number for use on a fixed telephone set or mobile phone. A telephone number and attendant information (IP address, etc.) to a telephone number are to be registered in the telephone number server via the user service server, telephone management server. Meanwhile, when registering a telephone number to be used on a mobile phone to the telephone number server, a terminal-unit authentication procedure is made in order to confirm a correctness of the telephone number and the attendant information to the telephone number. The telephone number server holds an external IP address of a media router to be connected by a fixed telephone set 1 having a telephone number "TN1", an internal IP address of a logic terminal at an end of a communication line to be connected by the media router, an external IP and internal IP addresses of a proxy telephone server, an internal IP address of the telephone management server, and a UNI of the media router. Furthermore, the external IP address of the media router can be changed to the external IP address of the telephone set 1, i.e. the telephone number server can hold an external IP address of the telephone set 1, an internal IP address of the logic terminal, an IP address of the proxy telephone server and telephone management server, and a UNI. Namely, the various pieces of information related to a telephone number are held. Furthermore, the telephone number server is allowed to inquire another telephone number server to acquire attendant information to the other telephone number "TN2".

<Server Integral Mount>

In carrying out the Communication Cases 1 to 6, the proxy telephone server 906-2, table management server 906-3, telephone management server 906-4 and telephone number server 906-5 of within the terminal-unit gateway 914-1 can be mounted within one computer, to carry out a plurality of servers as application programs of within a computer by providing individual port numbers. Similarly, the servers in plurality within the terminal-unit gateways 914-2 to 914-4 also can be carried out respectively as application programs in plurality within a computer by providing individual port numbers.

Also, this is the case that the media router 903-1 or the like is connected from the terminal-unit control section 914-1 but there is no radio base point. The proxy mobile telephone server 906-6 can be omittedly carried out.

<Summary 1: Communication with Fixed Telephone Sets and Mobile Phones>

In a terminal-to-terminal communication connection control procedure connecting, via a communication line, the terminal unit 1, the media router 1 or radio base point 1, the telephone management server 1, the telephone management server 2, the media router 2 or radio base point 2 and the terminal unit 2, the communication between the terminal unit and the media router or radio base point carries out a communication procedure on the basis of an individual interface for the terminal unit. The communication procedure of between the media router or radio base point and the telephone management server is by a UNI for the media router or radio base point. The communication procedure of between the telephone management server 1 and the telephone management server 2 is by an NNI based on the common channel signaling system. The telephone management server includes at least a function to carry out the UNI for the radio base point. The UNI for the media router or radio base point can be characterized by acquisition through an inquiry from the telephone management server to the telephone number server so that the telephone management server uses it in communication procedure management. The acquired UNI can be recorded in a CIC management table of under the management of the telephone management server and used in communication procedure management. Meanwhile, in a case that the telephone management server 1 and the telephone management server 2 are in agreement, a method of communication between the telephone sets is possible. This case is achieved by an implementation omitting the internal-IP-packet communication between the telephone management server 1 and the telephone management server 2. Namely, it is possible to carry out a terminal-to-terminal communication connection control procedure connecting the terminal unit 1, the media router 1 or radio base point 1, the telephone management server, the media router 2 or radio base point 2 and the terminal unit, from the communication line. At this time, omitted is an NNI based on the common channel signaling system at between the telephone management server 1 and the telephone management server 2.

The IP network includes two or more network node units. An external packet forwarded from the media router 1 or radio base point 1 turns into an internal packet under the control of a unit control table in a source-sided network node unit. The internal packet is transferred within the communication network. The internal packet is restored into an external packet in a destination-sided network node unit, and forwarded to the media router 2 or radio base point 2. Because of a communication connecting, from the communication line, the terminal unit 1, the media router 1 or radio base point 1, the telephone management server 1, the telephone management server 2, the media router 2 or radio base point 2 and the terminal unit 2, the communication procedure of between the media router or radio base point and the telephone management server is by a UNI for the media router or radio base point while the communication procedure of between the telephone management server 1 and the telephone management server 2 is by an NNI based on the common channel signaling system, thus carrying out the terminal-to-terminal communication connection control method. Meanwhile, an external packet is inputted at a logic terminal on an external communication line. By defining three sets of the input source-sided logic terminal identifying information, a source external IP address in the external packet and a destination external IP address, defined is a destination incoming-call internal address of an internal packet transfer under the control of a unit control table in the source-sided network node unit. It can be reworded that, under the control of the unit control tables in the source-sided and destination-sided network node units and control tables in the relay units, an internal communication line for internal packet transfer is defined between the source-sided and destination-sided network node units. The internal packet is transferred within the communication network and restored to an external packet in the destination-sided network node unit. By using two sets of the input source-sided logic terminal identification information and the destination external IP address in the external packet, the source external IP address in the external packet cannot be used.

By using a communication record ID in the unit control table and specifying the relevant communication record, it is possible to impose a telephone communication fee for the telephones having at least one being a mobile phone. In terminal-to-terminal communication, the number of outgoing calls can be regulated by the use of an outgoing-call management table. Meanwhile, it can be characterized to regulate the number of incoming calls by the use of an incoming-call management table. Furthermore, in terminal-to-terminal communication, the operation server can inquire the telephone management server to acquire the information in the CIC control table used in the terminal-to-terminal communication thereby imposing a communication fee. The radio base point includes an IP communication line interface section, a radio interface section and a radio transmitting/receiving section. The radio transmitting/receiving section can have a telephone communication with any one or more of analog-mobile-phone radio communication path, a digital-mobile-phone radio communication path and an IP-mobile-phone radio communication path. Also, the IP communication line interface section is a radio base point characterized by using a radio communication path-IP address correspondence table to manage the IP addresses to be used by mobile phones. The internal packet can be any of an IPv4, an Ether frame, an MPLS frame and an HDLC network. The technique explained in the other embodiment can be applied to the present embodiment.

The IP network allows both the communication of between mobile phones of between the mobile phones 1 and the mobile phone 2 and the communication between fixed telephone sets of between the fixed telephone set 1 and the fixed telephone set 2. Furthermore, telephone communication is possible between the mobile phone and the fixed telephone set via the IP network. The user offers an application for registration of a mobile phone with attaching, at least, a telephone number and a mobile-phone address. The accepter notifies the user of terminal-unit authentication information and a proxy mobile phone server address. The user sets a telephone number, mobile phone address, terminal-unit authentication information and proxy mobile phone server address onto the mobile phone. The superior telephone number server holds at least a telephone number and terminal authentication information within the telephone number server thereby registering a telephone number of the mobile phone.

The mobile phone transmits position registration request information. An external packet containing the position registration request information passes the network node unit and turns into an internal packet to be delivered to a superior telephone number server. The superior telephone number server uses a telephone number and terminal-unit authentication information of the mobile phone included in the received at least position registration request and a telephone number and terminal-unit authentication information held in a telephone number registration procedure of a telephone set of an information mobile phone, to carry out an authentication procedure examining whether the mobile phone is a normal telephone set thereby carrying out an initial position registration of the mobile phone.

The mobile phone transmits position change request information. An external packet containing the position change request information passes the network node unit and turns into an internal packet, thus delivered to a superior telephone number server. The superior telephone number server uses a telephone number and terminal-unit authentication information of the mobile phone included in the received at least position registration request and a telephone number and terminal-unit authentication information held in a telephone number registration procedure of a telephone set of an information mobile phone, to carry out an authentication procedure examining whether the mobile phone is a normal telephone set. Next, the information concerning the mobile phone is sent to the telephone number server or superior telephone number server managing a changed position of the mobile phone thereby carrying out a position change procedure of the mobile phone. It is also possible, as a variation, for the superior telephone number server to manage the related information, such as a telephone number and IP address of the mobile phone, and for the telephone number server to manage the related information, such as a telephone number and IP address of the fixed telephone set.

In the network node unit for carrying out communication between mobile phones and network node unit for carrying out communication between fixed telephone sets, any is possible of a method for forming an internal packet from an external IP packet and restoring an external packet by the encapsulation and decapsulation function of the network node unit and a method for making an internal packet by selecting an external packet selected by an address inspection using the registration information of within the network node unit explained in the other embodiment. Also, the network node unit can carry out a packet filter function, packet priority control, multicast control and signature control using a protocol kind and port number. In a case connecting a plurality of IP networks, a telephone number server connected to an IP network 1 can acquire an IP address and related information related to a telephone number "TEL2" managed by a superior telephone number server 2 by way of a superior telephone number server 1 connected to the IP network, a route telephone number server, and a superior telephone number server 2 connected to an IP network 2.

<Summary 2: Terminal-to-Terminal Media Communication>

The terminal unit 1 and the terminal unit 2 uses telephone numbers establish, via an IP network, a communication path by a line-connection control procedure applying a common channel signaling system to the IP network in the IP network, to carry out a terminal-unit high-level communication start procedure between the two terminal units. Next, terminal-to-terminal media communication is done between the terminals. When the terminal-to-terminal media communication ends, the communication path in the IP network is released by a line-connection control procedure applying a common channel signaling system to the IP network. Thus, a terminal-unit high-level communication closing procedure can be effected to carry out multimedia communication. The terminal-to-terminal media communication can communicate an IP packet storing, for example, voice and images between the terminal unit 1 and the terminal unit 2, to effect voice image communication. When the terminal-to-terminal media communication ends, the terminal unit 1 and the terminal unit 2 carry out a terminal-unit high-level communication closing procedure for closing the established voice image communication path.

<<Relation to Prior Patent and Prior Patent Application>>

This embodiment discloses a method for carrying out fixed-telephone and mobile-phone communications on the same IP network by using a CIC management table including a management function of a terminal-sided UNI and a terminal-to-terminal communication connection control method having a mobile phone at one end. Disclosed are multimedia terminal-to-terminal communication to carry out terminal-to-terminal communication connection control based on a common channel signaling system and a method for communication by dynamically setting a communication record used in IP encapsulation or the like. The prior patent (Japanese Patent No. 3084681) discloses an IP network based on an IP encapsulation technique, i.e. IP network that an external packet forwarded from a terminal unit turns into an internal packet under the control of a unit control table of a source-sided network node unit, the internal packet being transferred within the communication network, the internal packet being restored into an external packet in a destination-sided network node unit to be allowed to reach another terminal unit. Meanwhile, the prior patent application (2001-78270), in its Embodiment 10 (FIGS. 135 to 160), discloses terminal-to-terminal communication connection control, not including a UNI management function, of between a fixed telephone set and a fixed telephone set.

9. Embodiment 9 for Carrying out Security ASP

Explanation is made on a method for implementing ASP service with security by the use of a first function (encapsulation and decapsulation function) and second function (protocol filter and port filter) of the network node unit to select an IP packet for communication between an ASP server and a user program thereby excluding unspecified IP packets.

In FIG. 224, numeral 1000 is an IP network, numeral 1001 is an ASP site, numerals 1003 and 1004 are terminal units having an IP-packet transmission/reception function, numerals 1005 to 1007 are network node units, and numerals 1011 to 1014 are user programs. The ASP site 1001 includes an ASP server 1008, a program 1009 within the ASP site, a WWW program 1010, and a database 1026. The network node units 1005 to 1007 respectively include unit control tables 1015 to 1017. The unit control table 1015 includes communication-records 1018 and 1019 and filter control records 1022 and 1023. The unit control table 1016 includes a communication record 1020 and a filter control record 1024. The unit control table 1017 includes a communication record 1021 and a filter control record 1025. The network node units 1005 to 1007 are connected via communication lines and routers so that they can mutually send and receive IP packets.

The communication records 1018 to 1020 have, in the control item CTL, a bit position "01" (protocol filter 1, transmission permission) and bit position "02" (protocol filter 2, arrival permission) both rendered "1". Furthermore, the communication records 1018 to 1020 have, in the control item CTL, a bit position "05" (port filter 1) rendered "1". The communication record 1019 has, in the control item CTL, a bit position "05" (port filter 1) and bit position "06" (port filter 2) rendered "1". The communication record 1020 has, in the control item CTL, a bit position "06" (port filter 2) rendered "1", and the communication record 1021 has, in the control item CTL, a bit position "05" (port filter 1) and bit position "06" (port filter 2) rendered "1". In FIGS. 225 to 227, numerals 1024-1, 1022-1, 1023-1 are protocol control records to be applied to the protocol filter 1, numerals 1024-2, 1022-2, 1023-2 are protocol control records to be applied to the protocol filter 2, while numerals 1024-3, 1022-3, 1023-3 to 1023-5, 1025-1 to 1025-3 are port control records. Incidentally, the filter control record 1025 includes port control records 1025-1 to 1025-3 but does not include protocol control records.

<<Transmission from Terminal Unit 1003 to ASP Site 1001>>

Numeral 1001-1 (in FIG. 228) shows a range of communication procedure within the IP network 1000. Although the port number "5000" of the ASP server 1008 is previously defined according to a client server model, the source port number "8200" in an external packet 1031 (FIG. 229) to be sent by a user program 1011 as a client is defined at a start of communication. The external packet 1031 forwarded from the user program 1011 is inputted to the network node unit 1006 (Step R1 in FIG. 228) via a communication line and converted into an internal packet by the use of the communication record 1020 and filter control record 1024. The internal packet passes an internal communication line and router to reach the network node unit 1005 (Step R2). In the network node unit 1005, the communication record 1018 and filter control record 1022 are used to restore an external packet. The restored external packet passes a communication line to reach the ASP server 1008 (Step R3).

When forming an internal packet, the communication record 1020 in the source-sided network node unit 1006 has, in the control item CTL, a protocol filter 1 (bit position "01") of "1". Accordingly, inspection is made whether the protocol item value "6" (TCP) in a header 1031-1 of the external packet 1031 is included within the protocol control record 1024-1 (FIG. 225) or not. In the present case, because the protocol control record 1024-1 includes "6" therein, the protocol filter 1 passes the examination (transmission permission). Because the port filter 2 (bit position "06") in the control item CTL of the communication record 1020 is "1", inspection is made whether the destination port number "5000" in a payload 1031-2 of the external packet 1031 is included within the port control record 1024-3 (FIG. 225) or not. In the present case, because the port number "5000" is included, the port filter 2 passes the examination (destination port number at transmission). Incidentally, when the other communication records are also unacceptable in the protocol filter or port filter examination, an internal packet is not formed.

Next, when an external packet is restored from the internal packet, the communication record 1018 in the destination-sided network node unit 1005 has, in the control item CTL, a protocol filter 2 (bit position "02") of "1". Accordingly, inspection is made whether the protocol item value "6" (TCP) in a header 1031-1 of an external packet 1031 to be obtained by restoration is included within the protocol control record 1022-2 (FIG. 226) or not. In the present case, because "6" is included in the protocol control record 1022-2, the protocol filter 2 examination (arrival permission) is passed. Furthermore, the port filter 1 (bit position "05") in the control item CTL of the communication record 1018 is "1", inspection is made whether the destination port number "5000" in a payload 1031-2 of an external packet 1031 to be restored and obtained is included within the port control record 1022-3 (FIG. 226) or not. In the present case, because the port number "5000" is included, the port filter 1 examination (destination port number at arrival) is passed. Incidentally, when not passed including the other communication records in the protocol filter or port filter examination, an external packet is not formed from the internal packet.

<<Sending Back from ASP Site 1001 to Terminal Unit 1003>>

An external packet 1032 (in FIG. 229) forwarded from the ASP site 1001 is inputted to the network node unit 1005 (Step R4) via a communication line and converted into an internal packet by the use of a communication record 1018 and filter control record 1022. The internal packet passes a communication line and router to reach the network node unit 1006 (Step R5). In the network node unit 1006, a communication record 1020 and filter control record 1024 are used to restore an external packet. The restored external packet passes a communication line to reach the terminal unit 1003 (Step R6).

When the internal packet is formed, the communication record 1018 within the source-sided network node unit 1005 has, in the control item CTL, a protocol filter 1 (bit position "01") of "1". Accordingly, inspection is made whether the protocol item value "6" in a header 1032-1 of the external packet 1032 is included in a protocol control record 1022-1 (FIG. 226) or not. In the present case, because "6" is included in the protocol control record 1022-1, the protocol filter 1 examination (transmission permission) is passed. Because the bit position "05" (port filter 1) in the control item CTL of the communication record 1018 is "1", inspection is made whether the source port number "5000" in a payload 1032-2 of the external packet 1032 is included in a port control record 1022-3 (FIG. 226) or not. In the present case, because the port number "5000" is included, the port filter 1 examination (source port number at transmission) is passed.

When an external packet is restored, the communication record 1020 in the destination-sided network node unit 1006 has, in the control item CTL, a protocol filter 2 (bit position "02") of "1". Consequently, inspection is made whether the protocol item value "6" in a header 1032-1 of an external packet to be restored is included in a protocol control record 1024-2 (FIG. 225) or not. In the present case, because "6" is included in the protocol control record 1024-2, the protocol filter 2 examination (transmission permission) is passed. Next, the communication record 1020 has, in the control item CTL, a bit position "06" (port filter 2) of "1". Consequently, inspection is made whether the source port number "5000" in a payload 1032-2 of an external packet 1032 to be restored is included within a port control record 1024-3 or not. In the present case, because the port number "5000" is included, the port filter 2 examination (source port number at arrival) is passed.

<<Communication between Terminal Unit 1003 and ASP Site 1001 of Another Program>>

By the client-server communication technique explained in the above, the program 1012 within the terminal unit 1003 is allowed for communication by using, as a server, a WWW program 1010 having a port number "80" in the ASP site 1001. Namely, an external packet 1033 is sent from the program 1012 to the WWW program 1010. An external packet 1034 is sent from the WWW program 1010 to the program 1012. At this time, the protocol control record uses 1024-1, 1024-2, 1022-1 and 1022-2 while the port control record uses 1024-3 and 1022-3.

<<Communication between Terminal Unit 1004 and ASP Site 1001>>

By the technique similar to the client-server communication between the user program 1011 and the ASP server 1008 explained in the foregoing, the program 1013 within the terminal unit 1004 is allowed, as a client, for communication with the ASP server 1008 by way of the network node unit 1007, interior of IP network 900 inside and network node unit 1005. The protocol control record 1023-1 within the network node unit 1005 uses 1023-1 and 1023-2. The port control record uses 1023-3 and 1025-1.

Incidentally, in the foregoing embodiment, the filter control record 1025 within the network node unit 1007 is in a case not including a protocol control record. In a process using the port control records 1025-1 to 1025-3, when detecting an external or internal packet having a protocol not including a port number, the external or internal packet is discarded. The program 1014 within the terminal unit 1004 is allowed, as a client, for communication with the program 1009 in the ASP site 1001 as a server by way of the network node unit 1007, IP network 900 and network node unit 1005, on the principle similar to the foregoing. Furthermore, communication is possible in a reverse relationship of the client and the server, i.e. the program 1014 is as a server having a port number "25" while the program 1009 is as a client, via the IP network on the principle similar to the foregoing. The program 1009 sends an IP packet 1035 (in FIG. 229) having a destination port number "25" toward the program 1014 while the program 1014 sends an IP packet 1036 (in FIG. 229) having a source port number "25" back toward the program 1009.

<<Method of Communication with ASP Site, with Utilizer's Terminal-Unit Program as Server>>

In FIG. 230, numeral 1040 is an IP network, numeral 1045 is an ASP site, numerals 1046 to 1048 are terminal units having an IP-packet transmission/reception function. The ASP site 1045 includes an ASP site program 1054. The terminal units 1046 to 1048 respectively include terminal-unit programs 1055 to 1057. The network node units 1041 to 1044 include respective communication records for management of encapsulation and decapsulation and filter control records 1041-1 to 1044-1 for determining a way of packet selection. Filter control record 1041-1 includes multiple filter control records for each terminal 1046 to 1048. In the present case, a packet to be sent by the terminal programs 1055 to 1057 has a source port number "5000". The respective terminal-unit programs are configured to operate as servers in a client-server model. The ASP site program 1054 is configured to operate as a client in the client-server model.

Numeral 1040-1 (in FIG. 232) shows a range of communication procedure of within the IP network 1040. An IP packet 1050 (FIG. 231) forwarded from the ASP site program 1054 includes a TCP packet, having a source port number "7100" and destination port number "5000", to reach the network node unit 1041 (Step T1 in FIG. 232). Then, a filter control record 1041-1 is used to examine the IP packet 1050. When the destination port number "5000" is passed, an internal packet is formed and transferred within the IP network to reach the network node unit 1042 (Step T2) where a filter control record 1042-1 is used to examine the internal packet. In case the destination port number "5000" is passed, an external packet is restored from the internal packet. The restored external packet 1050 passes over a communication line to reach the terminal-unit program 1055 (Step T3). When an IP packet is sent from the terminal-unit program 1055 (Step T4), a filter control record 1042-1 is used in the network node unit 1042 to turn an IP packet selected as a source port number "5000" into an internal packet. The internal packet is transferred within the IP network (Step T5). In the network node unit 1041, a filter control record 1041-1 is used to restore an external IP packet from an internal packet selected as a source port number "5000". The restored external IP packet reaches the ASP site program 1054 (Step T6).

Furthermore, the IP packet 1051 forwarded from the ASP site program 1054 (Step T11) contains a TCP packet, having a source port number "8100" and destination port number "5000". The IP packet 1051 is examined by the use of a filter control record 1041-1 similarly to the foregoing. The internal packet is transferred within the IP network (Step T12). In the network node unit 1043, a filter control record 1043-1 is used to examine the internal packet. A restored external packet 1051 reaches the terminal-unit program 1056 via a communication line (Step T13). When an IP packet is sent from the terminal-unit program 1056, in the network node unit 1043 a filter control record 1043-1 is used to form an internal packet to be transferred. In the network node unit 1041, a filter control record 1041-1 is used and a restored external IP packet reaches the ASP site program 1054 (Steps T14 to T16). Furthermore, an IP packet 1052 forwarded from the ASP site program 1054 (Step T21) contains a TCP packet, having a source port number "9100" and destination port number "5000". Similarly to the foregoing, a filter control record 1041-1 is used to examine the IP packet 1052, thereby forming and transferring an internal packet (Step T22). In the network node unit 1044, a filter control record 1044-1 is used to examine the internal packet. A restored external packet 1052 passes over a communication line to reach the terminal-unit program 1057 (Step T23). When an IP packet is sent from the terminal-unit program 1057, a filter control record 1044-1 and filter control record 1041-1 is used on the principle similar to the foregoing. A restored external IP packet reaches the ASP site program 1054 (Steps T24 to T26).

<<LAN Lease Service>>

In FIG. 233, numeral 1060 is an IP network, numerals 1061 to 1063 are LANs on lease, numeral 1064 is a range to cover the LANs on lease 1061 to 1063 by a LAN leaser, numeral 1065 is an ASP site, numerals 1066 to 1070 are terminal units, numerals 1071 to 1076 are network node units, numerals 1085 to 1089 are LANs, numerals 1080 to 1084 are a gathering of communication records as main tables of unit control tables and various control records as sub-tables, e.g. form of 742-1 to 742-6 shown in FIG. 67. In this embodiment, explanation from now on is made, merely as a communication record, a pair of communication records as main tables and various control records as sub-tables.

The LANs 1085 and LANs 1087 are Company A's LANs, including terminal units 1066 and 1068 therein. The Company-A has a LAN 1061 leased from a LAN leaser. The LAN 1061 includes various resources for use by the Company A (servers, database, application programs, domain name servers, data storages, and so on). The terminal unit 1066 is allowed to use the various resources of within the LAN 1061 by way of communication lines (Step 1091 in FIG. 234). Similarly, the terminal unit 1068 is allowed to use various resources of within the LAN 1061 by way of communication lines (Step 1092). For a communication between the terminal unit 1066 and the resources of within the LAN 1061 (Step 1091), used is a communication record 1080 and 1081 in the unit control table. Also, for a communication between the terminal unit 1068 and the resources of within the LAN 1061 (Step 1092), used is a communication record 1082 and 1083 in the unit control table. Because there are no other communication records for communication with the resources of within the LAN 1061 in the network node unit 1074 and other network node units, the Company-A is allowed to exclusively use the LAN 1061. It is satisfactory for the Company-A to possess a terminal units 1066 and 1068 for access to the LAN 1061. Thus, there is a merit of unnecessity of expertise technicians who maintain and manage the servers of the LAN 1061 and of rooms for accommodating the resources of the LAN 1061.

<<Joint Utilization of ASP Site>>.

The ASP site 1065 can afford to include therein various application servers, WEB servers, database and data storages. 1086 is a Company-X's LAN, including a terminal unit 1067. Numeral 1088 is a Company-Y's LAN, including a terminal unit 1069. Numeral 1089 is a Company-Z's LAN, including a terminal unit 1070.

Company X can send and receive an IP packet to and from the ASP site 1065, to use the internal resources of the ASP site 1065 (Step 1093 in FIG. 234). Company Y can send and receive an IP packet to and from the ASP site 1065 and IP packet, to use the internal resources of the ASP site 1065 (Step 1094). Company Z can send and receive an IP packet to and from the ASP site 1065, to use the internal resources of the ASP site 1065 (Step 1095). Namely, Company X to Company Z can jointly use the ASP site 1065. Because there are no other communication records for communication with the ASP site 1065 in the other network node units, the three of Company X to Company Z can use the ASP site for their own purposes. In the case that Company X to Company Z are banks, such application programs as commonly used by the banks can be set up in the ASP site and utilized in a joint fashion. Where Company X to Company Z are insurers, such application programs as commonly used by the insurers can be installed in the ASP site 1065 and utilized. By consideration replacing Company X to Company Z with business circles, it is possible to limitlessly list up, e.g. automobile industry, architecture industry and travel industry.

<<ASP Provision of LAN Under Lease>>

Company A leases a LAN 1061 so that the third party can utilize, as servers, the various resources of the LAN 1061 from the Company-A's terminal units 1066 to 1068. Next, in order for the respective terminal units 1067, 1069, 1070 of Company X to Company Z to utilize as servers the resources of within the LAN 1061, the common carrier operating the IP network 1060 is asked to set up communication records in the related network node units. Thereupon, the company A can provide ASP services to Company X to Company Z by leasing the LAN 1061, i.e. without possessing the LAN of the ASP service.

<<Summary>>

The IP network includes two or more network node units. The programs in the ASP site send an external packet to the terminals of one or more utilizers. The external packet is inputted at a logic terminal to a source-sided network node unit. From a selected external packet, an internal packet is formed so that the internal packet is transferred within the communication network. Concerning the internal packet, in a destination-sided network node unit, an external packet is restored from a selected internal packet and forwarded onto an external communication line 2 in the IP network. In at least one of upon forming an internal packet and upon restoring an external IP packet, at least one of a protocol and a port number of the external packet is to be used. Thus, an IP packet can be send from the utilizer's terminal unit back to the program in the ASP site. The programs in the ASP site operate as clients of a client-server model. The program on the utilizer's terminal unit is operated as a server of the client-server model, and that enhances communication security between the ASP site and terminals.

By operating a selected packet as an external IP packet, further the programs in the ASP site as a client of the client-server model and the program on the utilizer's terminal unit as a server of the client-server model, security can improved for the server or program of within the ASP site. For the network node unit within the IP network, there are a case to use its encapsulation function and a case to use an address inspection function using the registration information of within the network node unit. Both are possible to carry out.

Furthermore, in case Company A leases a LAN in a manner passing through the IP network, an IP packet can be communicated between the Company A's terminal unit and the resources within the leased LAN. Accordingly, in order to setup a communication record in a unit control table of within the network node unit of the IP network and disable IP-packet communication between the terminal unit other than the Company-A's terminal and the resources within the leased LAN, a LAN leaser can lease a LAN by not setting a communication record in a unit control table of every network node unit in the IP network. Meanwhile, Company X to Company Z set up a communication record to the unit control table of a network node unit within the IP network in order to communicate IP packets with the ASP site. The other than the Company X to Company Z are not set up, in every network node unit, with a communication record of enabling communication of IP packets with the ASP site. Thus, two or more companies can jointly utilize the ASP site. Meanwhile, the ASP can offer ASP services using the LAN under lease.

<<Encapsulation and Address-Inspection Functions>>

The network node units within the IP network are used in their encapsulation functions, to turn an external IP packet into an internal packet so that the packet is transferred within the communication network and decapsulated, in a destination-sided network node unit, to restore an external IP packet. The network node units carry out one or more of packet priority control, multicast control and signature function, thereby making possible to further improve the information security on the communication network of IP network. The enables secure implementation of the LAN lease service and the joint utilization of ASP site. Meanwhile, the network node units within the IP network do not use an encapsulation function. A packet, selected by an address inspection using an in-network-node-unit registration information explained in Embodiment 7(see FIG. 222), is transferred within the communication network. At this time, the network node unit conducts an address inspection and one or more of packet priority control, multicast control and signature function, thereby making possible to further improve the information security on the communication network. That enables secure implementation of the LAN lease service and the joint utilization of ASP site.

10. Embodiment 10 for Transmitting Multicast Data to Mobile Terminal Unit

Figure 37:
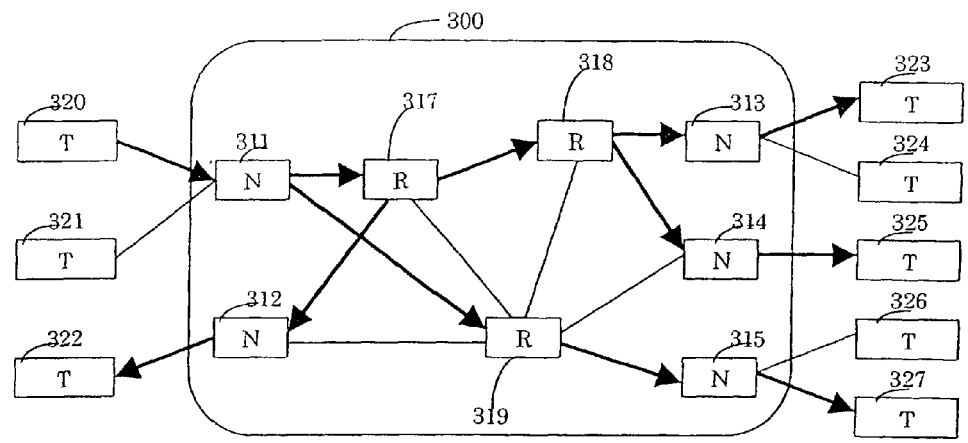
FIG. 37 is a figure explaining the multicast technique, in the third embodiment of the present invention.

FIG. 235 shows an IP network 300-1 for distributing multicast data, which is a figure changing a part of FIG. 37 (Embodiment 3) explaining multicast data distribution. In preparation for explaining FIG. 235, summarization is made to the multicast data distribution of FIG. 37.

FIG. 37 shows a flow of multicast data. When an IP packet is sent from the terminal unit 320, the IP packet reaches the network node unit 311 and turned into an internal packet, thus being transferred to the routers 317 and 319. The internal packet transferred to the router 317 is transferred to the network node unit 312 and router 318. The internal packet transferred to the network node unit 312 is restored to an external IP packet and transferred to the terminal unit 322. The internal packet reaching the router 318 is transferred to the network node units 313 and 314. The internal packet reaching the network node unit 313 is restored to an external IP packet to reach the terminal unit 323. The internal packet reaching the network node unit 314 is restored to an external IP packet to reach the terminal unit 325. On the other hand, the internal packet, forwarded from the network node unit 311 to reach the router 319, is transferred to reach the network node unit 315 where it is restored into an external IP packet and reaches the terminal unit 327. In encapsulation of from an external IP packet into an internal packet and decapsulation of from an internal packet into an external IP packet, used is an address management table in the network node unit. The terminal units 320 to 327, having one destination-sided network node unit, are referred to as fixed terminals. These when used as telephone sets are referred to as fixed telephone sets. Incidentally, the terminal unit used in mobile communication referred later or the like is referred also as a mobile terminal unit. This when used as a telephone set is referred also to as a mobile phone. The mobile phone has a telephone number capable of identifying the mobile terminal.

Next, explanation is made on a flow of multicast data by the IP network 300-1 (FIG. 235). In the IP network 300-1, there are network node units 311 to 315. The terminal units 320 to 327 are connected to the network node units via communication lines and multicast data is transmitted from the terminal unit 320, which is similar to FIG. 37. The difference from FIG. 37 lies in that the terminal units 321, 324, 326 are to receive multicast data. In the IP network 300-1, the address management tables of the network node units 311 to 315 respectively include records 331-1 to 335-1 (FIG. 236) defining multicast delivery routes. The router 317 includes a multicast table 337-1 (in FIG. 237) as a route table element defining internal-IP-packet delivery destinations. The router 318 includes a multicast table 338-1 as a route table element, while the router 319 includes a multicast table 339-1 as a route table element.

In order to add receiving terminal units 321, 324 and 326, there are modifications in the records of address management tables of within the network node units and the records in route tables in the routers. The multicast record (first line) of the address management table 331 (in FIG. 40) within the network node unit 311 is added by a logic output interface "G00" to the terminal unit 321 and changed into a record "I01, E01, M1, IM1, (G02, G03, G00), 0" and further into a record "IM1, M1, E01, I01, G00, F02" as shown in 331-1 (in FIG. 236). "G00" shows an internal logic output interface of the network node unit 311, which is a folded line in the meaning that the output of the network node unit 311 is returned to an input.

The multicast record (first line) of the address management table 332 (in FIG. 40) in the network node unit 312 is similar to the record 332-1. The multicast record (second line) of the address management table 333 (in FIG. 42) in the network node unit 313 is added by a logic output interface "F11" to the terminal unit 324 and changed into a record "IM1, M1, E01, I01, G31, (F10, F11)". The multicast record (first line) of the address management table 334 (in FIG. 42) in the network node unit 314 is similar to the record 334-1. The multicast record (second line) of the address management table 335 (in FIG. 42) in the network node unit 315 is added by a logic output interface "F17" to the terminal unit 326 and changed into a record 335-1 "IM1, M1, E01, I01, G31, (F17, F18)".

The address management tables described in Embodiment 3 are included in the function of the unit management tables disclosed in Embodiment 7, which will be explained with reference to FIG. 238. In 332-1x (FIG. 238), on the first line (the upper) is shown a communication record 738 (in FIG. 62) while on the second line (the lower) is shown a in-address-management-table record 332-1 (in FIG. 236) changed in item order, wherein correspondence can be given between "ISA" and "IMI", "IRA" and "I01", "NSA" and "M1", "NDA" and "E01", "MSA" and "one", "MDA" and "one", "IFI" and "G04", and "IFE" and "F04". Namely, these are items used for the same purpose. Herein, "one" refers to 255.255.255.255 (when in IPv4).

FIG. 239 shows a form that media routers 320M to 327M are arranged between the network node units of within the IP network 300-1 and the terminal units at the outside of the IP network 300-1. The media router accommodates a plurality of terminal units having an IP-packet transmitting/receiving function to have a function of connection to a network node unit. This, in the invention, is carried out as 903-1 (FIG. 108), for example. Explaining it with reference to FIG. 239, an IP packet containing multicast data is sent from the terminal unit 320 to reach the network unit 311 via the media router 320M. In the network node unit 311, an internal packet is formed by the use of a first-lined record 331-1 "I01, E01, M1, IM1, (G02, G03, G00), 0" of the address management table. The internal packet is transferred to the router 317 connected to a communication line designated by the record item "G02", to the router 319 connected to a communication line designated by the record item "G03", and to the network node unit 311 connected to a communication line designated by the item "G00" (folded back).

The internal packet transferred to the router 317 is used by an item "G11" and item "G12" of in the route table 337-1 and transferred to the router 318 connected to a communication line designated by "G12" and to the network node unit 312 connected to a communication line designated by "G11". The internal packet transferred to the router 318 is used by an item "G27" and item "G28" of in the route table 338-1 and transferred to the network node unit 313 connected to a communication line designated by "G27" and to the network node unit 314 connected to a communication line designated by "G28". On the other hand, the internal packet transferred to the router 319 is used by an item "G22" of in the route table 339-1 and transferred to the network node unit 315 connected to a communication line designated by "G22".

The internal packet reaching the network node unit 311 is used by a record 331-1 "IM1, M1, E01, I01, G00, F02" on a second line of the address management table to restore an external packet. The restored external packet is transferred to the media router 321M connected to a communication line designated by the record item "F02". The subsequent is similarly done. The internal packet reaching the network node unit 312 to 315 is used by a record "IM1, M1, E01, I01, . . . , . . . " as the address management table record 332-1 to 335-1 to restore an external packet. The restored external packet is transferred to the media router 322M to 327M connected to a communication line designated by the record item "F04", "F10", "F11", . . . "F18".

An IP network 300-2 (FIG. 240) is set up with address management table records for multicast distribution in the network node units 311 to 315 and route tables for multicast branching in the routers 317 to 318, similarly to the IP network 300-1 (FIG. 239). Furthermore, the media router 321M (FIG. 239) is replaced with a radio base point 321B. Furthermore, the media routers 323M to 327M (FIG. 239) are respectively replaced with radio base points 323B to 327B (FIG. 240). The radio base point 321B and the radio base points 323B to 327B are installed within the IP network 300-2. The arrow on a communication line shows a multicast distribution route. The radio point has a function to accommodate a plurality of mobile terminal units, for connection to a network node unit, which in the invention is embodied, e.g. as 902-3 (FIG. 108). The multicast distribution route set up within the IP network 300-2 is the same as the multicast distribution route set up within the IP network 300-1. Accordingly, a multicast IP packet forwarded from the terminal unit 320 passes the media router 320M to be inputted to the IP network 300-2 to reach a fixed terminal unit 322 AND mobile terminal units 321B, 323B to 327B by way of multicast distribution routes by way of multicast distribution routes of within the IP network 300-2.

An IP network 1100 (FIG. 241) is an IP network formed by adding servers and routers to the IP network 300-2. The IP network 1100 and the network 300-2 have internal resources in correspondence, as follows. Network node units 1101 to 1105 (FIG. 241) respectively correspond to the network node units 311 to 315 (FIG. 240). Routers 1107, 1108, 1109 (FIG. 241) respectively correspond to the routers 317, 318, 319 (FIG. 240). The connection relationship of communication lines between the network node units and the routers also has a one-to-one correspondence. Fixed terminal units 1120 and 1122 (FIG. 241) respectively correspond to the fixed terminal units 320 and 322 (FIG. 240). Mobile terminal units 1121, 1123 to 1127 respectively correspond to the mobile terminal units 321B, 323B to 327B.

The arrow on a communication line within the IP network 1100 shows a multicast distribution route. The multicast distribution route within the IP network 1100 is set up the same as the multicast distribution route of within the IP network 300-2. Accordingly, a multicast IP packet forwarded from the terminal unit 1120 passes the media router 110 to be inputted to the IP network 1100, reaching a fixed terminal unit 1122 or mobile terminal units 1121, 1123 to 1127 by way of multicast distribution routes within the IP network 1100.

In FIG. 241, the network node units 1101 to 1105 are respectively connected with terminal-unit control sections 1131 to 1135. Meanwhile, the terminal-unit control section 1131 to 1135 is set up, therein, with a telephone number server 1131-5 to 1135-5, a telephone management server 1131-4 to 1135-4, and a table management server 1131-3 to 1135-3. Numeral 1106 is a router, 1136 is a superior telephone number server, numeral 1137 is a user service server, and numerals 1138 and 1139 are multicast authentication servers for confirming the correctness of the multicast receiving terminals of the mobile terminal units (M authentication servers). The terminal-unit control section 1131, telephone management server 1131-4, telephone number server 1131-5 and superior telephone number server 1136 shoulder the same function as the terminal-unit control section 914-1, telephone management server 906-4, telephone number server 906-5 and superior telephone number server 995 shown in FIG. 108. The function of the M authentication server 1138, 1139 is explained in this embodiment. The terminal-unit control sections 1131 to 1135 are connected via communication lines. The communication lines allow to transfer an internal packet or the like containing a line-connection control message for call control.

It is possible to provide a correspondence between the communication elements described in FIG. 108 and the communication elements described in FIG. 241, for example, as in the following. The telephone set 905-1 (in FIG. 108) can be made corresponding to a fixed telephone set 1120 (in FIG. 241), the media router 903-1 is to a media router 1110, the network node unit 906-1 is to a network node unit 1101, the terminal-unit control section 914-1 is to a terminal-unit control section 1131, the communication line 912-1 to a communication line 1144, the connection control section 914-4 to a terminal-unit control section 1134, the network node unit 909-1 is to a network node unit 1104, the radio base point 902-4 is to a radio base point 1115, and the mobile phone 905-8 is to a mobile phone 1125.

Furthermore, a control communication line connecting from a terminal-unit control section 1131 (FIG. 241) to a communication line 1144, router 1141 and terminal-unit control section 1134 can be made corresponding to the control communication line connecting from the terminal-unit control section 914-1 (FIG. 108) to the communication line 912-1, router 911-1, router 911-2, router 911-3 and terminal-unit control section 914-4. To the control communication line is to be transferred a packet or the like storing a line-connection control message based on a common channel signaling system. Furthermore, a media communication line connecting a network node unit 1101 (FIG. 241), communication line 1145, router 1107, router 1108 and network node unit 1104 can be made corresponding to the media communication line connecting the network node unit 906-1 (FIG. 108), communication line 913-1, router 911-4, router 911-5, router 911-6 and network node unit 909-1. To the media communication line is to be transferred telephone voice and image data or multicast data including voice and image data, besides text data.

From the fact that telephone communication can be made between the fixed telephone set 905-1 and the mobile phone 905-8 by the line-connection control applying a common channel signaling system to the IP network as explained in FIG. 183, by the correspondence between the communication elements described in FIG. 108 and the communication elements described in FIG. 241, telephone communication can be made between the fixed telephone set 1120 and the mobile phone 1125 according to a line-connection control applying a common channel signaling system to the IP network. By a method similar to the above, telephone communication can be made, for example, between the mobile phone 1121 and the mobile phone 1124. Furthermore, telephone communication is possible between the fixed telephone set 1122 and the fixed telephone set 1120.

<<Multicast Receive Request and Reception End>>

Explanation is made on a case that the mobile terminal unit 1121 transmits radio wave information including a multicast receive request that is unexpectedly connected to a radio base point 1111 via a radio communication line 111-1 (FIG. 241). The radio base point 1111 first exchanges information with the mobile terminal unit 1121 to confirm a communicatability through a radio communication path (Step V1 in FIG. 242). The confirmation procedure is made in the communication level 1 or 2. When a communicatability is confirmed, the mobile terminal unit 1121 transmits a multicast receive request (Step V2). The multicast receive request information includes a telephone number "TN3" to be used by the mobile terminal unit 1121, terminal unit authentication information "PID3" and multicast reception-terminal-unit authentication information "PID-M" (password or the like). Incidentally, the multicast reception-terminal-unit authentication information can use the terminal authentication information "PID3" set in the telephone number registration of a mobile phone in Communication Case 2 in Embodiment 8 and terminal authentication information "PID-M".

The radio base point 1111 forms an external packet 1160 (FIG. 243) containing a telephone number. "TN3" included in terminal authentication information "PID3", external IP address "EB1" of the mobile terminal unit 1121 and second terminal-unit authentication information "PID-M", and sends it toward a multicast authentication server 1138 (external IP address "WA9"). Herein, the external packet 1160 has a source external IP address "EB1" and a destination external IP address "WA9". The external packet 1160 reaches the network node unit 1101 (Step V3), where a third-lined record "IB1, EB1, WA9, IWA9, . . . " of an address management table 1101-1 in a network node unit 1101 (FIG. 245) is used to form an internal packet 1161 (FIG. 244). The internal packet 1161 is sent to the multicast authentication server 1138 (Step V4). The multicast authentication server 1138 receives the internal packet 1161 and acquires, from the received internal packet, a telephone number "TN3", external IP address "EB1", internal IP address "IB1" and multicast authentication terminal-unit authentication information "PID-M" and holds them therein (Step V5). An internal packet containing a telephone number "TN3" is formed and sent to the telephone number server 1131-5 (Step V6). The telephone number server 1131-5 notifies the acquired telephone number "TN3", together with an identification symbol of telephone number server 1131-5, to a superior telephone number server 1136 (Step V7). The superior telephone number server 1136 extracts multicast authentication terminal-unit authentication information "PID-M" from the telephone number "TN3" held therein, and notifies it to the authentication server 1138 (Step V9) via the telephone number server 1131-5 (Step V8). The authentication server 1138 confirms whether the received information agrees with the telephone number "TN3" received in the step V4 and multicast authentication terminal-unit authentication information "PID-M". In the case of agreement (pass), the process proceeds to the following. Where in disagreement, the subsequent procedure is suspended.

The multicast authentication server 1138 notifies a result of authentication (pass, failure) to the mobile terminal unit 1121 via the network node unit 1101 and radio base point 1111 (Steps V11 to V13). The mobile terminal unit 1121 can reply to the authentication result notification (Step V13x, option). Furthermore, in an acceptance case, the authentication server 1138 asks the table management server 1131-3 (Step V15) to rewrite the second-lined record "IM1, M1, E01, 101, G00, 0" of a address management table record 1101-1 (FIG. 245) of in the network node unit 1101 into a record "IM1, M1, E01, I01, G00, F02" shown in 1101-2 (Step V16). Namely, the sixth item "0" is rewritten to "F02". Thereupon, an external IP packet storing multicast data forwarded from the fixed terminal unit 1120 passes the media router 1110 (Step V21) to reach the network node unit 1101 (Step V22), where a first-lined record "I01, E01, M1, IM1, (G02, G03, G00), 0" of the address management table 1101-1 is used. The internal packet moved back by an item "G00" returns to the network node unit 1101 (Step V23). Applied by a record 1101 "IM1, M1, E01, 101, G00, F02" of the network node unit 1101-2, an IP packet storing multicast data to be forwarded at the item "F02" is forwarded onto a communication line 1111-2 (FIG. 241) designated by "F02" (Step V24). Next, it passes the radio base point 111 to reach the mobile terminal unit 1121 (Step V25). Meanwhile, the multicast authentication server 1138 notifies a multicast data transmission start to the user service server 1137 (Step V17). The user service server 1137 can use a report of multicast data reception as fee-charge information to the terminal unit 1121 (Step V18, option).

Multicast data reception end procedure is made as in the following order. A multicast data reception end request is forwarded from the mobile terminal unit 1121 to the radio base point 1111(Step V30). When the radio base point 1111 forwards an external IP packet containing a multicast data reception end request, the external IP packet reaches the network node unit 1101 (Step V31) and encapsulated into a multicast data reception end request internal packet. The multicast data reception end request internal packet is delivered to the multicast authentication server 1138 (Step V32). The external IP packet containing a multicast data reception end request contains the similar content to the external IP packet 1160 (FIG. 243), i.e. a telephone number "TN3", external address "EB1", terminal-unit authentication information and so on. The internal IP packet containing a multicast data reception end request is similar to the internal IP packet 1161. The multicast authentication server 1138, receiving the internal IP packet containing a multicast data reception end request, asks the table management server 1131-3 (Step V33) to rewrite the content shown in the record 1101-2 of the address management table in the network node unit 1101 to the content shown in 1101-3 (Step V34) to prevent the IP packer containing multicast data from being transmitted to the radio base point 1111 and report the user service server 1137 of stopping multicast data distribution (Step V35). The user service server 1137 can use a multicast data service reception report as a fee-charge information onto the terminal unit 1121 (Step V36, option). Meanwhile, the authentication server 1138 can report a result of multicast data distribution stop to the radio base point 111 (Steps V37x, V38x, option).

<<Multicast Data Transmission from Mobile Terminal Unit>>

In place of transmitting an external packet containing multicast data from the fixed terminal unit 1120, multicast data can be transmitted from the mobile terminal unit 1121 to the radio base point 1111 via a radio communication path 1111-1 so that an external packet containing the received multicast data is formed and transmitted from the radio base point 1111 via a communication path 1111-2 to the network node unit 1101, being transferred in the IP network 1100 and distributed to the fixed terminal unit 1122 and mobile terminal units 1123 to 1127. Namely, it is possible to distribute the multicast data having an origin of the mobile terminal unit 1121. At this time, the records, in the network node unit and routers, defining a multicast distribution destination are set and used based on the principle explained using FIGS. 235 and 236.

<<Free-of-Charge Multicast Service>>

In the implementation of multicast service, free-of-charge multicast service can be realized by omitting the authentication procedure on a multicast data receiving terminal and the procedure concerning fee charge on a user service server. Namely, the Steps V17, V18, V35 and V36 are not executed in FIG. 242.

<<Summary>>

The IP network previously sets up a record for multicast data distribution in address management tables in the network node units and a record defining a multicast distribution destination in route tables of within the routers, to transmit an external packet containing multicast data from a fixed terminal unit. The external packet reaches a source-sided network node unit, and turns into an internal packet according to the designation of a record of the address management table, being transferred onto one or more internal communication lines. The transferred internal packet, when passing a router, follows an in-router multicast record. The internal packet arrives one or more reception-sided network node units on a side close to a reception terminal. In the reception-sided network node unit, an external packet is restored from the internal packet. The restored external packet containing multicast data, as a first case, can be transferred from the reception-sided network node unit to a fixed terminal unit via an external communication line and media router. As a second case, it can be transferred from the reception-sided network node unit to the radio base point via an external communication line, and, in the radio base point, delivered to a mobile terminal unit via a radio communication line. In place of transmitting multicast data from a fixed terminal unit, multicast data can be transmitted from a mobile terminal unit to a radio base point via a radio communication line so that an external packet containing the received multicast data is formed and transmitted from the radio base point to a network node unit via a communication path to be transferred within the IP network 1100, thereby distributing multicast data.

In the case that the mobile terminal unit issues a multicast receive request containing at least multicast receiving terminal-unit authentication information, the receive request makes a request to a multicast authentication server. When the multicast authentication server, when the mobile terminal unit is allowed for multicast reception, asks the table management server to rewrite a multicast distribution record of the address management table in a network node unit the mobile terminal is to connect, thereby making the mobile terminal unit receivable. Namely, the multicast data is rewritten and the multicast data is transferred to a reception-requesting mobile terminal unit according to record designation. The multicast authentication server notifies the user service server of multicast data delivery being possible, thus making it possible to use it as fee-charge information. When a multicast data reception end request is issued from the mobile terminal unit, the multicast authentication server knows the end request. The multicast authentication server asks the table management server to rewrite an address management table record in the network node unit, to stop multicast data transfer and report the stop of distributing user service server, multicast data. Free multicast services can be implemented.

According to the present invention, because communication is made with another telephone set or voice image unit by way of an IP network and mobile communication network, realized is a terminal-to-terminal communication connection control method for telephone communication or voice image communication; realized is a terminal-to-terminal communication connection control method by establishing a TCP communication path between a source-sided telephone management server and a destination-sided telephone management server and then establishing a communication path for terminal-to-terminal communication, and thereafter carrying out a voice image communication between the two voice image units via the IP network; realized is resolving the method for TV conference with IP multicast by setting a communication record for multicast to an address management table in a network node unit and setting a route table for multicast to transmit a voice moving image by the use of a multicast address; realized is resolving the method for configuring a gateway for connection between an IP network based on the common channel signaling system and a PSTN through installing a relay gateway within an IP network in order for telephone communication of telephone set—IP network—PSTN—telephone set; realized is resolving the method for structuring an IP network by setting an entire or part of an external address in an address area of an internal packet due to a method of setting to an inside of an external IP packet upon IP packet encapsulation; realized is resolving the method for structuring an IP network by a method of setting an entire or part of an external address in an address area of an internal frame; realized is resolving the method for structuring an security IP network by carrying out a method to separate an IP network into a plurality of internal IP networks by the use of a packet filter, a priority control function, a multicast recipient address conversion function or a port number; realized is a method for carrying out fixed telephone communication and mobile telephone communication on the same IP network based on the common channel signaling system by the use of a CIC management table including a management function of a UNI on the terminal unit side; realized is an IP network capable of carrying out security ASP by selecting an IP address, port number or protocol kind of an IP packet communicated between an ASP server and a user program by a network node unit; provided is IP packet exchange service (Intranet, Extranet) and fixed telephone service and mobile phone service, without distinction, by IP networks based on the same principle and realized is a multicast data method without distinction between the mobile terminal unit and the fixed terminal unit; and realized is resolving the method for registering and changing a whereabouts position of a telephone set by registering a mobile phone in a mobile communication network comprising an IP network in order to carry out mobile phone communication.

of the eighth embodiment of the invention.

What is claimed is:

1. A communication system, wherein:
a wireless base station B1 is connected to a network node unit N1 by a logical terminal LP1 via a communication line L1, and a wireless base station B2 is connected to a network node unit N2 by a logical terminal LP2 via a communication line L2,
a server S1 receives a telephone number or a host name of a terminal M2 and a connection request from a terminal M1 via said wireless base station B1, and
based on said telephone number or said host name of said terminal M2 and said connection request,
said network node unit N1 sets a communication record R1, said network node unit N2 sets a communication record R2 and then a communication path P12 in which an internal packet is transferred, is set between said logical terminals LP1 and LP2,
voice or data is sent to said wireless base station B1 from said terminal M1, and an external IP packet including said voice or data is sent from said wireless base station B1,
said external IP packet is inputted to said network node unit N1 from said logical terminal LP1,
said network node unit N1 converts, based on said communication record R1, said external IP packet into said internal packet,
said internal packet is transferred in said communication path P12, said external IP packet is restored from said internal packet at said network node unit N2 and is sent to said wireless base station B2 from said logical terminal LP2, and said voice or data is sent to said terminal M2 from said wireless base station B2, and
based on a communication release request which is sent from said terminal M1 or M2, said network node units N1 and N2 reset said communication records R1 and R2 and then said communication path P12 is reset.

2. A communication system according to claim 1, wherein: a terminal T2 substituted for said wireless base station B2 is connected to said communication line L2, and said terminal M1 communicates with said terminal T2 via said communication path P12.

3. A communication system according to claim 1, wherein: a terminal T1 substituted for said wireless base station B1 is connected to said communication line L1, a terminal T2 substituted for said wireless base station B2 is connected to said communication line L2, and said terminal T1 communicates with said terminal T2 via said communication path P12.

4. A communication system according to claim 1, wherein: said communication system is connected to a public switched telephone network and said terminal M1 communicates with a telephone machine connected to said public switched telephone network.

5. A communication system according to claim 4, wherein: a terminal T1 substituted for said wireless base station B1 is connected to said communication line L1, and said terminal T1 communicates with said telephone machine.

6. A communication system according to claim 1, wherein: said server S1 records a communication start time and a communication end time.

7. A communication system, wherein:
a wireless base station B1 is connected to a network node unit N1 by a logical terminal LP1 via a communication line L1, and a wireless base station B2 is connected to a network node unit N2 by a logical terminal LP2 via a communication line L2,
a server S1 receives a telephone number or a host name of a terminal M2 and a connection request from a terminal M1 via said wireless base station B1,
said server S1 forms a message and sends said message to a server S2 which is discriminated based on said telephone number or said host terminal M2 and said connection request,
said network node unit N1 sets a communication record R1, said network node unit N2 sets a communication record R2, and then a communication path P12 in which an internal packet is transferred, is set between said logical terminals LP1 and LP2,
voice or data is sent to said wireless base station B1 from said terminal M1, and an external IP packet including said voice or data is sent from said wireless base station B1,
said external IP packet is inputted to said network node unit N1 from said logical terminal LP1, and
said network node unit N1 converts, based on said communication record R1, said external IP packet into said internal packet which contains said external IP packet,
said internal packet is transferred in said communication path P12, said external IP packet is restored from said internal packet at said network node unit N2 and is sent to said wireless base station B2 from said logical terminal LP2, and said voice or data is sent to said terminal M2 from said wireless base station B2, and
based on a communication release request which is sent from said terminal M1 or M2, said network node units N1 and N2 reset said communication records R1 and R2, and then said communication path P12 is reset.

8. A communication system according to claim 7, wherein: a terminal T2 substituted for said wireless base station B2 is connected to said communication line L2, and said terminal M1 communicates with said terminal T2 via said communication path P12.

9. A communication system according to claim 7, wherein: a terminal T1 substituted for said wireless base station B1 is connected to said communication line L1, a terminal T2 substituted for said wireless base station B2 is connected to said communication line L2, and said terminal T1 communicates with said terminal T2 via said communication path P12.

10. A communication system according to claim 7, wherein: said communication system is connected to a public switched telephone network and said terminal M1 communicates with a telephone machine connected to said public switched telephone network.

11. A communication system according to claim 10, wherein: a terminal T1 substituted for said wireless base station B1 is connected to said communication line L1, and said terminal T1 communicates with said telephone machine.

12. A communication system according to claim 7, wherein: said server S1 or S2 records a communication start time and a communication end time.

13. A communication system, wherein:
a communication network includes plural network node units, a wireless base station B1 is connected to a network node unit N1 by a logical terminal LP1 via a communication line L1, and a wireless base station B2 is connected to a network node unit N2 by a logical terminal LP2 via a communication line L2,
said communication network receives a telephone number or a host name of a terminal M2 and a connection request from a terminal M1 via said wireless base station B1, and
based on said telephone number or said host name of said terminal M2 and said connection request, said network node unit N1 sets a communication record R1, said network node unit N2 sets a communication record R2, and then a communication path P12 in which an internal packet is transferred, is set between said logical terminals LP1 and LP2, voice or data is sent to said wireless base station B1 from said terminal M1, and an external IP packet including said voice or data is sent from said wireless base station B1, said external IP packet is inputted to said network node unit N1 from said logical terminal LP1, and said network node unit N1 converts, based on said communication record R1, said external IP packet into said internal packet which contains said external IP packet, said internal packet is transferred in said communication path P12, said external IP packet is restored from said internal packet at said network node unit N2 and is sent to said wireless base station B2 from said logical terminal LP2, and said voice or data is sent to said terminal M2 from said wireless base station B2, and based on a communication release request which is sent from said terminal M1 or M2, said network node units N1 and N2 reset said communication records R1 and R2, and then said communication path P12 is reset.

14. A communication system, wherein:

a communication network includes plural network node units, a wireless base station B1 is connected to a network node unit N1 by a logical terminal LP1 via a communication line L1, and a wireless base station B2 is connected to a network node unit N2 by a logical terminal LP2 via a communication line L2, said communication network receives a telephone number or a host name of a terminal M2 and a connection request from a terminal M1 via said wireless base station B1, and based on said telephone number or said host name of said terminal M2 and said connection request, said network node unit N1 sets a communication record R1, said network node unit N2 sets a communication record R2, and then a communication path P12 in which an internal packet is transferred, is set between said logical terminals LP1 and LP2, voice or data is sent to said wireless base station B1 from said terminal M1, and an external IP packet including said voice or data is sent from said wireless base station B1, said external IP packet is inputted to said network node unit N1 from said logical terminal LP1, and said network node unit N1 inspects whether said communication record R1 exists or not, based on an information to discriminate said logical terminal LP1 and a destination IP address of said external IP packet, upon finding said communication record R1, said network node unit N1 converts, based on said communication record R1, said external IP packet into said internal packet which contains said external IP packet, said internal packet is transferred in said communication path P12, said external IP packet is restored from said internal packet at said network node unit N2 and is sent to said wireless base station B2 from said logical terminal LP2, and said voice or data is sent to said terminal M2 from said wireless base station B2, and based on a communication release request which is sent from said terminal M1 or M2, said network node units N1 and N2 reset said communication records R1 and R2, and then said communication path P12 is reset.

15. A communication system according to claim 14, wherein: a terminal T2 substituted for said wireless base station B2 is connected to said communication line L2, and said terminal M1 communicates with said terminal T2 via said communication path P12.

16. A communication system according to claim 14, wherein: a terminal T1 substituted for said wireless base station B1 is connected to said communication line L1, a terminal T2 substituted for said wireless base station B2 is connected to said communication line L2, and said terminal T1 communicates with said terminal T2 via said communication path P12.

17. A communication system according to claim 14, wherein: said communication system is connected to a public switched telephone network and said terminal M1 communicates with a telephone machine connected to said public switched telephone network.

18. A communication system according to claim 17, wherein: a terminal T1 substituted for said wireless base station B1 is connected to said communication line L1, and said terminal T1 communicates with said telephone machine.

19. A communication system according to claims 1, wherein: said communication network record a communication start time and a communication end time.

20. A communication system, wherein:

a wireless base station B1 is connected to a network node unit N1 by a logical terminal LP1 via a communication line L1, a wireless base station B2 is connected to a network node unit N2 by a logical terminal LP2 via a communication line L2, and a wireless base station B3 is connected to a network node unit N3 by a logical terminal LP3 via a communication line L3, a server S1 receives a telephone number or a host name of a terminal M2 and a connection request from a terminal M1 via said wireless base station B1, and based on said telephone number or said host name of said terminal M2 and said connection request, said network node unit N1 sets a communication record R1, said network node unit N2 sets a communication record R2, and then a communication path P12 in which an internal packet P12 is transferred, is set between said logical terminals LP1 and LP2, voice or data is sent to said wireless base station B1 from said terminal M1, and an external IP packet including said voice or data is sent from said wireless base station B1, said external IP packet is inputted to said network node unit N1 from said logical terminal LP1, and said network node unit N1 converts, based on said communication record R1, said external IP packet into said internal packet P12 which contains said external IP packet, said internal packet P12 is transferred in said communication path P12, said external IP packet is restored from said internal packet at said network node unit N2 and is sent to said wireless base station B2 from said logical terminal LP2, and said voice or data is sent to said terminal M2 from said wireless base station B2, and based on a poS1tion change request, said network node unit N3 sets a communication record R3, said network node unit N2 sets a communication record R2X and then a communication path P32 in which an internal packet P32 is transferred, is set between said logical terminals LP3 and LP2, said network node unit N3 receives said voice or data from said terminal M1, via said wireless base station B3, and sends said voice or data to said terminal M2, via said communication path P32, said network node unit N2 and said wireless base station B2, and based on a communication release request which is sent from said terminal M1 or M2, said network node units N3 and N2 reset said communication records R3 and R2X, and then said communication path P32 is reset.

21. A communication system according to claim 20, wherein: a terminal T2 substituted for said wireless base station B2 is connected to said communication line L2, and said terminal M1 communicates with said terminal T2 via said communication path P12 or P32.

22. A communication system according to claim 20, wherein: a terminal T2 substituted for said wireless base station B2 is connected to said communication line L2, said terminal M1 communicates with said terminal T2 via said communication path P12 or P32, and said terminal T2 does not send said caL1-on notification.

23. A communication system, wherein:
a wireless base station B1 is connected to a network node unit N1 by a logical terminal LP1 via a communication line L1, a wireless base station B2 is connected to a network node unit N2 by a logical terminal LP2 via a communication line L2, and a wireless base station B3 is connected to a network node unit N3 by a logical terminal LP3 via a communication line L3,
a server S1 receives a telephone number or a host name of a terminal M2 and a connection request from a terminal M1 via said wireless base station B1,
said server S1 forms a message and sends said message to a server S2 which is discriminated based on said telephone number or said host name of said terminal M2 and said connection request,
said network node unit N1 sets a communication record R1, said network node unit N2 sets a communication record R2, and then a communication path P12 in which an internal packet P12 is transferred, is set between said logical terminals LP1 and LP2,
voice or data is sent to said wireless base station B1 from said terminal M1, and an external IP packet including said voice or data is sent from said wireless base station B1,
said external IP packet is inputted to said network node unit N1 from said logical 1 terminal LP1, and
said network node unit N1 converts, based on said communication record R1, said external IP packet into said internal packet P12 which contains said external IP packet,
said internal packet P12 is transferred in said communication path P12, said external IP packet is restored from said internal packet at said network node unit N2 and is sent to said wireless base station B2 from said logical terminal LP2, and said voice or data is sent to said terminal M2 from said wireless base station B2, and
based on a poS1tion change request, said network node unit N3 sets a communication record R3, said network node unit N2 sets a communication record R2X and then a communication path P32 in which an internal packet P32 is transferred, is set between said logical terminals LP3 and LP2,
said network node unit N3 receives said voice or data from said terminal M1, via said wireless base station B3, and sends said voice or data to said terminal M2, via said communication path P32, said network node unit N2 and said wireless base station B2, and
based on a communication release request which is sent from said terminal M1 or M2, said network node units N3 and N2 reset said communication records R3 and R2X, and then said communication path P32 is reset.

24. A communication system according to claim 23, wherein: a terminal T2 substituted for said wireless base station B2 is connected to said communication line L2, and said terminal M1 communicates with said terminal T2 via said communication path P12 or P32.

25. A communication system, wherein:
a communication network includes plural network node units, a wireless base station B1 is connected to a network node unit N1 by a logical terminal LP1 via a communication line L1, a wireless base station B2 is connected to a network node unit N2 by a logical terminal LP2 via a communication line L2, and a wireless base station B3 is connected to a network node unit N3 by a logical terminal LP3 via a communication line L3,
said communication network receives a telephone number or a host name of a terminal M2 and a connection request from a terminal M1 via said wireless base station B1, and,
based on said telephone number or said host name of said terminal M2 and said connection request,
said network node unit N1 sets a communication record R1, said network node unit N2 sets a communication record R2, and then a communication path P12 in which an internal packet P12 is transferred, is set between said logical terminals LP1 and LP2,
voice or data is sent to said wireless base station B1 from said terminal M1, and an external IP packet including said voice or data is sent from said wireless base station B1,
said external IP packet is inputted to said network node unit N1 from said logical terminal LP 1, and
said network node unit N1 converts, based on said communication record R1, said external IP packet into said internal packet P12 which contains said external IP packet,
said internal packet P12 is transferred in said communication path P12, said external IP packet is restored from said internal packet at said network node unit N2 and is sent to said wireless base station B2 from said logical terminal LP2, and said voice or data is sent to said terminal M2 from said wireless base station B2, and
based on a poS1tion change request, said network node unit N3 sets a communication record R3, said network node unit N2 sets a communication record R2X, and then a communication path P32 in which an internal packet P32 is transferred, is set between said logical terminals LP3 and LP2,
said network node unit N3 receives said voice or data from said terminal M1, via said wireless base station B3, and sends said voice or data to said terminal M2, via said communication path P32, said network node unit N2 and said wireless base station B2, and
based on a communication release request which is sent from said terminal M1 or M2, said network node units N3 and N2 reset said communication records R3 and R2X, and then said communication path P32 is reset.

26. A communication system according to claim 25, wherein: a terminal T2 substituted for said wireless base station B2 is connected to said communication line L2, and said terminal M1 communicates with said terminal T2 via said communication path P12 or P32.

27. A communication system according to claim 25, wherein: a terminal T2 substituted for said wireless base station B2 is connected to said communication line L2, said terminal M1 communicates with said terminal T2 via said communication path P12 or P32, and said terminal T2 does not send a call-on notification.

28. A communication system, wherein:

a communication network includes plural network node units, a wireless base station B1 is connected to a network node unit N1 by a logical terminal LP1 via a communication line L1, a wireless base station B2 is connected to a network node unit N2 by a logical terminal LP2 via a communication line L2, and a wireless base station B3 is connected to a network node unit N3 by a logical terminal LP3 via a communication line L3, said communication network receives a telephone number or a host name of a terminal M2 and a connection request from a terminal M1 via said wireless base station B1, and based on said telephone number or said host name of said terminal M2 and said connection request, said network node unit N1 sets a communication record R1, said network node unit N2 sets a communication record R2, and then a communication path P12 in which an internal packet P12 is transferred, is set between said logical terminals LP1 and LP2, voice or data is sent to said wireless base station B1 from said terminal M1, and an external IP packet including said voice or data is sent from said wireless base station B1, said external IP packet is inputted to said network node unit N1 from said logical terminal LP1, and said network node unit N1 inspects whether said communication record R1 exists or not, based on an information to discriminate said logical terminal LP1 and a destination IP address of said external IP packet, upon finding said communication record R1, said network node unit N1 converts, based on said communication record R1, said external IP packet into said internal packet P12 which contains said external IP packet, said internal packet P12 is transferred in said communication path P12, said external IP packet is restored from said internal packet at said network node unit N2 and is sent to said wireless base station B2 from said logical terminal LP2, and said voice or data is sent to said terminal M2 from said wireless base station B2, and based on a position change request, said network node unit N3 sets a communication record R3, said network node unit N2 sets a communication record R2X, and then a communication path P32 in which an internal packet P32 is transferred, is set between said logical terminals LP3 and LP2, said network node unit N3 receives said voice or data from said terminal M1, via said wireless base station B3, and sends said voice or data to said terminal M2, via said communication path P32, said network node unit N2 and said wireless base station B2, and based on a communication release request which is sent from said terminal M1 or M2, said network node units N3 and N2 reset said communication records R3 and R2X, and then said communication path P32 is reset.

29. A communication system according to claim 28, wherein: a terminal T2 substituted for said wireless base station B2 is connected to said communication line L2, and said terminal M1 communicates with said terminal T2 via said communication path P12 or P32.

* * * * *